(12) United States Patent
Rosenberg

(10) Patent No.: US 10,739,951 B2
(45) Date of Patent: Aug. 11, 2020

(54) INTERACTIVE USER INTERFACES FOR ELECTRONIC TEXTBOOK IMPLEMENTATIONS

(71) Applicant: Knowledge Initiatives LLC, The Sea Ranch, CA (US)

(72) Inventor: Barr Rosenberg, The Sea Ranch, CA (US)

(73) Assignee: Knowledge Initiatives LLC, The Sea Ranch, CA (US)

( * ) Notice: Subject to any disclaimer, the term of this patent is extended or adjusted under 35 U.S.C. 154(b) by 0 days.

(21) Appl. No.: 16/181,941

(22) Filed: Nov. 6, 2018

(65) Prior Publication Data

US 2020/0174630 A1 Jun. 4, 2020

Related U.S. Application Data

(63) Continuation-in-part of application No. 16/055,415, filed on Aug. 6, 2018, which is a continuation of application No. 14/688,211, filed on Apr. 16, 2015, now abandoned, which is a continuation-in-part of application No. 14/020,748, filed on Sep. 6, 2013, now abandoned.

(51) Int. Cl.
*G06F 3/0483* (2013.01)
*G09B 7/00* (2006.01)
*G06F 3/0482* (2013.01)

(52) U.S. Cl.
CPC .......... *G06F 3/0483* (2013.01); *G06F 3/0482* (2013.01); *G09B 7/00* (2013.01)

(58) Field of Classification Search
CPC ... G09B 5/00; G09B 5/02; G09B 7/00; G09B 19/00; G06F 3/0481; G06F 3/0482; G06F 3/0483
See application file for complete search history.

(56) References Cited

U.S. PATENT DOCUMENTS

| | | |
|---|---|---|
| 6,613,100 B2 | 9/2003 | Miller |
| 7,559,034 B1 | 7/2009 | Paperny et al. |
| 8,341,164 B1 | 12/2012 | Rosenberg et al. |
| 8,672,686 B2 | 3/2014 | Ferreira |

(Continued)

FOREIGN PATENT DOCUMENTS

| | | |
|---|---|---|
| EP | 3042372 A1 | 7/2016 |
| WO | WO-2015035074 A1 | 3/2015 |
| WO | WO-2016167829 A1 | 10/2016 |

OTHER PUBLICATIONS

ALEKS Corporation. ALEKS QuickTables. Internet Archive Wayback Machine, Nov. 8, 2011, 9 pages; http://web.archive.org/web/20111108225024/http://aleks.com/independent/students/qt_tour_print.

(Continued)

*Primary Examiner* — Jerry-Daryl Fletcher
(74) *Attorney, Agent, or Firm* — Wilson Sonsini Goodrich & Rosati

(57) ABSTRACT

An interactive graphical user interface for navigating an electronic textbook includes nodes and connectors connecting the nodes. The nodes may correspond to items of educational content, and the connectors may correspond to a plurality of paths through the nodes. As a user navigates through the electronic textbook, the user may be presented with a custom map of the electronic textbook. A path of traversal may be permanently stored.

18 Claims, 23 Drawing Sheets

(56) References Cited

U.S. PATENT DOCUMENTS

| | | | |
|---|---|---|---|
| 8,750,782 | B2 | 6/2014 | Scandura |
| 2003/0071845 | A1 | 4/2003 | King et al. |
| 2003/0172052 | A1 | 9/2003 | Crandell et al. |
| 2005/0026131 | A1 | 2/2005 | Elzinga et al. |
| 2006/0008789 | A1 | 1/2006 | Gerteis |
| 2009/0164939 | A1 | 6/2009 | Ishimitsu et al. |
| 2011/0039249 | A1 | 2/2011 | Packard et al. |
| 2013/0022953 | A1 | 1/2013 | Van Der Linden et al. |
| 2014/0282013 | A1 | 9/2014 | Amijee |
| 2015/0072330 | A1 | 3/2015 | Rosenberg |
| 2015/0254214 | A1 | 9/2015 | Rosenberg |
| 2017/0366547 | A1* | 12/2017 | Goldfarb ................ H04L 63/08 |

OTHER PUBLICATIONS

ALEKS Corporation. Overview of ALEKS. Internet Archive Wayback Machine, Aug. 23, 2013, 3 pages; https://web.archive.org/web/20130823234629/http://www.aleks.com/about_aleks/overview.

ALEKS Corporation. What Is ALEKS? Webpage printout, Copyright 2016, printed Apr. 6, 2016, four pages, https://www.aleks.com/about_aleks, https://www.aleks.com/about_aleks.

Ashbach, Heather. Bridging the Gap: Adaptive Learning Program Developed at UCI Supplements and Reinforces Math and Science Skills. UCI News, Jul. 1, 2013, three pages.

Co-pending U.S. Appl. No. 16/055,415, filed Aug. 6, 2018.

EP14776930.1 European Office Action dated Aug. 17, 2017.

Falmagne et al. The Assessment of Knowledge, in Theory and in Practice. Formal Concept Analysis, 4th International Conference, ICFCA 2006, Lecture Notes in Artificial Intelligence, Feb. 2006 Proceedings, pp. 61-79, vol. 3874, Dresden, Germany.

PCT/US2014/054131 International Search Report and Written Opinion dated Jan. 26, 2015.

PCT/US2015/049243 International Search Report and Written Opinion dated Nov. 2, 2015.

ALEKS Corporation. Research Behind ALEKS: Knowledge Space Theory. Webpage printout, Copyright 2016, one page, https://www.aleks.com/about_aleks/knowledge_space_theory.

U.S. Appl. No. 14/020,748 Office Action dated Dec. 30, 2016.

U.S. Appl. No. 14/020,748 Office Action dated Jun. 30, 2016.

U.S. Appl. No. 14/020,748 Office Action dated Oct. 19, 2017.

U.S. Appl. No. 14/020,748 Office Action dated Oct. 28, 2015.

U.S. Appl. No. 14/688,211 Office Action dated Apr. 21, 2017.

U.S. Appl. No. 14/688,211 Office Action dated Feb. 7, 2018.

\* cited by examiner

Electronic Textbook 5

WIDE-ANGLE VISION

ACUTE FOCUS VISION

INTERACTIVE USER INTERFACES FOR ELECTRONIC TEXTBOOK IMPLEMENTATIONS

CROSS-REFERENCE

This application is a continuation-in-part of U.S. application Ser. No. 16/055,415, filed Aug. 6, 2018, which is a is a continuation of U.S. application Ser. No. 14/688,211, filed Apr. 16, 2015, which is continuation-in-part of U.S. application Ser. No. 14/020,748, filed Sep. 6, 2013, each of which applications is entirely incorporated herein by reference for all purposes.

FIELD OF THE INVENTION

Preferred embodiments of the invention are directed towards electronic textbooks and other collections of useful information. In particular, preferred embodiments of the invention are directed towards creation and use of such collections of useful information, by permitting interested parties to traverse and annotate collections of useful information, and recording the traversals and annotations for the benefit of other interested parties. Other preferred embodiments of the invention are directed towards aiding a creator's thought process when developing and communicating useful collections of information. One purpose of the invention is to aid productive thought by facilitating more accurate understanding and more effective communication.

Various embodiments are directed to a Creative Development Environment (CDE), a corresponding Creative Presentation Environment (CPE), and Aids to Productive Thought (APT) that can be implemented in various suitable electronic environments.

BACKGROUND

Limitations of Traditional Printed Books:

In today's modern world, there is a vast ocean of information available on subjects of interest to users. This information is difficult to collect, organize, and present in a manner that is both focused and flexible. For example, publishing a collection of information in a book allows the book's author to present a focused presentation of the material in an order defined by the pages of the book. However, a book is not flexible. There is only one linear path through the book from start to finish, and that order is defined by the book's author and not customizable or adaptable by the user (e.g. reader). Furthermore, if a user wishes to explore content outside of the book there is no easy way for the user to identify relevant additional content to explore and to access and review additional content with any level of detail. This is particularly challenging where the user wishes to explore additional content that was created after the book was written. Even if the user can use outside resources to access additional content after the book is published, the user has no easy way to record the additional content for later consideration, either by her/himself or by others.

Limitations of the Web:

Alternatively, information may be published as a collection of separate pages containing links from one page to another, such as Internet web pages. Information published in this manner is much more flexible, as a user can navigate through the information following the links between the pages. Also, web content is frequently updated so additional content created after the initial publishing of the webpage is made available to users. However, there is little organization to web content. It is difficult for a user to locate useful related content if that content is not directly linked to or from the page the user is reading.

Limitations of Usual Web Browsing Methods:

It is also difficult if not impossible for the user to gain the benefit of the experiences of others who have navigated through the same collection of information. At best, the user is presented with a page having links to other pages, but the user has no understanding of how other users have navigated through those links, why a particular user selected a particular link or path, or what path a particular user chose to follow through a collection of information.

It is also difficult for the user to make a record of the user's own navigation through the content, to present a record of the user's navigation to others, and for users to provide additional content and link that content to the visited content. Users are not generally permitted to modify the content of web pages to add additional links. While users can create their own pages and provide links to the visited content, such links are only associated with the user's own page, and are not accessible from the visited content. Consequently, although a group of web pages might well represent a useful collection of information, it is difficult for users of the web to individually or collectively shape such a collection into a coherent whole.

Limitations of Printed Textbooks:

Textbooks are important mechanisms for conveying information and learning new information. Students often make notes while reading textbooks to help them recall or process new information. Notes have traditionally been taken on paper—sometimes on the pages of the textbook, sometimes on other sheets of paper. Each approach has its own merits and demerits. A traditional textbook cannot offer a multi-faceted note-taking system in which notes are directly associated with specific locations in the text, and yet also independently accessible and sharable.

Traditional textbooks present material in linear format that is constricted to the outline of the content, this can make interacting with the content difficult. For example, to search a print textbook the user must start by looking at the indexed items to determine the section they need to examine to find the content they are searching for, and this is sometimes awkward and time consuming. As a result, the ability of the users to review previously read material from the textbook may require reliance on the table of content, outlines they have generated, notes they have made in the textbook and memory. When using a textbook for a course, a reader who wishes to look ahead at new material may not have notes or other resources and thus must solely rely on the generic index, table of contents, or outline provided by the textbook. Printed textbooks rely on the linear presentation of material, as set forth in the table of contents, in the outline, index, and progression of the text, and generally have difficulty presenting multiple parallel themes or discussing the interacting effects of multiple factors or aspects presented within the textbook. The linear structure of both outline and material helps to maintain a single progression that aids a reader's memory, but the linear structure does not have the flexibility to accommodate the needs of all students by fostering understanding, and therefore the rigid structure of printed textbooks can detract from a reader's understanding by de-emphasizing interrelationships among topics.

A printed textbook offers limited capabilities for students, teachers and others to share information. The student usually reads the textbook independently, and there is no way for the teacher, fellow students, parents or mentors to supplement the student's reading experience effectively with timely and focused encouragement, elaboration, supplementary exposition, cautions (mistakes to avoid) or emphasis (things to focus on).

Thus there is a need to embed annotations and overlays into a digital textbook format that permits note-taking, handles richer non-linear outlines, supports multiple themes or traversals through the content, and facilitates more efficient contextual search. A digital textbook format of this type opens up the content to include and support sharable contributions by the student, the teacher, parents and others.

Limitations of Printed K-12 Textbooks:

Printed textbooks must be designed for a "typical student", and cannot cater to the diverse needs of a varied student body. Since it is ordinarily not practical for students in the same class to use different textbooks, textbooks are designed for the "typical student" and classroom education focuses on that hypothetical "typical student". When major distinctions exist among students who might otherwise be together in a class, the practicable solutions may be clumsy and costly, and often involve offering different classes with different textbooks, such as special education with remedial textbooks, college-oriented classes with advanced textbooks, and special classes for students who speak a foreign language at home.

Diverse students would surely benefit from diverse materials that could accommodate each student's individual needs; however, there is currently no practical way to assemble diverse material into a single book. Assembling varied course content into a single printed textbook designed to accommodate the needs of a diverse student body would cause printing costs to go up and make books heavier, and redundant content presented in a restricted format or linear outline could confuse students and teachers. Furthermore, the rigid format of a traditional textbook forces a separation between teaching and testing, and prevents the textbook from assisting the teacher in administering a personalized exam to reflect a student's unique status. Flexible service for diverse students at a high level requires the embedding, layering, and presentation of content disclosed by the present application. Our education system shows clear signs of stress as a result of the inability to meet the diverse needs of an international student body with materials that are well suited for each individual student's needs. For example, specialized schools, often in urban areas, have found success providing advanced education for a premium cost, indicating that generally available education in school systems and the school systems in rural areas lack the facilities to provide advanced education and thus are not able to provide advanced or gifted students with the same universal opportunities. Current educational systems also do not do well educating students who have challenges with standard textbooks due to dyslexia or dyscalculia, and yet possess ordinary or even superior intelligence. Such students may, for example, be able to understand the meaning and function of language and mathematics just as well as typical students, but do not readily comprehend symbolic representations in letters and numbers. They might learn much more through teaching methods that emphasize intuitive knowledge of the use of language and mathematics, and allow the student to recognize meanings that are implicit through the student's experience rather than by rote learning. Teachings oriented toward meaningful understanding might also be useful supplements for all students, but they cannot now be readily assimilated into standard textbooks in large part because of the format and structure of linear written methods for conveying information.

The root of the difficulties with current learning environments lies in the limitations of the printed, one-book-suits-all textbook. There is a need for a new form of textbook that offers each student a personalized learning opportunity through systems and interfaces that are designed to be adapted and custom tailored to the educational needs, learning styles and preferences of the individual student. Diverse student learning experiences arising from such a multi-functional textbook could cause confusion in the classroom—both between students and teachers and among students—so it will be important for the new form of textbook to be able to pass on student experiences and comments from student to teacher and provide a framework for students to share their experiences with one another. Providing electronic mechanisms for acquiring and sharing content and experiences between students and teachers is also important because students that have grown up using modern technology may also be more accustomed to engaging by sharing and interacting with each other as a means of contextualizing and understanding content. The preference of some students may be two-way interaction as a means of learning as opposed to single direction absorption of information from a standard textbook.

Thus, there is a need for a new way to organize collections of information such as electronic textbooks, in a manner which permits textbook authors or users to define different paths through the information, and which retains these paths, and information about these paths, allowing them to be made available for the benefit of other users.

Color-blindness is another limitation that is not always addressed by standard textbooks. The colors used in diagrams and figures in printed books are designed for the student with typical vision, and cannot be readily personalized for each color-blind student to a palette that best conveys information to the student's visual sensitivity. Thus, there is also a need for a new form of textbook that can morph the color palette in its diagrams to respond to the requirements of a color-blind student, which could thereby also be responsive to the personal color preferences of all students.

Beyond these evident limitations, a wider issue that impacts every student, because students are all different and it is not clear that every student should be forced onto a single path by a "typical student" text. Students can potentially learn to understand the subject matter better while also learning more about themselves and how they learn, but this potential can only be realized when students are able to choose among various modes of learning and optional supplements, while receiving the guidance that they need from the textbook to make informed choices. Thus there is a need to develop an electronic textbook that provides these capabilities.

Limitations of Printed College & Post-Graduate Textbooks:

In addition to the above limitations, printed textbooks in higher education present a plethora of problems including: exorbitant cost and obsolescence, inefficient presentation of complex knowledge in appropriate depth, absence of linking up of content with other sources of information, difficulty fitting content efficiently into a wider curriculum, and student challenges with carrying knowledge forward after graduation.

Cost and Obsolescence:

The high cost of printed textbooks for higher education merits attention, it was estimated at $1,200 for the 2012-2013 academic year for College education in the United States. The high pace of obsolescence in textbooks forces down the value of used textbooks, thereby increasing the cost of ownership for students who resell textbooks. These statistics call into question the lasting value of books students purchase for their personal libraries. The lag time that often postpones publication until well after the author completes work is another concern in a setting of rapid obsolescence. It makes sense to shift to an alternative method of providing textbooks that hastens publication, reduces production costs and permits regular, fully-functional updates to existing textbooks.

Presenting Complex Knowledge in Depth:

Current educational methods that rely on printed textbooks, which lack adaptive capabilities and cannot be coordinated with the web, cannot keep up with the decentralized global research enterprise and the proliferation of shared knowledge on the web. Linear outline and linear page sequence are the joint organizing principles of a printed book, so current traditional textbooks are incapable of keeping up with new information. A book can also offer one or more separate lists of specialized items like figures or exercises to supplement the outline; however, there is no systematic means for rendering relationships between topics that cut across different segments of the outline. Nor is there a good way of highlighting the collective importance of relationships or themes that spread across different segments. Nor is there any good way of navigating through the book to see only those sections that deal with a single theme in the proper order. The tools in printed textbooks that are presently available to present complex material and promote understanding of complex matters are essentially limited to interpolated comments and diagrams, themselves trapped in the linear sequence of the book and visible only at that one point. Thus, there is a clear need for an electronic textbook that is built around the concept of a fully general non-linear outline that can make arbitrary relationships visible and present distinct traversal paths for each of the diverse themes presented in the book. There is also a need for an overlay system in the electronic textbook that allows faculty and students to add and share comments at any point in the book and generate full traversal paths through the book.

Curricula Involving Multiple Textbooks:

Inefficient cross-referencing between textbooks is a major drain on a student's energy and understanding in higher education. Everything would be much easier for students and faculty if textbooks could cross-refer effortlessly, and effectively interoperate. For example, most students in higher education regularly take courses in different but closely related disciplines, often for the purpose of assimilating interrelated knowledge, methods, and perspectives. Consequently, many individual courses need more than one textbook to fully cover the material presented. At present, there is no way for printed textbooks to interact in a single curriculum, nor is there a way for faculty to effectively offer detailed traversal paths that could substitute or augment direct for in-person interaction. Thus, there is a need for electronic textbooks that can be integrated in a common configuration, offering the student traversal guides that lead to mastery of joint or related content.

Linking to References:

When reading a printed textbook, access to references is at best cumbersome. Nonetheless, it seems clear that one of the greatest potential values of a modern higher education textbook would stem from its usefulness as a superior access point to a vast and burgeoning body of literature. The service of providing access to a vast changing and constantly growing body of literature cannot be provided without offering the student direct access to cited references. Providing access to a vast and changing, constantly growing body of literature will only be practicable when the textbook can be kept up to date at reasonable cost while continuing to offer direct and immediate access to current references.

"Direct Access" to broader content can be implemented in different ways, for example: access can be provided to the document as a whole, direct access can be provided from within the referring point to the point where the specific cited passage resides, or access can be provided by adding optional capability of temporary transit from the original point of reference to a native presence at the remote website that serves the reference, with the option of direct return at any time to the point of departure. Thus, there is a need for an electronic textbook that can effectuate such access. Once electronic textbooks have this capability, service providing websites will step up to provide these varying degrees of access, allowing linking to a specific passage and optional native access when appropriate.

Fitting Efficiently into a Wider Curriculum:

The educational styles normally supported by a collection of linear printed textbooks do not accord well with the comprehensive perspective required for mastery of a curriculum by students and faculty. Although it is well known that many students benefit from both reading and hearing complex material, the higher education teacher is often required to devote lecture time to clarifying issues with the textbook readings, filling in gaps in content, updating obsolete passages, and explaining other passages in greater depth. This is an awkward and inefficient approach that is not fully satisfying for teacher or student, consumes valuable lecture time and can create a sense of tension between lecture and textbook. In this changing world adequate textbooks do not always exist, and when the teacher develops supplementary readings to fill the gaps or extend available coverage, it is often difficult to coordinate the new material with the existing curriculum. Thus, there is a need for electronic textbooks that are presented within the setting of an overlay or dynamic user interface that reflects the teacher's pedagogical requirements, allowing the faculty member to insert comments of all types, point out relationships, change the order of presentation, insert new material, and sometimes override elements of the material entirely.

Departmental faculty may work together to craft a consistent curriculum that integrates diverse textbooks and fills in the gaps, but there may be no efficient way to embody their efforts at the required level of detail in a form of documentation that can stand the test of time and conform and adapt to changes to the material or to the university curriculum and course catalog. Thus, there is a need for a general system that can serve as an umbrella structure, providing and engaging with multiple sources of content such as two or more electronic textbooks and guiding students through a curriculum that extends across them; such a structure would support the assimilation of supplementary materials provided by the faculty and preserve superior teaching materials at the detail level in a lasting and dynamic format. In such a general system, an overarching curriculum can be readily extended beyond the setting of a single course to cover an entire program.

Difficulties with Carrying Knowledge Forward:

Institutions of higher education are natural places for energy to be invested in organizing and integrating knowledge, and it makes sense for them to build upon these efforts to provide lifelong educational services for their graduates. However, at present no efficient framework exists for the ongoing efforts of faculties in updating and expanding their knowledge base and curricula to be usefully disseminated to their graduates. The natural approach is a "living curriculum" in the form of overlay and supplementary material provided by the faculty that organizes and presents the information in electronic textbooks that is being regularly updated. A setting and system of this kind for presenting and curating information could also shelter and support ongoing communications by faculty sharing knowledge learned through their own experience to students and graduates in a relevant way. It would be quite possible for academic efforts of this kind, building upon electronic textbooks as their springboard, to become the foremost guides to professional information on the web. Thus, there is a need for an effective overlay system that integrates well with electronic textbooks and allows the fruits of ongoing collective faculty curriculum efforts to be shared with graduates as well as current students and regularly updated in a cost-effective way.

Urgent Need:

These challenges are intensifying. As society grows more complex and the pace of social change continues to accelerate, the gap between course content and application is widening. As more and more resources are freely available on the web and search providers become increasingly effective, the value added by an academic program is likely to diminish unless the program can integrate the web as a resource included within its more structured and formal offerings. As knowledge deepens, increasing specialization requires a proliferation of classes, which in turn leads to smaller class sizes and higher costs per student. There is a compelling need for new educational tools built around electronic textbooks and overlays that can empower educators to offer efficiently the benefits of their understanding to their students in coursework as well as after graduation.

Need for New Methods and New Insights:

Similar to language, visual representation is a longstanding human skill. The two skills are complementary and have different strengths. For example, visual representation of content can be processed more quickly than language based content. There is a need to coordinate language with map and diagram at a high level through computer displays based on innovative software. There is a need for techniques like the non-linear outline in the form of an overlay that blend language with visual representation.

Facing burgeoning complexity there is a need for tools and systems that are adapted away from the rigid linear form of a printed book, which is rooted in the ancient traditions of memorization and subsequent recitation of spoken words. The structure of linear systems supports linear thought, which has limitations. By contrast, visual analysis takes us almost effortlessly to the big picture. There is a need for techniques that overlay two or more alternative organizations of the same constructs (e.g. interpretations, systems of logic, causal structures, visual renderings, etc.) that allow the visual field to assist in clarifying complex meanings.

Verbal analysis and visual analysis are two distinct mental capabilities. Current information tools such as textbooks predominantly rely on verbal analysis, thus limiting the student's ability to adapt to their personal preferences, and failing to support the ability to teach students to bring verbal and visual analysis together and apply them in balance in the learning process. There is a need for techniques like the "dwordle" exercise, "visual logic" and drawing with meanings" that can help the student to learn how to coordinate visual and verbal capabilities in productive thought. As access to knowledge and information deepens and extends, students face increasing complexity. There is a need for systematic tools that allow students, readers, and authors to bring the highest qualities of verbal and visual analysis to bear using tools like the closely-coupled "display field" and "tabular grid", which represent complex material in both visual and verbal forms, and permit us to move at will between the two, seamlessly and spontaneously.

Knowledge is important in modern societies, not least because of the great complexity of the world. With the growing body of knowledge and data, there is a need for tools that help individuals (students, faculty, authors, readers, users etc.) to cope with complexity and keep up with the pace of change.

New knowledge takes shape within the setting of existing knowledge. When a user's (e.g. student, faculty, author, reader, etc.) creative thoughts and new ideas are emerging, it can be difficult for the user to sustain the creative process at a high level because the flux of potential ideas that cannot be retained in memory. Existing knowledge, which has been held in memory of the past can be questioned and disrupted during the creative process. Unfolding ideas, which are often tentative and unstructured, may not yet be fixed in memory and indeed should not be fixed for them to be subject to change. Potential ideas that have not yet been articulated are the aim of the creative process, but those potential ideas have not yet taken shape in conscious thought. Disruption of existing knowledge, ever-changing configurations of working ideas, and elusiveness of potential ideas, are all hallmarks of the creative process. Mental energy can be wasted in confusion and creative opportunities can bemissed.

Confusion itself is not the problem, because confusion can be a fertile state in which new knowledge readily comes forth. The primary concern is losing touch with valuable ideas, losing track of creative progress, and ending the creative session without making any progress. In an effort to protect oneself from this, a mental effort may be made to hold on to one's working ideas and tie them back to existing knowledge so that nothing will be lost; unfortunately, holding on mentally in this way can stifle the natural flow of creativity, slow progress and tempt one to give up before full potential is reached. To circumvent these obstacles, all there is a need jot down notes or make drawings along the way. What one writes down can be preserved for later review and can be safely released from memory. The act of writing something down in this context, can allow one to let go and stimulate one to launch a fresh train of thought. Creative thought thus alternates between actively thinking, and pausing to making notes and refresh ourselves.

One's brains are the basis for a thought process. Modern education systems demonstrate that the brain learns from experience and is readily trainable. Although education rewards effective thinking, the curriculum does not specifically focus on teaching a student how to think. Students don't learn how to observe their thought process, how to think effectively about thinking, or how to evaluate their habits of thought and enhance them so that they can think more productively. One can learn to think by solving problems, and as one matures increasingly complex problems can be solved, but this may be accomplished without learning creativity. Common sense suggests that if an individual thoughtfully observes their creative process, they can discover ways to enhance it.

Interactive User Interface:

The nodes and connectors in the electronic textbook have both verbal and visual qualities. The nodes can have meaning and texts are attached to them like titles in an outline, but they also operate like visible objects that can be displayed in many different views in corresponding positions with the positions providing context and conveying meaning. The user can appreciate their dual aspects of system function and display, and consequently expect them to magically behave as they do. The intuitively straightforward behavior of the system and display is accomplished by calculations performed by computer processes and then presented via displays that project and render the context of the content in accordance with the needs of the user and the nature of the content. There is a good deal of sophistication involved in the software that accomplishes this, which operates invisibly in the background to maintain a seamless user interface.

SUMMARY

Provided herein is an interactive graphical user interface presented on a display for navigating an electronic textbook, comprising: a custom map including a visual representation of a plurality of layers, each layer comprising a plurality of graphical nodes and a plurality of graphical connectors therebetween, a graphical node corresponding to a page, and a graphical connector corresponding to a path between any two pages, wherein the visual representation of the plurality of layers includes at least one graphical connector traversing between two graphical nodes located in two different layers or offers the opportunity to navigate between layers; a graphical status indicator on the custom map, wherein the graphical status indicator indicates a current location of a user on the custom map, the current location being a current node; and content of a current page of the electronic textbook corresponding to the current node, wherein each of the plurality of graphical nodes is selectable by the user, wherein selection of a subsequent graphical node navigates the user from the current page to a subsequent page corresponding to the subsequent graphical node.

In some embodiments, the custom map is user-specific to the user.

In some embodiments, each of the plurality of layers corresponds to a different difficulty level of the electronic textbook.

In some embodiments, the interactive graphical user interface further displays a visual representation of a comment layer overlaying the custom map, the comment layer comprising one or more comments. In some embodiments, each of the one or more comments is linked to a node or connector of the custom map. In some embodiments, each of the one or more comments is associated with viewability permissions.

In some embodiments, the custom map further comprises a graphical representation of a path previously traversed by the user to arrive at the current node. In some embodiments, the path is a graphical highlight of one or more nodes or one or more connectors in the path. In some embodiments, the path is permanently stored in a database. In some embodiments, the database is secured by a blockchain.

In some embodiments, the custom map further comprises a graphical representation of a recommended future path. In some embodiments, the recommended path is a graphical highlight of one or more nodes or one or more connectors in the recommended path.

In some embodiments, the custom map is updated in real-time. In some embodiments, the custom map is updated in response to user interaction with the interactive graphical user interface.

In some embodiments, each of the plurality of graphical nodes and plurality of graphical connectors are assigned a unique identifier.

In some embodiments, the custom map is collapsible such that the display primarily shows the content.

In some embodiments, a subset of the plurality of graphical nodes corresponds to problem pages containing user-interactive problems.

In some embodiments, the plurality of graphical nodes displayed in the custom map is within viewability permissions relative to the user or relative to the current node or relative to the layer of the current node.

Basic Functions

In an aspect of an embodiment of the invention, an electronic textbook is presented as a collection of items of information with multiple navigation paths defined through the items of information.

In an aspect of an embodiment of the invention, each navigation path corresponds to a level of instruction, such as average, advanced or remedial.

In an aspect of an embodiment of the invention, materials from instruction levels other than the user's assigned level are optionally available to the user.

In an aspect of an embodiment of the invention, users are offered the choice of either or both of two different styles: conceptual/factual and cookbook-solution/procedurally oriented contrasting to meaningful/visual-tactile/understanding-oriented.

In an aspect of an embodiment of the invention, test-your-skills exercises are offered to student users, performance is evaluated, and feedback is given to the student.

In an aspect of an embodiment of the invention, users are offered the choice of teaching materials in three forms: written, spoken and video.

In an aspect of an embodiment of the invention, the user's choices concerning level and/or style and/or spoken/written and/or performance on test-your-skills exercises are recorded and analyzed to determine which personalized options should be visible to and recommended to the user.

In an aspect of an embodiment of the invention, users are guided and permitted to change paths while navigating through the textbook.

In an aspect of an embodiment of the invention, the user's recorded choices and/or test-your-skills performance are made available to privileged users such as parents, instructors, school authorities, authors and publishers in appropriate forms.

In an aspect of an embodiment of the invention, complete user paths through the textbook are recorded, with comments, for presentation to privileged users or other users.

In an aspect of an embodiment of the invention, privileged users and/or users are permitted to add additional content to the textbook.

Functions Serving Both User and Author

In an aspect of an embodiment of the invention, users of the electronic textbook benefit from a non-linear outline interconnecting the items in the form of an overlay in multiple layers.

In an aspect of an embodiment of the invention, the author of the electronic textbook organizes the material for the textbook using a similar overlay.

In an aspect of an embodiment of the invention, users of the textbook are able to access and extend the non-linear outline in either of two formats: a display field or a spreadsheet-like tabular grid.

In an aspect of an embodiment of the invention, the author of the electronic textbook conceives of and assembles the material for a textbook using the display field and tabular grid.

In an aspect of an embodiment of the invention, the electronic textbook user reviews the path already traced and explores options ahead in the display field.

In an aspect of an embodiment of the invention, the author of the electronic textbook uses the same display field to design and test navigation paths and optional choices for users.

In an aspect of an embodiment of the invention, users are permitted to use the display field and tabular grid to make personal notes on the items in the electronic textbook and create connectors among these notes, for their own benefit or the benefit of others.

In an aspect of an embodiment of the invention, the author uses the display field and tabular grid in the same way to create the non-linear outline overlay that determines the navigation paths and options.

In an aspect of an embodiment of the invention, users work in the display field to include diverse audio and visual media in their notes on items in the electronic textbook.

In an aspect of an embodiment of the invention, the author uses the display field and tabular grid to assemble various audio and visual elements into the electronic textbook.

In an aspect of an embodiment of the invention, the electronic textbook user employs the glossary to find the meaning of a term, and then uses the display field to view selected highlighted instances of the term sought.

In an aspect of an embodiment of the invention, the author uses a list of terms in the tabular grid to sharpen up language and develop a glossary, and uses the display field to view selected other instances of terms under consideration.

In an aspect of an embodiment of the invention, the user's understanding is heightened by links between items in the display field that demonstrate logical relationships—"visual logic"—or suggest important associations—"drawing with meanings".

In an aspect of an embodiment of the invention, the author uses visual-logic and drawing-with-meanings tools to explore complex interactions and elicit new ideas while simultaneously developing material for the electronic textbook In an aspect of an embodiment of the invention, the electronic textbook user adds additional items to the electronic textbook using the display field and tabular grid and offers these to a privileged user or the author for inclusion in the textbook.

In an aspect of an embodiment of the invention, the privileged user or author reviews the material suggested by the user, deems it worthy of inclusion, and uses the display field and tabular grid to incorporate it into the electronic textbook.

In an aspect of an embodiment of the invention, updates to the electronic textbook are made available to new purchasers and existing owners of the textbook.

The present disclosure provides interactive user interfaces for education with several benefits and advantages.

Interactive User Interface for Education

Applications of computer systems and the web in education have not yet reached their potential. An interactive user interface can allow diverse students with different styles of learning to come together in a classroom or web class to study common topics with related materials, while learning in their diverse ways and benefiting from their diversity with the support of the interface and the teacher.

Providing Choices for Students to Make

Differing students must be offered appropriate choices among different levels of material such as basic, general, and advanced, and among different styles of presentation that allow students to find the necessary balances between application and intellectual understanding and between symbolic and substantive depictions.

Custom Mappings of Curriculum and Progression

The curriculum for the course as a whole, which may extend beyond the course proper to previous and subsequent courses in the same subject as well as to other related courses and other web-accessible materials, is mapped in its entirety in terms of various paths and connections among course materials in the "overlay outline", and also described by a "dependencies and requirements" mapping in which topics are flagged for required comprehension and dependencies connect each topic to other topics necessary for its comprehension.

Offering the Student a Custom Mapping

The student is provided a custom topic map, which maps all previously studied pages (the path taken) and all immediately relevant possibilities for progression (the view ahead), and the interactive interface offers a local "custom map" in which the natural continuation of the present path and other possible branches and optional choices are visible, so that the student can receive visual representations of context while taking a more active learning role and learning more about learning.

Offering Structured Inquiry

In addition to traditional aids like glossary, index, and search, the interactive user interface can offer modes of inquiry that take advantage of nodal structure, such as searching for individual nodes in which multiple specified items appear, or connected structure such as a set of nodes within a limited connection distance (for example, within the range of two connectors) in which multiple specified items appear; search results in the custom or content map, for example, can be displayed in terms of individual map locations by local maps, or in terms of the overall outcome by highlighting the distribution of solutions found across the range of the entire map.

Providing for Innovative Jumps

One example of structured inquiry is the search for logical connections, which may arise from related meanings, usages, applications or structures, and which may inspire a sense of excitement, enthusiasm or intense curiosity when recognized; therefore, the author or other commentators can indicate various such connections among items (innovative jumps) scattered through the electronic textbook, provide within the textbook varied implementations of these connections such as optional choices, excursion paths, or linked pages within a single topic, and a user or teacher may discover such a connection through structured inquiry and potentially add the logical connection as an option for others.

Offering Optional Pages and Excursions

In contrast to a traditional printed textbook that is limited to the sequential presentation of its contents, a course that is offered with an interactive user interface can be extended and enriched in many ways. Optional pages, optional visits to the web, optional sequential paths through multiple pages (excursions), and specialized supplemental pages (such as "test your skills" pages) that figure in the electronic textbook's assessment of the student's capabilities. can help to enrich the student's experience; the interactive user interface's custom mappings are sensitive to the concern that options may not fit into the main thrust of the student's progress, and can, for example, display optional material only when requested or alternatively display only such optional material as may play a significant role in the student's understanding of course material, such as certain test your skills pages and question cascades.

Extending Content

One fundamental strength of the interactive user interface of an electronic textbook is to reach out to the prior year's course in the same subject for review and remedial purposes and reach out to the next year's course for advanced materials as well as when approaching the end of the school year, and also reach out to supporting topics in other simultaneous courses, as for example for the benefit of the entire class when linking courses in math and science, or when helping a student to clarify a language issue by linking any other course to an English course.

Providing for Comments and Guidance

A student's notes on the course material can be attached to the custom map at the point they refer to, and subsequently reviewed as a full history overlaid on the map or in other ways juxtaposed with their referents; the teacher, caregiver and other mentors can enter guidance for the student and other comments that are handled in the same way; comments and guidance can be linked in conversations or other groupings; and in all cases, the visibility of each comment item is determined by author, so that, for example, a student's comments may be entirely private or selectively shared with other students or shared in their entirety with a caregiver and or friend, and a conversation between teacher and mentor can be reserved exclusively for themselves.

Learning from Mistakes and Misunderstandings

The interactive user interface allows the electronic textbook to readily administer questions and problems singly or in cascades in user-friendly forms within the contexts to which they relate, provide maps that highlight indications of past mistakes and potentially link these together in association with common underlying themes, and include in the student's traversal maps question pages and problem pages that were useful, as resources for future reference.

Providing Assistance after a Mistake or Misunderstanding

Questions and problems may be frequently provided to help each student to sharpen and clarify understanding, and based on assessments of the answers the textbook can evaluate a student's capabilities and potentially administer additional questions or problems to provide further assistance.

Helping to Clear up a Misunderstanding

When a pattern of mistakes persists and/or its underlying structure is unclear, the interactive user interface can support cascades of questions or problems that delve increasingly deeply as necessary in search of an underlying difficulty, and after a difficulty has been pinpointed and resolved as demonstrated in one or more correct responses, the interface can offer a second forward cascade as appropriate that leads back through successive applications to the starting point, in order to confirm the assessment and solidify the student's knowledge.

Learning Together at a Distance

When a student is unable to get to the classroom and participating from home, or a student attends a web class where students are routinely separated from the teacher and each other, or when students are working on homework and cooperating or collaborating from various sites, or when a student is taking an examination remotely, the interactive user interface can offer useful tools in support of learning together at a distance; also tools of the system operating on each student device can support user recognition so as to authenticate each user and protect against interlopers, and related tools can offer conversions between text and speech so that each user can convey and also receive information in textual form or spoken form or both.

Entrainment for Interface Navigation

The interactive interface is designed to support entrainment, wherein the interactive interface on a following device is originally brought to the same condition as a leading device and subsequently entrained to continually display a copy of the lead device display, while also receiving supporting information as well as other communications from the lead device; at any time entrainment can be relaxed to restore the student's device to active use or entrainment can transition from one device to another so that, for example, students can exchange the leadership role or alternate in making contributions to a common project.

Cooperation and Collaboration

With the support of the interactive user interface, students can cooperate by exchanging comments while keeping in touch verbally or through visual displays, and collaborate by jointly editing a shared document and in other ways, and students can collaborate on class projects while relying on the recognition capabilities of the interactive interface to verify their separate contributions; the same capabilities that support the attribution of collaborators also help to validate the work of someone who is taking an exam remotely.

Conclusion

The electronic textbook's interactive user interface is the indispensable component of the larger electronic textbook system by means of which the student contacts the information and ways of thinking embodied in the textbook, the system evaluates the student's existing knowledge capabilities and conducts the student through the learning process, the teacher and other mentors help to direct and structure the student's participation in the course, and students cooperate and collaborate while maintaining distinct responsibilities for their separate contributions.

Device Pairs

In various embodiments, a creative user can be encouraged to alternate between the formal and creative devices in a device pair. For example, working with the formal device can support clarity and accuracy and advances toward a final product. Working with the creative device can support wide-ranging context and can free the user to respond spontaneously. The formal field can serve for memory and the creative field can serve for exploration. Alternating between the two in successive cycles can allow knowledge to take shape gradually and extend beyond preconceived limits. Each of the following example device pairs combines a formal Display Field oriented toward analytical clarity with a less structured Display Field oriented toward wide-ranging context; however, these example embodiments should not be construed to be limiting on the variety of embodiments that are within the scope and spirit of the present invention.

Tabular Grid and Display Field

This device pair helps a user arrange systematically the various significant factors in a problem and their attributes, while also creating a graphic display of key factors and relationships among significant factors in a problem that helps a user to comprehend important points, keep them in mind, and develop new ideas.

Informed-Choice Paths and Knowledge Garden

This device pair helps an author to appreciate diverse themes present in the material and discover modes of presentation that appeal to diverse readers. Authors learn to go beyond sequential linear organization of content, so that annotators and readers can actively explore the knowledge offered and develop greater mastery and appreciation.

Overlay Outline and Concordance with Contexts

This device pair helps users to interweave top-down systematic thinking with the meaningful specificities of significant bottom-up data. This approach helps in many situations, and can be beneficial in a large-scale project.

Relationship Display and Dwordle Field

This device pair helps users to lay out and present relationships among constructs as users currently understand them, while also providing the freedom to let go of the structure users have established and explore new possibilities, discern unexpected linkages and revise and extend our knowledge. In various embodiments, this approach can be effective in solving knotty and longstanding problems.

Panorama with Scenes and Context Gatherer

This device pair helps users break down complex matters into manageable pieces without losing track of the larger picture and work out the implications of seemingly disconnected insights, while continuing to gather further observations and insights that extend, enhance and potentially revise understanding.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The details of the invention, including structure and operation of the embodiments of the invention, may be gleaned in part by study of the accompanying figures, in which like reference numerals refer to like components.

DETAILED DESCRIPTION

Certain preferred embodiments of the invention will now be discussed in detail. While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Figure 1:
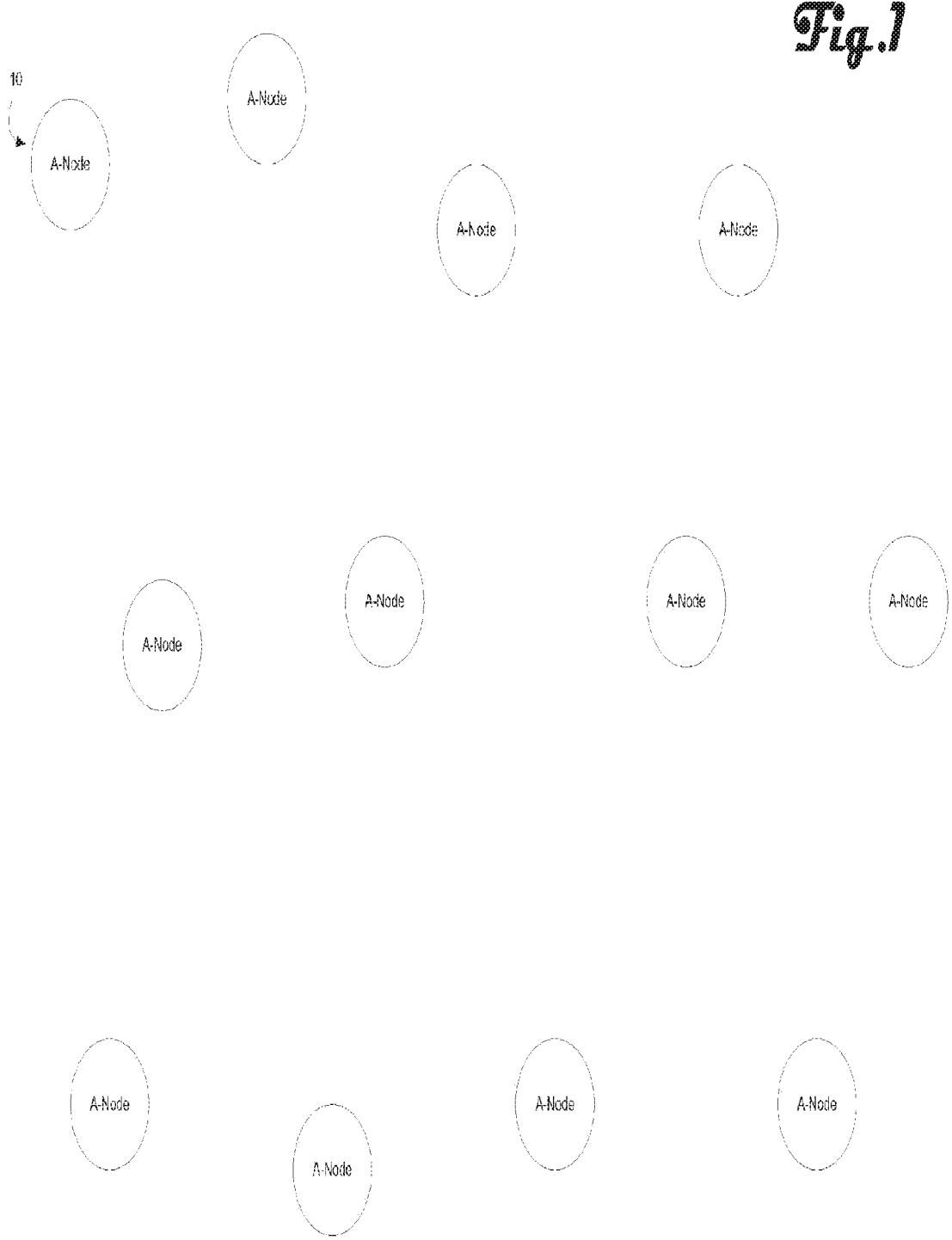
FIG. 1 shows a collection of information nodes in an electronic textbook, according to an embodiment of the invention.

In an embodiment of the invention, with respect to FIG. 1, a collection of information is information for use in an electronic textbook 5. An author compiles the information for use in the textbook 5, and creates a collection of information items, or nodes 10. For convenience, the nodes compiled by the author are labeled as "A-nodes" in FIG. 1.

Further examples discussed below will introduce nodes 10 supplied by others who interact with the electronic textbook 5.

Diverse Items:

Each node 10 contains a piece of information about the subject matter of the textbook 5. For example, a node 10 can contain a sentence, a paragraph, a page, or a chapter of text. Additionally, a node 10 can contain multimedia information, such as a picture, a video recording, an interactive graphic, or a sound recording. The author can compile this information in a variety of ways. The author can create the information items in the nodes 10, by for example writing the text, drawing the picture, or recording the video or sound. Additionally, the author can gather existing information items from other sources. The author gathers a text quotation from a source such as a book, or a historic document. The author samples a sound recording of a famous speech or dramatic performance. The author gathers a copy of a video recording made available to the author, such as a video of a presidential address, or of a historical event such as the Apollo moon landings. In an embodiment, each of the information items in the nodes 10 is selected by the author for inclusion in the electronic textbook. Additionally, as discussed in further detail below, other entities or individuals also select information items for inclusion in the electronic textbook 5.

Comments on Items:

The author additionally provides comments about the information item. For example, the author describes why the author decided to include the information item in the electronic textbook 5. The author identifies a source for the information item. The author may also indicate the date the author collected the information, or the date the author added the information to the collection. These comments may be included in each information item itself, or may be associated with an information item as attributes of the information item. The comments are associated with each information item, for example by being attached to or linked to the information item.

User Interactions:

The electronic textbook format allows the author to (i) attach interactive support functions to all nodes, and (ii) to embed within specialized nodes extensive interactive content. Further, (iii) the electronic textbook allows the interactions with the user to be recorded as attributes of the user's path through the electronic textbook that can be shared with friends, parents, teachers, the author, and so on, thereby serving a number of important functions such as guiding the user toward choices that result in finding their optimal book; tracking the user's use of the book and performance with material in the book, and sharing this information with parent and/or teacher; giving the student an opportunity to share comments and questions with other students and offer them suggestions about nodes to visit in the book.

Interactive Support Functions:

Interactive support functions include, for example: view-ahead, path-taken, perspectives, and overlay view (overlay view displays the network of overlays, including the user's, parents', teachers', friends' with the option to focus on a subset such as just one's own comments), other navigation tools, search, index, and a number of dialogues. Examples of the dialogues include: "where am I and what can/should I do next?" dialogue, "where have I been and how can I review it?" dialogue, "I [don't understand, am confused by, can't remember, don't see the use of, am bored by] this, so please help!" dialogue, "I'd like to see further [advanced, remedial, procedural, contextual, inspiring, detailed] material about this." dialogue, 'I' d like to see an [example, exercise, application, exposition, intuitive illustration] of this." dialogue, "Is there another way of [explaining, solving, proving, understanding, applying, thinking about] this?" dialogue. These dialogues provide a structured display and response to commonly encountered situations for the users. The forms of specialized nodes include, for example: junctions (gateways, vestibules, galleries, logic views and simple junctions), test your skills, examples, exercises, and interactive Aids to Productive Thought (APT). Interactive APTs are interactive displays that help to align conceptual and intuitive understanding, make useful connections between related topics, assist in remembering and getting a feel for things, help with the creative process and help with effective inference.

Querying Incomprehensible Passages

For example, in an embodiment, the electronic textbook encourages the user to select any sentence or passage that is difficult to understand, and drag and drop it into a query window. The electronic textbook may then request that the user read the section through completely and then read through to this point a second time before actually launching the query if the passage is still not clear. Once the query is launched, the electronic textbook presents an explanation to the user, which is drawn from a combination of glossary entries, remedial material, and special exposition designed exactly for that passage. In this embodiment, users' difficulties with particular passages are reported back to the author or publisher, allowing for the database of special expositions to be expanded and potentially leading to rewriting of unclear passages. In this embodiment, the electronic textbook is likely to be frequently updated. Updating would be transparent to users on the cloud, and users who downloaded the textbook to local computers would receive update downloads. Returning to the experience of the user, the electronic textbook asks the user after reviewing the expository material whether the passage has become clear. If not, the user is offered the choice of attaching a query comment to guide parent, teacher or other mentor to provide assistance later on.

Study Partner:

As another example, in an embodiment, the Study Partner is an audio presentation that interacts with the student user verbally. Study Partner presents himself/herself as the student's peer and makes the process of study more engaging. Study Partner can interact with the student user at any time. For example, it can administer an exercise or test your skills exam in friendly dialogue, carrying out all of the steps from introducing the exercise/test, offering feedback along the way, and concluding with a discussion about how the student's performance fits in with the student's study plans and longer term goals (see below for more information on study plans and goal setting). Study Partner can receive queries and present responses in dialogue, voicing prepared query-response passages, the content of glossary entries or recommended references. Study Partner can activate any aspects of navigation through the overlay on behalf of the user, guiding the user to remedial material or inviting the user to consider more advanced material that comes up in the dialogue. Study Partner can also drill the student user on study material, offering additional explanations or alternative approaches. Study Partner can convey new information to the student user, such as informing the student user of the arrival of new comments by other users. In order to function, Study Partner depends on three primary elements. First, it draws upon content provided by the author and publisher-including the basic content of the electronic textbook and additional material developed for query response-as well as content assimilated through the contributions of the school and teachers, parents and mentors, the student user, and fellow students. Second, Study Partner relies on the logical structure for this content embedded in the Electronic Textbook, including the layout for query response, in order to provide the benefit of this store of information to the user in a friendly and supportive way. Third, Study Partner relies upon capabilities for voice recognition and intelligent dialogue that are familiar in consumer electronics applications such as Siri and well known in the industry.

Notes, Comments and Reminders:

In an embodiment student users are able to attach a note, comment or reminder at any node or connection in the electronic textbook, including any nodes or connections that have been added by the user. As these terms are used here, a "note" is directly related to the electronic textbook and explains it in the user's own words; a "comment" is anything else that is relevant, and particularly something that is intended to be shared with others or describes the user's experience; and a "reminder" is a personal memo to oneself, usually something that is ongoing and needs to be recalled afterward. A note may or may not be shared with others, as determined by the user or arranged by other privileged users. A comment is more likely to be shared, and in some embodiments may be shared by default within the user group. A reminder is private by default, although it can be shared with selected other users. The user can view his or her own notes, comments, and reminders along with the node or connection to which they are attached, and these can also be viewed in a gallery filtered and/or sorted by location, topic or time created, and can also be located by searching for any term. Notes, comments and reminders can be created with Voice Memo for audio or Video Memo for video, and can also be typed as text in the Text Memo field.

Aids to Focus and Time Management:

In another embodiment, the electronic textbook can highlight for the student user the time span of the present study session, recording the start time and asking the student for the planned duration. The electronic textbook can then offer to disable the internet during study sessions. It can prompt the student when no evident user activity occurs during a 5-minute interval or whenever scope is switched away from the textbook during the session. The electronic textbook can alert the student to the amount of time seemingly diverted to the internet or other activities during the study session, and report both "clock time" (the duration of the session), and "study time" (the estimated time actually invested reading and interacting with the material.)

Figure 2:
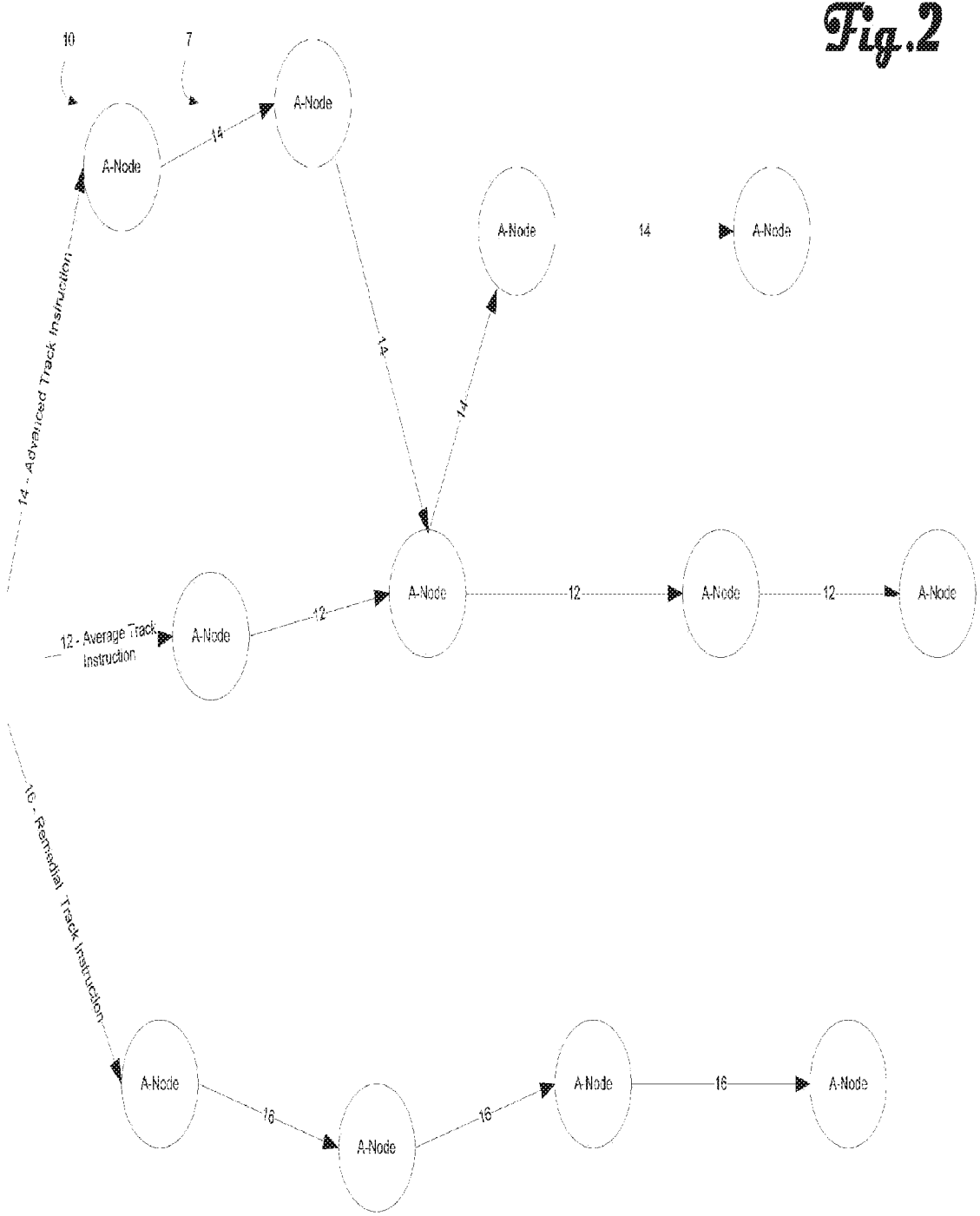
FIG. 2 shows paths associated with the information nodes in an electronic textbook, according to an embodiment of the invention

Multiple Paths Through the Book:

Turning to FIG. 2, the author defines a number of paths that traverse through the nodes 10. These paths are made up of connections 7 between the nodes 10. The connections 7 of an embodiment can be as content-rich as the nodes 10, rather than merely serving as connections between the nodes 10. A path comprises a series of connections 7 in addition to the nodes 10 that they connect, and much of the information that pertains to a path is associated with the connections. For example, many author or user notes and comments naturally attach to connections 7, not to nodes 10. Such comments include explanatory comments clarifying why a particular connection was traversed, or previewing what the user can expect to encounter in the node 10 at the other end of the connection. The traversal record that constitutes a path comprises connections. Connections have attributes that aid in navigating through the electronic textbook 5.

Connections of Various Types:

For example, if a user is surprised by a node 10 or otherwise wishes more information about how the user arrived at the node 10, the comments and other attributes of the connections 7 allow the user to find out where he is, and where he came from. Connections 7 also possess attributes. This is important because in many applications, various connections 7 serve more than one function or role, and it is sometimes important to separate out or highlight connections 7 based upon their role. For example, some connections 7 connect a sequence of nodes 10 and some connect branches to that sequence, while others reflect logical relationships. Some may represent a person's comments or additions, as distinct from those provided originally by the author. The connections 7 allow the functions they serve to be identified as attributes that aid in making informed choices and displaying the map of the electronic textbook 5.

Average, Advanced and Remedial Paths:

Each path represents a different presentation ordering for the instructional material used in the electronic textbook 5. For example, in this embodiment the electronic textbook 5 includes a primary path 12, which represents the path an average student is expected to take through the electronic textbook 5. The electronic textbook 5 further includes an advanced path 14, which represents the path an advanced student is expected to take through the same electronic textbook 5. The electronic textbook 5 further includes a remedial path 16, which represents the path a remedial student is expected to take through the same electronic textbook 5.

Written, Spoken and Video Formats:

Additionally, the author can define paths that take into account additional desired instructional techniques. For example, some students process audio or visual information more efficiently than textual information. For these students, the author can provide alternative nodes 10 which present the same instructional content in different forms. Thus an item of instructional content may be provided in narrative text form in one node 10, in audio form in another node 10, and in image or motion picture form in yet another node 10. Additionally, the author can provide alternative nodes 10 which provide the instructional content in different languages, either textual or spoken. Alternatively, a given node 10 may present the same content in multiple different forms. A user traversing a path in the electronic textbook 5 will then select the form of information which the user finds most efficient to process. Of course, the form of information selected by the user can vary from node to node.

Individual Paths are Distinct:

Each of the paths 12, 14, 16 traverses through the nodes 10 of the electronic textbook 5. The paths 12, 14, 16 may each traverse different nodes 10, or the paths 12, 14, 16 may overlap one or more nodes traversed. For example, in FIG. 2 the path 12 and the path 14 each traverse the node 10a. The node 10a, therefore, represents an information item that is expected to be helpful both to average and advanced students traversing the electronic textbook 5. In an embodiment, the paths 12, 14, 16 are independent of each other, unless the author creates a connection between the paths. Thus the particular connections 7 between the nodes 10 can be members of multiple different paths. The connections 7 can be combined into a path without concern about the connections' roles in other paths they may belong to. All paths to which a connection 7 belongs are separately stored. The membership of a given connection in the various paths of the electronic textbook 5 is an example of one of the attributes of a connection.

Informed Choice:

Having defined multiple paths through the nodes 10, it is helpful to provide the user with a variety of ways to choose amongst the paths, or to make other choices which will enhance the user's educational experience. Among the important concepts reflected in embodiments of the invention is the concept of informed choice. The term "informed choice" refers to the tools and techniques that the electronic textbook 5 offers to assist the user in finding the appropriate path. It is beneficial for the electronic textbook 5 to give the user a wide variety of choices of ways to navigate through the material reflected in the nodes 10, and to give the user the information necessary to make wise choices. The framework of the electronic textbook 5 emphasizes meeting individual wishes and needs by offering diverse paths and helping users to find their appropriate path.

Learning about Knowledge:

The framework of the electronic textbook 5 facilitates creative development, learning and teaching. While helping people to learn the subject matter at hand, it also helps them to learn more about their own state of knowledge and to clarify their thoughts. The framework encourages users to reflect on how the electronic textbook 5 can assist them. For example, at a significant point along the paths through the electronic textbook 5, a user might see among the options presented in a node 10 such responses to choose as "Why am I doing this: what's in this for me? Can you make this more interesting? More relevant. I need an example! I'm completely lost. I disagree with this. I'm interested; can you tell me more about this? Go into this more deeply?

Dialogues:

Here are some further examples of dialogues that an author might offer to a user:

Where am I and what can/should I do next?

Where have I been and how can I review it?

I [menu: don't understand, am confused by, can't remember, don't see the use of, am bored by] this, so please help!

I'd like to see further [menu: advanced, remedial, procedural, intuitive, contextual, inspiring, detailed] material about this.

I'd like to see a [menu: example, exercise, application, exposition, intuitive illustration] of this.

Is there another way of [menu: explaining, solving, proving, understanding, applying, thinking about] this?

Please refresh my understanding of [list of topics from which to choose.]

Does this relate to [list of topics from which to choose]?

Setting Goals and Monitoring Progress:

In an embodiment, the electronic textbook can discuss goals with the student during informed choice dialogues. For example, the electronic textbook can suggest such goals for improvement as (i) doing well in the course and moving up from remedial to average, or from average to advanced; (ii) completing the course material early and going on to material in the subsequent course; (iii) going more deeply into intuitive understanding of what the material is useful for and how it works, and (iv) working through the material more quickly and efficiently. In brief, these four dimensions could be summarized as academic mastery, academic advancement, practical mastery and pace.

The electronic textbook can encourage the student user in various ways to respect the goals that they have set and to monitor their own efforts and progress. Once a substantive goal is formulated, the electronic textbook can propose a graduated series of intermediate steps that will lead to attaining the goal. If the student establishes a time-frame for attaining the goal, the electronic textbook can suggest reasonable target dates for completing the intermediate steps. The electronic textbook can offer the student to track their progress toward their chosen goal, and to give them advice and encouragement along the way. With the student user's agreement, the electronic textbook can offer supportive comments that compare the student user's actual progress with the targeted schedule.

Alternatively, if the student prefers, the electronic textbook can report on their accomplishments respecting all four goals. For example, the electronic textbook could help the student user to create a critical path to learning select material based on the user's input of number of hours to be spent per day, with specific goals for mastery of material achieved by a certain date.

In an embodiment, the electronic textbook analyzes each study session as the student user is winding it up, taking account of the student user's interactions including path taken, performance on exercises and test your skills, time spent on various features and queries launched, and self-evaluation comments. Placing this information into the context of the course syllabus and the user's expressed goals and experiences in prior study sessions, the electronic textbook can provide feedback to the student user and/or to the student's parents or teacher in an appropriate way.

Considering Options:

When the user selects one of these dialogues, the user is directed to a node 10 which provides information responsive to the choice the user made. Encouraging a user to choose invites the user to reflect on what the different possibilities mean to them and to consider how best to make a decision. Choices promote awareness of people's diversity, for people are different and make diverse choices. A user may choose options that fit their own interests, or they may select an option because they are interested in why it is interesting to others, or because it contradicts their views.

Information and Perspectives:

The electronic textbook 5 of an embodiment offers many types of information, such as:

Orientation-what path has been traced up to this point, what choices are there at this moment and where do they lead.

Comprehensive overview and search: a comprehensive list of available features and links, which can be filtered by any applicable attributes;

Recommendations optionally supported by comments, based upon the user's experiences so far;

"Test your skills" questions that yield recommendations on what more may be important to learn; and Alternate paths provided by the author or friends.

Nodes for Navigation and Logic: The nodes 10 and connections 7 in the electronic textbook 5 offer a range of options for giving the user choices to select from:

a Vestibule node displays the relevant choices when a user reaches a junction;

a Gateway node welcomes the newly arrived user to a path or introduces the user to a section;

a Gallery node shows a wide range of alternatives; and a Logic View node presents causal relationships or associations, most often when items are interrelated in complex ways;

an ordinary junction (typically a connection, but it can be a node) offers a signpost with explanatory text as appropriate.

Figure 4:
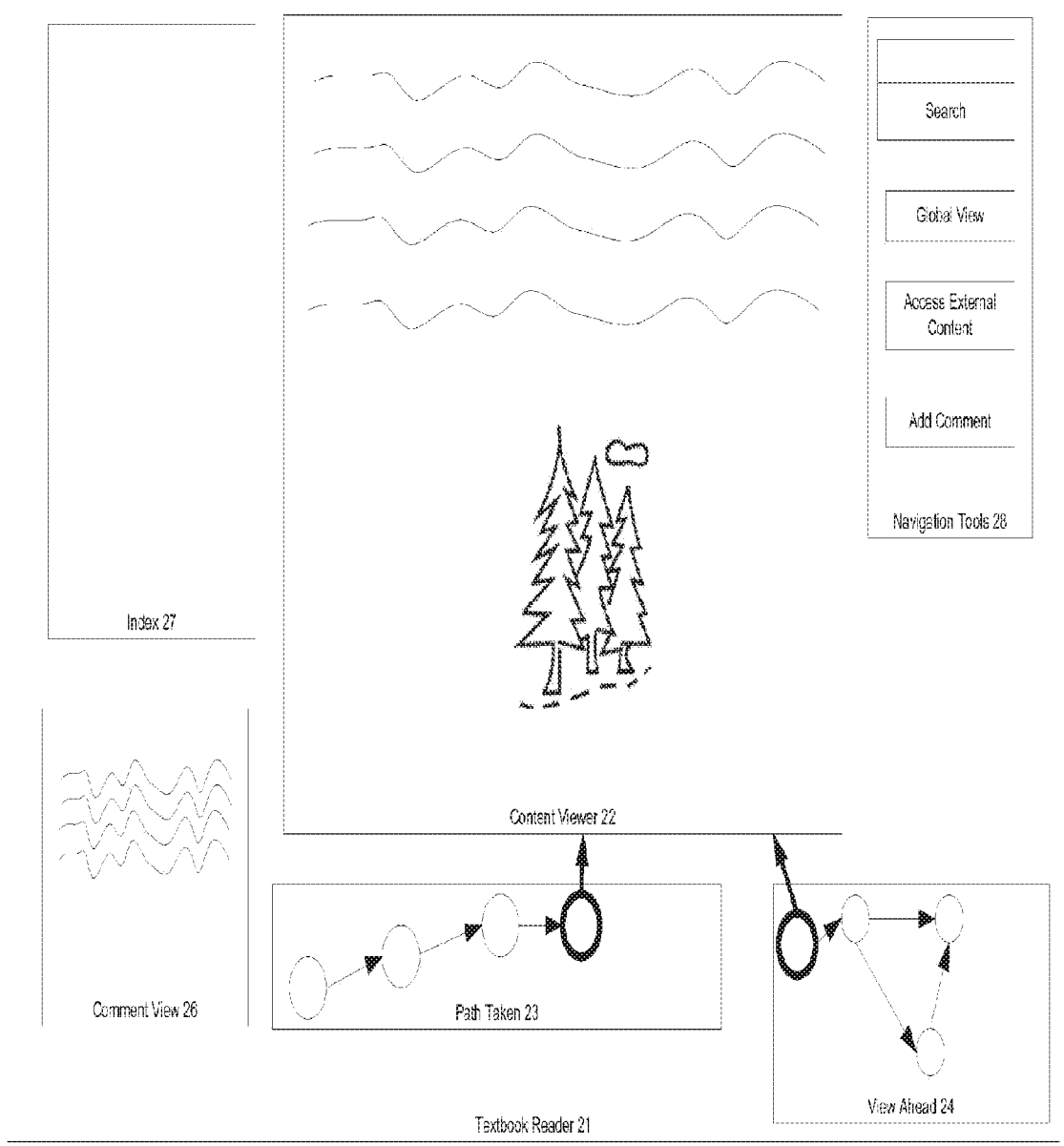
FIG. 4 shows a textbook reader, according to an embodiment of the invention.

Halls of Informed Choice:

As will be discussed in further detail below, the electronic textbook 5 when viewed in an environment such as that presented in the reader of FIG. 4, presents a view-ahead window which shows the next stations on the present path, and a path-taken window showing the previous stations. All of these and more are referred to generically as halls of informed choice.

Halls of informed choice are offered at important junctions to present the author's customized discussion and display of the choices available. These halls supplement perspectives (discussed in further detail below), which are available at every node to provide local views or views of the entire document. Note that a hall is a component of the navigation aspect, and so has many functions in common with connectors, but it is a node dedicated to navigation rather than a connector. There are four main types of halls as well as ordinary junctions.

Gateway:

A gateway is an entry point to a path or section of the document. This may be designed for newly arriving visitors or for users transitioning to a new section. An electronic textbook 4 (or overlay 41 as discussed below) can have many gateways, each serving a different audience. Typically a gateway offers welcoming information, an introduction and a summary of what lies ahead, all of which may be tailored to the user's needs based on their prior path. A gateway can invite the user to consider opportunities and reflect on what might be most useful or appealing.

Vestibule:

The user generally enters a vestibule after having made a choice.

Consequently a tool-tip introducing the vestibule may appear when the cursor is passed over that choice. Vestibules can have diverse purposes, such as to present a preparatory test of skills, offer an exercise, invite the user to pause and reflect, or summarize the material graphically in preparation for a further choice.

Gallery:

Generally a gallery displays nodes that have a common status. For example, all of the optional nodes in an electronic textbook might be displayed in a single gallery. Alternatively, all of the subtopics of a topic might be displayed in a gallery.

Logic Views and Logical Nexus:

A logical nexus can, for example, represent a special factor common to a number of nodes. In a book about society, for example, some distinct factors might be cooperation, personal accomplishment, knowledge, thoughts and emotions; each of these factors could be awarded its own logical nexus that presents the role that the factor plays throughout the book in a meaningful way. A logic view node could display many such logical nexuses, presenting a visual display of the role of each in the book and giving the user ready access to all this information.

Structural Views:

Some of the most important logic views are structural. A structural hall shows nodes according to some organizing principle. For example, nodes might be arranged in a two-dimensional table. In an electronic textbook, the columns might be different paths through the material, such as remedial, average and enhanced, and the rows might be lessons. Alternatively, nodes might be arranged in a circle or several concentric circles. Generally a logic view node is a visual element displaying logic and also serves as a staging area from which to quickly explore that logic, by navigating to the nodes 10 pertaining to the logical concept that relates the nodes together.

Ordinary Junction:

An ordinary junction generally does not have a special node attached. Instead it assembles and displays attributes of the connectors and their nodes that can be reached at that junction. It is like a signpost at a junction on a trail.

View Ahead and Path Taken:

Unlike the halls mentioned so far, which apply to fixed positions in the electronic textbook 5, View Ahead and Path Taken accompany you on your journey, for example as stand-alone windows. Wherever you are, they show you the choices ahead of you and the path you have traced so far.

Figure 3:
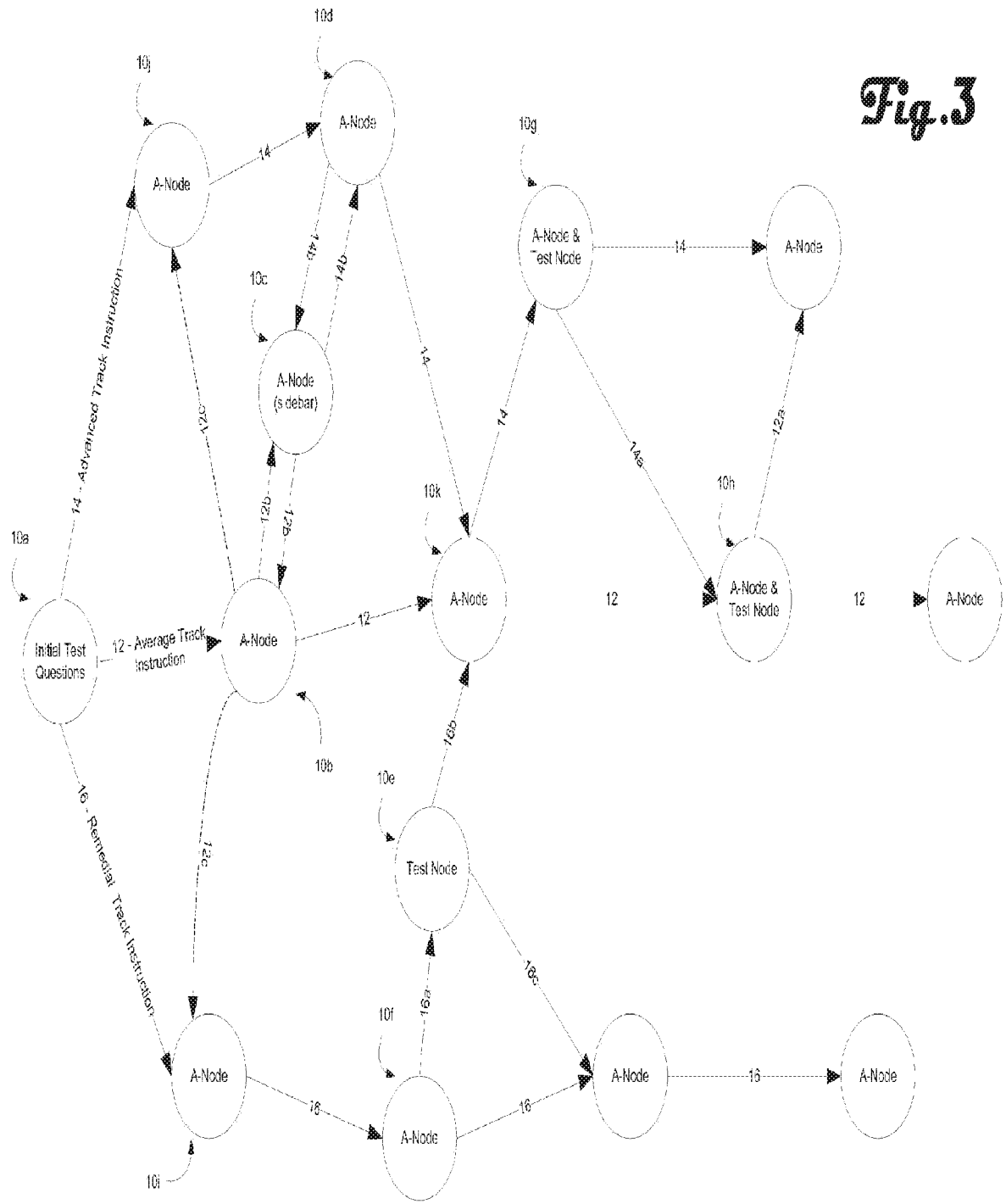
FIG. 3 shows additional connections between information nodes of an electronic textbook, according to an embodiment of the invention.

Entry Gateway:

Turning to FIG. 3, the author defines additional connections and nodes of the electronic textbook 5, to implement the halls of informed choice discussed above. For example, the author can provide a variety of ways for the user to select a path to begin traversing the electronic textbook 5. One way is to present a gateway node 10a having a series of test questions, which test the beginning skill level of the user. Based on the outcome of the test questions, the user is directed to the appropriate path. High-scoring users are directed to the advanced path 14. Average-scoring users are directed to the average path 12. Low-scoring users are directed to the remedial path 16.

Alternatively or additionally, the user may be presented with each of the available paths, along with comments that explain each path. These comments can be stored as an attribute of the initial path connection. This connection attribute may be displayed to the user when the user expresses an interest in learning more about the path, for example by clicking on the path starting point, or by moving a pointer over the path starting point, or some other way of indicating an interest in learning more about the path. Alternatively, these comments can be set forth in the gateway node 10a, which lists and explains some or all of the paths available in the electronic textbook 5. To further aid in organization of the paths through the electronic textbook 5, the paths may be presented in various orders. For example, author-defined paths are presented first, followed by paths created by privileged users such as teachers, schools, or school districts. Then paths created by other users are presented. The active path for a specific user can be presented before all other paths, to assist the user in picking up where the user left off in the textbook 5.

Arrangement of Paths:

In an embodiment, the electronic textbook also permits arrangement, of paths, whereby only certain specified paths and options along those paths are permitted to a particular user, while other paths and options along the permitted path are securely hidden. Arrangement is an important feature of the electronic textbook that facilitates administration of the electronic textbook. The teacher can arrange the gateway node 10a so that the student begins on an assigned path, such as the average path 12. Alternatively, if the student has studied with other electronic textbooks in previous classes, it can be arranged that the recorded performance of the student in those prior classes determines the options available in the gateway node 10a.

Multiple Years of Instruction:

The information included in an electronic textbook need not be limited to a single grade or a single topic. For example, a single mathematics textbook might include all the instructional material for grades one through four. In this case, a student beginning the second grade would enter the gateway node 10a with the options of reviewing material from the first grade, beginning at the start of the second grade and beginning at the point where the student left off in the previous year if the student had already progressed into second grade material while in the first grade.

Multiple Themes:

As another example, consider a college-preparatory class in U.S. History or Social Studies. An electronic textbook might be designed around a chronologically organized primary path, while also embedding in the primary and supplementary material nodes that typify different organizational approaches used in academic fields such as economics, social science, political science, law, ethics and psychology. The first part of a year-long course could be taught in a chronological way following the primary path, while the second part repeatedly returns to the gateway node 10a to traverse different academic themes one after another, reflected in different paths through the nodes 10 of the electronic textbook 5. Thus, the electronic textbook of an embodiment offers the students useful perspectives on the choices available in college. Another instructor might present the material in the book in a more conventional way, integrating the supplementary material alongside the primary material as a year-long chronological course.

Extending and Updating:

While building the paths 12, 14, 16 through the nodes 10, the author also can create additional nodes 10, or refine or change the content of the existing nodes 10, as desired. For example, in reviewing the instructional material, the author decides that the contents of a particular node 10b may be confusing to some students, or the students would otherwise benefit from additional explanation. The author therefore adds an additional node 10c, such as a vestibule, which provides this further explanation, along with connections 12b from the node 10b to the node 10c, and back again. Alternatively, the author decides to update the textbook 5 with additional information, such as a new version of the textbook 5, to incorporate newly-discovered information. This additional information may also be added as additional nodes 10.

Path-Dependent Navigation Options:

Note that node 10c may also be linked to by other nodes, such as the node 10d on the advanced path 14. Similarly, node 10k is connected to nodes on both path 12 and path 14. Where a node is linked from multiple other nodes, the electronic textbook 5 retains knowledge of the node from which the user came, and uses that knowledge to provide further options to the user. For example, if the author desires that the user stay on the same path 12, 14, 16 that the user was on, then for users who arrive at node 10c from node 10b, the node 10c will present only the connection 12b back to node 10b, and not the connection 13b to the node 10d. Similarly, for users who arrive at node 10c from node 10d, the electronic textbook 5 will present only the connection 13b back to node 10d, and not the connection 12b to the node 10b. Likewise, users who arrive at node 10k on path 12 will leave node 10k on path 12, whereas users who enter node 10k on path 14 will leave node 10k on path 14. This feature allows the electronic textbook 5 to use the same content on both paths 12, 14, without risk of confusing the user as to which path the user is on.

Availability of Options:

Optionally, the user will not be presented with the connections on the path the user is not currently travelling. Alternatively, the electronic textbook 5 can present both return connections, and thereby allow the user to switch paths from the path 12 to the path 14 via the node 10c or 10k. This is an example of a context-sensitive feature of the nodes 10. The user's experience is different, depending on which path the user took to arrive at the node 10c or 10k.

Test Your Skills: Path Transitions Based on Performance:

It is also advantageous for the user to be permitted to change paths, as appropriate for the user's skill level and understanding of the material. Thus the author builds in nodes 10 which facilitate the user's changes in path. For example, the author determines that at node 10e, a user on the remedial path 16 should be offered a test, to see if the user has grasped sufficient knowledge to be elevated to the average path 12. The author creates the test node 10f, and prepares appropriate skill test material, such as test questions. If the user passes the skill test, then the user is elevated to the average path 12, via the connection 16b. If the user does not pass the test, then the user is returned to the remedial path 16, via the connection 16c.

In this example, the test is optional. After reviewing the content at node 10e, the user is offered the opportunity to take the test at node 10f, via the connection 16a. As with any of the nodes 10 or connections 7, the user may provide comments associated with the connection 16a. For example, the user may explain why he elected to take the test, or offer words of encouragement to other users following the user's path. If the user declines the option to take the test at node 10e, then the user continues to follow the remedial path 16.

The electronic textbook 5 also includes nodes such as the node 10g on the advanced path 14, where a test is incorporated into the content of the node. Here, the user is simply presented with the test. If the user passes the test, then he continues on the advanced path 14. If he does not pass the test, then the user switches to the average path 12, via the connection 13a. Similarly at node 10h, a user on the average path 12 is presented with a test. If the user passes the test, he is switched to the advanced path 14 via the connection 12a. If the user does not pass the test, he continues on the average path 12. The transitions from path 12 to path 14 are, in this example, seamless and transparent to the user. The user is only aware that he was asked test questions, and that he was then presented with a path to follow to the next node. Thus the user need not even be aware that he has been switched to a more difficult path, or to a less difficult one.

Information about Choices:

In addition to presenting test questions to the user, the electronic textbook 5 can also include other types of choices offered to the user, in nodes 10. For example, as discussed above, at a significant point in the electronic textbook 5 a user might see among the options presented to them in a node 10 such responses to choose as "Why am I doing this: what's in this for me? Can you make this more interesting? More relevant. "I need an example!" I'm completely lost. I disagree with this. "Please refresh my understanding of [list of topics from which to choose . . . " I'm interested; can you tell me more about this? Go into this more deeply? Does this relate to [list of topics from which to choose]? Based on the choices the user makes, the user will be directed to different nodes 10 in the electronic textbook 5, such as nodes on a different path, or explanatory nodes to clarify difficult content.

Logical Connections:

The author can also include other ways to associate nodes 10 with each other in an electronic textbook 5, without creating a path. For example, the author could determine that a node on the average path 12, such as node 10b, contains content that is logically related to another node, such as the node 10i on the remedial path 16, or the node 10j on the advanced path 14. Then the author creates a connection 12c with an attribute indicating that the nodes 10b and 10i, or 10b and 10j, are logically related to each other, even though they are on different paths. This attribute can be in a comment added to the connection, explaining the relationship between the two nodes. In an embodiment, the author creates the logical connection by dragging a connection between the node 10*b* and the node 10*i*. The connection may be highlighted, represented with a dashed line, or otherwise marked to distinguish it from a connection that forms part of a path. This connection could be used by a student to optionally review the related content at nodes 10*i* or 10*j*. Alternatively, it could be arranged that this connection would be obscured from display to students, and instead could be provided only to the author, or to privileged users of the electronic textbook 5 (e.g. teachers or school boards). Of course, these logical relationships can be defined between any nodes 10 which are logically related, regardless of which path 12, 14, 16 the nodes are on.

Knowledge Garden:

Just as a garden path offers the walker views of other features in the vicinity, a textbook of an embodiment can be designed as a "knowledge garden" with primary paths that the user must traverse, which are enriched by an array of relevant topics potentially interesting to the user offered optionally at each point along the way. In a knowledge garden, a gradually unfolding set of options may be displayed as a set of small icons from which to choose. For example, if there were 200 nodes along a primary path, there might be 500 supplementary nodes of this kind in the electronic textbook. The author would select a subset of six of these to appear as options on each primary node, selected from among the total of 500 for relevance and appropriateness. The connectors among these supplementary nodes can be thought of as the layout of the garden.

Structural Connections:

Another kind of relationship is "structural". This is an important special case of logical relationships that arises when nodes fall into categories (related in sequence by type) or fall into a matrix structure like a table or spreadsheet. For example, language texts may cover a basic series of grammar topics each year, in which case the matrix would have grades as its rows and topics as its columns. Alternatively, the chapters of a text might contain text, examples, and exercises, leading to three categories. Also, the author may choose to cover exactly the same distinct topics at different levels (remedial, average, and advanced) or in different ways (procedural and intuitive), so that the topics are rows and the forms of coverage are columns. These special cases are important because they offer different modes of traversal and call for special display formats.

Other Connections:

Also there is the straightforward relationship arising from a glossary. Also there are, as explained below, possibly overlays provided by the teacher, or parents or the user's personal use, or by the user for his/her own use.

Perspectives:

The electronic textbook 5 of an embodiment also offers perspectives, which are representations of portions of the electronic textbook 5 that allow the user to explore outside the restrictions imposed by the author's own structure. Perspectives have many facets. A perspective can show, for example, the entire electronic textbook 5, a given path 12, 14, 16, the nodes 10 and connections 5 in the vicinity of a path 12, 14, 16, or the connections between two paths. It can show your present location, or the possible paths leading from your location stretching out to a requested distance (either simply measured as a number of nodes out on the path, or using a distance metric such as those discussed with regards to visibility of a path below). It can show the path you have traced so far and the recommended path ahead. If you are interested in traversing from your present location to another node in an orderly way, alternate paths can be shown in perspective. (Of course you always have the alternative to just jump to a desired node, and you will often do so.)

A perspective can highlight any category of features (i.e. nodes) and/or any category of connections. It can show some or all categories, each highlighted in a different way. A perspective can also work with "layers", which are like tiers in a "layer cake." Layers may represent different stages of progression or different levels of the non-linear outline. The perspective can show them individually, alternately, or in progression like horizontal slices through the cake. It can also show them all at once as a three-dimensional image, while highlighting the different layers in a variety of ways to distinguish them.

Any hall of informed choice can display on request an appropriate perspective well suited for considering where to go next. Similarly, certain perspectives, such as the path ahead or path taken, can be continually displayed by the electronic textbook 5, for example using the reader of FIG. 4, discussed below.

Perspectives can take diverse forms. Structure of the nodes 10 and connections 7 can be displayed graphically or can be implicitly shown through the form of a table. For example, orderly arrangements of nodes 10 or connections 7, and their attributes, can be shown in a spreadsheet view in the tabular grid 61.

Textbook Reader:

Turning to FIG. 4, the electronic textbook can be viewed using a textbook reader 21 running on the user's computer. This reader 21 may also be used by the textbook author to build the electronic textbook 5, and may incorporate the features of the overlay builder 56 as discussed in further detail below. The textbook reader 21 includes a content viewer 22, which displays the content of the various nodes 10 of the electronic textbook 5. The content viewer 22 permits the user to interact with interactive content, such as by clicking on words or images to navigate to, for example, a glossary as discussed in further detail below. If the content in the content viewer 22 itself contains connections to other content, the user can activate or navigate to that content by clicking on it. The content viewer 22 can additionally incorporate the functionality of the visual display 60 and tabular grid 61 as discussed in further detail below with reference to FIG. 10. This allows a reader of the textbook to experience the same benefits realized by the textbook author, which is particularly helpful where the reader wishes to extend the content in the electronic textbook 5 as discussed herein.

Path-Taken View:

The reader 21 also contains a path-taken window 23. This window shows the path the user has followed thus far, to arrive at the node 10 displayed in the content viewer 22. The path can be displayed either in text form, or preferably in graphical form as shown in FIG. 4. In an embodiment, the current node 10 being displayed is highlighted in the path-taken window 23, for example by being bolded, with an arrow indicating that the content of the current node 10 is displayed in the content viewer 22.

View-Ahead:

The reader 21 also includes a view-ahead window 24, which shows the user the nodes 10 that are visible from the current node 10. These nodes are also preferably displayed in graphical form as shown in FIG. 4, but may alternatively be displayed in text form, for example a list of nodes, or a two-dimensional spreadsheet view of nodes with their attributes in the tabular grid 61. The view-ahead window 24 can display the connections from the current node 10 in different ways, depending on the nature of the connection. For example, sequential connections on the path 12, 14, 16 that the user is following are displayed with emphasis (e.g. bolded or solid lines), whereas logical connections to other nodes are displayed with less emphasis (e.g. dashed lines), and other visible nodes may be displayed with even less emphasis (e.g. grayed out). In the view-ahead window 24, as well as in the path-taken window 23, the user can access information about the nodes in these windows by, for example, moving a cursor over the node, causing information, such as a comment or summary of the node's content, or the location of the node, to pop up or be displayed in the textbook reader 21. These are examples of the interactive support functions discussed earlier. The user can navigate to any node 10 displayed in either window simply by clicking on the node in the respective window 23, 24.

Comment Window and Index Window:

The reader 21 also includes a comment view window 26. This window displays comments pertaining to the current node 10, and permits users to add or edit their comments. The reader 21 also includes an index window 27. This window displays an index of terms in the electronic textbook 5, for use as discussed herein by the user.

Navigation Tools Window:

Finally, the reader 21 includes a navigation tools window 28. This window displays any tools used by the user to navigate the content in the electronic textbook 5. This window 28 contains a search tool, for the user to search the electronic textbook 5. The window 28 contains a global view button, which allows the user to display a graphical view of the entire textbook 5, or alternatively those portions of the textbook 5 which are accessible or visible to the user (e.g. depending on the user's role, and the visibility metrics discussed above). The global view in an embodiment uses the display area 60 and the tabular grid 61, discussed in further detail below with reference to FIG. 10. The window 28 contains an external content button, which allows the user to navigate to external content, not found in the electronic textbook 5. As discussed in further detail below, this external content is accessed by the user and stored in the electronic textbook 5. Finally, the window 28 contains an add comment button, which allows the user to add a comment to the current node 10, or, when the user navigates a connection 7, to that connection 7. The windows of the reader 21, may optionally be hidden from view and only displayed when selected, for example from a menu, by the user.

Navigation Information:

The electronic textbook 5 offers many types of information to users, while they are navigating the electronic textbook using the reader 21. For example, the users are offered orientation information, showing the user what path has been traced up to this point, what choices are there at this moment and where they lead. The user is offered a comprehensive overview of the electronic textbook 5 and search capabilities to locate any desired content in the electronic textbook 5. If the user identifies a particular node 10 in the electronic textbook 5, the user is offered a selection of the various paths that the user could take to arrive at the identified node, from the node the user is currently at. Of course, in an embodiment the user can simply jump to the desired node, supported by an automatic facility for optional return to the jumping-off point. Alternatively, this capability can be blocked by a privileged user, as needed to avoid the user getting confused or distracted by the other content in the electronic textbook 5. Blocking this capability allows the privileged users (e.g. school authorities) to crisply and unambiguously design the textbook, so that the sheer mass of material does not cause confusion or distract the student from the primary path, and so, for example, the teacher knows what the student is accessing.

Index:

The user is offered an index, comprising a complete list of available nodes and connections in the electronic textbook 5, which can be filtered by any applicable attributes. The index can highlight categories of nodes, or categories of connections. The user is offered recommendations for paths, nodes or connections to visit, optionally supported by comments (from the author or other users), based upon the user's experiences so far. The user is offered "test your skills" questions that yield recommendations on what more may be important to learn; and alternate paths provided by the author or other users.

Graphical and Tabular Display:

This information can be displayed in a variety of ways. For example, orientation information can be displayed as a listing of connections, or as rows in a table or spreadsheet. Alternatively, orientation can be depicted graphically as a view of the nodes and connections. Similarly, an index can be offered as a table, or the indexed nodes or connections can be highlighted in a graphical view of the electronic textbook 5, or the indexed nodes/connections can by pulled to the foreground of the view.

Alternatives Portrayed in Nodes:

The nodes in the electronic textbook 5 also offer a range of options for portraying alternatives, such as the halls of informed choice discussed above: a node can display the relevant choices at a junction; a node can welcome the newly arrived user to a path or section; a node can show a wide range of alternatives; a node can include a listing of the next nodes on the present path, or the previous nodes on the path. Of course, this information provided in the nodes can alternatively be provided in the connections.

Restricting Connections to Connections:

In an embodiment, connections to connections are not allowed. In this embodiment, connections are limited to denoting connections (including logical relationships) and texts attached to connections are meant for expanding on relationships and commenting on those connections. In this embodiment, it is unwise to attach a great deal of material to a connection because later the user might want to connect to that material and would not be able to do so. If the text in a connection gets too voluminous, it is preferable for the user to break the material apart and put the bulk of it in a node. Information can be placed anywhere, but the preferred design is for the author to place all major branch points in a kind of node generally called a 'junction" that is intended to facilitate connection. Junctions include gateways, vestibules, galleries, logical "nexus points", and non-specific junctions. This also applies to users creating overlays, as discussed in further detail below. In an alternative embodiment, where users can connect to connections, these restrictions need not apply.

Written, Spoken and Video Formats:

Although not shown in FIG. 3, as discussed above in an example embodiment the user is offered choices of the form of the content presented to the user, such as text, audio or video content. Each of these forms of content are presented in different nodes, or alternatively in the same node for a given information item. The author can define separate paths through each of the different offered formats, or alternatively where the different formats are presented in the same node may provide one path which captures all formats.

Color Blindness:

The electronic textbook is a natural setting in which to check for color blindness, evaluate its symptoms, and modify the color palette in diagrams and displays to best suit the user's needs. In an embodiment, the user is first asked if she or he might be color blind, or would like to check to find out. A positive response takes them to an interactive graphic that guides them through a series of simple exercises that determine the color palette they can distinguish, their "functional color palette". If they have any form of color blindness, this palette will be comprised of only a subset of the usual range of colors. If necessary this is supplemented by various fill patterns and line patterns to fill out the requisite number of distinctions. The color-blind status and modified functional palette are stored along with the student's records. Where feasible, diagrams and exhibits provided in the electronic textbook will subsequently appear with the student's modified palette.

Adapting to User Preference and Performance:

The electronic textbook 5 of an embodiment is adaptive, and can select the form of content that the user prefers. The user can explicitly indicate to the electronic textbook 5 which form of content the user prefers. Alternatively, the electronic textbook 5 can automatically select the appropriate form of content for a given node, based on metrics such as the user's past selection of content form, or a measurement of the user's performance on test questions that are based on a given form of content presentation. Thus, if the user selected for example to receive content in written text form, and then the user performed poorly on a skill test, the electronic textbook 5 will present the user with the option to receive subsequent content in a different form, such as audio or video. Similarly, if a user selected for example video content, and then the user performed well on a skill test, then the electronic text book will deliver subsequent content in the same format (here video).

Procedural/Rote and Intuitive Meaning:

An author can represent content in many ways: prose description, images, diagrams, outlines, procedures of thought, memorization tools, examples, exercises, games, tables. Presentations can emphasize conventional procedures and routine ways of thinking such as, grammar, vocabulary, definitions, facts and assumptions, standard problem solving methods and rote learning, and searching for information. Alternatively, the author can emphasize intuitive meaning by providing examples, reformulating narrative descriptions into solvable problems, comparing and contrasting different methods of solution, demonstrating quick shortcuts that give approximate answers, diagraming relationships, offering various kinds of games and exercises that manipulate objects on the screen, and so on. Both approaches have merits and ordinarily they should be combined, but the user can choose to emphasize some ways over others.

Exercises Graded for Speed as Well as Accuracy:

In an embodiment, in order to encourage the student user to develop practical mastery of skills and insights implicit in the material, exercises take the form of interactive games or challenges that are timed for speed as well as accuracy. Games may involve techniques like approximation, selecting appropriate tools, and appreciating underlying relationships. In general these are not "word challenges" that reward the student for correctly interpreting the meaning of the words that present the challenge. Instead the user is rewarded for understanding intuitive meaning, recognizing relationships among elements of the situation, determining which elements are significant and developing insights into how problems can be solved. Emphasizing quickness and creativity helps the student user to wake up to new approaches. Repeating exercises of similar format helps to stabilize new ways of understanding. These exercises are designed to be enjoyable as well as instructive.

Visibility:

One way to control the association of nodes 10 to each other in the electronic textbook 5 is to use the concept of visibility. Visibility refers to the subset of nodes and connections that are visible to the user at any point of time. Ordinarily the entire document is not visible. Instead the range of visibility may have been reduced in three stages: what the user can potentially see according to the prevailing arrangement, what portion of this the author or other privileged users have arranged for the user to be able to see at this present point in the path, and what the user has chosen to see from within that view.

Limiting Visibility to Improve Focus:

Limited visibility has many benefits. In a positive sense it focuses attention and adds clarity by showing what is presently most relevant. In a negative sense it sets aside what the user is not supposed to see and whatever the author or other privileged user judges to be potentially distracting, disturbing or confusing to the user. At any time the user can select a wide perspective that shows all that is presently permitted.

Thus, a node 10 of an example embodiment contains connections to all of the other nodes 10 in the electronic textbook 5 which satisfy a visibility parameter. Any nodes 10 which fail to satisfy the visibility parameter are not associated with each other. The visibility parameter may be defined in a variety of ways. The most straightforward visibility parameter is an author or other user's express definition that a given node, for example the node 10b, is visible from some other node, for example the node 10a. Creation of a path (e.g. the paths 12, 14, 16, or the user-defined path 18 discussed in more detail below) is an example of an express definition of visibility. Creation of a logical connection such as the connections 12c between two nodes is a further example of an express definition of visibility. Any user following the paths 12, 14, 16 or the user-defined path 18 will see the nodes 10 they are traversing, and will also see the nodes 10 connected to these paths by the logical connections 12c.

Extending Visibility to Show Options:

Additionally, the electronic textbook 5 can make visible nodes 10 not on the path being followed, nor associated by a defined logical connection to such nodes. For example, in the electronic textbook 5 there is no connection provided by the textbook author between nodes 10b and 10f However, as the electronic textbook 5 is used by students, suppose that it turns out that several students traverse from node 10b to node 10f on their own, without following a path left by others. These traversals are recorded, as discussed in further detail below. In an embodiment, once a sufficient number of users make a transition from one node to another, these transitions cause a connection between those two nodes to become visible to all users of the electronic textbook 5. In this example embodiment, every node 10 has a virtual association to every other node 10 in the electronic textbook 5. Each virtual association has a weight assigned to it, representing for example the number of users who have transitioned between the two nodes. Once that weight crosses a visibility parameter threshold, the virtual association becomes a visible connection between the nodes that all users can see.

Sharing Comments to Inform Choice:

In an embodiment, once that connection arises, some or all of the attributes and comments from the various user-defined paths are assimilated into the attributes and comments of the newly-created connection. For example, the user comments explaining why they each chose to make the transition are made visible to all users. The new connection can become part of an existing defined path, such as the paths 12, 14 or 16. For example, if the majority of the users who made the transition were following the average path 12, then the new connection is incorporated into the average path 12. This feature allows the defined paths through the electronic textbook 5 to be updated and modified, based on the actual traversal patterns of the students using the electronic textbook 5 over time. As the students themselves discover better ways to learn the material, those discoveries are made visible to all future students.

Sharing Comments for the Sake of Classroom Communication:

By facilitating each student's search for their ideal book, the electronic textbook encourages diverse student learning experiences. It's important to promote appropriate communication that will counteract any confusions arising from diversity and preserve the cohesiveness of the class. In an embodiment, the teacher can stay in touch by regularly accessing students' recorded comments. Also in an embodiment, students are able to keep in touch with one another by sharing comments, describing their experiences and offering one another encouragement.

Comment Walls:

In an embodiment, comments are available to everyone in the user group on Comment Walls. The Comment Wall is a gallery display that assembles comments from all users in the group. As explained above, any user can attach comments to any node or connection in the electronic textbook. A "user group" can be defined to include, for example, the students in a class and their teacher. Any student user who has navigated to any location can view all comments that have been attached to their present location, or that refer to a node or connection that they are considering as their next step. A user who is viewing any Comment Wall can optionally attach a fresh comment. Any student user can also view all comments within the group, regardless of topic, on a Community Comment Wall, sorted by default with most recent comment first; however, if the Community Comment Wall becomes too much of a distraction for student users, a privileged user can withdraw permission for this option.

Facilitating Remote Participation Through Entrainment:

In an embodiment, the teacher traverses a path through the electronic textbook during each class and encourages the students to follow along with their own equipment. Alternatively or in addition, the teacher may project the screen image onto a larger screen for the class to view. In this circumstance, a student user who is unable to attend class in person for whatever reason and is participating from a remote location can also follow on his/her own electronic textbook while listening to an audio broadcast of the class. In this case, the remote student user's electronic textbook is entrained to the teacher's, following every step that she takes and each keystroke that she enters. (Optionally, electronic textbooks in the classroom can also be entrained in this way.) This setup permits the remote student to have a realistic experience of the class, which can be supplemented through the electronic textbook's ability to forward the student's comments to the teacher and to classmates.

Personalizing Visibility:

Additionally, as noted above, the electronic textbook 5 can make some nodes conditionally visible. For example, the electronic textbook 5 can define certain connections as visible to any users who score above (or below) a certain score on a test node, or visible only to privileged users. The electronic textbook 5 of an embodiment can also provide indications of the relative visibility of the various nodes 10. Thus, nodes that have a high visibility score are displayed more brightly, whereas nodes with a low visibility score may be displayed in a grayed-out or faded style, or using some other way of signaling that the node has a lower visibility score.

Adaptive Emphasis of Logical Connections:

In a preferred embodiment, these spontaneously-generated connections are only allowed to arise where the author has anticipated the possibility of a spontaneous connection due to a logical connection identified by the author. A textbook author identifies the likely sources for the more probable connections, such as regional or cultural knowledge, the same topic at different levels of performance, the same topic in procedural and intuitive ways, the same problem solved differently, or reference to glossary or definition. Where a possible linkage can be anticipated and understood by the author, the author permits this connection to become visible if enough users traverse it. For instance, if more students go to advanced and/or remedial material or go from procedural material to intuitive material and examples; or go from one approach to solving a problem or another, or to the glossary or to a definition, then the electronic textbook can benefit the student by promoting the visibility of those paths. Also whenever the author offers a junction, and especially when it is a major one, it is a natural idea to display frequency of choices made by users in a useful way. When the link is by unstructured association not anticipated by the author, by contrast, allowing spontaneous connections might disorder the experience of the textbook. In alternative embodiments, however, where users are given more freedom to form their own associations, spontaneous connections are permitted between any nodes, as discussed above.

Figure 5:
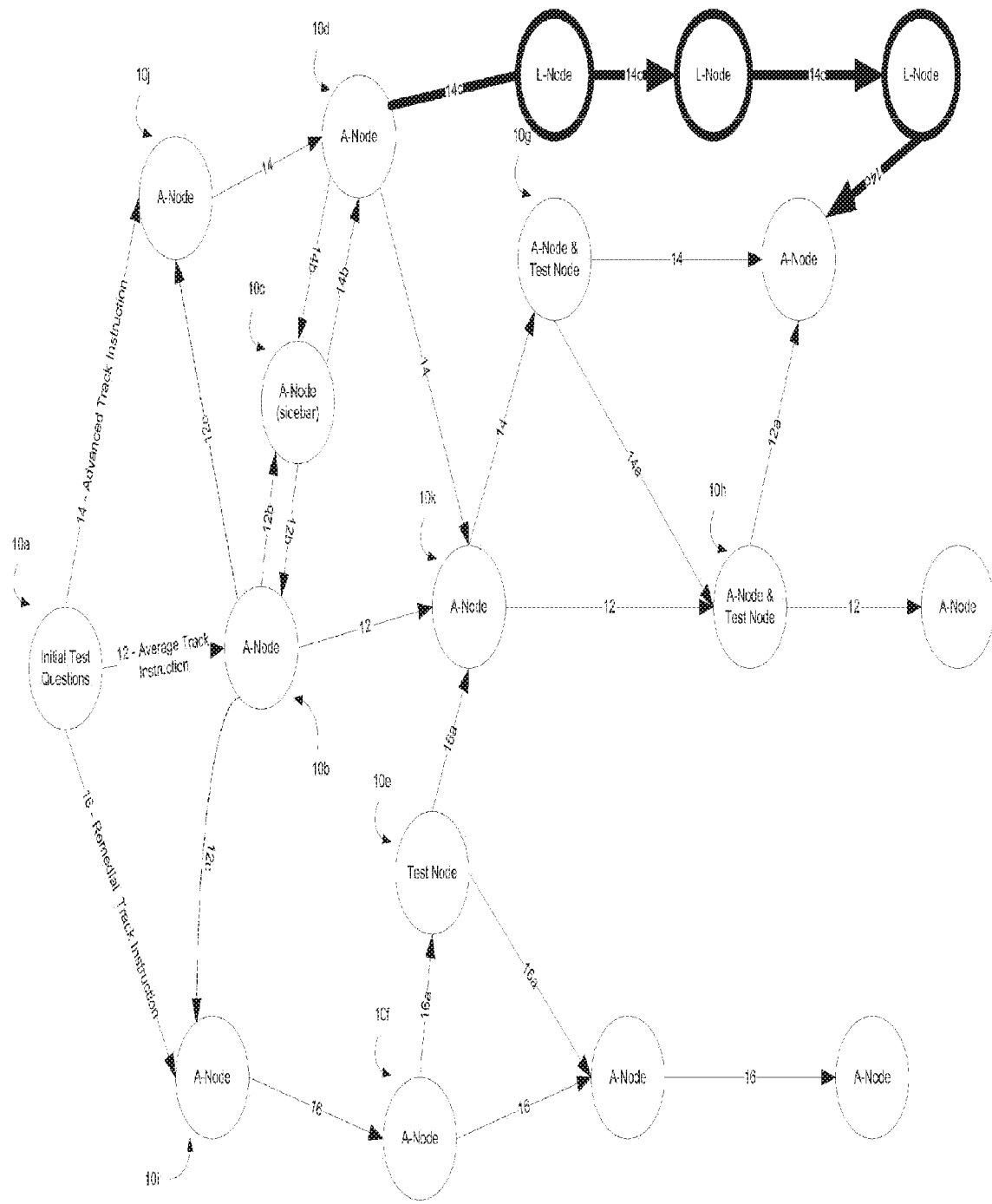
FIG. 5 shows additional information nodes added to an electronic textbook, according to an embodiment of the invention.

Arranging Tie-Ins for Supplementary Material:

Turning to FIG. 5, the author can also incorporate tie-ins in the electronic textbook 5. For example, at node 10g, the author inserts a tie-in, to indicate an appropriate location for others to insert additional content into the electronic textbook 5. This additional content could be content tailored to a given user community, such as a school district, a school, or an individual teacher's classroom. For example, for a textbook discussing the history of the Spanish missions in California, the author includes a tie-in indicating that the node 10g is an appropriate place for a school district to insert additional content, such as the L-nodes and connections 14c shown in FIG. 5, about the particular Spanish mission (e.g. Mission San Juan Capistrano) located nearest the district. In the example of FIG. 5, this tie-in is located on the advanced path 14, but of course these tie-ins can be located on any or all of the paths 12, 14, 16 in the electronic textbook 5.

Interlinking Electronic Textbooks:

These tie-ins can even incorporate one or more entire additional electronic textbooks created according to embodiments of the invention. This allows for an entire series of electronic textbooks to be seamlessly melded together into a single electronic textbook 5, covering an entire multi-year curriculum for a given subject matter. Thus, a school could present the entire K-12 mathematics curriculum to its students as a single electronic textbook 5. This would allow the students to proceed at their own pace across multiple years of education, picking up where they left off the prior year in each instance. Through use of skills tests as discussed above, such an electronic textbook 5 captures any loss of skills over a break in the student's education, such as over a summer break. The electronic textbook 5 can then direct the student to the appropriate remedial instruction, by switching the student to the appropriate path through the electronic textbook 5.

Figure 9:
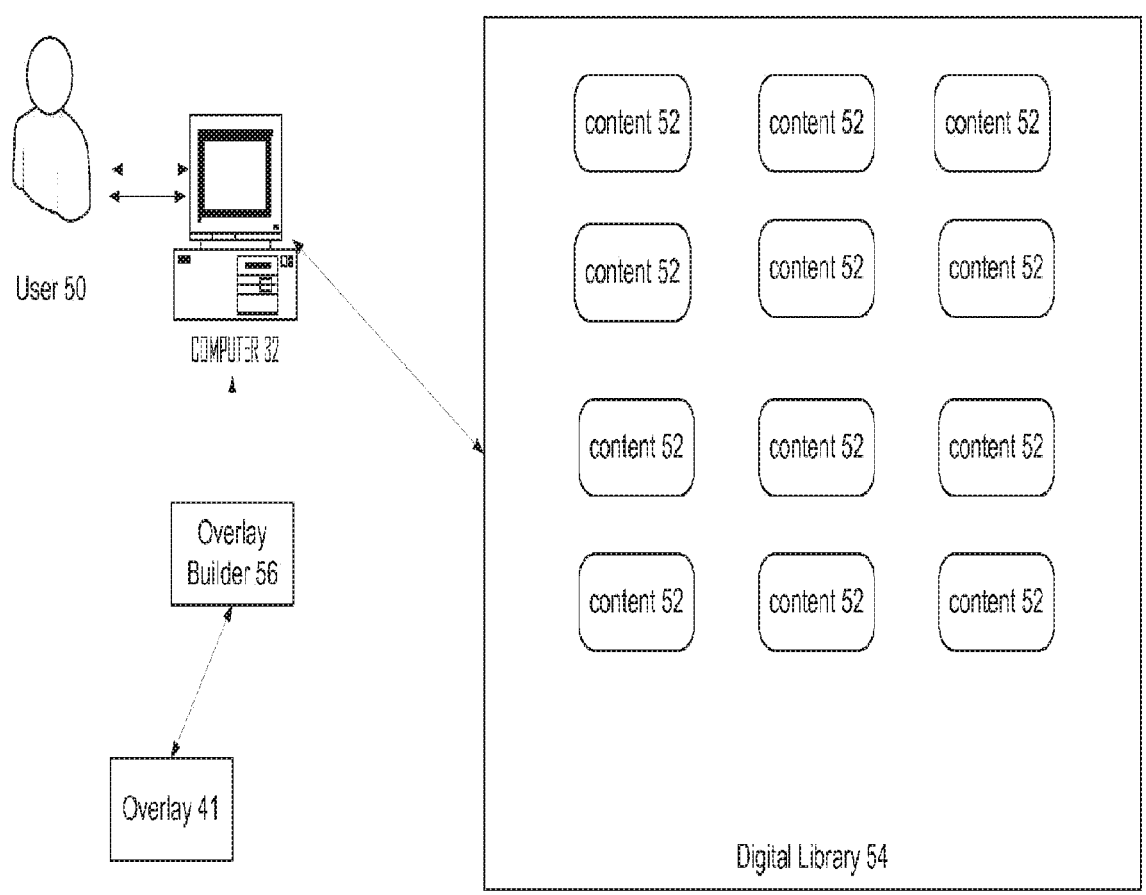
FIG. 9 shows an embodiment of the invention, used to create an overlay for a collection of content available in a digital library.

Paths, Comments and Additions:

Once the author has completed preparation of the electronic textbook 5, the electronic textbook 5 is made available to other users. These users can include the ultimate end users, such as the students who will use the textbook 5 as a learning tool. Additionally, these users can include privileged users, such as a state, county or local school board, a school district, an instructor, or a school or university. In rare cases, legal issues associated with aspects of the book may bring in the judicial system as well. Each user to whom the textbook 5 is made available has the ability to navigate the textbook 5 and to add comments and additional content to the textbook 5. A privileged user, such as an instructor, may use this facility to tailor the textbook 5 to regional, local, and even personal needs. Beyond this, each individual user has the capability to add material in the form of personal comments and notes and also to share material with other users. The textbook 5 becomes a personalized textbook for each user. Alternatively, as discussed further below, with reference to FIGS. 7 and 9, the user's comments may be saved separately as an overlay 41.

Figure 6:
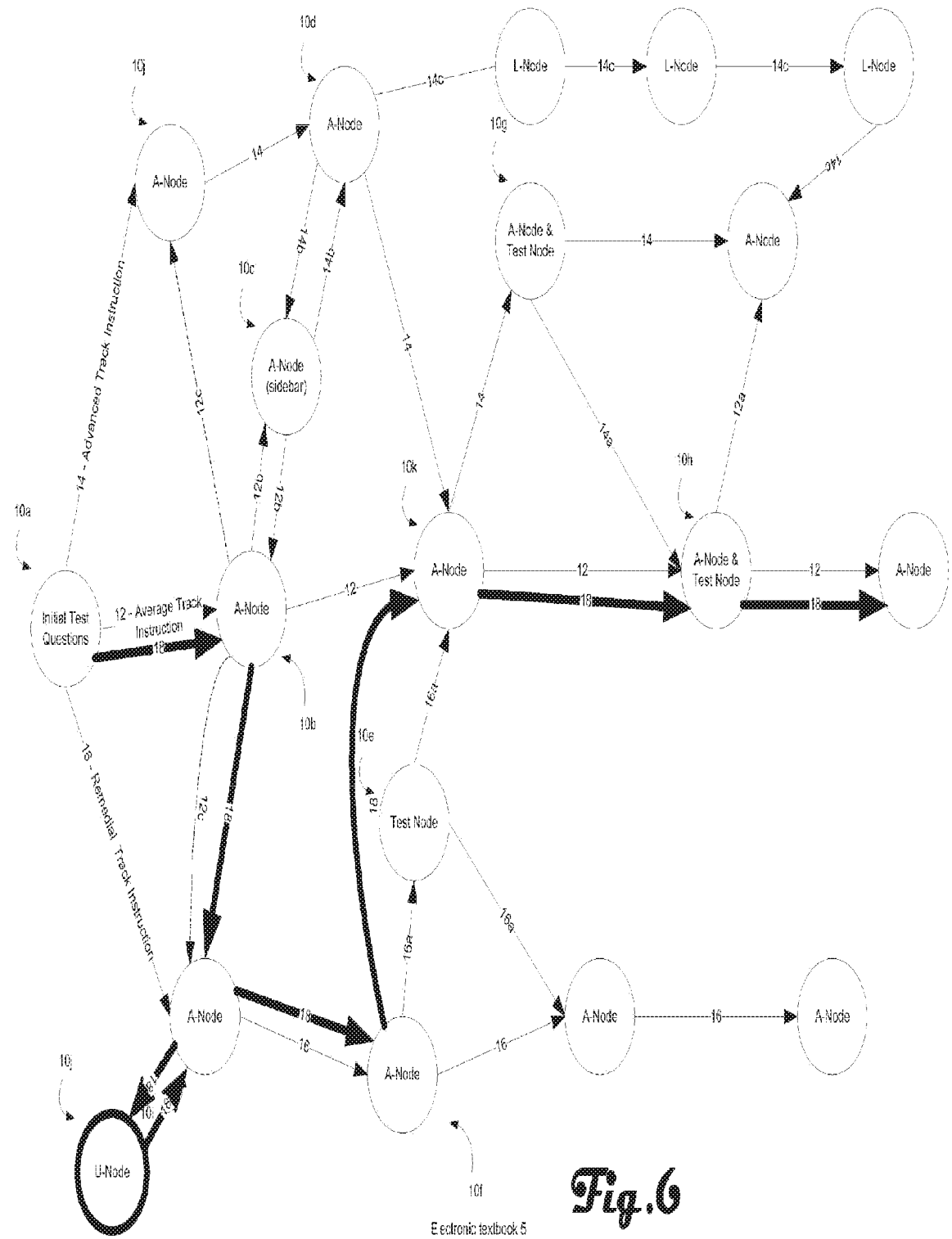
FIG. 6 shows creation of a user-defined path through an electronic textbook, according to an embodiment of the invention.

Recording User Choices, Comments and Interactions:

Turning to FIG. 6, a user begins using the textbook 5 at node 10a, where the user answers the initial test questions. In this example, the user's answers indicate that the user is best suited to begin on the average path 12. The user's path through the textbook 5 is indicated by the reference 18. When the user interacts with node 10a, the user is given the opportunity to provide comments regarding his/her decision to visit this node. Those comments are stored as part of the user's path 18 through the electronic textbook 5. The user's interaction with the node 10a is also stored as part of the user's path 18. Thus, the information the user accessed is tracked, including the responses the user gave to the test questions. This information is made available for use by the privileged users, or by other users of the electronic textbook 5. The scope of access of this information may be configured, either by the author, by privileged users, or by the user using the textbook 5. For example, access to the information could be restricted just to the user, or just to the user and designated privileged users such as the instructor for the class or the user's parents, or could be made available to all of the students in the same class.

Templates for Comments:

The user is optionally permitted to select any path leaving node 10a. Alternatively, the user is guided to the average path 12, or even required to follow the average path 12. The configuration of node 10a, including indications of which other nodes 10 the user is allowed to traverse to, may be done by either the author, or by one of the privileged users identified above. In this example, the user then navigates to node 10b, along the average path 12. Again, the user is given the opportunity to provide comments regarding her/his decision to traverse the connection between the nodes 10a and 10b, including for example reasons why the user chose not to follow the other connections out of node 10a. In an embodiment, these comments are free-form reactions or personal notes, with most of the usable feedback for the author coming from the frequencies with which paths are chosen. Alternatively or additionally, the comments may be collecting using standardized templates for data entry that would result in comments friendly to generic treatment by search engines to create population statistics (e.g. the template could be formatted as a form to fill out). For example, in a shared environment such as the overlays discussed below, with reference to FIGS. 7 & 9, the standardized template could be developed by a search provider and made available to the users creating the overlays. In the textbooks for use in the earlier grades, by contrast, this kind of structured comment sharing may be distracting to the student. At higher grade levels, where students benefit more from shared learning experiences, standardized templates can be provided. Alternatively, as discussed further below, with reference to FIGS. 7 and 9, the user's path 18 and associated comments may be saved separately as an overlay 41.

Upon arriving at node 10b, the user processes the content stored in node 10b. For example, the user reads the text for node 10b, or views a video or image, or listens to an audio presentation regarding the content of node 10b. As discussed above, the user optionally chooses a format for the content of node 10b that the user desires to receive, such as text, audio, image or video format for the information in node 10b. Node 10b contains several connections to other nodes 10 in the electronic textbook 5. There is a sequential connection 12 from node 10b to node 10k, along the average path 12. There is also a pair of connections 12b from the node 10b to the node 10c and back. Finally, there are two logical connections 12c, one from node 10b to node 10j on the advanced path 14, and a second from node 10b to node 10i on the remedial path 16.

Reviewing Comments and Personalized Access:

In an example embodiment, the user is presented with all of these connections, and allowed to choose which connection she/he wishes to follow. The user may review any comments left by the author, privileged users, or other users who previously travelled along any of those connections, to aid the user in deciding which connection to take. Alternatively, some of the connections from node 10b are obscured, such that the user cannot see them. These obscured connections may be made available only to privileged users. The privileged users are permitted to traverse these connections, and make the connections available to other users. Alternatively, some of the connections are made available only to users who first complete a task such as reading a text, viewing an image or video, listening to an audio recording, or responding to a test question in the node 10b.

In the example of FIG. 6, the user, upon visiting node 10b, decides to investigate the content of node 10i on the remedial path 16. Node 10i is identified in node 10b as a logically-related node 10. For example, the user decides that he would like additional information about the subject matter of node 10b, and identifies node 10i as a helpful source of additional information. In one example, the user reviews comments left by other users who visited node 10b, and decides based on those comments that node 10i is likely to contain additional useful content for the user to review, in order to learn the subject matter of the electronic textbook 5. Alternatively, the user is presented with a preview of the content at node 10i, or simply with a title indicating the content located at node 10i. The user is given the opportunity to record comments as to why the user chose to visit the logically-related node 10i, rather than continuing on the path 12. These comments are saved into a database associated with the electronic textbook 5. Alternatively, as discussed further below, with reference to FIGS. 7 and 9, the user's path 18 and associated comments may be saved separately as an overlay 41. Thus the user is, in an embodiment, permitted to change paths even in nodes which do not include test questions as discussed above.

User-Contributed Content:

The user visits node 10i, reviews and processes the content located in that node, and leaves any further desired comments. In this example, the user decides that the content at node 10i should be augmented. For example, the user in reviewing the content at the node 10i realizes that the content is related to other content the user is aware of, which is not in the electronic textbook 5. Alternatively, the user concludes that the content at node 10i is incomplete, or difficult to follow, or out of date, or overly simplified. Thus, the user determines that his own educational experience, or the educational experiences of other users, would be enhanced by providing the additional content.

In one embodiment, the user is not permitted to revise the content stored in node 10i, for example because the user is not the author of the electronic textbook 5. The user is, however, permitted to add nodes 10 to the electronic textbook 5, to personalize the textbook 5. The user thus adds the U-node 10j to the electronic textbook 5, containing the additional content identified by the user. If the user is permitted to modify the content of the node 10i, for example if the user is a privileged user or the author of the electronic textbook 5, then the user optionally updates the node 10i with the updated content, instead of creating a new node 10j with that content.

In an embodiment, adding the node 10j to the electronic textbook 5 occurs automatically, as a result of the user visiting the node 10j, for example by navigating to it. The electronic textbook 5 automatically records the user's connection to the node 10j by capturing that connection when the user uses it to navigate to the node 10j. The electronic textbook 5 also captures the content of the node 10j, and incorporates it into the textbook 5, for example by storing the content in a database containing the textbook. Alternatively, the electronic textbook records only the connections to the content and does not record the content itself. Alternatively, the user expressly specifies one or more connections between the new node 10j and other nodes 10 in the electronic textbook 5. Alternatively, as discussed further below, with reference to FIGS. 7 and 9, the node 10j and associated comments may be saved separately as an overlay 41.

The user then adds any desired comments, such as an explanation of why the user visited the new content, why the user wanted to add the new content to the textbook 5, or the like. When the user leaves the node 10j, and returns back to the previously existing nodes 10 in the electronic textbook 5, the return path is also automatically captured and stored in the electronic textbook 5. In the example of FIG. 6, the user goes back to the node 10i after visiting the new node 10j. Alternatively, the user may be presented with other nodes 10 to visit instead of the node 10i. For example, the user could be presented with a list of all nodes 10 that are visible from the node 10i that the user most recently had visited, thus giving the user more flexibility in deciding where to go next in his educational journey of exploration.

User-Contributed Connections:

In the example above, the added content was not already in the electronic textbook 5. In another alternative example, the user realizes that the content at the node 10i is related to other content that is located in the electronic textbook 5. In this example, the user simply adds another connection to that content, for example by navigating to that content, and then provides any desired comments indicating for example why the user made the connection.

Accessing a Glossary:

In a related context, the electronic textbook 5 can include a glossary (not shown), which provides definitions of key terms used in the electronic textbook. The user, wishing to understand the meaning of a term, can click on the term and be taken to the glossary definition. This glossary definition is stored in a node 10 of the electronic textbook 5. Thus, the user's traversal to the node 10 of the glossary, and back, is stored as part of the user's path 18 through the electronic textbook 5.

Bypassing Test-Your-Skills:

From the node 10i, the user continues building the path 18 through the nodes 10. The user, having chosen to switch from the average path 12 to the remedial path 16, continues on the remedial path 16 to the node 10f, for additional remedial instruction. After reviewing and processing the content of node 10f, the user is presented with another option, to either continue on the remedial path 16 to the next node 10 on that path, or alternatively to proceed on the path 16a to the test node 10e. In the example embodiment shown in FIG. 6, the user is further given the opportunity to bypass the test node 10e and proceed directly back to the average path 12.

Users are permitted to bypass test nodes for a variety of reasons. For example, where the user starts on a given path (such as the average path 12) and then chooses to deviate from that path, the user is permitted to return to the path originally selected at any time. Alternatively, the user may be permitted to skip over test nodes as desired, even if the user is not returning to a path previously followed. Alternatively, the user may be permitted to navigate to any node that is visible to the user, as discussed above, even if doing so would bypass a test node.

Once the user navigates to the node 10k, the user then follows the average path 12 through the remaining nodes 10 in the electronic textbook 5, until the user reaches the end of the average path 12. Along the way, the user is permitted to provide comments for each node 10 visited, and for each step along her/his path 18. These comments can include the user's reactions to the content of the nodes 10, the user's reasons for selecting the steps of the path 18, or other comments as desired by the user.

Revisiting the Path Taken:

At any point during the user's traversal of the path 18, the user optionally may revisit his/her path 18, provide additional comments about previously visited nodes 10, edit or remove previously recorded comments, and edit or remove any of the connections on the path 18, or any nodes 10 or other content added by the user. Alternatively, some or all of the user's ability to modify or remove content may be constrained. For example, it may be helpful for a teacher to understand the complete path a user travelled through the electronic textbook 5, even though the user wanted to conceal an aspect of the path. This would give the teacher a better understanding of the user's actual educational journey.

Privacy:

As the user is traversing the nodes 10 of the electronic textbook 5, and creating the path 18, this path is saved by the electronic textbook 5, along with the user's comments. Alternatively, as discussed further below, with reference to FIGS. 7 and 9, the user's path 18 and associated comments may be saved separately as an overlay 41. The path 18 and the user's comments may be secured as private to the user. Alternatively, the path 18 and the users' comments are provided to other users of the electronic textbook 5. For example, the path and comments are provided to the user's teacher, so the teacher can monitor the user's progress through the electronic textbook 5 and provide additional instruction where needed. Similarly, particularly where the user is a primary or secondary school student, the user's path may be provided to the user's parents, so that the parents can monitor the user's progress and provide assistance where needed.

Advantages of the Electronic Textbook: Each User's Ideal Book:

The electronic textbook 5 of an embodiment provides a number of advantages over conventional textbooks. Student users are diverse. Boys and girls are distinct and have different learning styles. Students vary in ability, preparation, experience and relative facility with different forms of learning, such as text-based (verbal) or image-based (visual) learning styles. Students' experiences vary by locality, family environment and language at home. An author can use the electronic textbook 5 to deliver an ideal book to each of a wide variety of students, with each student exploring and discovering the book that best fits him or her. The electronic textbook 5 contains enough diverse material to provide a path through the electronic textbook 5 that reflects a book tailored to each student's educational needs and preferred way of receiving educational content. The electronic textbook 5 provides content in the nodes 10 which informs the student's choices well enough to permit the students to find their own preferred path (i.e. book) amongst all of the other possible paths contained within the electronic textbook 5. This variety allows the author to create a better book for the students than any traditional linear textbook, because the author can offer the students choices and can help the students discover the instructional material that best reaches each student.

Advantages of Tie-In Points:

As discussed above, the electronic textbook 5 need not supply the entire universe of material on a given subject matter, for all students. Instead, the electronic textbook 5 provides tie-in points where other privileged users such as school districts can supplement the electronic textbook 5 with local material. This is an advantage of the electronic textbook 5 of an embodiment; it is arrangeable by multiple users. Furthermore, privileged users can extend the tie-ins by defining additional tie-in points that allow other privileged users to further tailor the educational content. For example, the state's board of education can define tie-in points where a local school district may tailor content. The school district can define tie-in points where a school may tailor content. The school can define tie-in points where a given teacher may tailor content. The teacher can define tie-in points where students and family members may tailor content. Thus, each level of authority can provide as much or as little flexibility as desired for subordinate users to supplement the electronic textbook 5.

Advantages of Paths at Average, Advanced, and Remedial Levels:

As discussed above, the electronic textbook 5 has multiple pre-defined paths 12, 14, 16 and also additional user-defined paths such as the path 18. This feature allows the electronic textbook 5 to satisfy the needs of a diverse student population. For example, the primary path through an electronic textbook 5 is the average path 12, which is designed by the author to be most suitable for average students. Along the way, at suitable points as discussed above (e.g. nodes 10c or 10k of FIG. 3), advanced topics are offered as optional choices to the student. As a result, advanced and interested students will learn more and learn more actively, by being engaged in their own education. They naturally select the advanced options, find them interesting, and settle onto an advanced path while also covering the average material. The advanced path 14 offers even more advanced material, and is suitable for higher level courses.

Remedial support can be offered in a friendly way, promising clarification and more extensive examples. Thus, the nodes 10 on the remedial path 16 contain additional clarifying and explanatory content. These nodes 10 can also include additional connections to additional nodes which supply even more examples or clarifying content. These clarifying nodes can be made available to the other paths 12, 14 as well. One example of this is the node 10c above, which provides clarifying content to users on both the average and the advanced paths (12, 14). By providing the user with multiple interconnecting paths through the electronic textbook 5, the user is empowered to tailor the content to the user's comfort level, by changing paths or selecting optional nodes 10 as the user's comprehension of the material fluctuates through the user's traversal of the electronic textbook 5.

The remedial path 16 is also available as an initial path through the electronic textbook 5. Users that are identified as needing simplified materials, such as those with learning difficulties, or those with low scores on an initial test (e.g. the test in node 10a above) will follow the remedial path 16. Users on this path will ordinarily see simpler content, exercises and test questions. However, these users are also presented with richer optional content, which comprise examples on the average path 12. Those examples may permit the remedial user to continue navigation along the average path 12, or alternatively may restrict the remedial user to returning back to the remedial path 16 after the user has processed the richer optional content.

Self-Correcting Paths: Fixed Thresholds:

Another advantage of the textbook 5 of an embodiment is that the paths 12, 14, 16 are self-correcting. For example, assume that the author creates an electronic textbook 5 with an average path 12 that turns out to be too difficult for the average student. As the students use the electronic textbook 5, they will naturally drop down to the remedial path 14. Over time, the number of users of the electronic textbook 5 using the remedial path 14 will increase. This use pattern can be detected by the electronic textbook 5, and the electronic textbook 5 can adjust the default paths accordingly. For example, the electronic textbook 5 can examine the usage volumes for each node, or connection between nodes, and assign the path with the most traffic as the average path 12. Similarly, the electronic textbook 5 can adjust the paths based on other metrics, such as average test scores for users taking a test at any given node, or combination of nodes. Thus, the path favored by users who score highly on the test nodes can be designated the advanced path 14, whereas the path favored by users who score poorly on the test nodes can be designated the remedial path 16.

Self-Correcting Paths: Adaptive Thresholds:

In another embodiment, the threshold test scores are self-correcting. Observing the subsequent performance of users juxtaposed with their initial test scores, if for example, the lower threshold for the average path 12 was 80, but it was discovered that students who scored between 70 and 80 on the test usually transitioned quickly to the average path 12, then the threshold could be lowered to 70.

Elevating Students to Advanced Material:

As discussed above, the electronic textbook 5 of an embodiment includes nodes 10 which test the user's comprehension of the material. These tests provide a useful feedback to a user of the electronic textbook 5. Sometimes, a user will not realize that they do not understand a particular aspect of the subject matter being taught. The test nodes allow the electronic textbook 5 to guide these users to the support they need. The test nodes also allow the electronic textbook 5 to elevate more advanced users to the more challenging material, to ensure that the advanced users retain their interest in the material, and are challenged by the material.

Refocusing Students on Remedial Material:

In an embodiment, the tests are required for users who are having difficulties with the material. Additionally, the electronic textbook 5 can provide additional nodes 10 which are also required for the user to review and process, if the user is having difficulties. The electronic textbook 5 can, for such nodes, disallow or disable the user's ability to travel to other nodes in the electronic textbook 5, until such point as the user has demonstrated mastery of the subject matter the user was having difficulty with. For example, the user may be required to review the additional nodes 10 and then answer further test questions, before the user is permitted to navigate out of the series of remedial nodes 10. If the user continues to have difficulties, and makes further mistakes in the tests, then the user can be transitioned to still further nodes 10, which include special content directed to helping the student figure out why the student made a particular mistake. Once the electronic textbook 5 identifies the reason for a user's mistake, the electronic textbook 5 then takes the user to remedial content tailored to the reasons for the user's mistake. This content is followed up with another test exercise, to confirm that the user has learned the material.

Remedial Resources for All Students:

These same content nodes 10 and test nodes 10 are also made available to users who are not having difficulties, should those users wish to navigate to these nodes for additional information. However, such users are not required to review these nodes 10, and are permitted to navigate away from these nodes 10 at any time once they begin reviewing them. This is one example of how the electronic textbook 5 of an embodiment presents content that is tailored, or fine-tuned, as the user reads the electronic textbook 5.

Adapting the Path to Performance:

As a user's performance on the exercises or tests in the electronic textbook 5 varies over the course of the user's navigation through the electronic textbook 5, the level of challenge of the tests and exercises can be dynamically adjusted. Thus, a user can begin navigating through the electronic textbook 5 as a remedial user, following the remedial path 16, and end up as an average user following the average path 12, without ever being expressly told that the user has changed paths to a more challenging path. Thus, a user with anxieties about his or her learning ability is not scared off from the content by concerns that the content is not appropriate for the user (i.e. it is "too hard" or "only for the smart kids"). Instead, the user simply experiences a default or recommended path through the content as it unfolds.

In an embodiment, as a user progresses through the content, completes exercises, takes tests, and makes choices to view more or less advanced material, the electronic textbook 5 adjusts the recommended path presented to the user, to factor in these dynamic variables. Thus, if a user performs well on exercises and tests, and is consistently selecting advanced optional content to view, the electronic textbook 5 can recommend more advanced content for the user to review. This selection can take the form of an express primary path switch, to elevate the user to the advanced path 14, for example. Alternatively, this selection can take the form of making visible more nodes 10 on the advanced path 14, or increasing the visibility level or priority listing of nodes on the advanced path 14, using the visibility metrics discussed above. Similarly, if a user performs poorly on exercises and tests, and is consistently selecting remedial optional content to view, the electronic textbook 5 can recommend more remedial content for the user to review.

Choices Regarding Modes of Instruction:

The electronic textbook 5 also offers different forms of instruction, as discussed above. This instruction can emphasize words and verbal logic, or it can emphasize images and kinesthetic/visual experiences. The user's choices in selecting content to review will disclose their preferred forms of learning. The electronic textbook 5 records these selections, and uses them to make recommendations to the user as the user visits further nodes 10 in the electronic textbook 5. The electronic textbook 5 is thus able to help users better comprehend the instructional material, by presenting material in a format tailored to each user.

Analyzing and Adapting to Performance and Preference:

The patterns identified by the electronic textbook 5, including the performance patterns and content format patterns discussed above, are used by the electronic textbook 5 to provide further recommendations to the user. For example, when a user completes a module, a given electronic textbook, or a grade level, the patterns are retained and re-used to provide recommendations for the next module, electronic textbook or grade level. Thus, in an embodiment the initial test questions presented in node 10a need only be presented for the very first interaction a user has with the subject matter of the electronic textbook. All subsequent interactions with that same subject matter, for example as the user progresses through the different grade levels (K-12) in a subject such as mathematics, are governed by the user's prior patterns as recorded and retained by the electronic textbook 5. Thus, a user who completes a first grade electronic textbook of an embodiment of the invention on the advanced path will automatically be started on the advanced path of the second grade version of the electronic textbook. Similarly, a user who has demonstrated a preference for visual content will be offered visual content in the second grade electronic textbook as well.

Multi-Media Textbook:

The electronic textbook 5 of an embodiment is a multi-media textbook. Thus, an electronic textbook 5 can provide both visual and auditory materials, as well as, with use of appropriate sensors such as a haptic feedback device, materials that stimulate touch or other human senses. Auditory recordings can be the primary format for delivering the educational content. Thus an electronic textbook 5 can deliver rich educational content to users who cannot process visual materials well, for example because the user is illiterate or vision-impaired. The auditory electronic textbook 5 can also present educational content that is historically audio-based, such as oral histories or stories. Alternatively, the auditory content can be supplemental or optional, as discussed above. One particularly useful way to incorporate auditory content is to provide a tie-in point for a teacher to create a new node 10 (or update an existing node 10) with a recording of the teacher's words of explanation or encouragement for their own students. This provides the user (who may be a young child in some embodiments) with a familiar and supportive teacher's voice. This would be a heartening experience for the user during the user's studies or homework sessions. Similarly, a family member could record words of encouragement that would appear periodically, such as at the end of a test or a module, to further motivate the user to succeed. Of course, a video recording could be included in addition to an audio recording.

Guides for Teaching:

The ability for an electronic textbook 5 of an embodiment to offer a variety of paths through the same content also helps guide other users of the electronic textbook 5. For example, where the user is a juvenile student, the user's parents and other family members will often want to help the student understand the material. The parents may have a good understanding of the subject matter the student is learning, but they may lack the ability to explain it clearly or teach through simple examples. The electronic textbook 5 of an embodiment provides a parent path through the material, which contains explanations of the material tailored to facilitate a parent's efforts to explain the material to his or her child. This parent path can be a path through additional or separate nodes 10, or it can be an overlay of comments onto the path (e.g. paths 12, 14, 16) that the student user is following. The comments can come from another user, such as the child's teacher, the author of the electronic textbook 5, or an author of a study guide which accompanies the electronic textbook 5. The comments for the parent path can be different from the comments for the student path, even for the same node 10. This is another example of how the content of a node 10 is tailored or presented in a context-sensitive manner, based on the path the particular user followed to arrive at the particular node 10. The parent user following the parent path can, of course, navigate to the student's path (12, 14 or 16) as needed for the parent to understand the material sufficiently to assist the student user. This example of two parallel paths for the student and the parent illustrates the use of structured connections (a subtype of logical connections), which can be usefully offered in a special way (for example side-by-side displays in the textbook reader 21 of FIG. 4.) Similarly, an author of the textbook 5 can include a path through the nodes 10 of the textbook 5, or an overlay 41 as discussed in further detail below, which contains comments intended for the teacher. This path provides a teaching guide, incorporated in or associated with the electronic textbook 5.

A Learning Resource for Teachers:

An electronic textbook 5 according to embodiments of the invention, as discussed above, is also a useful learning tool for the classroom teacher. The electronic textbook 5 presents a variety of different learning paths through the subject matter. The electronic textbook 5 further provides a variety of different learning formats, and caters to diverse learning skills. A teacher following these learning paths and absorbing these learning formats and skills will use the electronic textbook 5 as an educational training tool. The teacher, by studying the electronic textbook 5 and following the diverse paths through the electronic textbook 5, learns how to give personalized instruction to each individual student based on the student's identified individual needs.

Extending Beyond a Single Course:

Because the electronic textbook 5 of an embodiment can be modified or extended, the electronic textbook 5 is not limited to a particular subject or a particular grade level, as is the case with traditional textbooks. An author can create a single electronic textbook 5 containing an entire course of study for a particular broad subject matter, for example mathematics, beginning with the very basic concepts of kindergarten mathematics (e.g. basic counting and addition) and concluding with advanced mathematical concepts suitable for high-performing 12th grade students (e.g. calculus or differential equations). The same electronic textbook 5 is then used to teach this subject to the users throughout their careers as K-12 students. This allows each student to find his or her own skill level with the material, year after year. Each student is able to move at his or her own pace through the material. Each student is able to review the material he or she learned in prior years, even where there have been significant breaks in the educational progress of the student, for example a break between grade levels such as a summer vacation between two primary grade levels. The students are able to maintain a continuous course of study across multiple grade levels, because they use the same electronic textbook 5, tailored to the student's individual learning style.

Intuitive Meaning as Well as Rules and Procedures:

In one example embodiment of an electronic textbook 5, pertaining to mathematics texts, existing math textbooks generally focus on teaching rules and procedures rather than fostering intuitive knowledge of the meaning and usefulness of the material. The electronic textbook 5 of an embodiment offers multiple different instructional paths through the nodes 10 of the mathematics electronic textbook 5. These paths include a first path which supplies the conventional rules and procedures for learning mathematics. These paths also include an alternative, intuitively meaningful second path that dovetails with the conventional procedural instruction on the first path. These two paths intersect at particular nodes 10 which teach key concepts necessary for all students to learn the material (e.g. 2+2=4). However, the intuitively meaningful second path provides additional or alternative nodes 10, which rely on teaching by experience rather than teaching rules and procedures. This second path allows the student to experience for her/himself how counting and calculating reveal useful qualities of our world, and how numbers can be used for calculation and communication.

The alternate second path can be optional, with the expectation that many teachers will present it systematically as supporting material. It can also serve as the sole acceptable teaching method for certain students who do not do well with the procedural approach. The student may be impatient with a rule-based unintuitive mindset, as the great genius Albert Einstein was in his school years, or may be forced to rely primarily on intuition because of a disability such as dyslexia or anxiety about math.

Reporting Progress when Appropriate:

Electronic textbooks according to embodiments of the invention are administered to allow other users to observe and address the student users' progress. The electronic textbook 5 can, in an embodiment, be distributed to individual users, for example by being downloaded to a given user's computer, tablet or other suitable electronic device. The electronic textbook 5 may periodically report data back to other users such as the teacher, or it may alternately preserve the user's information strictly private. This permits the user to exercise more control over access to the user's stored information, such as the user's comments, test results, progress through the electronic textbook 5, etc.

Alternatively and preferably, the electronic textbook 5 of an embodiment is stored in a centrally-accessible location, available to an entire community of users. For example, the electronic textbook 5 is stored on and made available from a computer connected to a network such as the Internet. In this embodiment, the teacher can access each student user's engagement with the electronic textbook 5. The student user's path through the electronic textbook 5 and the choices that the student user made are important indications of how well the student user is learning the educational content, as well as indicating which formats for the material (e.g.

textual, audio, video) are most beneficial to the student user. Making these records available to the teacher provides a reliable feedback mechanism to the teacher. Providing the electronic textbook 5 at a centrally-accessible location is also useful in connecting widely-separated users, such as home-schooled students, or students located in geographically remote regions.

Information Transmitted to the Teacher:

Thus, m an embodiment, the teacher can access the student's path through the various nodes 10. The teacher can observe any other metrics stored by the electronic textbook 5, such as the time each user spent visiting each node 10, the comments the user left as he or she traversed the electronic textbook 5, or the user's performance on exercises or tests. Furthermore, other diagnostic calculated data can be reviewed, such as indications of whether the user is classified as remedial, average or advanced, whether the user is following a procedure-based path or an instruction path based on intuitive understanding, or whether the user is selecting textual, audio or video formats for the instructional content. The electronic textbook 5 calculates this information as part of recording the student's path through the material, and to support the various recommendations discussed above. By storing the electronic textbook 5 in an accessible location this information can be opened up to other users in the community, such as teachers, parents or administrators.

"Wrappers":

For example, in an embodiment, the student user systematically prepares focused comments known as "wrappers" for personal benefit that are also made available to the teacher. For instance, these can be prepared after each exercise, test your skills exam and after the completion of each chapter of the electronic textbook. Wrappers can also be submitted at any point where the student accomplishes an expressed goal or turns away from a goal. The wrapper is a form of reflection on personal involvement that should be prepared soon after completing a project or receiving feedback on performance, A wrapper can address such aspects as prior study strategies, experiences during the event, analysis of mistakes, and intent to modify study strategies. Submitting the wrapper to the teacher, parent or mentor creates an opportunity to receive feedback, support and useful advice.

Alternatively, a middle ground may be implemented, where the electronic textbook 5 is stored in a centrally-accessible location, and the diagnostic data on the user's traversal through the electronic textbook 5 is also stored in a centrally-accessible location, but where the user's comments and additional nodes 10 added to the electronic textbook 5 are stored locally as an overlay, such as the overlay 41 described in further detail below with reference to FIGS. 6 & 7.

Management by Multiple Levels of Administration:

Additionally, as discussed above the electronic textbook 5 of an embodiment is managed by multiple levels of administration, including for example a state board of education, a local school board, a school, an administrator such as a special resources or special needs coordinator for special needs students, and an individual teacher. Each of these entities is allowed to provide input on matters such as approval of content, approval of instructional formats, approval of content format (e.g. text, audio or video), addition of tailored instructional content, addition of comments, addition of alternative content formats or instructional formats, etc. Furthermore, in an embodiment there is a hierarchy of such entities, such that a superior level entity is allowed to make decisions about which features of the textbook 5, such as particular nodes 10 or paths 12, 14, 16 are required to be included in the textbook 5, or optionally may be included in the textbook 5, or are prohibited from the textbook 5. Inferior entities are then allowed the flexibility to further modify the available content, within the parameters established by the superior entity.

Thus, for example, a state board of education could determine that a particular set of nodes 10 and paths 12, 14, 16 was required in all textbooks on a given subject within the state. The local school board could then determine that additional nodes 10 and connections 7 in the paths 12, 14, 16 were required in all mathematics textbooks used in that district. The local school board could further determine that individual schools and teachers were permitted to add tailored content to certain nodes 10, but were not permitted to add tailored content to other nodes 10 for which the school board wanted to enforce a common core curriculum (e.g. for nodes 10 directed to preparation for a district-wide test, for which it was considered important that all students be given the same preparation).

This regulatory structure is provided, in an embodiment, by allowing each administering entity to arrange properties for each node 10 or connection 7 in the paths 12, 14, 16 in the electronic textbook 5. These properties include, for example, whether the node or connection is mandatory, optional, or prohibited, whether modification of the node or connection is permitted, whether additional nodes or connections can be added to the node, whether comments can be added to the node or connection, whether content formats can be added to or removed from the node, whether the node or connection is visible, or can be made visible as discussed above, etc.

Separable User Overlays:

In example embodiments discussed above, the electronic textbooks included both the nodes 10 and the connections (e.g. paths 12, 14, 16) between the nodes 10, and the paths (e.g. path 18) followed by users navigating the nodes 10. In an alternative embodiment, the connections and/or the paths can be maintained separately, as an overlay to the electronic textbook 5, such as the overlay 41 discussed in further detail below with references to FIGS. 6 & 7. This allows users to make their own private overlays which the user can store securely and separately from the underlying electronic textbook 5. The user also can distribute the overlay separately from the textbook 5. This also allows authors to construct different electronic textbooks which each rely on some or all of the same underlying set of nodes 10 for the underlying content. For example, an author can construct a remedial textbook, an average textbook, and an advanced textbook all relying on the same set of nodes 10 as shown in FIG. 1. The remedial textbook includes the nodes 10 and the remedial path 16. The average textbook includes the nodes 10 and the average path 12. The advanced textbook includes the nodes 10 and the advanced path 14. Alternatively, the author can simply distribute the electronic textbook including just the nodes 10 to all users, and then separately distribute the appropriate path 12, 14, 16 as an overlay to the electronic textbook 5, tailored to each user's particular needs.

Overlays can be Shared:

The overlays of an embodiment are also useful for the users to make comments on the electronic textbook 5 as discussed above, including for example taking notes to assist the user in reviewing the material. As discussed above, comments can be appended to the nodes 10 or connections 7 or the paths 12, 14, 16, 18. In an embodiment using overlays, the comments are provided as a separate overlay to the electronic textbook 5. The comments then can be separately stored and distributed to other users, without requiring distribution of the electronic textbook 5 itself. The comments can be juxtaposed to the nodes, connections or paths that they relate to, by any user with access to both the comments and the underlying electronic textbook 5. The user can navigate through the comments and the underlying electronic textbook 5 at the same time. Additionally, the user can review the comments independently of the electronic textbook 5, as desired. In an embodiment, the user can review the comments overlay, and then navigate to the underlying node, connection or path to which the comment applies, for example by clicking on the comment.

Overlays as Study Guides:

These comments can also be distributed to other users as a study guide. A user, such as a particular student, or a teacher, or even the author of the electronic textbook 5, can create a separate overlay containing comments about the instructional material in the electronic textbook 5. The overlay is tied to the nodes, connections and paths in the electronic textbook 5 (or in other overlays for the electronic textbook 5). These comments are then provided to other users as a stand-alone study guide for the electronic textbook 5.

Overlays as Development Tools:

These overlays are also useful to authors, preparing to write the electronic textbook 5. The author compiles a collection of instructional material which will form the nodes of the electronic textbook 5. The author then begins creating connections between the various pieces of instructional material in the collection, to develop dependencies between these pieces. These dependencies will ultimately inform the author's decisions as to which connections or paths to build through the instructional material of the completed electronic textbook 5. Since the dependencies created by the connections are, in this embodiment, provided as a separate overlay, the author can model many alternative dependencies, and can add or remove dependencies without disturbing the underlying instructional material or the other overlays.

Applications in Higher Education:

In embodiments of the invention, electronic textbooks for college and graduate studies can be lower-cost alternatives to printed textbooks that allow for regular updates at reasonable cost. When compared to traditional printed textbooks, electronic textbooks can present complex knowledge in depth much more effectively, link up much more directly with other electronic textbooks and other sources of information on the web, fit much more efficiently into a wider curriculum, and allow the university's contributions to students' knowledge to be carried forward much better after graduation.

Presenting Complex Knowledge in Depth:

Embodiments of the invention precisely satisfy the requirements expressed in the following passage from the Background: "The decentralized global research enterprise and the proliferation of shared knowledge on the web are overwhelming the adaptive capabilities of education based on printed textbooks. Linear outline and linear page sequence are the joint organizing principles of a printed book. Of course a book can also offer one or more separate lists of specialized items like figures or exercises to supplement the outline. However, there is no systematic means for rendering relationships between topics that cut across different segments of the outline. Nor is there any good way of highlighting the collective importance of relationships or themes that spread across different segments. Nor is there any good way of navigating through the book to see only those sections that deal with a single theme in the proper order. The tools presently available in a printed textbook to present complex material and promote understanding of complex matters are essentially limited to interpolated comments and diagrams, themselves trapped in the linear sequence of the book and visible only at that one point. Thus, there is a clear need for an electronic textbook that is built around the concept of a fully general non-linear outline that can make visible arbitrary relationships and present distinct traversal paths for each of the diverse themes presented in the book. There is also a need for an overlay system in the electronic textbook that allows faculty and students to add and share comments at any point in the book and fully general traversal paths through the book."

Linking Electronic Textbooks to References:

A popular_modern higher education electronic textbook could potentially provide a superior access point to relevant literature. This service could well be a boon to authors and publishers, and could be readily achieved by an author. To be viable, this service must give the student direct access to the cited references. Success will also depend on keeping the textbook up to date at reasonable cost while continuing to offer direct and immediate access to current references.

Direct Access to References:

"Direct Access" can be implemented to three degrees: access to the reference as a whole, or better direct access within that document to the point where the specific passage cited resides, or possibly the added optional capability of native presence at the website serving the reference, beginning from the point where the reference resides, with the option of direct return at any time to point of departure. The electronic textbook can provide this access to qualified servers, including access in all degrees to another electronic textbook. Once electronic textbooks have demonstrated this capability, it will become feasible for providers to serve the referred materials to these degrees, allowing linking to a specific passages and optional native access when appropriate.

Stand-Alone Overlays

These overlays are also useful in building a multi-course curriculum of study, involving multiple electronic textbooks as discussed above. A teacher, such as a university professor, or an entity such as a university department (or alternatively a school, school district or other similar user as discussed above), may wish to distribute a set of course materials tailored to that teacher or department's curriculum, without distributing an entire set of electronic textbooks for the curriculum. By providing a separate overlay, the teacher can build a single comprehensive set of comments, notes or other study aids, or even connections or paths, which correspond to the nodes of a number of electronic textbooks, and which address all of the electronic textbooks in a cohesive manner. This overlay can be distributed to all of the students. The students then separately purchase the underlying electronic textbooks. The overlay automatically links to each of the underlying electronic textbooks as they are acquired by the student. This functionality depends on common standards that are adhered to both in the overlay builder and in the electronic textbook.

Integrating Multiple Electronic Textbooks in a Curriculum:

In an embodiment of the invention, electronic textbooks can cross-refer seamlessly. For example, a course assigns two electronic textbooks, with closely interwoven material, such as a History of Labor Law and a History of Organized Labor. The student has access to both books, and has a Textbook Reader. Some years earlier, the present Instructor, while a graduate student assisting in this course, prepared an overlay 41 with a study guide and readings path, which he now distributes to the students. The overlay 41 includes the sequential path of the course readings through these two books. Each step takes the student to the precise point in the relevant book where the reading begins and provides a later marker for the conclusion of the reading. The four elements involved (the text reader, overlay 41 and the two electronic textbooks) interact seamlessly. Further, suppose that one of the books refers to the other during the reading. The student can then follow the highlighted link into the second book and return after reading the cited reference. The overlay 41 is a superior teaching aid in a lasting format that functions at the detail level. It serves as an umbrella above two or more electronic textbooks, guiding students through a curriculum that extends across them. Even without the aid of the overlay 41, in an embodiment the two electronic textbooks can interoperate in the sense of offering direct access for cross-references: following a reference in one textbook will take the reader directly to the cited passage in the other and also provide native presence in the other book in case the reader chooses to browse it before returning to the original point where the reference was cited.

Overlays can Outlast their Textbooks:

The stand-alone character of the overlay is an advantage as time passes and textbooks change. The task of remapping the overlay to a new textbook may be supported automatically by the publisher by providing a suitable mapping from old to new pages, and otherwise it can be quickly accomplished by comparing old and new texts. During this same process additional elements can be added to the overlay to incorporate innovations in the new text, and notes concerning any useful material that has been lost can be directed to another source or in the worst case point to the older version. In this manner, an entire multi-course curriculum can be integrated into a single overlay. This overlay can then be offered to any interested users, including both current students and alumni. This allows the alumni to refresh and update the knowledge they acquired when they were students.

Carrying Knowledge Forward:

Institutions of higher education are natural places for energy to be invested in organizing and presenting knowledge in an integrated format, and it makes good sense for them to build upon these efforts to provide lifelong educational services for their graduates. The natural approach is a "living curriculum" in the form of overlay and supplementary material provided by the faculty that organizes and presents the information in electronic textbooks which are themselves being regularly updated. A setting of that kind can shelter and support ongoing communications among faculty as they share their academic learning, as well as knowledge learned through experience, to students and graduates in a relevant way. Academic compilations of this kind, building upon regularly updated electronic textbooks as their springboard, might become the foremost guides to professional information on the web.

Overlays on Existing Collections of Information:

The embodiments discussed above are directed to electronic textbooks. The nodes 10 are related to educational material compiled by an author of an educational textbook, and the connections 7 and paths 12, 14, 16, 18 are made by authors and users of educational textbooks. In additional embodiments, the principles and concepts discussed above can be applied to other collections of information. For example, the overlay discussed above can be created and applied to any existing collection of information.

Web Browsing Overlay:

In an embodiment, the overlay containing a user's path through a collection of information, with the user's comments, is associated with a plurality of nodes that represent items of information stored on a network, such as web pages stored at various locations on the Internet. This overlay is particularly useful in the context of web pages on the Internet, because each of those pages is typically controlled by different authors. Thus the content on the pages themselves cannot be modified by other users. However, the overlay of an embodiment of the invention allows a user to track his or her paths through a collection of web content and provide comments that help the user or other users understand the user's thought processes in navigating through the web content.

Recording a Product Search:

For example, a user is searching the web content to locate a desired object, such as a new car. The user has many different requirements for the new car, which are difficult to satisfy with a single product. Thus, the user does a lengthy search and review of many different cars described in many different web pages on the Internet. The user wishes to retain a record of his search, including not only the pages he visited, but also his comments reflecting, for example, his thought processes for why he chose to visit each page, his conclusions upon visiting each page, the alternative pages he considered visiting next, etc. The user may use this record to aid in his own recollection of the steps he took in searching for the object. Alternatively, particularly where the user was doing the search for someone else (e.g. the user was a shopping consultant or agent for the buyer), the user can provide the search history with comments to the buyer, so that the buyer can fully understand the search process, and can easily re-visit some or all of the material searched, with an understanding of why that material was deemed useful or important.

Figure 7:
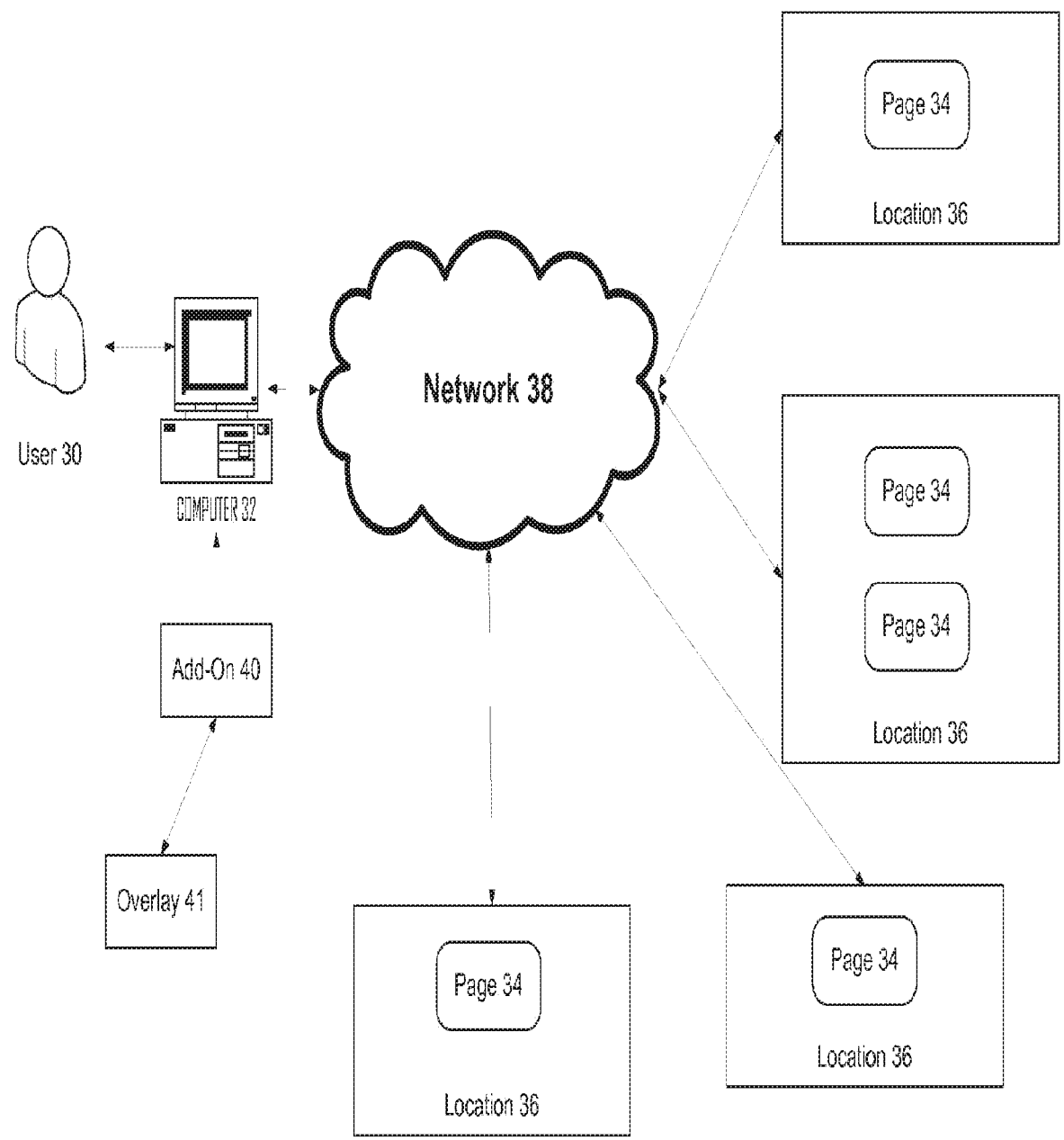
FIG. 7 shows an embodiment of the invention, used to create an overlay for a collection of network-accessible pages of information.

Browser Add-On:

In an embodiment, as shown in FIG. 7, the user 30 uses a computer 32 having a browser to search content stored as a plurality of pages 34 in a plurality of locations 36 on a network 38 such as the Internet. The browser includes an add-on 40. The add-on 40 monitors the user's navigations through the pages 34, as the user searches for the desired object. The add-on 40 is configured to record the user's path through the pages 34, documenting each page 34 visited, and each connection between the pages 34 that the user navigates. These connections may be explicit links defined in the respective pages 34, which the user clicks on. Alternatively, these connections may reflect locations of the pages visited, such as a URL, which the user enters into the browser, without traversing an explicit link.

Figure 8:
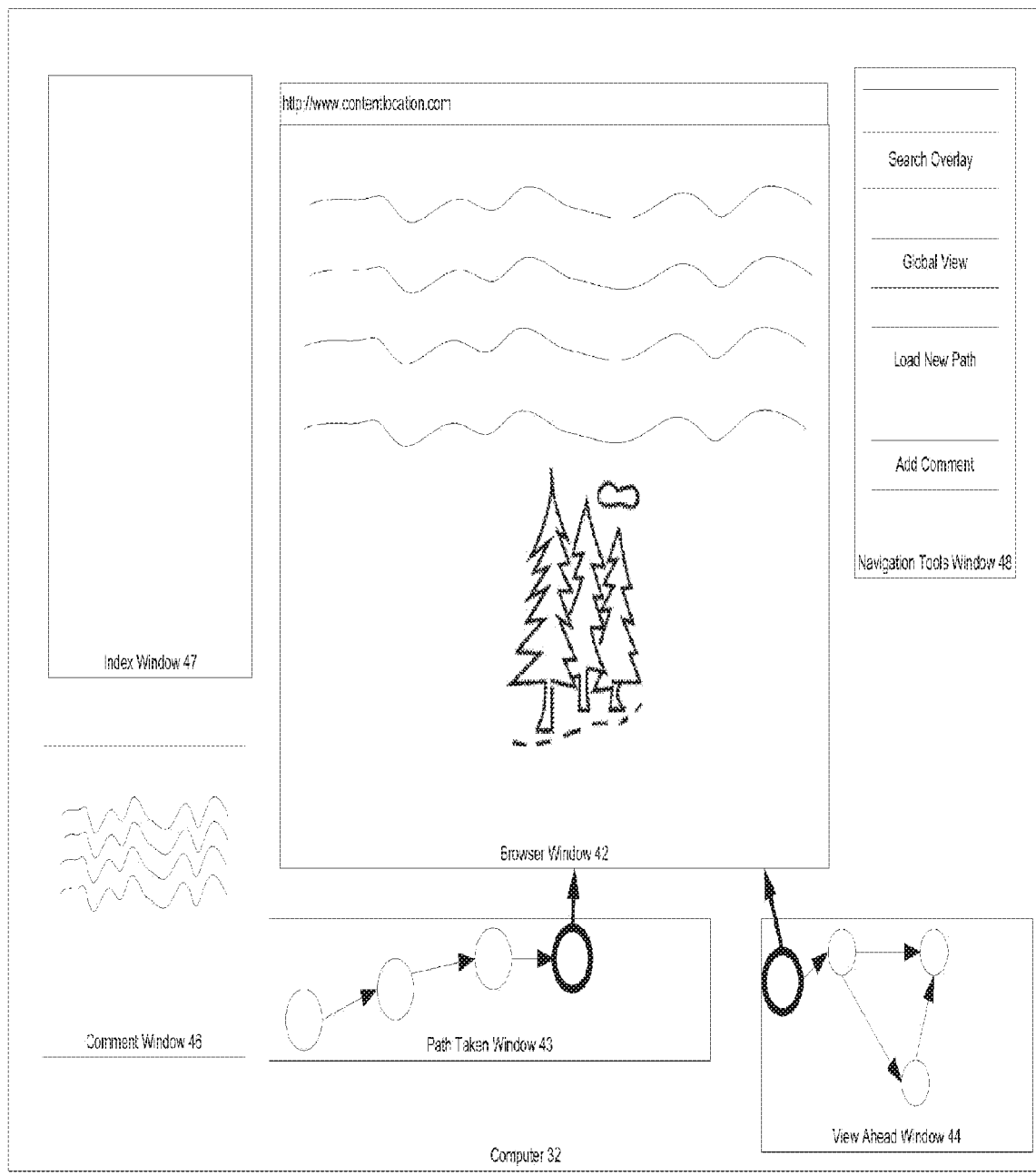
FIG. 8 shows a browser add-on, according to an embodiment of the invention.

Turning to FIG. 8, the pages 34 can be viewed using a browser running on the user's computer 32. The browser includes an add-on 40, which extends the features of the browser in accordance with embodiments of the invention. This add-on 40 can also incorporate the features of the overlay builder 56 as discussed in further detail below. The content is displayed in the browser window 42 which displays the content of the various pages 34 at the locations 36. The browser also permits the user to navigate to new pages using addresses entered into an address box for the browser window 42.

Path Taken:

The add-on 40 contains a path-taken window 43. This window shows the path the user has followed thus far, to arrive at the page 34 displayed in the browser window 42. The path can be displayed either in text form, or preferably in graphical form as shown in FIG. 8. In an embodiment, the node in the overlay 41 corresponding to the current page 34 being displayed is highlighted in the path-taken window 43, for example by being bolded, with an arrow indicating that the content of the current page 34 is displayed in the browser window 42.

View Ahead:

The add-on 40 also includes a view-ahead window 44, which shows the user the nodes, and/or pages 34 that are visible from the current page 34. If the user 30 is following a previously created path through the overlay 41, then the view-ahead window 44 will display the nodes in the overlay 41 which are visible from the node corresponding to the current page 34 being viewed. If the user 30 is not following any pre-existing path, and is instead creating a new overlay 41 or extending an existing overlay 41 by navigating to new pages 34, then the view-ahead window 44 can alternatively display all of the pages 34 accessible from the current page 34, or can be blank, signaling to the user 30 that a new path is being formed.

The view-ahead window 44 can display the connections from the current node and/or page 34 in different ways, depending on the nature of the connection. For example, sequential connections on a path being followed by the user 30 are displayed with emphasis (e.g. bolded or solid lines), whereas logical connections to other nodes are displayed with less emphasis (e.g. dashed lines), and other visible nodes may be displayed with even less emphasis (e.g. grayed out). Links in a page, which have not yet been converted into connections of the overlay 41, are preferably displayed in a manner that distinguishes them from the connections of the overlay 41. In the view-ahead window 44, as well as in the path-taken window 43, the user 30 can access information about the nodes in these windows by, for example, moving a cursor over the node, causing information, such as a comment or summary of the node's content, or the location of the node, to pop up or be displayed in the add-on 40. The user can navigate to any node displayed in either window simply by clicking on the node in the respective window 43, 44.

Comments, Index and Navigation Tools:

The add-on 40 also includes a comment view window 46. This window displays comments pertaining to the current node being displayed, and permits users to add or edit their comments. The add-on 40 also includes an index window 47. This window displays an index of terms in the overlay 41, for use as discussed herein by the user 30. Finally, the add-on 40 includes a navigation tools window 48. This window displays any tools used by the user to navigate the content in the overlay 41. This window 48 contains a search tool, for the user to search the overlay 41. The window 48 contains a global view button, which allows the user to display a graphical view of the entire overlay 41, or alternatively those portions of the overlay 41 which are accessible or visible to the user (e.g. depending on the user's role, and the visibility metrics discussed above). The window 48 optionally contains an external content button, which allows the user to navigate to external content, not found in the electronic overlay 41. Alternatively, the existing navigation features of the browser window 42 allow the user 30 to navigate to any accessible content on the network 38. As discussed in further detail herein, this external content is accessed by the user and stored in the overlay 41. The window 48 contains a load new path button, which allows the user 30 to load a new path, or a new overlay 41, into the add-on, for example when the user 30 wishes to review a path or overlay created by another user as discussed herein.

Finally, the window 48 contains an add comment button, which allows the user to add a comment to the current node, or, when the user navigates a connection, to that connection. The windows of the add-on 40, may optionally be hidden from view and only displayed when selected, for example from a menu, by the user.

Building the Overlay:

The add-on 40 builds an overlay 41, as described above, which documents the user's path through the pages 34. The add-on 40 records every aspect of the path the user 30 follows, including information such as the locations 36 visited, the pages 34 visited, any additional data the user 30 supplied such as information entered into forms on the pages 34, or selections made on the pages 34. This information is saved securely, using known methods of securing data such as encrypting the information. The add-on allows the user to enter comments for each page 34 visited, and each connection between the pages 34 on the user's path through the pages 34. These comments, as discussed above, can be text, audio or video comments. The user 30 may select a button on the add-on screen to initiate entry of a comment, or alternatively may use other means of signaling the add-on to accept a comment, such as a special keystroke combination.

Sharing the Overlay:

The overlay 41 is then available for the user to distribute to other users, in the same manner as discussed above. The overlay 41 is also available for the user 30 to update with additional content or comments, should the user 30 re-visit the search at a later date. Thus, the user 30 can bring up a prior search in the add-on 40, and pick up where the user left off, or at any point in the search. The add-on 40 preserves the entire search history in the overlay 41.

Reviewing the Overlay:

The user 30 may also use the add-on 40 to bring up the overlay 41 for review after the user has completed a path through the collection of information. The user 30 can replay the path, re-visiting the pages 34 and the connections stored in the overlay 41 between the pages 34, and also revisiting the comments stored with each page 34 or connection. The comments will automatically be presented to the user as the user traverses the pages 34 and connections while replaying the path. Other types of connections, such as the logical connections discussed in more detail in the next paragraph, are also presented for viewing in the replay of the path.

Extending the Overlay:

The user 30 can also add additional connections which reflect relationships other than a traversal between two pages 34. For example, if the user 30 identifies a logical relationship between two pages 34, which the user did not at first appreciate as he was traversing the pages 34, the user can add a logical connection between the two pages 34, and provide a comment explaining why the user added the connection. Thus, in the car search example, the user could add logical connections that connect together all of the identified cars in the search which have the same color, or the same body style, or the same brand. Another user could then easily review only the cars having a given characteristic, such as 4-door sedans, but still visit them in a particular order as desired by the user 30. This allows the user 30 to create entirely new paths in the overlay 41, to relate the pages 34 in new ways.

A Map of the Path:

The user can also view the overlay 41 as a map of the user's path, using the add-on 40. This allows the user to edit both the path and the comments. For example, the user can remove pages 34, connections or comments which are no longer needed. The user can also add further comments to the pages 34 or connections. The user can also print the path. The add-on prints the path sequentially, to reflect the order the user 30 visited the pages 34. The comments are printed along with each visited page 34, or connection between pages. Audio comments are optionally transcribed to written form by voice-recognition software using known methods.

Inserting Material:

The user can also add additional pages 34 (or nodes 10 as discussed above), containing content not found on the network 38. For example, if the user 30 has additional content stored locally on the computer 32, the user can add this content to the overlay 41, and create connections to the pages 34 already in the overlay 41. This is similar to the process described above for a student adding in personalized content such as the node 10j to the electronic textbook embodiment.

Saving the Overlay:

In an embodiment, the overlay 41 saves the path in a compact form, such as retaining only the URLs for the various pages 34 visited, along with records for the transitions between the URLs. Alternatively, the overlay 41 creates an image or local copy of each page 34 visited, and saves a complete summary of the path the user 30 took through the pages 34.

Sharing and Cooperating:

Because the overlay 41 is saved electronically, it can be easily distributed to other users, for example by e-mailing the overlay 41 to the other users, or placing the overlay 41 in a centrally-accessible location as discussed above with reference to the electronic textbook 5. These other users can then use add-ons 40 on the browsers running on their computers 32, to replay the paths in the overlay 41 as discussed above, as well as add their own comments, extend the paths in the overlay 41 to cover additional pages 34 on the network 38, or supply additional local content. The users then can exchange the overlay 41 amongst each other, further building on the shared knowledge base. Eventually, the overlay 41 would include the comments and recommendations of a large number of users, as to which pages 34 contained desirable information. Each user's comments and additions are tracked. This allows any given user to easily identify which comments or additions were made by each user, and to filter this material based on who provided it.

Reliable Backtracking:

Because the overlay 41 tracks the user's interaction with all of the pages 34 on the network 38, the overlay 41 allows for a more robust navigation of these pages 34 than is possible with just the web browser running on the computer 32. For example, web browsers typically provide a "back" button for users to use to return to the page 34 they previously visited. Such browsers can even store a chain of previously visited pages 34. However, this stored chain of pages is unreliable, because conventional browsers cannot reliably handle all types of web content. For example, if the user 30 navigates to a popup window, a conventional web browser will not retain the popup in its list of visited pages 34. Thus the user 30 cannot backtrack to the popup window. Other forms of complex pages 34 are also not typically retainable by conventional browser histories, and cause the backtrack trail to be broken, disabling backtrack capability entirely.

The overlay 41, in an embodiment, however, records all of the pages 34 visited by the user 30, including popup windows or other complex pages not captured by browsers. The overlay 41 also keeps track of the browser's backtrack status as each new page 34 is loaded. When the browser loses backtrack capability, the overlay 41 records that event, infers an explanation (for example by receiving a signal from the browser indicating what the browser was doing when backtrack was lost [e.g. opening of a popup, opening an additional window in the browser, or changing the Universal Resource Locator (URL) without notifying the browser of intermediate activities]. The overlay 41 next identifies the proper chain of pages visited [e.g. correctly identify a popup or a new window or the initial and subsequent URLs at a complex or secure website that the browser cannot track on its own]) and flags the node in the overlay 41 corresponding to the page 34 where backup capability was lost. Thus, if the user 30 later wishes to return to any visited page 34, the user 30 can use the overlay 41 to get there. The overlay 41 reaches the pages on the continuous path using the browser's backtrack capabilities. Any page after backtrack capability was lost is recovered, for example by returning to the node corresponding to the page 34 where backtrack capability was lost, and then navigating forward through the nodes of the overlay 41, along the recorded path, to reach the desired page 34.

Submitting the Overlay to a Search Engine:

The overlay 41 can also be submitted to a conventional search engine such as www.google.com, to obtain additional guidance. The comments in the overlay 41 are optionally filtered out by the add-on 40 prior to submission, to preserve privacy. The overlay 41 is then parsed by the add-on 40 to extract the key terms and motivations underlying the creation of the overlay 41. Those terms are formatted for presentation to the conventional search engine. The search engine results are then made available as additional pages 34 for the user 30 to traverse, to further extend the content in the overlay 41. When multiple users of the overlays 41 each submit their overlays 41 to the conventional search engine, those key terms and motivations become part of the formula used by the conventional search engine to retrieve results. Thus, the submissions to the conventional search engine indirectly create a community of users 30 who are interactively aiding each other in building improved overlays 41.

Mapping Across Multiple Content Collections:

In an embodiment, the overlay 41 is further used to create a map or overlay that shows the relationships of content in multiple different content collections, such as multiple different websites. The overly 41 is constructed, for example, by a website builder who wishes to correlate content on one website with related content on another site. The overlay 41 shows relationships (as connections) between the other sites' web pages to pages on the present site, as well as relationships among the pages on the other site, and provides informative comments (for example as tooltips tied to the elements of the overlay 41, or to the other pages, or as comments in the comments window 46). The other sites' pages are represented as nodes in the overlay 41. The relationships depict graphically the specific connections among the various pages and their material. This form of overlay is analogous to a personal navigation, but offers such features as links between local content and content at other sites, graphical displays of interconnections coordinated with local content, and a more professional style of presentation. The overlay 41 of an embodiment makes this approach readily accessible to website builders.

Facilitating Interoperation Among Websites:

For example, the overlay 41 allows websites to interoperate. Suppose that one website offers practical services and has developed a large clientele in some special area, while some other websites in that area offer useful information for that same clientele. The service-oriented website can prepare an overlay 41 that reaches key pages from the other sites, and integrates them into a guide for its clientele. When a user navigates to one of the pages residing at a foreign site, three special benefits can be offered: first, a helpful introductory comment places the foreign webpage into the context of the guide; second, the foreign website page comes up with customized emphasis on the key material that is being referred to; third, although the user is now operating native on the foreign site and can tour its webpages freely, at any time the user can use a control panel or special keystroke to return to the exact condition at the home website that prevailed before navigating to the foreign site. Note that the first and third benefits can be offered by the overlay 41 operating on the home website only. However, the second benefit is best realized by interoperation between two overlays 41, one on the home website and one on the foreign website. Such interoperation can also offer a customized tour of the foreign website, using the overlay 41 on the foreign website, navigating from page to page highlighting relevant information.

Application 1—Overlay for Legal Argument

This example application of the device pair Informed-Choice Paths and Knowledge Garden is described in the paragraphs immediately below. The application concerns preparation of a contentious argument for which precedent is relevant. For example, in accordance with one embodiment, the user employs an overlay builder with access to a library of resources that help to marshal precedent. Items of relevant precedent are captured as nodes and assigned attributes concerning the nature of their possible relevance. Relationships among different items are established as connections between nodes and assigned attributes such as the nature of the relationship. Material can be imported from overlays prepared previously in other projects and as new content.

Many of the relationships concern logical argument: the diagram comprising nodes and connections is an instance of a relationship display, in which many links correspond to logic display, while others can be more adversarial, procedural or associative. A prepared path lays out the progression of argument, and a second path can be conjectured for the opposing argument. Each path naturally includes contingency plans for actions to be taken in response to actions by an opponent. The junction points for these contingencies can be analogous to informed-choice junctions, with the added feature that someone other than the user—in this case the adversary—makes the choice. Perspectives in the Knowledge Garden naturally can include an overall view, views from each of the adversarial perspectives and a balanced judicial view. In addition to the prepared paths, temporary paths serve for the user and other annotators to express provisional ideas or comments.

For example, as discussed above, the overlay 41 can draw on network content such as web pages 34 on network 38. Additionally, the overlay 41 can draw on local content stored on the computer 32. Furthermore, the overlay 41 can draw on any other content that is accessible to the computer. For example, with reference to FIG. 9 a user 50 uses a computer 32 to access a variety of content 52, such as text or images of text, in a digital library 54. The content 52 represents source material that the user 50 will use to craft, for example, a legal argument, a legal brief, or a position paper for a political debate. The user wishes to marshal the legal or political precedent for his argument, as well as the precedent he anticipates the opposing party to marshal.

The user 50 uses an overlay builder 56 to build an overlay 41 that assists the user in marshaling his precedent. The overlay 41 will be shared with other users, as discussed above. The overlay builder 56 can be an add-on to a browser, such as the add-on 40 discussed above. Alternatively, the overlay builder 56 is a stand-alone program running on the computer 32. The overlay builder 56 displays the content 52 of the digital library 54, and also displays a visual representation of the overlay 41, including the nodes and the connections as discussed above. In an embodiment, the overlay builder 56 is itself an application of the same concepts used by the end users discussed above to navigate through content. The same components that a user uses to navigate through content are here used by the author to build the content.

Assigning Attributes:

In the overlay 41 of this embodiment, the nodes each contain a particular position or argument that the user 50 wishes to include. Each node has attributes assigned to it, for example the polarity of the position or argument (e.g. supporting the user's argument, supporting the opponent's argument, or neutral). Other attributes can include, for example, a measurement of the strength of the argument, a measurement of the likelihood that the argument will come up in the legal proceeding or the debate, and whether an argument has been disclosed to or is known by the other side and if so in what form.

These attributes can influence the appearance of the nodes as displayed in the overlay builder 56, for example by shape of the node, size of the node, color of the node, or relative location of the node in relation to other nodes. For example, if the user 50 wishes to view the polarity of the various nodes in the overlay 41, the user selects the polarity attribute and tells the overlay builder 56 to display the different polarities in different colors.

Attributes in an Electronic Textbook:

Similarly with respect to the nodes 10 discussed above in the electronic textbook 5, attributes of the nodes 10 can influence the appearance of the nodes 10 in the electronic textbook 5. Thus, nodes 10 can have attributes such as title, brief abstract, type (e.g. feature format (including various kinds such as text, image, mixed, interactive, video, audio, etc.), gateway, vestibule, gallery, logic view, or ordinary junction), and significance level (a number from 1 highest to 9 lowest, like the levels of an ordinary linear outline) that helps to present compact summaries of the global text or local region by selectively showing only higher levels. These attributes may similarly be displayed, either by the overlay builder 56, the browser add-on 40, or by the electronic textbook 5 itself, using the shape of the node, size of the node, color of the node, or relative location of the node in relation to other nodes as discussed above.

Importing Material from Prior Overlays:

In addition to source material, the content 52 of the digital library 54 can also include other overlays that were previously generated by the overlay builder, for example for an earlier aspect of the legal case, or for a similar case or debate position. The overlay files are stored for subsequent use in the digital library 54. In an embodiment, the overlay files are stored in a directory, similarly to the way that pdf files are stored, or they may be stored as indexed items in a digital library with its own index of items (such as pdfs and overlays), each with their appropriate searchable attributes. When a previous overlay is brought up, it can be viewed as rows in a spreadsheet or relational database (the "tabular grid" presented below), or can be presented to the user visually as a map similar to the textbook 5 discussed above (the "display field" presented below).

The user 50 thus can begin with an existing overlay, and modify it to comport with the user's current needs, by deleting unwanted nodes, connections or comments, or changing attributes of the nodes, connections or comments, for example by raising or lowering a relevancy attribute, a strength attribute or a likelihood of presentation attribute. This feature of an embodiment of the invention allows the user 50 to easily preserve and re-use his prior work.

Importing Content

In an embodiment, as the user 50 researches the issues for relevant content, such as relevant precedent, the user creates new nodes simply by selecting the desired content from the content 52, and dragging and dropping that content 52 into a display window of the overlay builder 56. The overlay builder 56 creates a new node in the overlay 41, containing the exact passage selected from the content 52 (assuming that the digital library 54 supports this). Alternatively, the new node in the overlay 41 contains the entirety of the content 52 selected.

Selecting the content 52 causes the overlay builder 56 to present the user 50 with several options, for example: (1) bring in the selected material as a quotation, (2) create a citation to the material, or (3) create a footnote containing the material. The user 50 then indicates via a comment which portion of the content 52 is pertinent to the position or argument defined by the node, and indicates by selection the exact material that is relevant. The overlay builder 56 also tags the new node with the path to the source content 52. The overlay builder 56 also automatically populates attributes of the new node with any attributes that can be gleaned from the source content 52. For example, bibliographic information about the source content 52 is collected, and a timestamp for when the node was created is provided. If the user 50 wishes to revisit the source content 52, the user simply clicks on the node, and the overlay builder 56 retrieves the source content 52, opened to the proper location with the selected passage highlighted.

Characterizing a Newly Created Node:

When the user 50 creates a new node, the overlay builder 56 causes a prompt such as a menu to appear, requesting the user 50 to provide additional information about the node, such as a title for the node, attributes of the node (as discussed above), and any comments the user 50 wishes to attach to the node. If the user 50 wishes merely to cite particular content 52, without any verbatim quotations of the content 52, then the user 50 need not associate any of the actual content 52 with the node. Instead, only a connection to the content 52 is provided, indicating the specific citation to the content (e.g. page and line number, or footnote number). The content 52 is still available for the user 50 to review, by clicking on the node as discussed above. The overlay builder 56 then creates the connections to the new node. A connection can be automatically created, to the last node that was added. Additionally, the overlay builder 56 can prompt the user 50 to provide any additional desired connections, as well as provide comments for each such connection.

Logical Connections:

As discussed above, the connections between nodes in the overlay 41 can be of several different types (e.g. logical connections, sequential connections). In this embodiment, the logical connections can represent, for example, implication and contradiction, or affirmation and refutation. The sequential connections can represent the sequence of the user 50's presentation, or a projected sequence of presentation of an opposing party. The overlay 41 displays each of these different types of connections in ways that make clear their distinct roles. Thus, a logical connection is displayed differently from a sequential connection (e.g. a dashed line vs. a solid line). The connections in the overlay 41 may be one-directional, or they may be bi-directional. Each of the connections between two given nodes include their own comments, which can range from a simple title of the connection, to a short note, to a rehearsal of a complete argument related to the transition between two items of content 52 associated with the two nodes joined by the connection.

Uses for Temporary Paths:

The user 50 can create as many paths through the nodes in the overlay 41 as desired, and can add or delete a path at any time. For example, when the user 50 invites another user to review the overlay 41 or an aspect thereof, the user 50 can create a temporary path through the overlay 41, which takes the other user through only those nodes and connections that are relevant to the review. This concept applies equally to the web search and electronic textbook embodiments discussed above. Thus a search consultant can create a temporary path through an overlay 41 representing a web search, to highlight for example just the models of car that the search consultant located. Additionally, a teacher can create a temporary path through selected nodes 10 of the electronic textbook 5, to help a student understand a specific point of instruction.

Creating a Path by Traversal:

Inserting a new path into an overlay 41 is preferably done simply by traversing the nodes in the overlay 41. The user 50 clicks on the nodes in the order desired to form the new path. Deleting or moving a connection or a path is equally straightforward. The user simply selects the connection to be deleted and indicates a desire to delete it, for example by selecting "delete" from a menu or by striking a key on a keyboard of the computer 32. The user can move a connection or path by dragging and dropping the connection to the desired nodes, or by deleting the undesired connection or path and creating the desired connection or path via traversal as discussed above.

Viewing a Message Sent as a Temporary Path:

When the other user proceeds along such a path, they will see the comments provided by the user 50, as well as the transitions between the nodes that express the user 50's thoughts and questions, so that the other user can quickly understand the user 50's intentions. The overlay 41 is also set to automatically open for the other user at the starting point of the temporary path created by the user 50, to allow the other user to quickly get started. Should the other user wish to gain additional perspective on the overlay 41, the other user can use the overlay builder 56 (or the add-on 40 or electronic textbook 5) to explore the rest of the overlay 41 (or electronic textbook 5) to gain the necessary perspective.

Printing a Sequential View of an Overlay Path:

The overlay 41 can be printed, to generate a conventional, sequential copy of the argument formulated by the user 50, or a legal brief. The user 50 simply instructs the overlay builder 56 to print the sequential path the user 50 defined through the overlay 41, reflecting the user 50's argument or brief. Preferably, the user 50 first views the overlay 41 in the overlay builder 56, for example in a preview mode of the display field 60, to confirm that the selected path is providing the correct nodes and connections. The connections and nodes in that path will be printed in sequential order. The nodes represent citations to and quotations from the authority relied upon. The nodes can also represent certain prepared arguments. The connections will represent transitional paragraphs between citations, for example providing additional explanation or argument which relies on the citation. The nodes and connections can be printed in whatever format is specified by the user 50. For example, the nodes can print full quotations or just citations. The nodes can print as footnotes in the printed document, or as paragraphs of text.

Printing an Overlay Path from an Electronic Textbook:

Of course, this same concept applies to the embodiments described above. Thus, a conventional textbook can be generated from the electronic textbook 5 by printing out a path (e.g. paths 12, 14, 16, 18) in sequential order. An annotated search history can also be generated by printing out a path through the overlay 41 of FIG. 7. The same overlay 41 or electronic textbook 5 can generate a large number of different conventional copies or books, simply by selecting and printing any of the different paths through the electronic textbook 5 or overlay 41.

Visual Logic: Displaying Structured Argument:

The overlay builder 56 also aids the user 50 in mapping out his argument strategy and thought process, by presenting a visual representation of the salient arguments, positions, and authorities. Thus the user 50 can view various perspectives on a given overlay 41, or a path through that overlay. As the user selects a given path through the overlay 41, the spatial orientation of the nodes in the overlay 41 change to emphasize the selected path. For example, if the user 50 displays the path representing the user 50's argument, then all nodes which are not in the user 50's argument, such as those that pertain to the opposing party's argument, are re-positioned in the display of the overlay builder 56. These other nodes can be displayed for example as side-notes in proximity to the selected path. Thus each node or connection in the selected path may have a side-note showing the refutation the other party is expected to make on one side, and any supporting points (but which are not directly part of the user 50's argument) as a side-note on the other side of the display of the overlay builder 56.

The user 50 can, of course, also display the other side's projected argument as the selected path, with the supporting and refuting points to the opposing party's argument being displayed as side-notes. The user 50 can also display both sides' paths in parallel, and emphasize the logical connections between the respective arguments.

Display at Various Levels of Detail: Assigning Outline Levels:

The user 50 can also provide additional structure to the overlay 41, by assigning significance levels to nodes and creating higher level nodes which themselves encapsulate other nodes. Thus the user 50 can create a hierarchical layering of the nodes in the overlay 41. This allows the user 50 to group related nodes together, and display the overlay 41 at varying levels of detail, converting the overlay 41 into a non-linear outline. When a collection of nodes is grouped together, the connections between nodes within the group are not displayed in the overlay builder 56. However, connections to nodes outside the group are still displayed. Optionally, where there are multiple connections between two higher-level nodes, those connections are coalesced into one connection for display purposes. These higher level nodes can be expanded and compressed as desired, to allow the user 50 to view and analyze the overlay 41 at any desired level of abstraction. This allows the user 50 to create an outline view or views of the overlay 41. Because the overlay 41 can contain multiple paths, all of the various paths from one higher-level node to another (paths which pass through various lower-level nodes) are simply paths as defined in the overlay 41, and can be straightforwardly displayed, as in the examples above. Of course, additional comments can be provided for any of the higher-level nodes or connections created as part of this outline. Similarly, this concept can be applied to the other embodiments discussed herein.

Other Layers: Expressed and Hidden Arguments:

Similarly, the user 50 can define layers for the overlay 41 (or electronic textbook 5). A layer is a group of nodes and connections that are all related to each other in some fashion. For example, the user 50 may wish to distinguish between positions that the user 50 has already expressed, and those positions that are still hidden from the other side, or distinguish between the other side's expressed positions and the user's conjectures as to the other side's hidden positions. The user 50 might also want to add a layer for predicted resolutions of various points of disputes.

Assigning Layers to Paths in the Electronic Textbook:

Similarly, for the electronic textbook 5 discussed above, the author may wish to define separate layers for each of the paths 12, 14, 16 through the electronic textbook 5, or define a separate layer for each stage of a multi-class curriculum or course of study. The overlay builder 56 allows the user to select a given layer (or layers) to emphasize visually, such as by highlighting the layer, expanding the size of the layer, or moving the layer forward in relation to other layers. Non-selected layers can be removed from the visual display region of the overlay builder 56 entirely.

Querying Content Through Temporary Connections:

When creating an overlay 41 (or an electronic textbook 5) the author may use the overlay builder 56 to assist with the creative process, for example by searching and querying the underlying content (e.g. pages 34 or content 52) used to build the overlay 41 or electronic textbook 5. The overlay builder 56 accepts queries on the content, and uses those queries to build temporary connections to and between the content queried. Similarly, the overlay builder 56 permits the author to query the nodes in the overlay 41, and builds temporary connections between the nodes queried. When the author is done with a particular query, and has located the desired content or nodes, then the connections created by the query can be relegated, disappearing from the overlay 41 or electronic textbook 5, at least for display purposes. The query remains, however, in an archive (e.g. another overlay created for archival purposes) for the author to refer back to when needed.

Temporary Development Connections:

Similarly, the author can, in building the overlay 41 or electronic textbook 5, identify several nodes as logical alternatives to consider for use in the final overlay/textbook. This indicates that a future choice will have to be made. A list of these temporary development connections is automatically maintained, tracking their character and status. This list can be traversed sequentially. Tracking the history of its assembly is another way of navigating the overlay 41. Of course, these concepts can be used by any user of the overlay 41 or electronic textbook 5, not just an author.

Creative Development Environment (CDE):

The electronic books and overlays of embodiments of the invention, such as the electronic textbook 5 or the overlay 41, are built using a creative development environment such as the overlay builder 56 discussed above. In an embodiment, the overlay builder 56 is a CDE for assembling, organizing, developing and sharing information. The overlay builder 56 is an electronic knowledge tool oriented towards effective thought. The overlay builder 56 interfaces with other publishing tools such as web browsers, word processors, desktop publishing software, document management tools and digital library software. The overlay builder 56 extracts content using these tools, and inserts that content into the nodes of the overlays and electronic books of embodiments of the invention.

The Creative Development Environment (CDE) and Creative Presentation Environment (CPE) can be built on a common platform and share many features in common. The electronic books and overlays of embodiments of the invention, such as the electronic textbook 5 or the overlay 41, can be built using a CDE such as the overlay builder 56 discussed above.

In various embodiments, the overlay builder 56 can be a CDE for assembling, organizing, developing and sharing information. The CDE can have extended capabilities for importing materials, undertaking complex compositions, building websites and working with extensive datasets. The CPE can have a different operator control configuration optimized for viewing and annotating, but shares many creative capabilities with the CDE in order to allow the reader to become an annotator and an active learner. For example, as described above in the section "Functions Serving Both User and Author" there can be various parallels between an author's creative work and active uses by a reader/annotator.

Aids to Productive Thought (APT):

The overlay 41 or electronic textbook 5 of embodiments of the invention are effective because they aid users in many aspect of their thinking, as discussed herein. They help the user, but they also help the author. Creating an overlay 41 or electronic textbook 5 helps the author think about the topic being addressed. Creative development in the creative development environment (CDE) can enhance the author's work, even if the author ultimately is creating a conventional publication, in linear form, and does not intend to share the electronically developed content (e.g. electronic book or overlay representation).

APT tools can be intended for practical use and designed to improve users' results. In various embodiments, Aids for Productive Thought (APT) offer device pairs that encourage users to alternate between analytical clarity and wide-ranging context. For example, in one embodiment, each device pair can comprise matched devices, each drawn from one of two classes of tools that sustain these two different states of mind. A first example class comprises tools for formally structuring and diagramming knowledge so that knowledge can be preserved, crystallized for active analysis, and shared. These devices can lay out complex information in a clear way that sustains concentration, aids our memory and promotes analytical clarity.

A second example class consists of tools for creatively exploring ideas, developing context for ideas, and transforming ideas into useful knowledge. These tools help users to explore new ideas in an unstructured setting, make fresh connections between known ideas, and develop new insights and solutions.

These two example classes of tools can promote two distinct states of mind, respectively, analytical clarity and wide-ranging context. Analytical clarity is often experienced as linear conceptual thought accompanied by acute visual focus. Diagrams and tables contribute to analytical clarity. Wide-ranging context often accompanies awareness of the senses and wide-angle visual focus. Calmness and gently persistent concentration contribute to wide-ranging context. Analytical clarity supports focused analytical efforts that clarify and enhance existing knowledge, while wide-ranging context supports open-minded creative curiosity that supplements and potentially disrupts existing knowledge. It can be helpful to alternate between them, and the device pairs take advantage of computer hardware and software to make this possible.

In various embodiments, each device-pair encourages users to move back and forth freely between analytical clarity and wide-ranging context, the two states of mind presented above. As user accustom themselves to these excursions and recognize their value, they can train their mind to function subliminally in the same way, maintaining their knowledge base while also extending it. As a result, their creativity and innate capabilities for thought are enhanced in unexpected ways. This is the patient style of creativity, the kind we need to think through problems, discover our mistakes, accomplish significant tasks and live a meaningful life.

The example Aids for Productive Thought (APT) devices presented here can help authors, annotators and readers to work well with complexity and discover creative solutions. The devices focus on different aspects of thought and offer demonstrable support for productive thought: using them, users find that they are thinking more successfully and with less tension and anxiety. Users develop new habits of thought, and can find new ways of approaching problems that allow them to manage greater complexity and take advantage of higher levels of abstraction.

In various embodiments, the device pairs can be embedded in the common platform for the Creative Development Environment (CDE) and Creative Presentation Environment (CPE). For example, the electronic books and overlays of embodiments of the invention, such as the electronic textbook 5 or the overlay 41, can be built using a CDE such as the overlay builder 56 discussed above.

The CDE can serve for creative development and productive thought, for sharing, and ultimately for publication. It can be designed to mirror the thought process of users, and when they share the work with others or present it to others in finished form, they are inviting others to share the view into the users' mirror. The Creative Presentation Environment (CPE) allows other users, like co-authors, annotators and readers, to share in the same creative dimensions that the author has experienced without risk of damaging the presentation that the author has created. A finished presentation can rely exclusively on formal devices, but the CPE user can have the scope to add her/his own elements to the presentation through annotation, and also to view and freely manipulate decoupled versions of the formal displays in creative devices.

The device pairs complement one another and interoperate so that the whole is greater than the sum of the parts. The basic platform also manages user interactions, and stores and manages user inputs. Each of the device pairs can demonstrate productive modes of thought and can enhance thinking on a specific dimension. Authors, annotators and readers can learn to think better, and develop insights about thinking that illuminate aspects of their mental landscape that might otherwise remain hidden.

In some embodiments, three or more device pairs can be used in different phases of developing and presenting a single body of knowledge, and in further embodiments, four or more devices can be active at the same time. The Creative Development Environment (CDE) can incorporate all the devices as well as other tools, and works with elements that can be passed efficiently from tool to tool. The CDE can facilitate spontaneous contributions by allowing authors and co-authors to follow their creative impetus, rather than being required to proceed in some predetermined sequence. The elements that comprise a project are generally interchangeable among all the devices, and the project that emerges from the work effort can be displayed or processed throughout the environment.

To appreciate the designs of these creative environments, the following sections present example principles and techniques of Aids to Productive Thought (APT) that such creative environments implement.

Apt Principles and Techniques Implemented in the Creative Development Environment (CDE) and Creative Presentation Environment (CPE)

Key principles and techniques for assisting productive thought in accordance with some embodiments will be described in several stages, beginning with overall example guidelines as follows:

(i) support relaxed concentration that is open to new ideas and insights, alert to new information, and purposeful without being rigid;

(ii) evoke acute-focus vision for tasks consisting exclusively of verbal analysis within the context of the formal visual display, and encourage wide-angle, panoramic vision for everything else;

(iii) allow the user's thought process to respond spontaneously as appropriate, often carrying forward creative initiatives, sometimes focusing on observation, sometimes practicing and learning through experience, sometimes pondering, sometimes spontaneously reactive, sometimes probing for errors;

(iv) recognize that most mental functions are subliminally conducted, and that the main thrust of conscious effort should be to illuminate that subliminal process and effectively disclose the results;

(v) visibly display effective information handling procedures; (vi) take advantage of the strengths of both computer calculation and human thought, to achieve the most efficient conjunction of the two;

(vii) build upon our modern culture's strong points and counteract its limitations.

The principles and techniques of Aids to Productive Thought (APT) in various embodiments can be described in terms of the implementation of these seven guidelines in the CDE and CPE. The following description focuses on practical implementation, and blends principles and techniques together without making formal distinctions between them, and should not be construed to limit the numerous possible embodiments that are within the scope and spirit of the present invention.

First Guideline: Support Relaxed Concentration

Creativity manifests newness. What exists already is its basis, and should be respected, relied upon when appropriate, and retained when valuable. Creativity thrives on openness to new possibilities; and it may be evoked by failure of the old as well as by curiosity about the new. The creativity that we need leads to benefit, and in that sense is purposeful. Random innovation and escapism are not going to help. It is necessary to set out on the path from old to new, and let go of the old before the new presents itself. There is not much security in this space between old and new, but there is potential. The creative thrust can nourish and sustain relaxed concentration almost indefinitely. Creative concentration is inclusive, in the sense that it is open to all possibilities, and it is not exclusive, in the sense that it rules nothing out until the learning that is implicit in consideration has taken place. The concentration that we need is balanced and calm, neither looking back to the old nor hurrying toward the new. We can relax in this concentration. The relaxation that we feel and the brightness of our minds signal that we are settled in a productive place.

Each of the seven example guidelines contributes to this state of mind in a specific way. This "support relaxed concentration" guideline can include three aspects of APT that facilitate settled concentration on meanings displayed in the visual field.

1) Visibility

What is visible on the display screen? What should be visible? This depends on context. Ideally, the user should be able to command visibility and direct it toward whatever would be most helpful. However, the need for visibility may be known subliminally rather than consciously, and in any case, there is always the potential for useful surprises. For example, in a K-12 textbook, the author can design visibility to support the reader's concentration and provide opportunities for informed choice. For adult readers, visibility may be left to the reader's choice, and empowered by a range of useful options. As discussed above in the sections having heading "Visibility," "Limiting Visibility to Improve Focus," "Extending Visibility to Show Options," the visibility of various elements can be controlled.

It is easier to focus on material and to think about it when we can see it displayed on a screen, and we can make better choices when we can consider options side by side. Visibility is particularly helpful when we're trying to discern aspects of a situation that we do not yet consciously understand. It's helpful to see whatever is relevant and it's helpful not to see distractions. Aids to Productive Thought (APT) tools help the user to gather relevant material together in the visual field.

2) Alternating Between Formal Displays and Creative Fields

Formal visual displays such as diagrams and spreadsheets stabilize the knowledge base. Creative fields allow free play for inventiveness. The formal field is analogous to memory and the creative field is analogous to exploration for new possibilities. For memory to be stable, it must be hardened against disruption, and yet innovation comes most easily when the mind moves freely without restrictions. It is true that we can discipline our mind to create without forgetting and preserve what may already be obsolete, but while our thought process is unfolding it is much easier to allow a formal display to stabilize our memory, so that we can freely create without fear of forgetting. Once we know that memory can be instantly recovered by looking at a formal display, we can relax and explore freely.

3) Presenting Complex Knowledge in Depth

Humanity's store of conceptual knowledge is growing exponentially, and increasingly complex problems are coming within reach of scientific analysis. The web offers freely a wealth of information far beyond what any one person could master. For example, as discussed below in more detail in the section entitled "Burgeoning Conceptual Complexity" we find it hard to take advantage of the conceptual knowledge that we have; we find it hard to tackle the complex problems of human and biological systems that are central in our times; and our knowledge of our own nature is weakened by overreliance on conceptual styles of communication. APT devices can help us to cope by presenting complex knowledge in depth in comprehensible ways that offer us integrated access to both overviews and details, and help us to find and share informative paths through the material. Even the greatest complexity can eventually be understood if we can see it in its entirety and break it down into understandable pieces.

Second Guideline: Evoke Appropriate Visual-Verbal Coordination

Like language, visual representation is a longstanding human skill. The two skills are complementary and have different strengths. As discussed herein, it is time for us to coordinate language with map and diagram at a high level through computer displays based on innovative software.

Facing burgeoning complexity we need to look beyond the rigidly linear form of a printed book, which is rooted in the ancient tradition of memorization and subsequent recitation of spoken words. Linear thought does have limitations: It is easy to get caught up in a confined pattern of repetitive thought. By contrast, visual analysis takes us almost effortlessly to the big picture.

Verbal analysis and visual analysis are two distinct mental capabilities. As discussed herein, it is time to step away from predominant reliance on verbal analysis and learn to bring these two into closer balance. As our knowledge deepens and extends, we face increasing complexity. It is time to work with systematic tools that allow us to bring the highest qualities of verbal and visual analysis to bear.

Coordinating verbal and visual analysis can be a fundamental principle of some embodiments of the Creative Development Environment (CDE). For example, in various embodiments, the CDE employs a number of devices that activate both verbal and visual analysis and align them in addressing common purposes.

In fact, there are three human sense fields associated with analytical thought: hearing, the wide-angle visual field that makes use of the retina as a whole, and the acute-focus visual field that depends on the central "fovea" region of the retina. Hearing is associated with verbal thought, linear thought, abstraction and voice communication. The wide-angle visual field is associated with panoramic awareness and wide-ranging context. The acute-focus visual field is associated with rapid reaction and close inspection. The wide-angle visual field brings feelings of calmness and relaxation, while the other two involve feelings of intensity and pressure.

To appreciate the issues more fully, it is helpful to explore verbal and visual aspects of the thought process in greater detail. Most of our human history has unfolded in small groups living off the land. For hunter gatherers and farmers, wide-angle vision 1310 (FIG. 13*a*) is the norm because it sees calmly and panoramically and can alert us to significant things in our surroundings. But as soon as a possible threat is perceived, humans at once focus acutely on the threat, and visual and verbal analysis immediately ensue. Thus our history has prepared us to use wide-angle vision 1310 to acquire information and acute focus 1320 along with verbal analysis to delve into it. Athletes on a playing field carry forward this tradition.

When something draws our attention, our eyes quickly focus on it. We see it and almost immediately afterward we recognize what it is. The name of the object may come into conscious thought, and we begin to have analytical thoughts about what it is and what it is doing. Meanwhile our vision continues to focus acutely on the object, further inspecting it in response to concerns expressed in our thoughts. We are experiencing a feedback loop between acute focus 1320 and verbal analysis: each informs the other, and both respond to the knowledge that is accumulating. The feedback loop may take place subliminally, or we may consciously sense the alternation between thinking about what we see and seeing more as a result.

In terms of conscious experience, verbal thought and the acute-focus visual field usually accompany analytical clarity. Aids to Productive Thought (APT) devices for analytical clarity emphasize coordination of acute visual focus with verbal thought. This follows in the tradition of diagrams and tables and formal presentations of many kinds.

The wide-angle visual field accompanies wide-ranging context. APT devices for creativity and wide-ranging context emphasize coordination of wide-angle visual focus with verbal thought. This follows in the tradition of informal notes, sketches and doodles. The value of tables and diagrams and formal presentations is well appreciated, so this aspect is not controversial.

One feature of the Creative Development Environment (CDE) can be to emphasize wide-angle vision. This can be important in some embodiments for achieving the basic aims of the APT initiative, because a feedback loop between wide-angle vision 1310 (FIG. 13*a*) and verbal analysis can be crucial element missing when we emphasize the commonplace feedback loop between acute focus 1320 and verbal analysis. The value of coordinating wide-angle vision 1310 with verbal thought is not well appreciated in the art and is discussed in more detail herein below, for example, in the paragraphs having the headings "Visual Focus: Acute and Wide-Angle," "Becoming Familiar with Wide-Angle Focus," and "Contrasting Wide-Angle and Acute Focus," Accordingly, the following disclosure illustrates contrasts between acute visual focus and wide-angle visual focus, and gives instructions on how to activate wide-angle vision 1310 by eliciting peripheral vision.

As discussed in more detail herein, it is possible to use a "dwordle" tool 1220 (FIG. 12*a*) in conjunction with the principles of acute focus 1320 (FIG. 13*b*) and wide-angle focus 1310 (FIG. 13*a*) above, to enhance their cooperation. Using the dwordle 1220, we are able to sense the respective strengths and limitations of the two frameworks and allow them to work together. This mind training takes form in conscious experience, enhancing the effectiveness of productive thought. As the human mind is trained to adopt this new technique, it learns to deploy it in its broader minding. Ultimately broad minding may take over these capabilities so fully that we receive the benefits almost instantly without needing to go through a conscious process to achieve the results.

The dwordle 1220 is an example of an APT tool that one can use to take advantage of an analytical feedback loop involving the wide-angle visual field and verbal analysis. When this feedback loop is activated by laying out terms in the dwordle field 1220 step-by-step, wide-angle vision 1310 (FIG. 13*a*) interprets the view as a drawing with meanings and infuses verbal analysis with fresh insights. In accordance with various embodiments, each step begins with a term placed in the dwordle field 1220 as a conscious act; the wide-angle visual field 1310 observes this placement in the context of other terms already placed and subliminal analysis is stimulated; this analysis, in turn, passes insights to verbal analysis, and a new term is made ready for placement, completing the feedback loop between wide-angle vision 1310 and verbal analysis. This feedback loop supplements the familiar feedback loop between acute-visual focus and verbal analysis, and the existence of both feedback loops is a convincing indication that analytical capabilities are associated with each of the three primary sense fields mentioned above.

Figure 14:
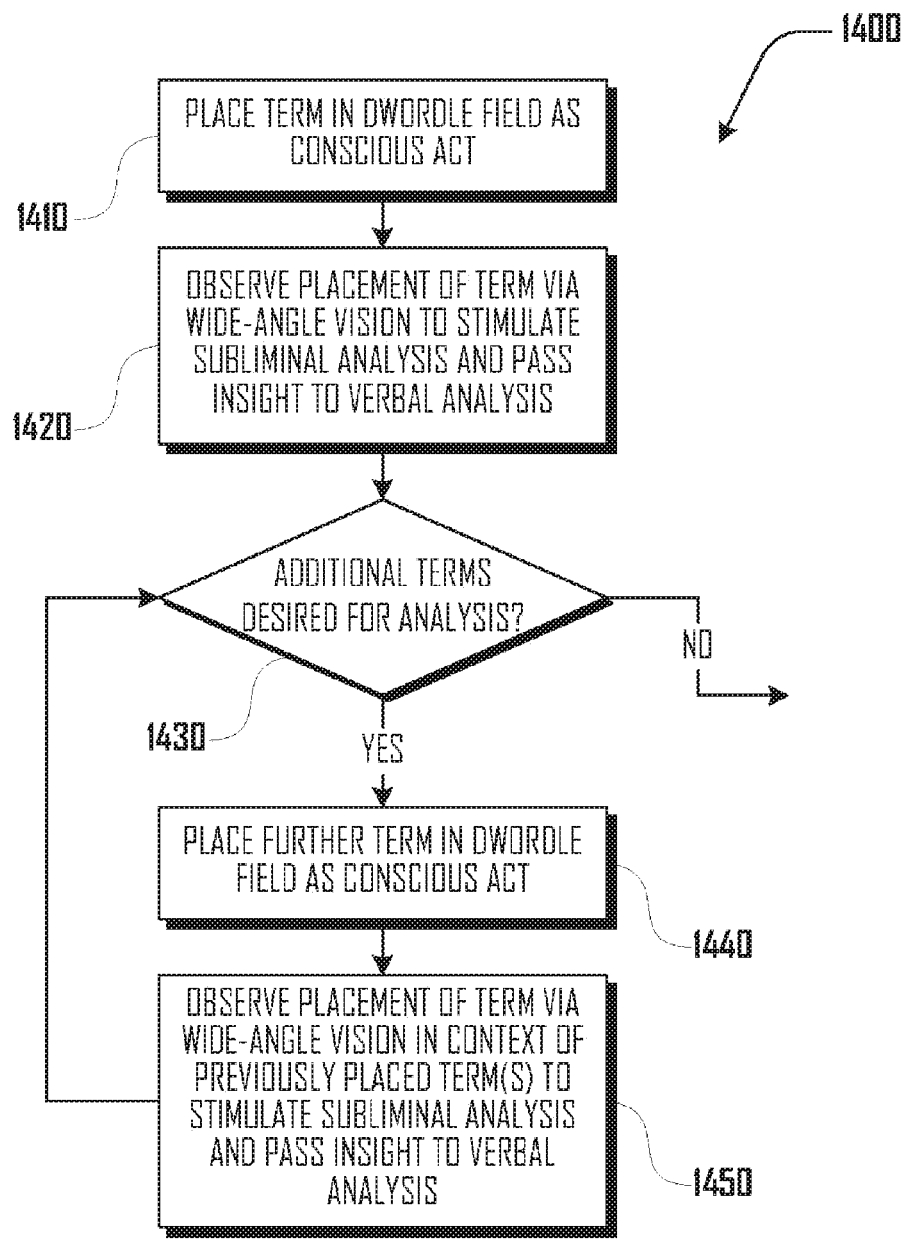
FIG. 14 illustrates a method of dwordling in accordance with an embodiment.

This process is illustrated in FIG. 14, which begins, in block 1410, where a term is placed in a dwordle field 1220 (FIG. 12*a*) as a conscious act. In block 1420 placement of the term is observed via wide-angle vision 1310 to stimulate subliminal analysis and pass insight to verbal analysis. In decision block 1430, a determination is made whether additional terms are desired for analysis, and if so, in block 1440, a further term is placed in the dwordle field 1220 as a conscious act. In block 1450 placement of the further term is observed via wide-angle vision in the context of one or more previously placed term to stimulate subliminal analysis and pass insight to verbal analysis. The method 1400 cycles back to decision block 1430, where a determination is made whether additional terms are desired for analysis and the method 1400 loop until no further terms are added to the dwordle field 1220 for analysis.

In various embodiments, use of wide-angle vision 1320 can be evoked in various suitable ways. For example, the user can be directed to center attention on a defined point on a display and the dwordle field 1220 can be presented on a portion of the display that is outside the acute vision field 1310 of the user. In further embodiments, the user can be directed to center attention on a defined point that is not part of the display and the dwordle field 1220 can be presented on a portion of a display that is outside of the acute vision field 1310 of the user. Accordingly, in some embodiments, the dwordle field 1220 can be presented on a display that is positioned outside the acute vision field 1310 of the user.

As discussed in detail herein (e.g., in sections below having the heading "Conscious Verbal Thought and the Wide-Angle Visual Field," "Verbal and Visual Analysis," "Verbal Analysis," "Limitations of Verbal Analysis," "Visual Analysis," "Limitations of Visual Analysis," and the like, there are various distinctions among these three forms of analytical thought, along with various strengths and weaknesses and the complementarities among them.

In some embodiments, the greatest complementarity is between verbal thought and wide-angle vision 1310. Verbal thought is linear and traces one connection at a time, while wide-angle vision 1310 offers wide-ranging context. The wide-angle visual field innately comprehends complexity. Verbal thought is limited to predetermined premises, while wide-angle vision 1310 sees the panorama impartially. Verbal analysis proceeds in terms of meanings, while visual analysis positions objects in space and discerns relationships among them.

Consequently, Aids to Productive Thought (APT) devices can be designed for analytical clarity and to evoke acute visual focus and the feedback loop between acute visual focus and verbal analysis. APT devices designed for wide-ranging context can evoke wide-angle visual focus and encourage users to facilitate the feedback loop between the wide-angle visual field and verbal analysis through their actions in creative fields. Users can also be encouraged to alternate between these two classes of devices spontaneously.

Third Guideline: Facilitate Spontaneous Response

As discussed in more detail herein, in various embodiments, the Creative Development Environment (CDE) allows an author to work spontaneously. Our minds maintain multiple trains of thought subliminally at the same time, and often interrupt one conscious train of thought with an insight into another, so in various embodiments, Aids to Productive Thought (APT) devices designed to support the thought process should be able to accommodate such work patterns. CDE devices allow us to interrupt our work on any aspect of a project and spontaneously shift to some other device and some other aspect of the project without risking damage to our work. APT devices also pair creative devices with formal ones so that we can work spontaneously in a creative display without being distracted by the formalized information.

Fourth Guideline: Illuminate Subliminal Mental Activity

In various embodiments, one of the key principles of Aids to Productive Thought (APT) can be to illuminate subliminal mental activity. In some embodiments, the seven example guidelines contribute to this. Here, subliminal mental activity is briefly described along with the techniques Visual Logic and Drawing with Meanings, Supporting Vivid Perception and Illuminating Context.

As discussed herein, the subliminal capacity of the brain, when measured in terms of calculations per second, is almost inconceivably greater than the bandwidth of conscious thought (see e.g., paragraphs below having heading "Limitations of Conscious Thought.") It makes sense to take advantage of this resource in any way we can. The acute-focus and wide-angle vision 1310 are ideal channels, each with their particular orientations as explained above.

Because the vast majority of our mental activity is subliminal, we can increase the productivity of our thought by making better use of this subliminal potential. Since this point may be counterintuitive, it is good to recognize that verbal and visual dimensions of thought and communication are indeed interacting subliminally. The following paragraphs provide convincing pieces of evidence, by considering our thoughts and our communications:

Mental events that do not directly convey sensory experience and that run through our conscious experience can be termed "thoughts." These thoughts may consist of words, images or both and are generally accompanied by feeling tones or emotion. Some people think exclusively in images and others think exclusively in words, and others think in both words and images. When people do think in both words and images, the ways in which the two are combined differ from one person to another and change for many people in the course of their lives; one general tendency is to favor words when considering issues in human relationships.

We also communicate using words and images. People whose thoughts consist solely of words can still understand and draw pictures and diagrams, and receive and convey information through gestures. People whose thoughts consist solely of images can still have conversations and read and write messages and papers. It is clear, therefore, that these people who think exclusively one way or the other can express themselves in forms that do not correspond to the forms of their thoughts. To accomplish this, the human thought process must be able to transform meanings from words to images and from images to words: human verbal and visual systems must interact with one another subliminally at the level of meanings. Another piece of evidence for this is that most of us have the ability to read and write our spoken languages, and this flexibility demonstrates subliminal verbal-visual interactions.

Visual Logic and Drawing with Meanings

In various embodiments, one of the principles of Aids to Productive Thought (APT) can be to illuminate these subliminal interactions. For example, in some embodiments, APT primarily relies on the visual field for this purpose, and, in particular, utilizes Visual Logic and Drawing with Meanings, which are described in greater detail herein.

Through these techniques, subliminal verbal and visual communication skills can be recruited to aid the thought process. Seeing logic displayed in diagrams and enacted dynamically in APT formal devices can evoke cooperation between the acute-focus visual field and verbal analysis. Watching a visual display of any kind with wide-angle panoramic vision can evoke wide-ranging context, and observing subliminally determined changes as we are making them in creative fields can activate the feedback loop between wide-angle vision 1310 and verbal analysis.

It can be important to evoke the visual focus appropriate to the circumstances. When the present context is well-defined and the matter at hand is to clearly understand the context, it can be best to rely on acute visual focus that closely links visual analysis and verbal analysis. This case is "Visual Logic." Visual-logic displays look like diagrams, with nodes clearly labeled and connectors between nodes clearly displayed. The character of those connections should also be displayed: is there causation in one direction or the other, or in both directions, or is this a case of mutual dependence? Visual-logic displays should facilitate drilling down to see further detail, and accessing explanatory resources like a glossary of terms. Everything is determined and everything makes sense.

However, most of the time when we are engaged creatively, the thought process is broadly responsible for context as well as detailed understanding: whenever context is open to improvement, it's much better to rely on wide-angle, panoramic vision aligned with verbal analysis in a feedback loop, here referred to as "Drawing with Meanings." Drawing with Meanings encourages extensions of context and modifications to the existing body of nodes and connections. These creative platforms allow you to selectively suppress existing aspects of structure in the formal display, so as to leave an open display that offers a clean slate for contemplation of alternative structures. This way, you can follow your creative urges without concerns for losing what you have already formalized, and you can make changes in whatever order you choose so that you can view the results as you go along, and learn from them as you continue to contemplate the revised context with wide-angle vision.

Supporting Vivid Perception and Memory

In various embodiments, Aids to Productive Thought (APT) devices can facilitate clear presentations of important and complex topics, by helping to assemble context and encouraging analytical understanding. When we can see things clearly and trace the connections mentally, the scene becomes clear for us and we understand it in our personal context. This clearly understood image is an important aid to memory: we may be able to recall the visual image precisely and/or trace the associations among the elements verbally, and when we can't readily recall the knowledge we can immediately bring it back to mind by viewing the image again.

Illuminating Context

In various embodiments, support for mental context can be a general principle of the Creative Development Environment (CDE). Information that seems important to us humans can often be misinterpreted in the absence of relevant context. Generally, knowledge depends on both information and context. Context is often implicit in our reasoning, and so recedes from conscious thoughts that focus on seemingly decisive factors. However, unless context has been brought to mind and taken into account, information may be taken at face value and misinterpreted, so that mistakes are made and opportunities are lost.

What does it mean for context to be illuminated? The detailed activities of brain and mind are mostly subliminal, so we cannot perceive illumination at the detail level directly. Instead, we can sense it in the qualities of our mental responsiveness. As we think something through, we can sense the increasing vividness and relevance of our thoughts as the process unfolds.

Context is gradually activated in the brain as we actively consider a situation and begin to think about what to do. During this gradual process, various elements of the context are being illuminated in the brain, and we often feel an intuitive sense of completeness as missing elements are brought into the light. As we continue to ponder the circumstances, the mental context becomes an active expression of knowledge that can be used effectively. At this point, we can say that the context as a whole is illuminated. It becomes further enriched as we make use of it.

Our mind responds to a stimulus by first establishing an immediate context, and then extending it. Sensory experience and the arousal of feelings are external stimuli, and our thoughts and the power of attention are internal stimuli. The combined effect of all these stimuli is extremely complex, and it is important to exercise the power of attention to focus on the elements of productive thought. Various embodiments of the Creative Development Environment (CDE) and Creative Presentation Environment (CPE) can help us to accomplish this by focusing on displays of well-crafted, meaning-laden contexts.

Consider how brain and mind respond to internal and external stimuli: The internal process of stimulus and illumination proceeds subliminally and is also projected into consciousness in the form of thoughts and other more subtle sensations. Ordinarily, conscious thoughts that pass through the mind illuminate subliminally other topics and thought forms that are associated with them. Thoughts arise through the process of illumination, and also have a powerful impact on illuminated context through their associations.

External stimuli play a parallel role when we are perceiving meanings. When we hear language, focus acutely on written language and diagrams, or view meanings and drawings with wide-angle vision 1310 (FIG. 13*a*), our perceptions have an impact on the illumination of context that is comparable to the impact of conscious thoughts. Through the power of attention, we can choose whether to attend to external perceptions of meanings, to our unfolding thoughts, or to both simultaneously. Internally received meaning-laden thoughts and externally perceived meanings represent two distinct channels of stimulus, and by selectively emphasizing them we can influence the illumination of context.

Moreover, when we focus on some topic attentively, associations with that topic become illuminated even if we don't consciously think about them. Wide-angle seeing of an informatively displayed context accomplishes this purpose directly: we naturally focus on what we see, and the meanings displayed there and their associations are illuminated. This effect is intensified when we observe new terms taking shape in a drawing or diagram as the result of our writing or typing them. When the display shows the context we need, the relevant associations can be readily illuminated.

As we learn to use them, various embodiments of the Creative Development Environment (CDE) and Creative Presentation Environment (CPE) can become important tools of thought. The display devices enter into partnership with our thought process, helping us to illuminate appropriate context and preserve it.

What is appropriate context? Here is an example: Suppose that you are considering a major decision, such as moving to another city or buying a new house. Many aspects of your life are relevant to the decision. A significant change is involved, and there are uncertainties. You are concerned with the decision itself, as well as with the time and hassle required to make the decision and the challenges of making the transition if you decide to move. Somehow you have to bring into focus the key factors involved. There are objective factors, but in the final analysis the decision is about you and your family and friends. How will this decision work out for you? If you change as a result of the decision, how will this work out for the new you?

What is the context for the decision? Most of what goes through your mind as you ponder the decision is related to the context, and everything that you learn along the way may impact the context. It's up to you to decide what's important. The situation is complex, and as you consider everything involved and visualize the consequences, you may eventually reach a conclusion and know that it is correct. Your certainty affirms that you have extended and crystallized the context to the point that the information you have considered is decisive for you. It may not be until later, when you look back on the decision and explain it to your friends, that the logic becomes clear.

Still later, as your life moves on, you may discover that the decision was wise, or else that it was mistaken. Looking back, you may be able to see that you correctly established the context and took the main points into account wisely, or alternatively, that you were somehow mistaken about the context and went in the wrong direction. We learn how to make decisions by making them and observing the consequences. We can learn from decisions taken in game situations, and through education, but decisions in the living world involve the truth of our own personal circumstances in a way that a game or classroom cannot.

There are close analogies between making a decision, solving a problem, writing a paper, and undertaking a project at work. In these cases and in many others, we need to get the context right in order to succeed. We need to find the main points and obtain enough relevant data to allow us to understand those points and fit them together into an intuitive picture of the whole.

Fifth Guideline: Visually Display Thought

Displaying aspects of thought in the visual field can be central to the Aids to Productive Thought (APT) initiative in some embodiments. The Guidelines for Evoking Appropriate Visual-Verbal Coordination and Illuminating Subliminal Mental Activity can play a part in this. In the following section, specific techniques for displaying components of the thought process are presented, but the brevity of this selective list should not be construed to limit the many alternative embodiments that are within the scope and spirit of the present invention.

Mirroring Human Thought

In some embodiments, a key principle of the Creative Development Environment (CDE) can be to mirror human thought in a useful way, so that users can get to know their thought processes. In this sense, using the APT devices can sometimes be a form of introspection. Users interact with the devices in ways that make visible patterns and capabilities of subliminal thought that might otherwise go unnoticed. Even if a user doesn't participate in the learning process consciously, subliminal learning can take place.

Connectors have Attributes

The mirroring principle can be illustrated by explaining why connectors have attributes and why constructs are allowed to morph: Each thought we have has contents of its own, and so is like a node. The thought also plays a role alongside other thoughts and is associated with them, so these associations are like connectors. Often the relationships between thoughts are more interesting and potentially much more useful than the thoughts themselves. When we explore an association between thoughts, we often find a relationship with significant attributes. Thus the connector has attributes just as a node does. This is a significant difference from the common treatment of relationships in a relational database, where relationships are implicit in the links between tables and cannot have attributes.

Morphing

Moreover, when we explore an association between thoughts, through our attention to it the relationship, which was previously just an association, morphs into a thought. Therefore, in order to mirror human thought, constructs must be able to morph between connectors and nodes. More broadly, in the Creative Development Environment (CDE) and Creative Presentation Environment (CPE), a construct can play different roles. For example, a construct can have an instance that is a node and another instance that is a connector. That same construct can also have an instance that is a display and another instance that is a category of instances. This flexibility reflects the nature of human thought, which allows a single idea to play many roles.

Layout and Sequence: Perceptions in Space and Time

"Layout" refers to the positioning of nodes and connectors in space, and "sequence" refers to presentation over time. Both can significantly contribute to communication and convey aspects of meaning that might otherwise be overlooked.

Visually Rendering Components of the Thought Process

Visual rendering begins with the ideas of "things," attributes, and connections. We see things, and we notice their attributes. A "thing" is distinguished by the attributes that separate it from other things. Image, color, shape, brightness, size, position, movement, and constituents are attributes that can distinguish a thing from other things. We also make connections between things: we see two things as connected if they are tied together or move together or share common attributes like color or shape.

Generally, in some embodiment of the Creative Development Environment (CDE), things can be visually rendered as nodes and links between things are rendered as lines connecting the nodes. Both things and connectors can have distinctive visible attributes like color, shape, size and elements like names or symbols. An idea can morph between a thing and a connection. For example, the similarity between two things is a connection between them, but that same similarity becomes a third thing when we're talking about how the things are similar.

Associations

Associations are very important in thought. For example, one thought leads to another thought because of the associations between them. Each conscious thought tends to illuminate subliminally other potential thoughts that are associated with it and may potentially succeed it in our train of thought. Words in a sentence are associated with one another by their common presence in the sentence, and elements of an image are associated by the common presence in the image.

Usually, associations are rendered as connections between the things associated, with attached identification and textual material to clarify their nature as needed. A distinct node that represents the association can be added if necessary, and linked to the original connection.

Context

Context allows us to make sense of information. We need to find the main points and obtain enough relevant data to allow us to fit the main points together into an intuitive picture or description of the whole. Smaller contexts can combine into a larger context, and defining and depicting distinct contexts facilitates their combination.

Contexts can be represented in the Creative Development Environment (CDE) as highlighted sets of nodes with interconnections. The coherence of a context may be emphasized by depicting a surrounding nimbus or aura. A context that is visually displayed and appreciated through wide-angle vision 1310 (FIG. 13*a*) can be quickly recalled and reviewed in its entirety. A cohesive scene, a relevant thread, a profile of attributes and a larger framework such as a procedure or structure are examples of contexts. Like a node or connector, a context has one or more instances and can be placed anywhere; in this sense, a context is a higher-level entity comprised of nodes and connectors.

Scene

A scene is a cluster of associated things, and provides a context for them. The material in a scene clusters together like a scene in a play or a moment of lived experience. Well-written paragraphs have the qualities of scenes. Scenes are memorable for closely associated meanings within them. Often a scene is a cohesive context within a broader context. Scenes can be used for many purposes: a phase of a logical argument, a problem to be solved, or an idea or definition to be understood. One of the important roles of scenes is to collect our thoughts, illuminate relevant context and help us to consider various circumstances at hand. Scenes are distinct elements that are often presented in sequence or grouped together with related scenes.

A scene is rendered as a set of nodes with interconnections corresponding to their associations. Its cohesion can be emphasized visually by highlighting its background, increasing its magnification, adding boldness or intensifying color. A scene can be created from scratch, or can be composed from a portion of a view.

Thread

A thread connects things that may be remote from one another. For example, the set of appearances of a term in a text are threaded together. The results of a search query are threaded together. Threads often play the role of bottom-up connections, and in this case, multiple threads that connect the same things combine into a stronger thread and reinforce one another in determining connectivity. A scene and a thread are similar and closely related. Each is a context, and includes a group of things and connections among them. A scene draws together diverse things that are interrelated, while a thread links diverse appearances of one common thing.

A thread is a context, and like scenes and other contexts, is rendered by interconnections among nodes. Whereas a scene coheres because of connections among the nodes within it and is likely to be unique in having these connections, a thread is more important for what it connects, and may be one of many threads connecting the same nodes. Multiple threads running along the same path can be rendered by a single wider connection.

Relationship

The term "relationship" here refers to an association that has been formalized. For example, when displaying logical relationships, the relationship might have the qualities such as mutual dependence or causation in either direction. A relationship between two constructs is interesting in its own right. It may have its own attributes.

Like an association, a relationship is usually shown as a connector between related elements, and the visual appearance of the connector may highlight the nature of the relationship. A relationship may also appear elsewhere as a node when it is being referred to as a factor in its own right.

Relevance Metrics

Some relationships are closer than others. The degree of closeness can be termed "relevance." A quantitative measure of closeness allows this to be reflected in the visual display. Relevance can be shown visually by the boldness of a connecting line, and nodes can be arranged so that more closely related nodes move closer to one another while less closely related nodes move further apart.

Attributes

Usually when we think of something, some of its features stand out. Features or qualities of all kinds are here termed "attributes." Both items and relationships between items can have attributes. Some attributes fall into standardized categories, like color or shape or size or cost, while other attributes are unique.

Sometimes attributes can be captured in displayed images. Attributes can be used to juxtapose similar items by sorting or filtering for them. In various embodiments, the attributes can be accessed through a tooltip or associated text, or through the Tabular Grid, or the like.

Sequence

Sequence unfolds in time. Spoken and written words appear in sequence, as do slides in a slide show and scenes in a play. Sequence can be an important aid to memory and understanding. Memories are often recalled in the order that they were learned, and that order can play a part in our understanding: for example, we may recall an initial flawed interpretation and the later occasion when we corrected our mistake, and these recollections remain as facets of our current understanding.

Sequence can be indicated by adding items to the display in sequential order, by sequentially highlighting visible images in any order, by laying out material in its sequential order, or by ordered gradations in color or size or other visible features.

Comprehensive List

Lists of relevant items have many uses. Comprehensive lists are often best, because we can notice things that are missing when a list is supposed to be comprehensive. A list helps to keep significant factors in mind and to think of other factors. Consulting the list as a whole can be helpful when thinking through relevant connections.

A comprehensive list can be accessed through a tabular display or graphically displayed as a visual panorama that can serve as the background while particular aspects are being visually emphasized to bring them to the attention of the user.

Path

Whenever a "train of thought" is being pursued, thoughts are tracing a path. Productive thought yields results, and along the way a user's thoughts will follow one or more paths that ultimately lead to success. In some embodiments, one of the key aspects of Aids to Productive Thought (APT) is assisting the user to choose the appropriate path and follow it successfully. Digressions may be useful, but it is important that the main path be remembered and returned to. Different gateways may be relevant for different users, and different routes through the material may be helpful, so it is important for an author to have the scope to provide these alternatives and help readers and annotators to find their own best paths. Both suggested paths and paths actually taken can be displayed.

The display is intuitive: topics are displayed as nodes, and steps along the paths we follow through the topics are shown as connectors between them. Thus a path is a sequence of connectors between successively visited nodes.

From General to Specific, from Overview to Detail

Two aspects of the diverse associations that interconnect our thoughts are particularly significant: level of generality and level of detail. Our thoughts often range from specific to general, and from fine detail to broad overview. These dimensions are parts of our lives and are built into language. Our patterns of thought are shaped by experience and inclination: while some people begin from specific detail and work up to general and overview, others begin with the general and proceed to the specific. We can structure our lives to some extent in order to accommodate our preferred approach, but reliable knowledge and reliable decisions depend upon taking into account the full range of both dimensions.

Visual display can be very helpful in this regard: different degrees of detail can be arranged and depicted as layers in space, as symbols with graduated sizes, or in many other ways, depending on the particular need.

Alternatives

It is often important to consider alternative approaches, views, solutions and the like. When alternatives are compared and contrasted, something better may emerge that brings together the good qualities of both alternatives and takes into account the different circumstances for which they may be suited.

Similarities and differences can be displayed visually in a diagram by showing common features in one color, say blue, and distinct features of the alternatives in other contrasting colors, say red for one alternative and green for the other. Alternatives can also be arranged and depicted as layers in space, with similarities stacked vertically so that they merge into one when viewed from above, and differences occupying distinct positions.

Structured Information

Consider a table with rows and columns. The entries in each row belong together. The entries in each column belong together. The rows have an order from top to bottom. The columns have an order from left to right. The columns and rows are relevant because each piece of information belongs in one of the columns and in one of the rows. The attributes reflected in the set of columns and the attributes reflected in the set of rows make the table meaningful.

Structured information of this kind is presented and manipulated in the tabular grid. It is also presented as a formal graphic display. An intermediate structured display can also be used as a creative field to gather information and organize the relevant rows and columns. If a third set of attributes also applies to the information, that third dimension can be depicted in a sequence of tables or a three-dimensional stack.

Sixth Guideline: Human/Computer Coordination

We humans have developed computers, and we continue to improve them. It makes sense for us to use them for productive purposes. When we are engaged in a knowledge-oriented project of some kind, we should be able to find a way for the computer to help us. What useful strengths does a computer offer, in comparison to ours? A computer that is functioning properly can calculate with more speed and exactitude than we can; it can repeat procedures perfectly and tirelessly, whereas we sometimes make mistakes and get tired; once information has been digested in digital form, a computer can assimilate it much more rapidly than we can; a computer has a perfect memory, whereas human memory is fallible; a computer can search its memory almost instantly, whereas illuminating our memory may take some time; a computer can share its memory with other computers much more efficiently than we humans can share our knowledge with other humans; the contents of a computer's memory can be displayed in many forms, whereas we are limited to traditional modes of communication. The computer also lacks some of our disadvantages: it does not have to maintain its status as a social being and it has few distractions.

Are there any advantages left for human beings? Of course! We are in charge. We are the ones who created computers, not the other way around. Unlike humans, computers have no direct access to knowledge and no autonomous purpose. Although we can give computers humanlike qualities in our fantasies, they have none at all. We have creative imagination, and they do not. We have access to valid intuitive knowledge, and they do not. It is human thought that counts, not computer calculations, and computers are well suited to support our thinking. A computer is a new breed of tool, ready for our use. As we increasingly project human conceptual knowledge into digital forms, we enhance the ability of computers to assist us.

Reflecting the advantages that the computer has, we use computers to make calculations, perform routine tasks, import and store vast amounts of data, search through the data, communicate and share information with one another, and view information. We use various programs and applications on computers in order to perform these functions as well as many other kinds of tasks.

We are already learning new ways of thinking from computers as we operate various applications that contribute to our understanding and skills. Computers are helping us to gather and structure data, perform calculations, compose messages and write texts. Shouldn't we also consider using programs on computers that help us to think more productively and enhance our thought? These can be the aims of various embodiments of the Aids to Productive Thought (APT) devices in the Creative Development Environment (CDE) and Creative Presentation Environment (CPE).

Fostering Creativity

When we enter terms into a creative field, we simultaneously clarify our thought and lift ourselves above it. When we follow the dwordle procedure discussed herein and gaze with wide-angle vision 1310 (FIG. 13a) on the dwordle field 1220 (FIG. 12a) as we focus our relaxed concentration on a topic and enter subliminally-generated terms at subliminally chosen positions, we bypass the limitations of linear conceptual thought. This procedure is pragmatic and straightforward: our mental processes have much to offer us, and it is common sense to allow the knowledge to be disclosed to our conscious mind. As we learn to rely more on wide-angle vision 1310 and purposeful subliminal thought, we enter a new dimension free from existing limitations, and activate a channel of communication between subliminal thought and conscious awareness.

Facilitating Thought by Interacting with Visual Displays

As the saying goes, "a picture is worth a thousand words." It's better still to have a diagram that combines both image and words. Diagrams help us to think as well as to communicate with others. When interacting with visual displays while we are thinking—writing or drawing or typing or manipulating images—there is further benefit from feedback loops between visual and verbal analysis. Whether our visual focus is acute or wide-angle, it can be valuable to juxtapose verbal meaning and visual image.

Direct Effects

When we enter and organize data in the Tabular Grid, a display field, a structured display, or a formal display, we can set down a lasting representation, an aid to memory, and a reflection of our mental activity that will stimulate us to go further. As we continue to improve our work, we build a progressive recording of our productive thoughts and develop an overview of the context we are exploring.

Eventually, our mental efforts can crystallize into something of value in our lives that we can share with others.

Depicting Mental Patterns as Scenes

When we have repetitive thoughts or run up against a mental block, instead of experiencing it again and again as it unfolds over time in full momentum, we can note down in a creative field all of the details we recall and trace the circumstances from first stimulus to eventual letdown, seeing the whole visual assembly as a single scene. Perhaps just writing it down in this way will be enough, or perhaps we will need to return to our work and add more observations as the pattern recurs. Eventually, just the experience of viewing the contents of the mental pattern in this way may be enough to lift us above it and redirect our thoughts productively, Both Stabilizing and Enhancing Present Knowledge In various embodiments, a creative user can be encouraged to alternate between the formal and creative devices in a device pair. For example, working with the formal device can support clarity and accuracy and advances toward a final product. Working with the creative device can support wide-ranging context and can free the user to respond spontaneously. The formal field can serve for memory and the creative field can serve for exploration. Alternating between the two in successive cycles can allow knowledge to take shape gradually and extend beyond preconceived limits. As the project advances, the knowledge base can be both stabilized and enhanced during each cycle, and the user can become accustomed to transitioning between the two mental orientations.

The formal display can stabilize the knowledge base, and can be kept up-to-date as the "best version." Working on the formal display and examining it in detail can promote analytical clarity and can activate the feedback loop between verbal analysis and acute visual focus. Past versions can be recovered as needed to review prior history, and the secure status of the best version allows the user to let go of it during creative sessions.

The creative fields can give inventiveness free play. During each cycle, work in the creative field can begin with a copy of the best version, in which details may be suppressed to soften the existing message. Working in the creative field can activate the feedback loop between verbal analysis and wide-angle vision 1310 (FIG. 13*a*) and can promote contemplation and responsiveness. After the creative phase is complete, modifications can be efficiently recombined with the best version, and a new cycle can begin.

Confusion, Cognitive Dissonance, a Hunch, an Intuition

Confusion is often an uncomfortable state, but knowing that we lack the knowledge we need can serve as a very useful invitation to new knowledge. Cognitive dissonance occurs when we know different things that contradict one another, and recognizing this is an excellent starting point for useful learning. Sometimes we have a hunch that a particular approach or innovation will work, even though we do not yet have a credible explanation for why or how this will come to pass. And sometimes we have an intuition about something important even though we have no context in which to explain it. In all four cases, we recognize that our knowledge is incomplete, we see that we need greater understanding and we have a starting point from which to proceed.

In various embodiments, entering the information we have, even though it may not seem to make sense, in a dwordle field 1220 (FIG. 12*a*) as described in more detail herein can be a reliable approach in situations like these. The dwordle can be beneficial for filling out gaps in our present knowledge, recognizing inconsistencies and discovering potential extensions. The visual display takes shape progressively and unexpectedly through a process akin to free association.

Seventh Guideline: Build on Strengths, Counteract Weaknesses

In various embodiments, the example Aids to Productive Thought (APT) devices presented herein can depend on capabilities of our culture in areas such as computers, displays and software that have recently developed and continue to improve. It makes sense to build upon these strong capabilities when looking for new avenues to productive thought. The six preceding example guidelines built upon these strengths, and below we refer to strengths in handling the materials of productive thought and undertaking projects that extend across multiple sources. It also makes sense to seek opportunities for productive thought by counteracting weaknesses of our modern cultures, and in various embodiments, wide-angle vision 1310 (FIG. 13*a*) is a tool to accomplish this.

Importing, Creating, Structuring and Redeploying Material

Material consists of constructs and their attributes. Attributes include identifiers, names, text for various purposes, images, external hyperlinks and other kinds of media. In some embodiments, attributes can also include the specifications of each instance of each construct in the Creative Development Environment (CDE.) environment, as well as its associations with any higher-level or lower-level constructs or structured displays. In various embodiments, a full history of each event associated with each construct can be maintained in the database so that a snapshot of the state of the Aids to Productive Thought (APT) material at any past time can be reconstructed.

Material can be imported from external sources or edited in text processing facilities. Material can be exported from one project to another. Creative tools can be designed for data entry and formatting. The APT devices can be knowledge oriented, and designed for projects ranging from small personal puzzles to informative treatments of vast bodies of material. The continuity of constructs can be maintained within and between projects. The user can determine whether any particular redeployment preserves or breaks off the identity of a construct that is being redeployed or renamed.

Working with Multiple Sources

In various embodiments, the APT tools for connectivity and display can be particularly helpful when considering materials that are closely related and yet importantly different. Here are some example cases of this kind: a coordinated treatment of an author's series of books on related topics, or several commentaries or guides to the same material that were prepared by different authors, or a commentary or supplement to an existing text being prepared by a second author. Other examples would be assembling existing diverse materials into a compilation, or preparing a guide or survey or introduction to a broad field comprising many different publications. Capabilities like overlays, layering, and perspectives can be helpful when working with multiple sources.

Counteracting Weaknesses

Figure 13A:
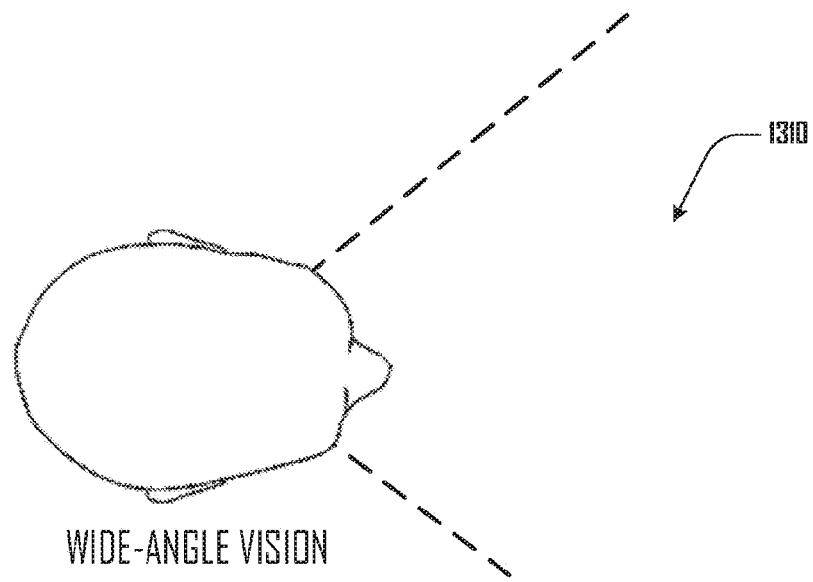
FIG. 13a illustrates a wide-angle vision field of a user.

It can also be important to counteract weaknesses in our culture. Excessive reliance on linear verbal thought is a weakness in the culture. Linear thought can only handle a few ideas at a time, and has little access to perspective. When we are constantly engaged in linear thought, we tend to rigidly maintain opinions and positions that might otherwise dissolve to our benefit. Linear thought is emotionally toned and tense, and locks us into constant self-presentations. Another weakness of our modern urban culture is underuse of wide-angle vision 1310 (FIG. 13*a*). Every human is unique and we think in different ways, but our complex modern cultures, which depend so much on conceptual knowledge, do seem to emphasize acute-focus vision over wide-angle vision 1310 and emphasize analytical clarity over wide-ranging context.

These two weaknesses are different sides of the same coin, because the calm perspective of wide-angle vision 1310 tends to quiet linear thought and soften its momentum. For these reasons, the wide-ranging context associated with wide-angle vision 1310 can contribute significantly to productive thought. In order to deal with complexity, see the big picture and solve problems effectively, we need its panoramic view. In order to relax our grip on existing opinions and welcome new ideas, we need its calmness and impartiality. In order to free ourselves from existing patterns and allow new knowledge to come forth, we need the break from linear conceptual thought that wide-angle vision 1310 offers.

Building Tools in Three Aspects:

Consequently, in various embodiments, there can be three distinct aspects to the tools used in the overlay builder 56: (i) developing knowledge and creating formal material; which can be supplemented by creating either an actual (ii) electronic textbook or other electronic book, or (iii) an overlay, electronic book or a website that combines the underlying content with the overlay, for release. Developing knowledge and creating material is the first step in any case. Beyond that, the later stages create electronic documents and also offer a potent feedback loop, as knowledge continues to develop while the material becomes embodied in its final form.

This suggests three embodiments: (i) Author's Workbench with Knowledge Development; (ii) the Electronic Textbook Builder, which is an extension of the Author's Workbench; and (iii) Website Builder, a parallel general tool for building overlays, electronic books and websites, also an extension of the Author's Workbench.

Author's Workbench: Knowledge Development:

Here the core benefit comes from the workbench providing aids to productive thought, as discussed in further detail below. Techniques are offered that profoundly improve coordination between visual and verbal analysis, allowing effective collaboration that benefits from their complementary capabilities. These same techniques and other methods also improve the alignment between conscious thought and broader mental activities. As a result, emotional blockages and biases are weakened and we open to new ideas with fresh discernment.

The effect of these benefits is magnified by the overlay builder's efficient coordination of diverse mental contributions. The author's workbench uses the overlay builder's tools to organize and ultimately assemble the raw material for a publication. The publication may be in a traditional linear form with a table of contents and outline, or it may be in electronic format, such as an electronic textbook 5, an overlay 41, or a web site accompanied by an overlay 41. One body of material can be also be deployed in both ways: the traditional book is extracted from the electronic textbook 5 or the overlay 41 simply by creating a linear path and exporting it in text form, as discussed above.

Electronic Textbook Builder:

This is an embodiment of the overlay builder 56 that is specialized for creating electronic textbooks. It has all the capabilities of the Author's Workbench, with general capabilities relating to the connectors 7, the halls of informed choice, the perspectives, and the other concepts discussed above with respect to the electronic textbook 5. The electronic textbook builder embodiment deals with many special textbook needs.

As discussed in further detail above, the electronic textbook format allows the author to
  (i) attach interactive support functions to all nodes, and
    (ii) embed within specialized nodes extensive interactive content. Further, (iii) the electronic textbook allows interactions with the user to be recorded as attributes of the user's path through the electronic notebook that can be shared with friends, parents, teachers, the author, and so on.
  Recording User Interactions:
  Recording interactions with the user, which include such things as choices, comments, time spent in various nodes, performance on test your skills, serves a number of important functions such as guiding the user toward choices that result in finding their optimal book;
    tracking the user's use of the book and performance with material in the book, and sharing this information with parent and/or teacher;
    and giving the student an opportunity to share comments and questions with other students and offer them suggestions about nodes to visit in the book.
  Interactive Support Functions:
  The interactive support functions include:
    view-ahead,
    path-taken,
    perspectives, and
    overlay view (which displays the network of overlays, including the user's, parents', teachers', friends' with the option to focus on a subset such as just one's own comments),
    other navigation tools,
    search,
    index, and
    the dialogues discussed above.
  Specialized Nodes:
  The forms of specialized nodes include:
    junctions (gateways, vestibules, galleries, logic views and simple junctions),
    test your skills,
    examples,
    exercises, and
    interactive Aids to Productive Thought (APT) (which are interactive displays that help to align conceptual and intuitive understanding, make useful connections between related topics, assist in remembering and getting a feel for things, help with the creative process and with effective inference, and so on.)

Tools in the three aspects presented above can be instances of the Creative Development Environment (CDE.) The products that they create such as electronic textbooks, websites, and the user environment can operate in the Creative Presentation Environment (CPE), or the like.

The material presented thus far has primarily related to the capabilities and use of the electronic textbook. Hereafter the primary emphasis will be on creative authorship in the CDE and sharing the author's creative experiences with the user in the CPE.

As presented herein, the disclosure of the CDE and CPE emphasizes the capabilities of five distinct example device pairs. To stay in touch with applications, the five example presentations are interspersed with the narrative for the author. As presented herein, the example five presentations are inserted at the first point of relevance, and appear in the following order:

1) Tabular Grid and Display Field

The example first device pair is the Tabular Grid closely-coupled with the Display Field. In various embodiments, Tabular Grid is a display similar to a spreadsheet in which information can be seen in detail, searched, filtered, and readily enhanced and imported or exported; Display Field is a graphic display in which entities are presented as nodes and relationships are presented as connectors, wherein modifications to the graphics can be quickly and easily effected and elements can be modified, added, deleted and imported or exported.

This Tabular Grid and Display Field device pair can align verbal and quantitative thinking with the visual field and visual analysis, and coordination between these two areas of thought can be provided by close-coupling between the two devices.

The four other example device pairs that follow each comprise of two distinct Display Field instances—one for formal display and the other for creatively extending and enhancing the knowledge base for the display. In some embodiments, every instance of the Display Field can be accompanied by a closely-coupled Tabular Grid.

Figure 11A:
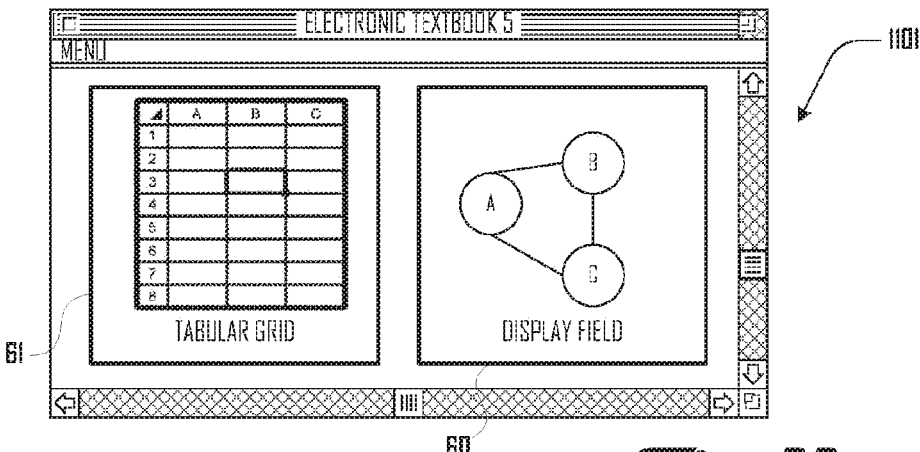
FIG. 11a illustrates Tabular Grid and Display Field device pair comprising a Tabular Grid device and a display field device.

FIG. 11a illustrates Tabular Grid and Display Field device pair 1101 comprising a Tabular Grid device 61 and a display field device 60.

2) Informed-Choice Paths and Knowledge Garden

The second example device pair can allow users with diverse interests and styles of learning to individually benefit from a common body of material by discovering a personal path through the material that suits them well. Informed-Choice Paths can be crafted to provide users with meaningful choices and the necessary information to choose effectively, and the Knowledge Garden offers users perspectives on their chosen path while also helping them to appreciate aspects of knowledge presented on other paths and related features. Informed-Choice Paths and Knowledge Garden help the author to assemble multifaceted material and present it effectively to a diverse audience, structuring material for learning and arranging it for accessibility. Users can be encouraged to take an active approach to learning, and as a result, learn more about their own circumstances and develop further insights into learning and knowledge. In some embodiments, Halls of Informed Choice such as Gateways, Vestibules and Galleries can be important when navigating paths. In some embodiments, Seven Modes of User Interaction can be important for informed choice: offering options; "Test your Skills" exercises; questioning the user and receiving questions from the user; encouragement, motivation and reward; active graphic content; exams; and presenting perspectives. In some embodiments, perspective displays of various kinds can be important for the Knowledge Garden.

Figure 11B:
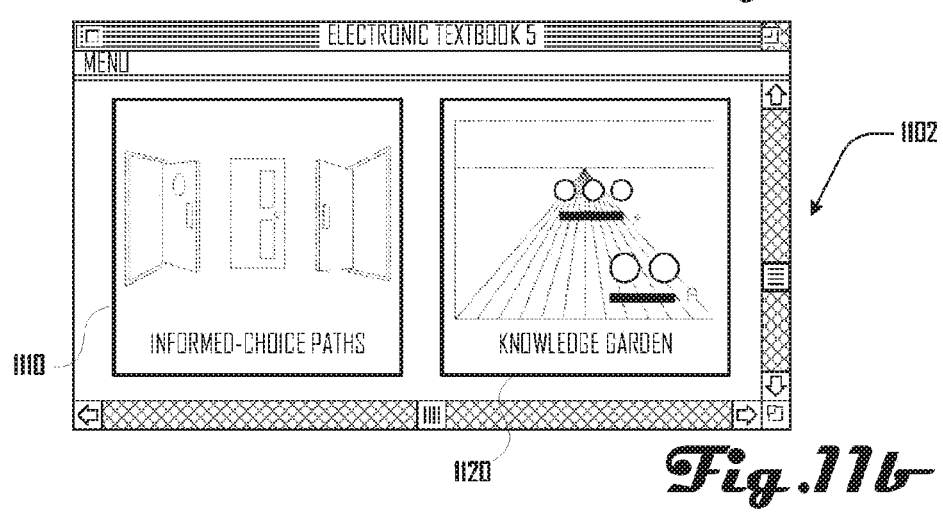
FIG. 11b illustrates Informed-Choice Paths and Knowledge Garden device pair comprising an Informed Choice device and a Knowledge Garden device.

FIG. 11b illustrates Informed-Choice Paths and Knowledge Garden device pair 1102 comprising an Informed Choice device 1110 and a Knowledge Garden device 1120.

3) Overlay Outline and Concordance with Contexts

The third example device pair conjoins Overlay Outline and Concordance with Contexts: Overlay Outline can be a generalized multi-level outline for textual material that can be non-linear, and in some cases, does not need to satisfy a tree structure, and therefore can allow for cross-connections between different branches and accommodates categorization along more than one dimension and juxtaposition of diverse outlines.

Concordance with Contexts can begin with a concordance of significant terms or passages or objects or blocks of text in the material and establishes contexts for them based on usages throughout the material. Overlay Outline can be a network of connectors among nodes pegged to the material from above, and Concordance with Contexts can be a network of threads, hub and spokes and sometimes scenes within the material, that can also reach up to take in terminology in the Overlay Outline.

In some embodiments, both Overlay Outline and Concordance with Contexts can be layered display fields with material as the bottom layer, but in the usual case where the material is the same or similar for both, the two devices can be brought together as distinct layered overlays above the common material. In some embodiments, the Interweaver, functions in this setting and provides creative scope for exploring the material and developing structure that takes into account both Overlay Outline and Concordance Contexts. The newly developed structure reaches up from the material to share the space of the Overlay Outline. In some embodiments, this device pair can be suitable for exploring and elucidating structure in project various sizes, and can becomes increasingly beneficial as the scale of such a project increases.

Figure 11C:
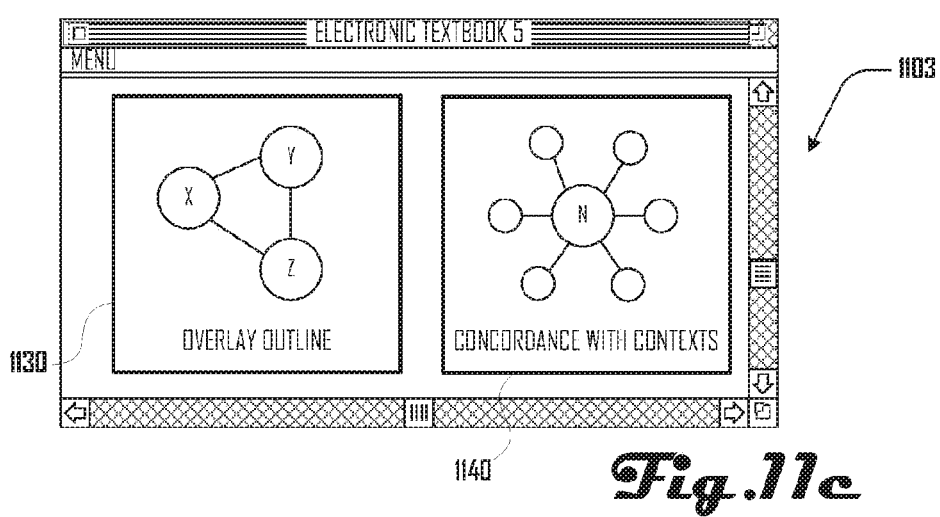
FIG. 11c illustrates Overlay Outline and Concordance Contexts device pair comprising an Overlay Outline device and a Concordance Contexts device.

FIG. 11c illustrates Overlay Outline and Concordance Contexts device pair 1103 comprising an Overlay Outline device 1130 and a Concordance Contexts device 1140.

4) Relationship Display and Dwordle Field

The fourth example device pair 1s Relationship Display selectively coupled with Dwordle Field. The Relationship Display can be a formal graphic display for diagramming relationships that can have capabilities for sequential presentations; the Dwordle Field can be a creative platform for imagining entities and delineating relationships. The two devices are selectively coupled so that a diagram initially present in both closely-coupled fields can be decoupled from Relationship Display, creatively enhanced in the Dwordle Field, and then integrated with the prior version in Relationship Display by aligning or recoupling.

In various embodiments, these two devices can elicit two different styles of vision related to two different mental states: a diagram in the Relationship Display evokes acute-focus vision, activates an intimate connection between visual and verbal analysis, and encourages analytical clarity; projection of a stripped-down display of the diagram in the setting of the Dwordle Field evokes wide-angle vision 1310 and facilitates dwordling, which further encourages wide-ranging context.

In some various embodiments, the creative nexus of the Creative Development Environment (CDE.) and Creative Presentation Environment (CPE) is juxtaposing and alternating between these two distinct styles of mental activity, which involve two different feedback loops: the feedback loop between acute-focus vision and verbal analysis, which come together as analytical clarity; and the feedback loop between wide-angle vision 1310 and verbal analysis, which come together as wide-ranging context. In various embodiments, this device pair can be suitable for small and medium scale projects, and for an overview or perspective on a project of any scale.

Figure 12A:
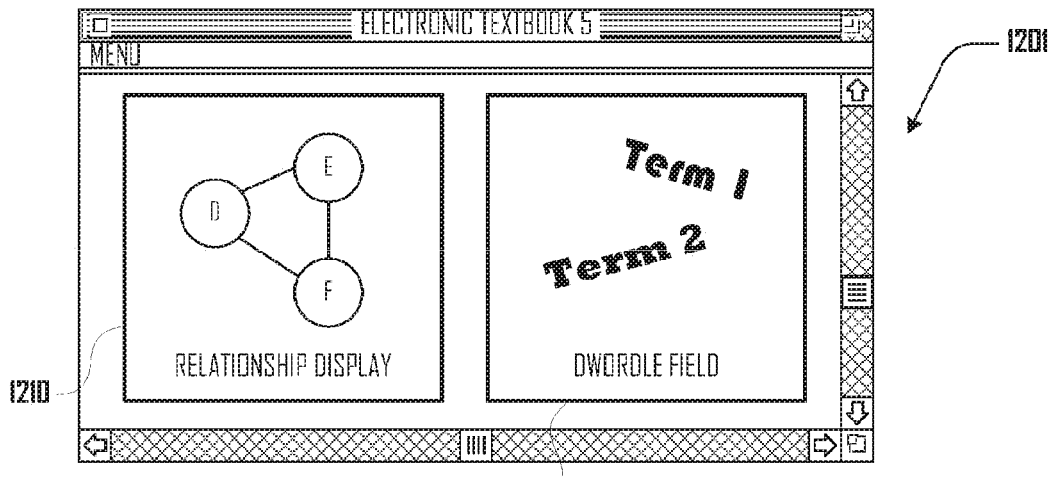
FIG. 12a illustrates Relationship Display and Dwordle Field device pair comprising a Relationship Display device and a Dwordle Field device.

FIG. 12a illustrates Relationship Display and Dwordle Field device pair 1201 comprising a Relationship Display device 1210 and a Dwordle Field device 1220.

5) Panorama with Scenes and Context Gatherer

The fifth example device pair can comprise Panorama with Scenes, which can generalize Relationship Display, and Context Gatherer, which can generalize Dwordle Field.

These two generalizations can handle a knowledge base comprising two levels of information: a panorama layer with broader perspective; and a context layer comprised of localized or detailed contexts that are individually meaningful. For example, a panorama might be a report and the contexts its appendices and attachments; or the panorama might be a reasoned argument or scientific paper with contexts that treat specific aspects in detail; or the panorama might be a compromise with the contexts being special interests; or the panorama might be a synthesis of various materials with those materials as the contexts.

Panorama with Scenes can provide a sequential presentation in which the panorama is maintained as a panoramic background like a relationship display, while the elements of the panorama being presented can be linked to the contexts of their origin in various ways. For example, the material can be presented as a succession of scenes, each of which is visually highlighted as it is being presented by means of multiple interior steps; or a presentation can refer to an individual context by highlighting elements in the panorama arising from that context; or the presentation can alternate between presenting the panorama and presenting relevant contexts. The Context Gatherer can also have a panorama layer and a context layer, and can function as a layered Dwordle Field. The context layer can accommodate the grouping of elements into contexts such as scenes, threads and hub and spokes, assigning context attributes, and creating connections within and between contexts. The panorama layer of Context Gatherer can interact with Panorama with Scenes much as Dwordle Field interacts with Relationship Display, and offers further capabilities for organizing contexts and crafting presentations involving contexts. In some embodiments, this device pair can be suitable for complex or multi-layered projects of any size, and can maintain a cumulative knowledge base of contexts that can be used for preparing panoramas.

Figure 12B:
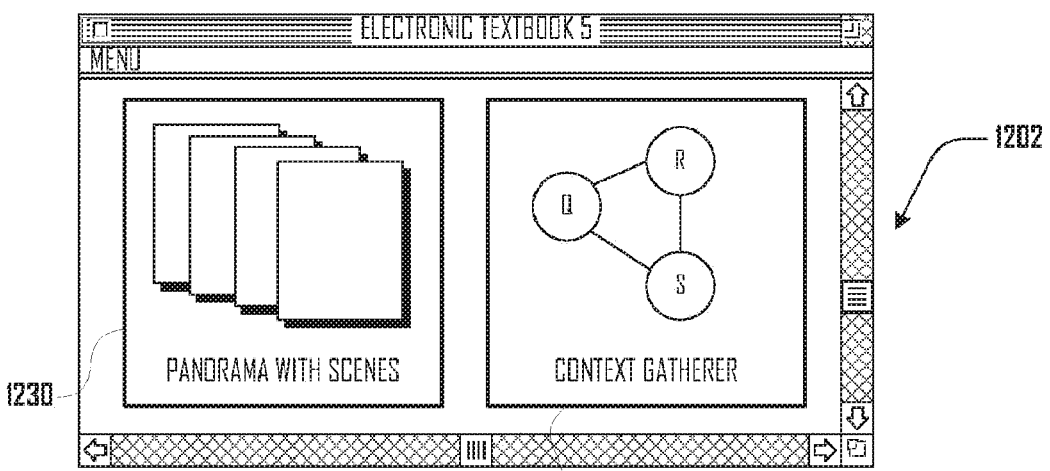
FIG. 12b illustrates Panorama with Scenes and Context Gatherer device pair comprising a Panorama with Scenes device and a Context Gatherer.

FIG. 12b illustrates Panorama with Scenes and Context Gatherer device pair 1202 comprising a Panorama with Scenes device 1230 and a Context Gatherer 1240.

Two additional example complementary devices are described below. In some embodiments, these complementary devices can play an important role in the Creative Development Environment (CDE.) and can also have other applications that extend beyond the scope of the CDE:

6) Dependencies and Requirements Display and Project Flow Field

In various embodiments, the CDE offers some capabilities of the Dependency and Requirements Display paired with the Project Flow Field. The Dependencies and Requirements Display and Project Flow Field device pair can be a knowledge tool like the device pairs discussed above, and can also function as a control structure and creative setting for an unfolding project.

In some embodiments, The Dependencies and Requirements Display and Project Flow Field device pair can be configured to help construct complex systems and then track and creatively support ongoing operations. Dependency and Requirements Display can formalize necessary attributes for each aspect of the system (Requirements) and how the various aspects of the system depend upon one another (Dependency).

The Project Flow Field can record the ongoing operation of the system and can offer scope for innovative solutions and modification of procedures. In some embodiments, Dependency and Requirements Display can be configured to be suited for Electronic Textbook design in situations where standards have been promulgated: educational standards are requirements, and dependencies arise from both standards and pedagogical needs.

7) Implemented Versions and Evolving Design

In further embodiments, the Creative Development Environment (CDE.) can also offer some capabilities of Implemented Versions paired with Evolving Design. This example device pair can depict and coordinate the product and design aspects of a project. Some embodiments can be configured for managing ongoing research and development in complex technical projects in which releases occur from time to time (Implemented Versions) while design is being continuously enhanced (Evolving Design.) The same capabilities that compare and contrast successive releases with one another and with designs can also serve to compare and contrast different solutions to a set of standards or other design; solutions may be successive drafts or editions of one textbook, or different textbooks by different authors.

In various embodiments, the two devices in each of the seven example device pairs can be configured to function jointly and interact closely in an intuitive way. The CDE can also offer specialized tools in various embodiments. Some tools can be associated with a device pair, such as Structured Display with Tabular Grid and Display Field, Perspectives with Informed-choice Paths and Knowledge Garden, Interweaver with Overlay Outline and Concordance with Contexts, Selective Decoupling and Coupling with Relationship Display and Dwordle Field, and Expert Knowledge Articulator with Panorama with Scenes and Context Gatherer. Each of these is described below along with the associated pair, but these descriptions are only examples of some embodiments. Flexible tools, which can be employed with several or all example device pairs, are described along with the first applicable device pair, but again, these descriptions are only examples of some embodiments.

Also, these device pairs can be more readily appreciated when presented along with applications. For example, one or more of the example device pairs described herein can be related to an electronic textbook 5, including a K-5 Math Textbook, and the like. Illustrative applications discussed herein can accompany one or more of the example device pairs, and any other suitable device pairs.

Figure 10:
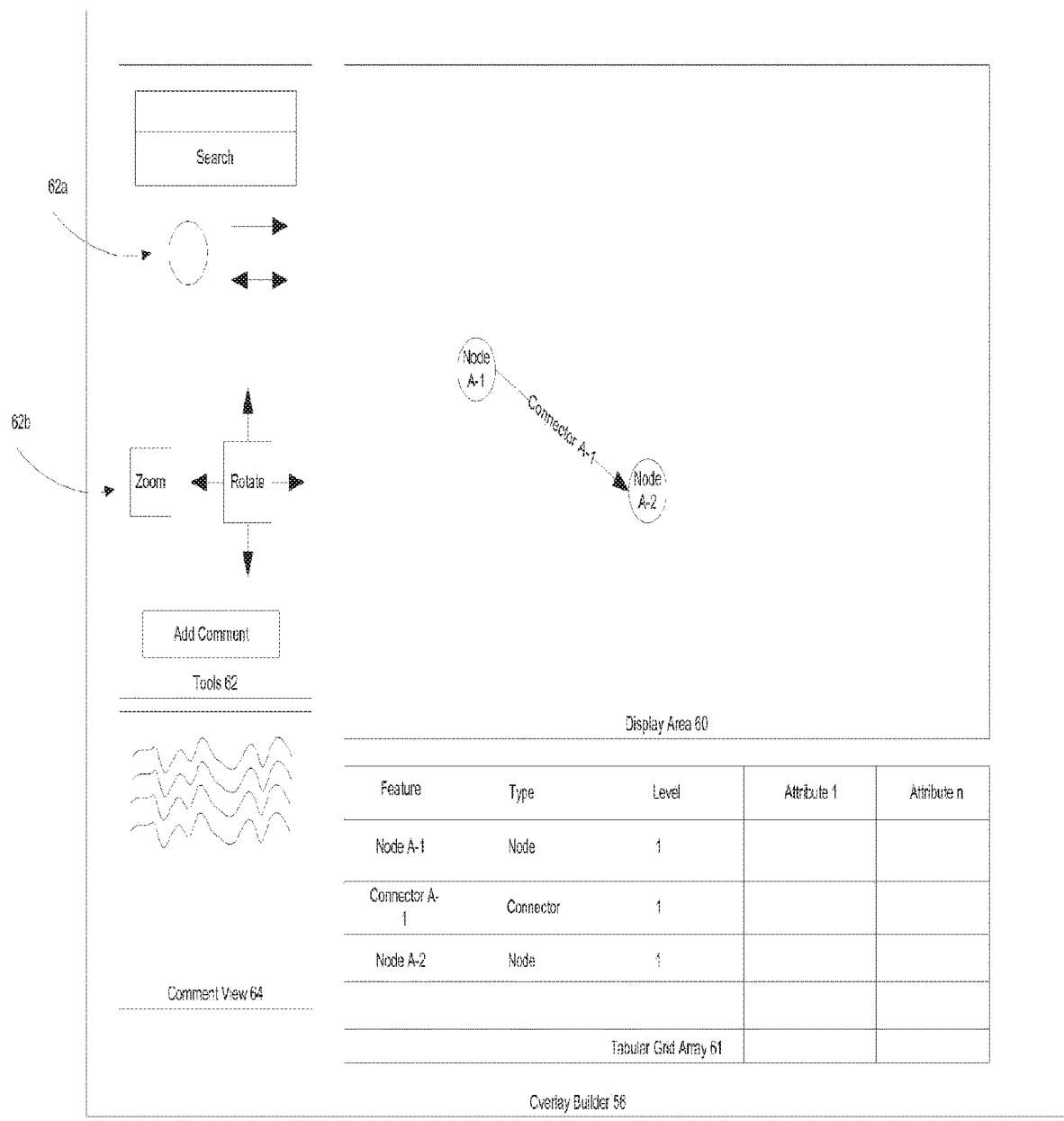
FIG. 10 shows an overlay builder, according to an embodiment of the invention.

Overlay Builder:

With reference to FIG. 10, the overlay builder 56 includes a display area 60, in which the overlay 41 (or electronic textbook 5) is displayed while the overlay is being created. The display area 60 is also used to display a completed overlay 41, and can be used by users to navigate the overlay 41. Additionally or alternatively as discussed above, a browser add-on such as the browser add-on 40 is used by users to navigate the overlay 41. The display area 60 is the Creative Development Environment (CDE) is the visual display field, referred to as the "display field". It is also a graphics workspace, where overlays can be assembled and the appearance of network displays can be crafted. It brings visual analysis (discussed in further detail below) to bear on the development of an electronic textbook 5 or overlay 41. The overlay builder 56 further includes a text-based tabular array 61, which in the Creative Development Environment (CDE) is referred to as the "tabular grid". The tabular array 61 serves as the verbal analysis tool (as discussed in further detail below). It also offers full capabilities for assembling an electronic textbook 5 or overlay 41, and allows convenient entry of entities (i.e. nodes 10 or connections 7, halls of informed choice, perspectives, etc.) and their attributes, as well as sorting and filtering attributes, nodes, connections etc. The display field 60 and the tabular grid 61 work in lockstep so that both modes of entry, display and analysis can be immediately engaged when appropriate. You will find that the Creative Development Environment (CDE) closely corresponds to the user environment. In a way, this is analogous to film-making in the sense that the director/author at all stages of development and the audience/users both experience the final product in the same way, and in the sense that the director/author strives to anticipate the responses of the audience/user and hone the product to meet their needs. In this case, the final product is experienced primarily through the closely coupled display field and tabular grid. However, in this case there is a further and even closer correspondence because most of the author's tools for developing understanding of the material and composing the electronic textbook are also employed by the student user to learn from and study and personalize his or her version of the electronic textbook.

Tabular Grid & Display Field

Pairing of closely-coupled Tabular Grid and Display Field can be a core capability of the Creative Development Environment in some embodiments. Joint roles of Display Field and Tabular Grid in creative development are discussed in more detail herein.

Pairing Tabular Grid & Display Field

In various embodiments, the Tabular Grid & Display Field can derive from a single project data base and present the same data in different forms. For example, the attributes of each aspect of the display field can be displayed as values in the Tabular Grid, and the values in the Tabular Grid determine the display. When an element in the display field is changed in any way—for instance renamed or resized or moved around—those changes can be reflected in the Tabular Grid, and those same changes would result if the changes were edited into the Tabular Grid.

In some embodiments, the Tabular Grid includes all of the attributes of displayed images, and the display can be reconstructed precisely from that data. Editorial changes can be made using either device. In practice, for some embodiments, it can be easier to modify the layout of the display through What You See Is What You Get (WYSIWYG) manipulations in the Display Field and change verbal attributes such as names or appended texts by editing in the Tabular Grid. However, in further embodiments, systematic changes of appearance that apply across several nodes can be more quickly implemented in the Tabular Grid than in the Display Field, and an author may prefer to continually focus on the Display Field in order to maintain concentration, and apply its tools to enter all sorts of changes.

As explained herein in more detail below in the paragraph having the heading "DISPLAY FIELD AND TABULAR GRID," the display field and tabular grid can respectively reflect visual and verbal workspaces, and work together to facilitate creative efforts. Combining verbal and visual information has a long history: Specifications for construction and engineering projects ordinarily involve drawings accompanied by legends describing various elements shown in the drawings, and also textual material with tables that give further specifications for the elements and provide more extensive comments on the drawings.

Traditionally, plans and legends were prepared separately and drawn by hand, but increasingly these are now both produced by a computer-aided design system from a common model. Any physical project is likely to involve both visual and verbal analysis, which are supported by drawings and by text, respectively. More broadly, verbal and visual analysis are complementary systems, and we benefit from engaging both of them in many types of analysis. Best results occur when a feedback loop conveys information from visual to verbal, and back again from verbal to visual.

In various embodiments, a closely-coupled pairing of a Display Field with a Tabular Grid can support creative understanding in many beneficial ways. For example, the Tabular Grid can organize the individual elements and their attributes and the Display Field presents the larger picture. Together, the two can allow users to keep track of the significance of what they are doing—the big picture—while getting the details right and keeping such details in mind. Examples of an author's creative use of such tools is described in further detail herein. In various embodiments, Display Fields can form the basis for a number of devices in the Creative Development Environment (CDE), which have been crafted to meet specialized needs. The eight devices that make up the four other device pairs described below are examples of distinct instances of Display Fields, each with an appropriately configured Tabular Grid.

Tabular Grid

In various embodiments, a Tabular Grid can be like a spreadsheet in appearance, and can have a spreadsheet's capabilities. For example, the rows can represent elements in the project, in which case the columns contain attributes of those elements.

The Tabular Grid can have many other capabilities as well. For example, the entry in each cell can appear like a mere number or image, but the cell also represents the object that has that value, and can serve for accessing data about or controlling that object. Each of the rows and each of the columns again represent a class of objects and can again help to identify, access or control the object. Consequently, in some embodiments, the Tabular Grid can serve as a control panel to carry out and track various procedures in respect to the underlying objects that are described in cells, rows and columns.

Also, the Tabular Grid can represent different kinds of objects: for example, in one embodiment, the rows can serve for both nodes and connectors, for diverse levels in a tree structure that are interrelated as parent and child, and for different historical states of entities that are changing over time. In some embodiments, the Tabular Grid can be used for importing data into a project and for exporting data.

In various embodiments, because of the close coupling of Tabular Grid and Display Field, the Tabular Grid does not always need to be used. For example, a small scale project without subtleties might be completed using the Relationship Display and Dwordle Field, without ever needing to view a Tabular Grid. The Tabular Grid can be beneficial in some embodiments when there are multiple creative dimensions and/or too many elements to keep in mind at one time. Such a mode can be the default mode of import and export. In embodiments where a project can benefit from a Structured Display or the user needs to be aware of detailed attributes, the Tabular Grid can be central to the creative process.

When exploring attributes of a population of constructs in order to think through their relationships and cluster them into categories, it is often helpful to alternate between sorting and filtering them on various attributes in the Tabular Grid while observing attributes in detail and possibly defining new cluster attributes, and subsequently contemplating a graphic display of the clusters that have been formed. Each iteration can lead to further understanding and result in identifying further attributes that better discriminate key aspects of the constructs.

The Tabular Grid is further described below in the paragraphs having the heading "TABULAR GRID," "Attributes of Nodes and Connectors," "Other Attributes" and "Other Grid Instances." Use of the Tabular Grid in importing materials and assigning attributes is described in more detail below in the paragraph having the heading "Importing Draft Materials using the Tabular Grid."

Attributes

In some embodiments, The Tabular Grid can be configured to present the attributes of every element in the Display Field. Such attributes can include qualities of the element, information about graphic displays, and the like. Attributes are discussed above in more detail in the paragraph having the heading "Attributes in an Electronic Textbook."

Display Field

A Display Field displays an assemblage of visual images—for instance a diagram made up of nodes and connectors. As described in more detail herein, the display field serves the visual graphics workspace for creative development and the presentation field for overlays and perspectives, and provides the user with the significant benefits of visual display of conceptual thought (see e.g., paragraphs below having the heading "DISPLAY FIELD AND TABULAR GRID" and "DISPLAY FIELD."

In various embodiments, the background of the Display Field is not inert: it is like a fertile field, because new elements can be planted anywhere on the background by clicking there and applying tools to put the desired object in place. Locations in the background can also be aware of certain abstractions that apply to them, such as scenes within which they fall. Elements displayed in the field can likewise be more than simple images. Their attributes can be modified by procedures applied to them. Connectors can be easily added, moved or deleted. Space can be opened up to alleviate crowding and distribute objects more regularly. Groups of elements can be aligned on horizontal or vertical axes or in other configurations like circles or regular multi-sided figures. The display can be layered to accommodate multi-layered perspectives and offer drilling down and other transitions between levels.

Structured Display

In various embodiments, a structured display flexibly displays information that floats freely while work is underway. In some embodiments, the structured display is tabular by default: it can be populated from a table and it can be formalized into a table at any time. It can be an intermediate between the open flexibility of the display field and the formal structure of the tabular grid. It can be a creative extension of tabular data that appears in a display field for modification and enhancement. It can be an informal array, a collection of entries in rows and columns that can be moved around spontaneously and then later realigned as a rectangular array. Other structures such as concentric circles or spokes around a hub are also possible in further embodiments. The whole of the Display Field or any part of it can be dedicated to a structured display, or an additional instance of a Display Field can be initiated for this purpose.

In some embodiments, structured displays can be very helpful at an intermediate stage in the author's creative process, as is described above in the paragraph having the header "Structural Connections," and as described in the paragraphs below having the headers "Opening a Structural "Project Matrix" in a Display Field," "Laying out the Columns," and "Laying out the Rows."

Information in structured form can also be carried forward all the way to the final presentation. For example, as discussed below in the paragraphs having the heading "Structural Views," "Path Display: PathText Ordering," "Using Structured Displays during Development," and "Structured Displays in the Final Product," one of the perspectives that can be built into the Knowledge Garden for a multi-year electronic textbook can take the form of an array in which lessons or grades appear as rows, while topics, styles of exposition or levels of presentation appear in columns.

Close Coupling

In various embodiments, close coupling assures that different closely-coupled devices or views (in this case the Display Field and its corresponding Tabular Grid) of the same data remain in perfect correspondence. The two displays are in lockstep, and any modification to data in either one immediately shows up in the other, as explained in the paragraph below having the heading "Display Field and Tabular Grid are Closely Coupled." This can become important when different kinds of operations are being performed on two or more displays with data in common.

Implementation of this capability can be one of the more demanding aspects of software development for the Creative Development Environment (CDE). In some embodiments, the most reliable approach, can be to have the Tabular Grid and Display Field be different renderings of identical objects in the same database, so that any change to the database from any source immediately impacts both devices.

Multiple Instances

Multiple instances of Display Fields and/or Tabular Grids can be open in the same project at the same time, as explained in the paragraph below having the heading "Multiple Display Fields and Tabular Grids Can Be Used Simultaneously." All can be windows into the same database, and all can be used simultaneously. Advantages of having multiple instances are illustrated in more detail herein. In some embodiments, by default, close coupling extends to every instance, but it can also be useful to deliberately decouple an instance as a field for innovation.

Layers

Different levels of an outline and different degrees of detail can be arranged and depicted as layers in space. Alternatives can also be arranged and depicted in this way, with similarities stacked vertically so that they merge into one when viewed from above, and differences occupying distinct positions when seen from above. Layering is often the most effective way to compare and contrast multiple sources.

Layers are significant features in many displays. Like different levels of an outline, different levels of significance, from greatest at the top to smallest at the bottom, can define layers. Comparable structures with similarities and differences can sometimes be best rendered by layers. A three-dimensional table can be rendered as layers of two-dimensional tables. Sometimes layers can be organized into tiers that group several layers.

Layers can be important in Panorama with Scenes and Context Gatherer, where panorama layer and context layer are pegged together, and in Overlay Outline and Concordance with Contexts, where the Overlay Outline is the upper layer, the material is the lowest layer, and Concordance Contexts occupy intermediate space and extend up to the Overlay Outline. Layers are also basic for Informed-choice Paths and Knowledge Garden, where paths often appear as an overlay and perspectives sometimes use views from above or from an angle. Layers are often the most straightforward solution when applications juxtapose different kinds of data.

Layers can be viewed from above, viewed from any angle in a projection of a three-dimensional model, and drilled down through. They can also be suggested by assigning icons of decreasing size or less distinct colors to lower layers. Three-dimensional displays may eventually be projected into true three dimensional viewers.

Group-Selection Tool

The group selection tool is used in display fields to assemble a group of nodes and connectors for any purpose. For example, they can be selected for grouping into a scene, for including in another view or deleting from the current view, for deleting from this project or copying for export to another project. Nodes and connectors can also be selected for formatting commands such as to move the group, to align the group with a grid, or to shrink or expand spacing between nodes within the group or around the borders of the group. A selected group can be aligned vertically, horizontally, in any direction, or in a circle.

Relevance-Contracted Dispersion

In projects with many elements, it is often helpful to use a mathematical algorithm to lay out the Display Field in a way that emphasizes interrelationships and puts related items close to one another. This is explained below in the paragraph having the heading "Positioning algorithms."

In some embodiments, preferred algorithms have three main features. First, they are relevance-weighted: when two elements are closely related, the algorithm places greater value on positioning them close by than it would if they were weakly related.

Second, the positions of chosen nodes can be anchored to positions selected by the user; the algorithm can be configured either to fix those positions absolutely or to establish them as high-priority targets that should be approached as closely as possible.

Third, based on these criteria the algorithm seeks to disperse the elements and arrange them to minimize cross-connections whenever possible, while also seeking to achieve overall compaction.

The algorithm can be used to improve the organization of a draft arrangement laid out by the user, or it can be used as a preliminary tool to work out a trial arrangement. The anchoring capability allows the user to work through several iterations if necessary, organizing some of the elements by hand and then using those positions as anchors for the algorithm's arrangement of the remainder.

Functions of Display Field and Tabular Grid Serving Both User and Author:

Users of the electronic textbook benefit from a non-linear outline, in the form of an overlay in multiple layers, presented in the display field; the author of the electronic textbook assembles this non-linear outline as the material is being gathered, and organizes the material using the same overlay in the display field or tabular grid.

Users of the electronic textbook are able to access and extend the non-linear outline in either visual or verbal formats, respectively the display field and tabular grid; the author of the electronic textbook conceives of and assembles the material for the textbook using the same formats, display field and tabular grid.

The electronic textbook user reviews the path already traced and explores options ahead observing views of the non-linear outline in the display field; the author of the electronic textbook uses the same views in the display field to design and test navigation paths and optional choices for users.

Users are able to use the display field and tabular grid to make personal notes on the items in the electronic textbook, add items to the electronic textbook and create connectors among these notes and items, for their own benefit or the benefit of others; the author uses the display field and tabular grid in the same way to create the non-linear outline overlay that determines navigation paths and options.

The electronic textbook user adds additional items to the electronic textbook using the display field and tabular grid and offers these to a privileged user or the author for inclusion in the textbook; the privileged user or author reviews the material suggested by the user, deems it worthy of inclusion, and uses the display field and tabular grid to incorporate it into the electronic textbook.

Users work in the display field to include diverse audio and visual media in their notes on items in the electronic textbook; the author uses the display field and tabular grid to assimilate various audio and visual elements in the electronic textbook.

The electronic textbook user employs the glossary to find the meaning of a term, and then uses the display field to view selected highlighted instances of the term sought; the author uses a list of terms in the tabular grid to sharpen up language and develop a glossary, and uses the display field to verify terms for the glossary by viewing selected instances of terms under consideration.

The user's understanding is heightened by links between items in the display field that demonstrate logical relationships—"visual logic"—or suggest important associations—"drawing with meanings;" the author uses visual-logic and drawing-with-meanings tools to explore complex interactions and elicit new ideas while simultaneously developing graphic material for the electronic textbook that the user will later view.

Overlay Tools:

Additionally, the overlay builder 56 has a suite of tools 62 available for use by the user to create, modify or view the overlay 41. Example tools include tools to facilitate adding nodes or connections to the overlay, such as templates 62*a* that can be dragged and dropped into the display area 60. The locations of the nodes and connections are similarly modified by dragging and dropping them into the desired new locations. The overlay builder 56 allows the user to define paths through the overlay 41 in the display area 60, either by the user traversing the nodes and connections and viewing the content, or alternatively by the user merely selecting the desired nodes and connections from the display field, for integration into the path. Buttons, scrollbars and rotation tools 62*b* can be used to manipulate the overlay 41 in the display area, for example to zoom in or out, pan up, down, left or right, or rotate the view, or search the content of the overlay 41 or that connected to by the overlay 41. The overlay builder 56 allows the author to save the overlay 41 as it is under creation, including saving snapshots of the overlay 41 in progress. These saved snapshots are archived for the author to return to as desired.

Using CDE Components:

We now turn to a discussion of the options available in a creative development environment of an embodiment of the invention, and the ways the options may be used to create electronic textbooks or overlays.

Informed-Choice Paths & Knowledge Garden

In some embodiments, the device pair comprising Informed-Choice Paths and Knowledge Garden allows multifaceted material to be assembled and effectively presented; helps to structure the material for learning; organizes the material for accessibility by users with diverse interests and learning skills; fosters user self-understanding; elicits an active approach to learning; and develops user perspectives on learning and knowledge.

Pairing Informed-Choice Paths and Knowledge Garden

Designing a body of material to support Informed Choice can yield several benefits. The overall breadth and quality of the material increases, because diverse resources can be offered to serve diverse purposes. Informed users can optimize their personal learning experience by selecting instructional formats and materials that are most appropriate for them. By making informed choices, users take more active roles in the learning process. Users who receive "meta-information" about learning and view perspectives on knowledge while being informed are able to interact more effectively with the material. Finally, the process of informed choice helps each user to better appraise personal needs and learning style.

When multiple paths through varied material exist, users' curiosity and interest can be awakened by disclosing inviting opportunities for exploration. The metaphor of a garden is appropriate: Walking along paths in a traditional garden, one sees pleasant vistas of other spots on other paths. In a knowledge garden, special features developed for one path become visible to users on other paths and potentially benefit them as well.

The process of crafting informed-choice modules enhances the author's comprehension of users' states of knowledge at each point in the learning process, and can result in clear presentations that crisply address the key points in the material. Visualizing a knowledge garden helps the author to appreciate the material's potential, and inspires new approaches to presentation.

Informed Choice

We will learn to understand the subject matter better while also learning more about ourselves when we are able to choose among various modes of learning and optional supplements, while receiving the guidance that we need from the textbook to make informed choices among them. It is helpful to provide the user with a variety of ways to choose amongst the paths, or to make other choices which will enhance the user's educational experience. The electronic textbook 5 facilitates creative development, learning and teaching. While helping people to learn the subject matter at hand, it also helps them to learn more about their own state of knowledge and to clarify their thoughts.

Various suitable unstructured questions can be suggested as possibilities for the textbook to invite the user to ask, such as "Why am I doing this: what's in this for me? Can you make this more interesting? More relevant. I need an example! I'm completely lost. I disagree with this. I'm interested; can you tell me more about this? Go into this more deeply?"

As these examples illustrate, an author can embed many possible styles of interaction between user and textbook in the textbook design. Questions like these serve a dual purpose: the answers help the textbook to understand the student's situation so as to guide the student down an appropriate path, and responding to the questions helps the user to notice her/his state of mind and consider personal factors that can contribute to successful learning.

The Electronic Textbook makes available to the author a number of different Modes of User Interaction. The following modes are particularly important for informed choice:

Offering Options puts the user in charge. The user is empowered to ask for further clarification on any of the available options before making a choice. Once the choice has been made, the user may be required to first proceed to a vestibule where various preliminaries such as introductory material are offered. In some cases, background knowledge checks and "Test your Skills" Exercises in the vestibule serve to verify the user's preparation, so that it can be supplemented through targeted instructional material as needed.

"Test your Skills" Exercises evaluate the user's understanding, and give feedback to the textbook about the user's present state of knowledge. The user generally has the opportunity to ask for guidance or further instruction as needed. Mistakes may prompt further investigation and retraining, as explained below.

Questioning the User and Receiving Questions from the User are important elements of user interaction, and are particularly significant when the user is interacting with an electronic Study Partner.

Encouragement, Motivation and Reward are services that can be readily offered. For example as discussed in detail in the paragraph above having the heading "Study Partner," a Study Partner can help with encouragement and motivation. The paragraph above having the header "Setting Goals and Monitoring Progress" explains how goals can be set during Informed Choice dialogues and how the electronic textbook can monitor performance and offer guidance and targeted instruction to help the user to succeed. The paragraph above having the header "'Wrappers'" describes how the textbook can assist the student in formulating "wrappers" or other study plans and sharing them with a teacher or mentor.

Active Graphic Content allows the user to interact with the textbook by actively participating in the graphic. The layout and sequence of events in the graphic help to clarify relationships and chains of causation and make the learning process more memorable. Like computer gaming, the graphic evokes the user's interest, supports the user's concentration, and retains the user's attention.

Exams are another service readily offered by the electronic textbook. Mock trial exams can be arranged for a student, and official examinations in a classroom can be administered on behalf of the educational institution. The textbook presents the exam, manages the presentation of the exam, and receives and grades the answers. The author may have included exam questions in the textbook design for such a purpose, or tools for generating test questions with randomized elements may be built into the textbook, or questions may be provided by the school.

Presenting Perspectives is very important in the Creative Development Environment (CDE) and Creative Presentation Environment (CPE). Much of the development work is done on a Display Field that shows a perspective on the material. Structured Displays showing multi-layer perspectives on content are suitable development views in many projects.

Modeling Learning and Knowledge

Effective design for Informed Choice depends on modeling the knowledge to be acquired, determining how various modes of instruction can instill that knowledge, and employing the strengths and weakness of each mode for different kinds of students.

Effective implementation of Informed Choice depends on tracking over time the user's current state of knowledge, learning preferences, and styles of learning. In the earlier grades, it may also be useful to monitor the user's interactions with the learning tool—such as an electronic textbook—for signs of poor communication, frustration, loss of interest or loss of confidence, inattention, distraction, forgetting, inexplicable errors and so on. To improve the user's experience and facilitate success, the learning tool will ideally also have access to modeling of patterns of performance—ranging from error to excellence—and reporting tools that can be used to share information with instructors, parents and mentors.

Informed-Choice Paths

Choice is informed by demonstrating possibilities, sketching alternatives, introducing the parameters of the decision, and making guidance available when requested. All of this establishes context for the user. The paragraphs below having the header "Knowledge is Information in Proper Context" explain that mere information is data out of context, while knowledge is information in proper context. To help others to make wise choices, it is important to help them to establish context by inviting them to ask appropriate questions.

Features, Halls, Logic Views, Nexuses and Connectors:

In graphical terms, a "feature" is a node and a "connector" is a link between nodes. Also halls of informed choice, logic views and logical nexuses are other kinds of nodes where connectors converge. Features, Halls, Logic Views, and Nexuses are displayed as nodes in the display area 60, while connectors are displayed as links. In the tabular grid 61, these features are displayed as rows (or columns) in the display.

Here are some ideas about using features, halls, logic views, nexuses and connectors:

For example, for young students, who love to explore, one possible rendering of an ordinary junction or simple Hall of Informed Choice is in the form of a room with a door or doors ahead on the same level for subsequent steps along the present path that are of equal difficulty, hatches in the floor for basics and remedial clarifying material, and hatches in the ceiling for advanced topics. Presenting the path as a series of rooms and presenting transitions along the path in this way may help to hold students' attention. Rewards for successful exploring can be offered to excite students' interest.

How do You Determine Features?:

If a topic is important enough to deserve to be in an outline, it should be a feature. Why? Because the network of features displayed in the display field 60 and the tabular grid 61 is like an outline, and you want the topic to be included in both areas. If the topic is a piece of a logical structure it should be a feature, so that it can appear in a structured display, such as a hall of informed choice. If the topic is going to receive connections from elsewhere, it should be a feature so that those connections can terminate in a node.

Halls of Informed Choice

Halls of Informed Choice are described in detail above in the paragraphs having the heading "Halls of Informed Choice, "Gateway," "Vestibule," and "Gallery": and the paragraph below having the heading "Points of Access" discusses access points such as formal gateways. Informed choices can be presented in Halls of Informed Choice, and also made available in other circumstances when requested by the user.

How do You Determine Halls of Informed Choice?:

These should appear at points where you want the user to pause and reflect. Gateways are points of entry for new visitors and/or transition between major sections. Vestibules are typically reached after the user chooses to set off in new direction: they encourage the user to pause for consideration and help the user to establish a personal context before proceeding. Galleries present comparable choices: any set of features that belong together in a list can appear in a gallery, and a gallery can also usefully collect a set of scattered features that share something in common. (For example, the set of instances of a given term or phrase are shown in a gallery.) Ordinary junctions are like trail junctions with a signpost.

How do You Determine Logical Nexuses?:

Here is an example: You begin with important relationships among constructs, ideas that are important to your message. You plan to present their collective relationships in a logic view. These may be relationships of cause and effect, which are directional from cause to effect, or refutations that are directional with reverse implication. There also associations that tie two constructs together, which are bi-directional, and contradictions that are bi-directional in reverse.

It's likely that each of the constructs involved will deserve to be in the outline, in which case each becomes a feature in its own right and logical connectors can handle the relationships among them. But suppose that the relationships among the constructs are complex, so that there may be a number of separate factors on the same connector, and/or a large number of crisscrossing connectors. In that case the diagram may be confusing rather than helpful: to clarify it, look for underlying factors that participate in the relationships among the constructs. Each of those underlying factors may be involved with only a few constructs in straightforward ways. Therefore create a logical nexus for each underlying factor, connected to the features it relates with.

For example, suppose that six constructs are closely interrelated, with as many as twenty linkages among them. This could be depicted with 20 individual connections in a single logic view displaying all of those connections, but all the crisscrossing might be confusing. However, if the connections have six flavors that each correspond to an underlying factor, the diagram becomes much clearer when logical nexus nodes are created for the six underlying factors, and each factor is then connected to the constructs it relates to. This approach can visibly capture the essence of the logical linkages.

Finally, how do You Determine Connectors?:

Connectors are of several types. There are connectors that express intrinsic relationships between the features they connect. These are "associating connectors" because they relate to the meaning and content of the features. Some associating connectors will be logical connectors that actually represent logical relationships and meaningful associations per se, as discussed above.

Also every path is expressed as a series of connections between nodes that are stages in the path, and so connectors are the links between nodes in a path. Such connectors belong to their path: if another path includes that same connection, it will have a distinct connector.

A connector could also be a stage in a path, but that may be confusing because a connector is intrinsically a link and has no home location. Therefore it's preferable not to include a connector as a stage in any path, so if you see a need for this create an ordinary junction node before the connector to serve that purpose.

One special form of path is the sequential ordering that leads progressively from the first to the last item in a list. Sequential ordering is another function of connectors. There are connectors between a parent and its children, for instance the title of a list and the members of a list, or a node on one level of a tree and the nodes on the next level that branch from that node.

Organizing Material for Nodes:

Each node has a title and optionally a short abstract-typically a sentence or short paragraph. Beneath these is often text and images in web format. Every such node should have some material. There is no upper limit on the extent of material. Ordinarily each node will have its own material, stored separately for example as a separate page of content (e.g. a web page). However, children of a node can be placed together with the parent in the same content store (e.g. on the same page beneath their parent, with their own URLs, titles and abstracts, in sequential order).

Text and Images for Nodes and Connectors:

Think of the title of a feature node as the title of a section in a chapter, and place below it whatever text and images belong to it. The material can be as extensive as needed. In an embodiment, the feature nodes have roughly the same amount of text as each other. Alternative embodiments allow them varying lengths based on the complexity of exposition in the node.

Connectors can have widely varying amounts of text, and may have none at all. Think of the connectors in paths as transitions, and provide as much text as necessary to clarify that transition in that path. When a path is printed (for example to create a linear book as discussed above), by default connector texts are printed in italics and feature texts in ordinary type. Reading through the printed version is a good way to see how well your connector texts fit in. Logical connectors that express relationships should have text (or images) to explain the nature of the relationship, and the text should be as long as needed.

Assigning Significance Levels to Nodes and Connectors:

One of the display options is to show the nodes down to a certain level. For example, the nodes can be organized as in linear outlines, with the highest level being one and the lowest being nine. When preparing a non-linear outline, it's very helpful to assign levels to significant nodes carefully, so that the layout of your network is clear at every level, and successive moves down to include lower levels add information across the board in a consistent way.

Halls of informed choice are typically assigned to the higher levels of the network, because of their important roles in navigation. A hall should typically not be at a lower level than the major nodes that it leads to. In this manner, when a user collapses the lower levels of the network, to more easily understand the higher-level organization of the material in the network of nodes, the user will not lose sight of an important hall of informed choice, until and unless the nodes the hall connects to are also collapsed.

Unless a connector is assigned a level, its level by default is the lower of the two nodes that it connects. However the display generally traces connections between high level nodes being displayed even when there is no complete connecting path at the levels shown, typically selecting the shortest connecting route and showing it with a lighter line corresponding to the lowest level of the connection along that route.

Points of Access:

It is sensible to design your material around access points and paths. Purpose-built gateway nodes are the primary access points. In the case of a website, internal web pages that are likely to be reached through search engines can also be viewed as access points. It is not necessary for an electronic book or overlay to have more than one access point or more than one path, but it is often preferable to provide alternate access points, to give users a variety of ways to experience the content, and to cater to a variety of learning modes as discussed above. Paths are routes that present valuable aspects of your material effectively to the audience that comes to them. Thus, an electronic book or overlay that has many different paths through it will provide an enhanced experience to the users.

Knowledge Garden

How can there be a Knowledge Garden that is distinct from the materials in Informed-Choice Paths that make it up? The answer lies in the design of the paths through the material, the informed choices offered, and the perspective views that the user sees. A wealth of supplementary options presented in an appealing way can enrich the user's experiences traversing the paths, as described in the paragraph above having the header "Knowledge Garden."

Stages on a Path and Optional Features:

In a conventional book the stages are sequential, the path is linear, and the flow is like the unfolding of verbal thoughts. Viewed as a means of communication, a book invites the reader to journey through a landscape familiar to the author, who simultaneously narrates the journey and presents the landscape in a single stream of words. The author's adventure when initially developing this landscape is implicitly present at all times: the journey remains highly personal and yet in some sense it is fully shared.

The word "garden" suggests something quite different. As a visitor strolls through the garden, paths chosen, steps taken, eye movements here and there, thoughts and impressions collectively create a unique texture of experience. The continuity in which each sensory image is embedded is the visitor's own continuity, not the gardener's. The plants that have been laid out to grow in the garden shape it through their vitality. As a consequence the gardener is somewhat removed from the visitor's experience. In a way the gardener is a facilitator whose work is peripheral to the life of the garden.

It is helpful to think of the stages of the path in an electronic book or overlay of embodiments of the invention in the same way. Each has its own aspects of meaning, and should be well rounded. When as author you place a stage of a path (i.e. a node or a connection) in conjunction with other stages to achieve an effect, you are facilitating a variety of possible experiences for your users, none entirely predictable.

Optional features (such as the nodes 10*c*, 10*e*, 10*j*, or the path 14*c* discussed above) represent possible excursions: the user can consider their qualities and easily decide whether to reach out to explore them or leave them aside. Their potential interest should be readily apparent from a brief abstract, presented for example as a tooltip to the user when he mouses over the node in the reader 21 or add-on 40 discussed above. That way the user can evaluate them without confusion, and keep the possibility in mind so as to possibly return later if some new association awakens an interest.

The arrangement of choices and the manner in which they are presented can have a significant effect. Here is an example of a Knowledge Garden:

In a textbook for young children, a collection of learning opportunities or a glossary of terms and symbols can be represented by a crowd of small figures in different shapes and colors, gathered together in an interesting background scene. Each figure portrays a distinct item, and is identified by a label on its chest or hat. The scene and the portrayals may not change during the school year, and may remain constant for several years, but the positions and behavior of figures change so as to highlight items that are presently relevant to the student's learning. For instance, items that are most relevant in the current lesson may be enlarged and bob up and down in the crowd while bearing labels on their hats, while items that are related but not so critical may stand or sit quietly in the front row with big smiles on their faces and labels on their chests. In a Kindergarten math text, for example, the very first figures might be people with big heads with labels like "1" and "2" and "O." The figures are cute and bob up and down as if to say, "You might want to know about me, so please come to me and learn." This display is a Hall of Informed Choice, specifically a Gallery. It can also be understood as a view in a Knowledge Garden because it juxtaposes many learning opportunities in a friendly and familiar way. A student who is puzzled by a symbol or term on any page in the textbook can jump to this timely Glossary, where symbols and terms on the student's current page and lesson are highlighted, and most recently introduced items are most active. If the student has made a mistake in an exercise, items that are closely related to the solution method and the student's error are emphasized. When the student responds to a figure in the Glossary by selecting it, the textbook carries the student along a special path through active features that explains the item and show how it is related to the work the student is currently doing.

Perspectives

The creativity of perspective centers on responding to the user's state of mind at each point on the path. What are the possibilities? Will some aspects of a larger picture be welcomed? Are clarifications needed? Is it time for a field trip to another topic? Each of these possibilities would be best presented by a different perspective, so it makes sense for the author to help the user to decide on perspective by making a choice. Paragraphs above having the header "Perspectives" describe perspectives, including view ahead and path traced. Perspectives can highlight different categories or focus on different levels of details. Any Hall of Informed Choice can display on request one or more perspectives. Perspectives can be shown in a Display Field or a Tabular Grid, as appropriate.

Perspective is bounded by visibility. What is visible and what is not?

Visibility:

As author, you determine the visibility of nodes and paths, as discussed in detail above. Once the user has settled on a path, normally that entire path from beginning to end becomes visible, but you can set the parameters in a different way. You can also determine whether other paths are visible or not, and from which points on the present path they can be seen. You also determine which optional features are routinely visible from each point on the path.

Perspectives can take many forms. One straightforward perspective is a map or plan of the Informed-Choice Paths in the Knowledge Garden and the stations along them. This is like an aerial view seen from above. If the plan involves multiple layers, these can be stacked vertically beneath the plan and viewed from above or they can be treated as a three-dimensional layout and viewed from any angle. The perspective can also be depicted as if walking forward along the path or looking forward through the windshield of a car, so that features stand out above a level plain or are seen crowning hilltops in a range of rolling hills. Or stations can be depicted compactly as arcs of concentric rings, with nearest stations in the first arc, the stations beyond them in a second arc, and so on. When a choice is being considered and again when a choice has been made, the details of a more narrow perspective can become visible through a vestibule. Formal Gateways can open onto the perspective within the gate or show it through the gated opening. Alternatively, the Informed-choice paths can be rendered in an entirely different setting, such as a city, village or building.

The environment for crafting paths in a Knowledge Garden, such as an overlay builder, can be instrumented to offer a good deal of flexibility at all levels, from the individual steps of a path up to wide-ranging perspectives on the Knowledge Garden as a whole. Uses of the Overlay Builder are described in more detail herein throughout the disclosure.

Application 2—K-5 Mathematics Textbook

Our initial demonstration of an Electronic Textbook (ET) is a prototype for a K-5 mathematics textbook. We have chosen this demonstration project for several reasons: Recently implemented Common Core State Standards in the United States call for improvements in math education and express concrete requirements. The span of coverage is K-5 because these six grade levels are treated as a coherent series in the U.S. Common Core State Standards. Math is the most natural medium within the general curriculum for teaching logical thinking and productive thought. Innovations to the beginning math curriculum may help to address innumeracy. Math instruction takes place in two distinct styles of presentation—procedurally oriented instruction using rote learning and cookbook solutions, and understanding-oriented instruction using more insightful, meaningful and visual-tactile methods—and the sharp contrast between the two suggests an interesting opportunity to create a textbook that offers both. Finally, dependency mapping among educational modules is an interesting challenge, and in this case it can simultaneously meet three significant needs: documenting the sequence of modules that satisfy Common Core State Standards; building into the textbook required core completion, the required backbone that must be preserved amidst the flexibility of Informed-Choice Paths; and implementing error diagnosis and retraining capabilities in the ET.

Features of the Textbook

Most of the features of the textbook are explained elsewhere in this application. For example, the design includes: average, remedial and advanced tracks at each grade level; both rote/cookbook-solution/procedurally oriented and meaningful/visual-tactile/understanding-oriented styles of presentation; provisions for tie-ins of useful material from outside sources; presentation of practice exercises and test questions that are supported by correctness feedback and informed-choice presentations of remedial exposition, and that inform the ET's calibration of the user's performance and learning preferences. The record of the student's performance and learning choices as a whole can be analyzed for learning patterns, which may lead to adjustments of the student user's path through the material, either invisibly by procedures compiled into the textbook or by presenting informed-choice options to the student.

The materials in the textbook cover multiple grades, and offer a different entry gateway for each grade. The material for each grade begins with a review section that is condensed from the previous grade's material from Grade 1 onward, and from level P for Kindergarten. At each grade level, advanced material reaches forward to the subsequent grade and beyond, and remedial material extends back to the previous grade and earlier grades as applicable. A truly advanced student can potentially complete the material for more than one grade in a school year, and a student challenged by math can potentially catch up by more than one grade. The multi-year textbook offers a natural way for the student's learning preferences and progress metrics to be carried forward from year to year.

The prototype textbook is designed to be downloaded onto a computer or operated from the cloud. It includes features relating to student communication with privileged users (instructors, parents and other mentors) as well as communicating and sharing information with other students. Privileged users have a separate login, which empowers them to see the whole of the knowledge garden, and to extend and modify the textbook to the extent permitted by their degree of privilege. Access to the textbook is secure and personal data is encrypted to ensure privacy.

The textbook contains active material of many kinds, and cannot be effectively used until it is activated, so activation charges for use can be assessed one year at a time. Consequently, the textbook can be made available on a year by year basis. The publisher can update the textbook each year and even within-year without disturbing a student's prior study history as recorded by the textbook.

The student's general learning preferences are determined when the student begins with the textbook and revisited at the inception of each subsequent year. Learning preferences and capabilities can also be assessed within a grade, based on student responses. Parents and/or the instructor are invited to participate in this process. The color palette is adjusted to non-standard colors or shades of gray if color contrasts are only partially perceived or not perceived at all. The size and boldness of the font is determined according to the student's needs, both in terms of absolute size and in terms of pixel count for the child's default access tool, be it tablet, laptop or monitor. The role of audio in the instructional process, which may extend to a "study partner" for the student, is decided.

An ET can be designed as multi-lingual. It can also be designed to customize symbolism and cultural preferences, so that it becomes truly international. In a multi-lingual text, preferred language and cultural preferences are determined, and beyond that the student is potentially offered the scope to view or hear translations of instructions in a second language. In a bi-lingual school, instructions in the two languages can be coordinated.

Other aspects of learning preferences, such as preference for verbal, visual or simultaneous visual/verbal presentations, and preference for written language or graphic image presentation, are elicited along the way, and can be validated by experiments in which different modes of presentation are alternated and resulting performance is evaluated.

Visibility is also dialed up or down to suit the student's needs. A balance point is chosen between allowing the student to explore learning options, on the one hand, and reinforcing the student's focus on completing each lesson, on the other. These preferences along with the student's grade level determine the options provided in the ET viewer and the configuration of informed choices.

Active content is an important strength of an ET. Practice exercises and test questions can be administered, and responses evaluated. A wrong answer can be simply reported as incorrect, or the correction can be supplemented with a renewed explanation of the correct approach.

The author can take advantage of the ET's capability to detect systematic error patterns and attribute them to varied causes such as failing to grasp the wording of the question, haste or carelessness in thinking through the answer, failing to check the answer, and misunderstanding: When the apparent cause is flawed understanding of specific material that came earlier in the textbook, the ET is capable of composing a remedial guided tour (or detour) for the student, including exploratory exercises that pinpoint the student's difficulties and subsequent retraining exercises targeted to correct the misunderstanding. The capability to track down the source of misunderstanding, taken together with the ET's potential ability to share student records anonymously with author or publisher, allows student performance to be monitored for signs of problem areas in which the ET can be improved.

Informed choice is the most significant dimension of active content. Halls of Informed Choice show various routes availability and various options to choose among, and each hall can include a small bit of learning that gives perspective on the knowledge being acquired. For example, if the student is offered the option to pause and complete a set of exercises that will test skills before proceeding, the choice can be presented as "test skills now or go on to learn the next skill before testing." Skills that have been recently learned can be listed for possible review or testing, and the student can be offered an optional preview of the next skill. As another example, the student can be offered the choice of going on to the next lesson or seeing another use of the skills in the present lesson before proceeding. Options can be made available for previewing before a choice is made. As another example, a student might be offered this possibility: "Now that you have learned this, you are ready to learn something that is cool and useful, but before you get there you'll need to learn another thing which may not be as much fun. Would you like to learn that other thing now so as to get to the cool skill that follows?"

Math Instruction Oriented Toward Understanding Rather than Procedure

Almost all of us are familiar with the repetitive exercises used in teaching math in the early grades. We learn to count and we learn the digits in order, and then when we have assembled a list of numbers in our memory, we learn to add and subtract which amounts to mentally moving up and down that list. Later we learn the multiplication tables and learn division as well, learning workable procedures by frequent repetition. All of this is accomplished by repetitive practice or "rote learning." All this practice can develop our powers of concentration, teach us patience and discipline our thought process. However, it is not clear that rote learning is the best way to learn math. Later on in K-12 math we will learn to solve problems of substantial complexity by using "cookbook" procedures. We are further developing our thought process, which is good, and learning to proceed patiently through a series of steps to achieve a result, but again it is not clear that applying these cookbook procedures is the best way to understand the mathematical principles that we are learning. What would understanding-oriented instruction be like? There are now and have been many good examples of this over the years, so for the present it seems better to indicate some aspects that will be implemented in the K-5 math textbook.

Understanding-oriented instruction develops and relies on such things as intuitive understanding, insight into the uses of math, practical applications and manipulation for hand/eye coordination. For students to appreciate math, it is also important for them to learn to comprehend the purity of abstract mathematical operations, on the one hand, and the ambiguities of mapping these pure abstractions into the physical world, on the other. Here are brief descriptions of several routes to understanding: In various embodiments, the fundamental route to understanding is to make use of what you have learned and develop practical skill by learning through experience.

A basic route to understanding and insight is to explore ambiguity: for example, suppose that you start with four similar objects and cut two of them in half? Do you now have six objects or do you still have four or do you only have two? If numbering refers to the number of pieces, you now have six. If numbering refers to the amount of material in the objects, you still have four. If numbering refers to perfect original objects, since two have been spoiled by cutting them in half, you only have two. The answer depends on the intent of the questioner, and by understanding how different intents lead to different answers, we learn more about numbers and mathematics.

Another basic route to understanding and insight is to learn two different approaches that accomplish the same purpose. In math, one approach can be used to solve the problem and the second approach can be used to check the work.

Another basic route to understanding is experiments. Even in the earliest grades, problems like "Find three numbers that when multiplied together make 42," which are solved by trial and error, encourage a student to be curious about how numbers work. Simple exercises like this may teach some students more about multiplication than reviewing the multiplication tables. A more interesting experiment for the third grade is presented at the end of this section.

Another basic route to understanding is to juxtapose the general and the specific. For example, if you are going to add and subtract several times in succession, can you do the operations in any order? Yes. Why? Because this corresponds to putting things in and taking them out of a pile, and the pile will be the same in the end. Can you perform a series of multiplications and divisions in any order? Yes. Why? It can be done in any order because multiplication and division make the pile proportionately bigger and smaller, and when all of the proportional adjustments are finished the pile will be the same size regardless of the order. However, note that various orders of multiplication and division may generate different fractions as intermediate answers along the way. While that is easily handled in math, when working with a physical pile, sometimes you may have to cut a piece apart in order to take out the right fraction: the order influences how much cutting apart you need to do. So now you see that you can do addition and subtraction in any order, and you can do multiplication and division in any order. Any questions? Can you mix between these two pairs in any order? No. Well then, are these two pairs—addition and subtraction, on the one hand, and multiplication and division, on the other—similar to one another? Yes, very similar: multiplication and division are the same as adding and subtracting, except that it is logarithms that are added and subtracted rather than the numbers themselves. That is how a slide-rule works, though few examples are found these days. Another basic route to understanding employs analogy or comparing and contrasting. An analogy between two things allows each to be better appreciated. For example, adding and subtracting numbers are like moving to the right and to the left on the horizontal axis of a graph. Comparing and contrasting two things allows each to be understood from the perspective of the other. For example, subtract 1 from 2 means the same thing as 2-1, but when we want to understand negative numbers, 2-1 more clearly shows that subtracting 1 from 2 is adding the negative number −1 to 2.

Another basic route to understanding and insight consists in representing the same material both visually and verbally in various formats such as images, written words, spoken words, diagrams, and physical manipulations.

Another basic route to understanding and insight derives from hand/eye coordination. Much of our intuition derives from coordination of physical movements with visual experience.

Several of these routes to understanding are combined in the following active-graphic project: In the prototype K-5 math textbook we introduce a small device that can be simulated as an active graphic and also produced in physical form for children to use like an educational toy. The device allows the user to demonstrate math concepts with rolling balls that are fenced in when appropriate. It consists of a small working area with fences around it and movable fences that can be placed inside. The working area is sized for twelve balls on the vertical axis and ten balls on the horizontal axis. In the toy, the working area lies flat on a table, and the working area slopes gently upwards away from the user in the "12" dimension so that marbles readily roll down toward the user, and slopes somewhat less steeply to the left, so that marbles also tend to roll to the lower left corner. Ordinarily labels for the digits 1-9 are placed below the first nine positions in the bottom row, beginning from the left, either on the bottom fence or on the flat surface outside it, and the same labels are placed on the first nine positions on the left edge of the device beginning in the bottom left corner.

The idea is to rely on gravity—real in the physical toy and emulated in the graphic—to move the balls into instructive configurations, and to have the child supplement this natural movement by moving the balls to perfect their positions—physically or by dragging on the screen. This one device is frequently used for insight demonstrations in the K-5 curriculum, so that users become familiar with it and develop an instinctive physical intuition about numbers and mathematics. The hope is that the device will help with understanding and become particularly valuable for students who might otherwise be challenged by innumeracy. In this description the balls will be referred to as "marbles," but in some applications the balls might be substantially larger.

Here are some examples of how the device can be used:

(a) The numbers one through nine can be explained by dropping nine marbles into the upper right corner of the field one by one. Each one will progressively fill the bottom row to the point where the corresponding digit is placed.

(b) Then the concept of ten is explained by filling the ten-space-long bottom row entirely, and illustrated by placing the label 10 at the end of the bottom row, on the right hand edge outside the fence. In the FIG. 10, the one at the beginning means one row of ten, and the zero that follows means that the row is counted as ten rather than as a count of ones.

(c) Adding additional marbles progressively explains the numbers from 11 to 99. Then the number 100 is explained by filling the layer completely, and explaining as in (b) above. Later on, using the same diagram, the concept of squaring a number can be explained by the fact that the square array, ten by ten makes one hundred.

(d) The usefulness of numbers can be intuitively grasped by just dumping a bunch of marbles inside the fences and seeing them informally count themselves as the force of gravity settles the marbles toward the lower row and more weakly toward the leftmost "one" column. (Normally, the user will need to adjust the positions of a few marbles to perfect the count, and performing this task helps to reinforce the physical intuition.) This exercise also explains that numbers measure exactly what we intuitively understand as quantity (many or few), and that conversely, we can use our intuitive sense of quantity to approximate number. Students using the physical toy can be encouraged to first weigh the marbles in their hand, and guess how many there are, before dropping them into the upper right hand corner so they will be counted.

Students using the graphic can estimate the number that are visible on the screen with a quick glance before introducing them into the work area.

(e) Continuing from (c) above, when a fence is placed horizontally above the tenth row, and still more marbles are placed in the appropriate way to begin a second layer on top of the first, numbers greater than 100 are treated in the same way as before.

(f) With four small fences, each two marbles long and two marbles high, binary numbers can be explained in the same fashion and the concept of squaring and cubing a number can be explained intuitively, since the fences make a cube.

(g) Addition can be explained by first dropping in marbles of one color, up to the first number to be added, and then separately marbles of another color up to the second number to be added, and then once the two counts of marbles have been verified, dropping the two groups into the frame one group at a time, to show the answer and show how the two numbers contribute to it. (Then the marbles can all be dropped in at the same time to show how the marbles from two original sets get mixed up and become indistinguishable in the answer. This is an instance of ambiguity: if we care about the colors, then mixing the marbles by adding them up goes against our concern for their differences.)

(h) Multiplication can be explained for any number up to 10 and any other number up to 12 by moving the right fence to the smaller position and then filling in the space between the left and right fence up to the larger position. The concept of squaring a number can be explained by the squareness of the array when a number is multiplied times itself.

(i) Division can be explained, when the divisor is no more than ten by moving the fence to the position of the divisor, and then dropping in the number of marbles to be divided: the number of full rows is the whole number in the answer, and the marbles left over are the fractional remainder.

G) Perfect division is achieved when the remainder is zero. This allows the idea of a prime number to be easily explained: For any number less than 25, drop in that number of marbles and move the fence back one by one from ten to two, to see if at any point there is no remainder in the top row. If there is no remainder, a perfect divisor has been found; if no case occurs then there is no perfect divisor greater than one and the number is prime.

(k) Fractions that are less than one can be intuitively explained by moving the right fence to the position of the denominator, and then placing that quantity of marbles on the first row in one color to fill the bottom row, and then placing marbles of another color in the quantity of the numerator on the row above, and visually comparing the proportional sizes of top and bottom.

(l) Fractions that are greater than one can be reduced by following the same procedure, and then noticing that each filled row from the numerator corresponds to one unit of the denominator, so that there are as many instances of the denominator as filled rows and what remains has been reduced to a fraction less than one.

(m) Following this same procedure, fractions in which numerator and denominator have a common divisor that can be canceled out to reduce them, can be explained by moving the fence to the position corresponding to that common divisor, and noticing that the denominator below and the numerator above both correspond to an exact number of rows, so the ratio of the two remains the same when all columns except the first are removed.

(n) The device can also be used to present understanding-oriented exercises such as checking one's work with a second approach, explaining ambiguities, experimenting and the like. Here is one example suitable for the average track in the third grade, where it helps to address several Common Core State Standards. This example can also be introduced progressively in earlier grades as an advanced exercise. This demonstration elegantly demonstrates the subtle logic of mathematics, and it also creates an attractive pattern in the work area: Put a marble of one color in the lower left corner. This represents 1×1=1, or !-squared. Now put a border of three marbles in another color to fill in around I-squared and make 2×2=4, or 2-squared. Now put in a border of five marbles to fill in around 2-squared to make 3×3=9, or 3-squared. Continue to fill in borders for the squares of numbers 4, 5, 6, 7, 8, 9 and 10, in each case using a different color than before. To make the work area more attractive, alternate colors in a regular way: for example if there are four colors of marbles, choose an order such as red, green, blue, yellow and repeat that until reaching ten. Now count up the marbles that comprise each square. For example, there are four marbles in 2-squared, and 49 marbles in 7-squared. Now, to check your work, count up the marbles in each border, for example 3 in the border that fills in 2-squared, and 13 in the border that fills in 7-squared, and then add up the counts of the borders successively to confirm the same answers. The experiment is almost finished! Do you see an important pattern in the numbers of marbles in the borders? What is that pattern? Can you explain it? Answer: beginning with the single marble for 1, the border counts are the odd digits from 1 to 19. The pattern can be explained verbally, and as will be explained somewhat later in the K-12 program, it corresponds to the equation (x+1)-squared=x-squared plus 2x+1: the border count for each squared number is twice the previous number plus one, or equivalently, twice the present number minus one.

Figure 17:
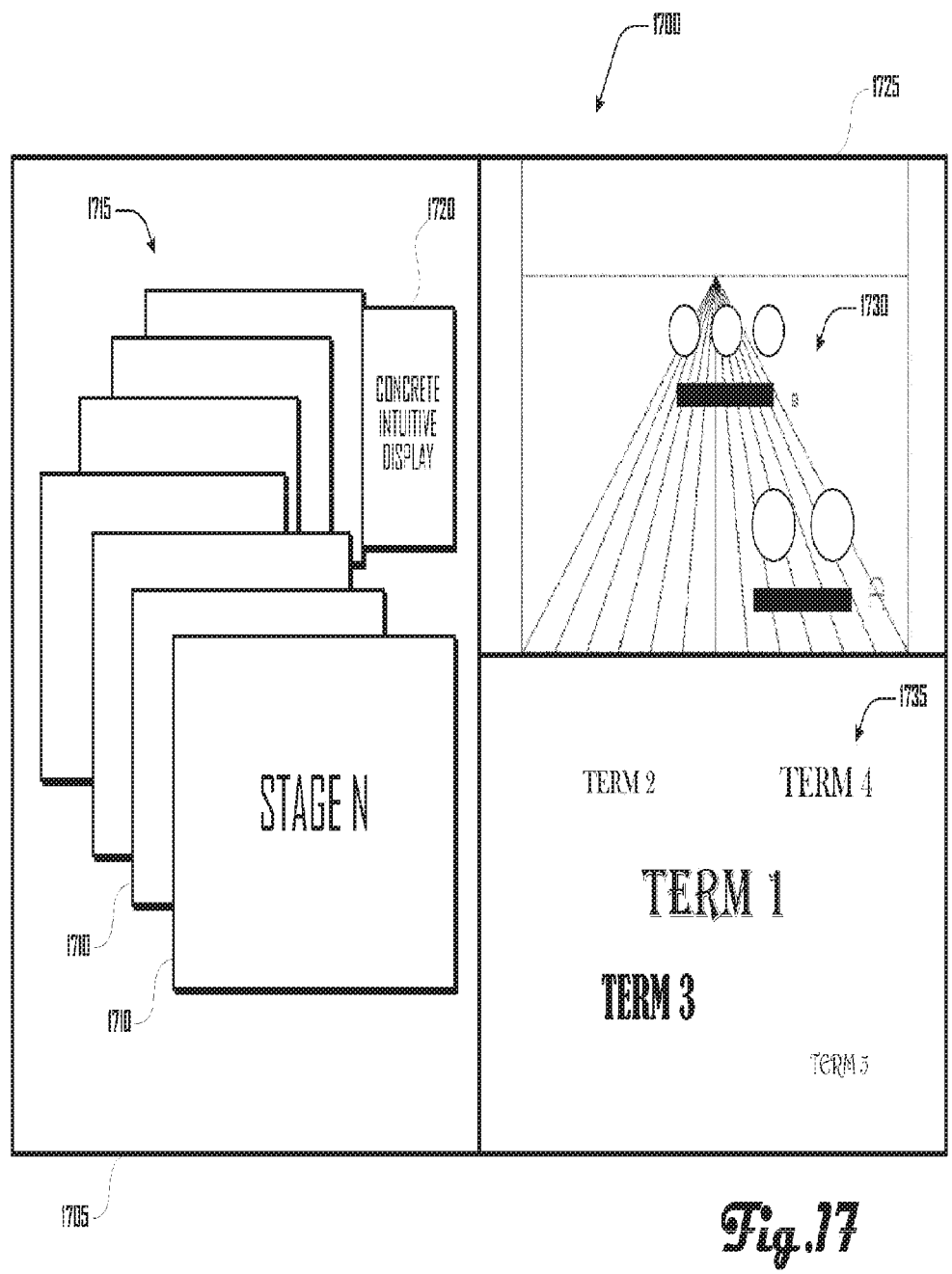
FIG. 17 illustrates an informed choice path and knowledge garden device pair m accordance with one embodiment.

As discussed above, relevant expositions can be simulated as an active graphic depicting marbles moving under the force of gravity, and either a snapshot photo or a video can serve to display each demonstration. FIG. 17 illustrates an example presentation 1700, which comprises a half-page-wide vertical panel 1705 having series of stages 1710 in the path-ahead 1715 for a math student one above another as if extending into the distance. On the right and adjacent to some of these stages 1710 but not all, there can be corresponding optional concrete, intuitive display 1720.

In an upper right panel 1725, a family of Overlay Supplements 1730 as discussed herein can be presented. This panel is one example of a knowledge garden, with a network of paths on each of several layers, each offering a different perspective on a knowledge base, and all visible from a higher perspective on the knowledge as a whole.

The panel in the lower right hand corner of the page can explain the glossary in the form of a crowd of terms 1735 with labels bobbing up and down, as explained in the paragraph having the heading "Stages on a Path and Optional Features" above. This presentation of a glossary can itself be a knowledge garden, with the terms 1735 arranged so that the most relevant ones are the most interesting or most apparent.

While these three example fields 1705, 1725, 1735 focus on knowledge garden, each one also involves informed-choice paths, respectively the average path with informed-choice options to make a side trip to the active-graphic; the family of overlay supplements, each an informed-choice guide to the knowledge base; and the informed-choice paths that lead to the glossary from the student's prior location and carry on through it to responses and further paths tailored to the student's current situation, as explained in paragraph having the header "How do you determine logical nexuses?" Accordingly, FIG. 17 illustrates example embodiments of the device pair of informed-choice paths and knowledge garden.

An Illustration: Presenting a Culture

This application deploys Informed-Choice Paths and Knowledge Garden in a mainstream, informative publication that might be distributed as an electronic book or website or both. The emphasis is on users' free choice of paths, in sharp contrast to the compulsory progression in a textbook.

The salient features of this application are, first, intrinsic complexity with many interrelated factors; second, diverse facets that derive from the complexity and characterize it in interesting ways; third, presentations concerning these diverse facets that demonstrate the author's contribution; and fourth, potentially interesting roots of this contribution that reach into the intrinsic complexity. Many publications and bodies of documentation share these features, such as technical documentation; manuals and guidebooks of various sorts; materials relating to the social and biological sciences, medicine and therapy; and many other expression of human systems and creations.

To illustrate, suppose that you are presenting a culture. It might be a national culture or the culture in a community. It might be a professional culture or a religious way of life. It might be an ideal culture, something to aspire to. In any case, suppose that your users are people from that culture and other people who interact with people from the culture, or who want to understand the culture or hope to join it. How would you lay out the information and present it?

At the heart of any culture is a mode of experiencing life and enacting the culture. Different people play different roles, but they share this common mode of interacting. The reasons why this mode makes sense to people in the culture—the logic of these ways of interacting—has many, many facets that are mutually interdependent. As a result, there is a great deal of complexity to communicate. If you try to cover this comprehensively in a book, potential readers may be daunted by the complexity. On the other hand, if you compose a shallow treatment that emphasizes anecdotes about people's ways of interacting and their personal priorities, much of the value in the publication will be lost.

Informed-Choice Paths and Knowledge Garden offer a straightforward method for addressing this challenge. Let the entertaining anecdotes be your gateways. Users will come because of the appeal of the anecdotes. Perhaps a user will be particularly interested in one gateway, because of having already experienced something similar. Your first job as author is to satisfy the user with your treatment of the anecdote. Your second job is to offer the user an appealing perspective that will invite the user to delve deeper into your knowledge garden. You already know a little about the user: the user has been attracted to that anecdote and has responded positively to your treatment by showing enough interest to consider exploring further. Now you can offer the user a range of attractive optional links from which to choose. The choice the interested user makes will give you one more bit of information, an additional clue to how best to lay out the user's subsequent path.

Perhaps you next offer the user a selection of other anecdotes akin to the first. Or you may offer a gallery showing all the anecdotes so the user can consider them all. You learn more about the user's interests from the selections that are made. Moving around the periphery of your material to view your treatment of the anecdotes, the user is also learning more about your work. At some point you can offer the user a chance for a dialogue about possible benefits from your book or site. Based on what you learn from the dialogue, you offer the user an Informed-Choice Path through the medium depth material: In this second phase, the user will see anecdotes presented in greater depth and accompanied by discussion of the culture's qualities. This Informed-Choice Path can be structured to lightly present your systematic message. At this level, the user sees options from time to time to explore topics closer to the complex heart of the culture—the logic of its interactions. Selecting such an option would take the user into the realm of interdependent complexity for the first time.

When your material is offered in this way, users discover their own ideal version of your material by following their own interests and letting you know what those interests are. Some users will reach the heart of your presentation in their individual ways, and thereby benefit from your treatment of its complexity, while others will be content to remain at the periphery or venture to medium depth.

Making a Knowledge Garden with Tabular Grid & Display Field

Display Field and Tabular Grid:

The overlay builder 56 uses the display field 60 and the tabular grid 61 to construct the electronic textbook 5 or overlay 41, and to incorporate the features, halls, logic views, nexuses, connectors and other aspects discussed above. The display field 60 and tabular grid 61 respectively reflect the visual and verbal workspaces, working together to facilitate the author's creative efforts.

Display Field:

The display field 60 is the visual graphics workspace for the overlay builder 56. The same basic framework of the display area 60 is also used for the display of large-scale perspective displays of the content for readers, for example when the reader wants to get a perspective view of the entire textbook or overlay, or large portions of it.

Benefits of Laying Out Concepts Visually:

The overlay builder 56 allows you to display many aspects of conceptual thought visually. This capability has at least five significant benefits: prompting memory; aids in sharing your thoughts and cooperating with a team; offering perspectives that help you to notice errors and omissions; fostering creativity; and facilitating more effective thought.

Preparing Depictions:

The display field 60 can show perspective displays for a work in progress or a finished textbook or overlay. The display 60 can be initialized from the Non-linear Outline of the site, and edited or reshaped in any way as appropriate. The elements (e.g. nodes, connections, etc.) in the display can be moved around to new positions. The templates for the perspectives actually used in the published document will be laid out here in the process of development. Any given depiction of the elements of the textbook or overlay can be modeled in the display field 60 and then saved as a perspective. This is also a home page for editorial work. New features can be created, new connections added, paths created and extended and so forth. Features and connections can be edited. Halls of informed choice can be defined and edited. In the display field 60, positioning of the various elements is important. Appropriate position is an aid to productive thought. Positions can be determined by mathematical algorithms or assigned by the author's judgment.

Positioning Algorithms:

Mathematical algorithms can arrange the nodes to as to minimize crowding of nodes and crisscrossing of connections. When the perspective centers around a specific location or path, the algorithms rely on distance from the center or centerline to develop an attractive layout. When the author has assigned significance levels to layer the nodes and connections, or has assigned any other kinds of layering, the algorithms take account of layering so that each layer is efficiently depicted. The algorithms are also very useful when adjusting the positioning after new nodes and connections have been added, nodes and connections have been removed, or the author has moved some nodes and connections manually. Algorithms also serve to "seed" a creative display field with raw material according to some existing structure, before the author begins a creative project.

Positioning by the Author:

The author can select the positions of nodes and connections for purposes of creativity and communication. In creative exercises described below such as the dwordle, drawing with meanings and visual logic, apparently random subliminal selection of positions helps the author to coordinate verbal and visual analysis. Communication of the underlying relationships among nodes is highly enhanced by positioning them in accord with their interrelations. We are familiar with positioning nodes in the two aspects of sequence and significance level in a linear outline, or laying them out in two dimensions in a diagram. The same principles apply here where linear outline and diagram combine in a non-linear outline.

Display Options:

Ordinarily the visual display field 60 shows features and connections between them in graphic form as nodes and connections. To encourage creativity, existing structure can be optionally hidden, or merely hinted at through color coding or spatial proximity. The primary display field 60 shows the global view of all nodes and all connections that are not path-dependent. Additional display areas 60 can be brought up for any desired custom display (e.g. of a perspective) and any given path. Most displays for users are also presented by default in the display area 60, and the user thus sees them in the same way that the author does. To further facilitate this, the overlay builder 56 can include the features of the textbook reader 21 or the add-on 40, as discussed above.

Tabular Grid:

The tabular grid 61 is the verbal and numerical workspace for the overlay builder 56. Each node and each connector appears as an entity in the tabular grid 61 and occupies one row of the array. Each column of the array presents an attribute of the nodes and connectors.

Attributes of Nodes and Connectors:

Some attributes apply to both nodes and connectors. For example,
(1) Unique identifying number
(2) Title
(3) Medium (e.g. audio, visual, text, HTML page, interactive graphic etc.)
(4) Type
(5) Link to Brief Abstract
(6) Link to medium
(7) Significance level
(8) Parent relationship to children corresponding to each appearance of the entity in displays and paths.

Other Attributes:

Other attributes apply to nodes or connectors but not both. For example, nodes may have a customized display. Connectors will have a unique directionality and identifying numbers for the nodes they link. In the primary sheet for the tabular grid 61, all nodes and all connectors that are not path-dependent appear as rows in the tabular grid. The grid display is actually a hierarchical tree, with the rows and connectors as the highest level displayed by default. Any row corresponding to a node can be expanded to see all of its appearances in paths and custom displays, which appear as indented rows beneath.

Other Grid Instances:

Additional sheets can also be brought up as additional tabular grids 61 for any path and any custom display. The additional sheet shows only those nodes and connectors that participate in the custom display and/or path.

Joint Roles of Visual Display Field and Tabular Grid:

We now turn to a discussion of the uses of the visual display 60 and the tabular grid 61 in conjunction, to demonstrate their joint roles as core elements in the overlay builder 56.

Early Stages of Developing Materials:

In the example below, the author makes use of the following elements in an intermediate stage of developing material for an electronic textbook:
(1) the primary display field 60
(2) the primary tabular grid 61
(3) an additional tabular grid 61 workspace to handle irregularities in speech recognition
(4) an additional display area 60 with a structural display of the project matrix
(5) an additional display area 60 with a linear outline of topics
(6) an additional display area 60 with a dwordle
(7) an additional tabular grid 61 for topics
(8) an additional tabular grid 61 for connectors Planning an Electronic Textbook:

Suppose that an author is composing an electronic textbook that offers text and image material for remedial, average, and advanced levels for a second grade mathematics class. The author also plans to include interactive graphics that offer more intuitive explanations of the topics. Consequently there are four "flavors" in the project: remedial, average, advanced and intuitive. The author is tentatively planning to cover about sixty topics, which might require up to 240 features if different features were provided for every flavor of topic. The author plans that the total will be substantially less, closer to 170, because for some topics one feature will serve both advanced and average, and for others one feature will serve for both remedial and average, and also because some interactive graphics features naturally handle more than one topic and present the logical connections between topics most clearly when topics are treated together in a single feature.

Importing Draft Materials Using the Tabular Grid:

The author has already used a word processor to create drafts of text for 80 features and a desktop publishing tool to create text and images for 40 more features. The author has also created 12 interactive graphic features that collectively present about forty topics. In addition, the author has 8 audio recording features that introduce and summarize eight sections of the subject matter. The author is now beginning to develop the electronic textbook.

The first step is to keyboard or import into the project database (such as the digital library 64 discussed above) the identifying information for these features: title, brief abstract, medium and type. All the titles, and some of the abstracts are pasted in from tables where they have been assembled. Media are straightforward and quickly specified. All are of type "feature". The links to the media are pasted in at the same time. All of this work is done in the tabular grid 61.

Overlay Outline & Concordance with Contexts

The device pair comprising Overlay Outline and Concordance with Contexts generalizes the linear table of contents and index in a traditional book. The overlay takes a top-down approach, while the set of contexts for concordance constructs is a bottom-up mapping of the material. Top-down and bottom-up meet in a creative region of interwoven threads. The interweaving of outline with concordance contexts illuminates the texture of the material and offers an imaginative approach for large projects. This device pair is suitable for exploring and elucidating structure in a project of any size, and becomes increasingly essential as scale increases.

Overlay Outline is also referred to as a "Non-linear Outline." It is a generalized multi-level outline for textual material that is non-linear and provides for cross-connections between different branches, categorization along multiple dimensions and incorporation of multiple outlines. Concordance with Contexts begins with a concordance of significant terms or other constructs in the material, and establishes a context for each based on usages throughout the material. Overlay Outline is a network of connectors among nodes that are pegged to the material from above, and Concordance with Contexts is a network of threads, hub and spokes and sometimes scenes within the material, that reaches up to take in terms in the Overlay Outline. Both Overlay Outline and Concordance with Contexts are layered displays with material as the bottom layer: in the usual case where the material is the same or similar for both, the two devices can be brought together as distinct layered overlays above the common material. An important tool, the Interweaver, functions in this setting and provides creative scope for exploring the material and developing structure that takes into account both Overlay Outline and Concordance Contexts. The newly developed structure shares the space of the Overlay Outline.

Background: Table of Contents, Footnotes, Index and Glossary

Traditionally, a table of contents gave a top-down overview of topics covered and the order of presentation, while an index in alphabetical order gave a bottom-up list of important terms and their significant usages. Both provided page numbers as navigation aids. The various passages that were referred to in a term's index entry provided a context for the term. A traditional Glossary offered a selected list of key terms along with definitions.

The table of contents has now been extended to a multi-level outline, and indexes have been supplemented and largely supplanted by searchable text. Traditionally, cross-references between related elements in a publication were provided by parenthetical remarks in the text, footnotes or endnotes, or in index entries. Many of these notations presented "interconnects" between topics in different sections or referred the reader to a glossary. Now interconnects can be offered more efficiently through hyperlinks.

Search tools and hyperlinks make material more useful and accessible. We now use these to find things and to explore context. Although the search process can be cumbersome, frustrating or confusing, we frequently find what we're looking for, and along the way we sometimes discover unexpected things.

Reinvention: Overlay Outline and Concordance with Contexts

Linear outline becomes a non-linear, multi-level Overlay Outline, which preserves the useful functions of a linear outline in a more general structure suited for collections of related material. The traditional selective list of index terms is replaced by a concordance: a full concordance comprising all elements, or a more focused list built around a glossary and other key elements. The traditional list of page-numbers is replaced with hyperlinks to key usages, which are assimilated in a bottom-up context for each element.

Top-down non-linear outline, and bottom-up concordance with context can be interwoven. Top-down and bottom-up meet together in a middle tier, a creative region where traditionally separated forms of information are juxtaposed. The elements in this region can share general markers for importance, relevance, nature of relationship, complexity and any other desired attributes. The user can navigate through the joint structures, sometimes traversing the non-linear outline and sometimes navigating among nodes and scenes by quantified intensity of relationship.

Content and content-headings, and also relationships and relationship-headings can be searchable, and context can be built up by quantifying degree of relationship and by explicitly defining bottom-up and intermediate "scenes." Everything, including scenes, can be searchable and sharable. User paths can be recorded and evaluated for the benefit of user communities.

Pairing Overlay Outline and Concordance with Contexts

The paragraphs below having the header of "Speedy Content Development" describe the benefits of combining top-down and bottom-up perspectives when developing content.

Pairing Overlay Outline and Concordance with Contexts provide for three tiers, which may each extend over multiple layers: the upper tier is top-down, an overlay outline; the middle tier consists of various interconnects; and the lower tier is a concordance, which may be either selective or comprehensive, that is extended upwards by "contexts" for significant terms. Contexts include both threads and scenes: threads are connections to instances of and references to the term that occur in the upper and middle tier, as well as elsewhere in the lower tier. Scenes are significant usages of the term in its various connotations and with various associations.

Concordance with Contexts is closely analogous to an active dictionary for the material in the project: the parallel is so close that it may sometimes make sense to extend the Concordance with a mapping to an actual dictionary, presented on a lower layer.

The Overlay Outline offers an overall map of the material, while contexts for significant constructs from the concordance are mapped to usages of key constructs in the material. These maps can be compared and analyzed. If the material has been thoughtfully organized, and the Overlay Outline has been carefully prepared, the overall map and the maps of usages of key terms and passages will show important similarities. Each outline section has both a header and a text: the text in each section can be characterized by significant constructs (ordinarily terms and passages) that appear more often within it than elsewhere in the material. Section headers generally use terms that appear again in the text of the section, and some of these will probably be characteristic constructs within the section. Sections linked by cross-references share similar characteristic terms, and sections that share characteristic terms are generally related. Consequently, correspondences between the topics of the Overall Outline and characteristic constructs will link topics to key usages, and other interesting patterns may emerge.

An author originally preparing a publication can use this device pair as an aid to composition. The Overlay Outline is the author's top-down view of the material being prepared, while the author's delineation of key terms and passages, which may optionally be embodied in a glossary of terms and/or a collection of important scenes in the material, determines the concordance; and the interweaving of Overlay Outline with Concordance with Contexts offers a rich presentation of the outline's consistency with the material. At any suitable point, an alternate concordance using all terms can be analyzed to see if significant terms have been missed.

A commentator or annotator preparing an Overlay Outline for existing material can begin the Overlay Outline with a list of titled sections, e.g. Chapters and Sections within chapters; begin the list of key terms and aliases with entries in an existing index and/or glossary; and begin the cross-reference links with cross-references found in the index and in notes. From that point forward, the work can continue in the device pair, editing in changes to the Overlay Outline, and modifying the lists of Concordance constructs, glossary definitions and aliases as the work proceeds.

An analyst or translator studying the material in depth can use the resources just mentioned while emphasizing Concordance with Contexts, beginning with a complete concordance and proceeding through the terms in the concordance one by one, developing an analysis of multiple meanings where necessary and assigning definitions and/or translations as required. When it is helpful to prioritize terms by significance and focus on key terms, it may also be helpful to emphasize key scenes that exemplify usages of key terms and/or in which multiple key terms appear. When a term has multiple applications or meanings, the user can partition the context into sub-contexts manually: a representative usage of each sub-context becomes its "root scene," and the various semantic usages are assigned to the appropriate sub-context. In some forms of presentation, significant scenes are displayed along with the Overlay Outline as illustrative contexts that epitomize the material.

A broader effort linking material from multiple sources written by a single author raises different challenges because diverse topics and purposes may be involved. It may be appropriate to establish multiple Overlay Outlines, arranged within the comprehensive outline as different layers, each of which concerns a coherent subset of topics and/or purposes that make up a body of work. As distinctions among the Overlay Outlines are refined, each characteristic construct and scene can be associated with the body or bodies of work in which it is predominantly applied.

A translation project involving multiple authors reaps further benefits from the development of Overlay Outline, characteristic constructs, key scenes, and Concordance with Contexts because the editorial work can be readily partitioned by characteristic construct and the outcomes of the common effort are clearly demonstrated in the scene translations that result. It makes sense to reach consensus first on key terms and key scenes before proceeding with the translation effort as a whole.

A collective effort translating a body of material that derives from multiple authors can be considered the ultimate capability of this device pair. This is illustrated by the "Systematic Translation of Religious Literature" application presented below.

Overlay Outline

Overlay Outline is a generalized multi-level outline for textual material that is non-linear and allows for cross-connections between different branches and accommodates categorization along more than one dimension and juxtaposition of diverse outlines. It serves the same purposes as a traditional outline and extends the outline's functionality. Like a traditional outline, it provides a multi-level mapping of content, an overall perspective from the top down. No longer limited by the traditional tree-structure, it can readily disclose further complexities. For example, it naturally handles material that is structured like an array, with content arranged on more than one axis. It can disclose connections that extend between branches of a traditional outline. It can offer different perspectives on the same material. No longer limited by the linear path from beginning to end, it can offer specialized gateways and customized sequences for diverse individual applications.

The paragraph below having the heading "The Non-Linear Outline Blends Language and Diagram" explains the value of blending language and diagram in the non-linear outline. Paragraphs above having the header "Functions of Display Field and Tabular Grid Serving both User and Author" explain how the Overlay Outline in multiple layers is useful for readers as well as for the author. Paragraphs above having the header "Display at Various Levels of Detail: Assigning Outline Levels," "Other Layers: Expressed and Hidden Arguments," and "Assigning Layers to Paths in the Electronic Textbook" explain the use of outline levels in the Overlay Outline, and describe how these are displayed as layers and how the overlay outline is capable of displaying only the higher outline levels at or above a chosen level. The paragraph above having the header "Overlay Tools" explains some aspects of editing an Overlay Outline and describes some of the editing tools that are available. Paragraphs above having the headers "Preparing Depictions," "Positioning algorithms," and "Positioning by the Author" describe methods for positioning nodes in the Overlay Outline as well as in the material below.

Concordance with Contexts

The concordance is the list of constructs—terms, passages, objects or blocks of text. Each construct can be accompanied by a definition, links to aliases, and links to important usages. The links from each construct to its key usages extend through the text like spokes from the glossary description which serves as the hub. Other connections that trace the continuity of mentions of a construct stretch through the material like threads. Concordance with Contexts can provide this range of information for key terms selected for their significance, delineating and displaying the instances of key terms dispersed throughout the text. The list of key terms and selection of most significant usages can be constructed by an editor, with the aid of an algorithm that locates promising passages and presents them for approval. When appropriate, the coverage can be readily extended to any other terms of interest requested by a user.

In Concordance with Contexts, the concordance does not need to be limited to words or terms. Scenes and important passages of all kinds can become the hubs for contexts. Concordance with Contexts can present the heart of each outline section by erecting a bottom-up structure of actual usages and key scenes that display the selected material in its original form. Spokes that extend upward from the concordance combine with threads that trace usages, creating a bottom-up mapping or pattern of connectivity for key terms or any terms. Bottom-up threads combine to reinforce one another, offering a bottom-up version of the material's structure that may conform with or diverge from the overlay outline. In one embodiment, the electronic textbook user employs a glossary to find the meaning of a term, and then uses the display field to view selected highlighted instances of the term sought.

Creating a Concordance of Words and Phrases:

Upon request, the overlay builder 56 assembles a comprehensive concordance of all words and phrases in the features, with an associated database of all instances of each word or phrase used. Since transcriptions have not been provided for the audio recordings, the overlay builder 56 uses voice recognition to transcribe them, and a second tabular grid 61 worksheet is brought up to present queries arising from ambiguities in the transcription. In an embodiment, the word-recognition algorithm prioritizes its interpretations to emphasize terms already included in the concordance. The rows of the tabular grid contain successive segments from the transcription, and the author can either view only those segments containing highlighted queries or alternatively all segments in order, with the ability to step automatically from one query row to the next.

A concordance can generalize to a "list of all" that can extend beyond words to passages, images, diverse media, texts, authors, and all kinds of elements in a project. A concordance can have layers: for example, a list of webpages could generate a concordance of page titles and keywords, a concordance of the pages' web-links, a list of their references, and a list of the terms appearing on them. Each of these four categories generates a set of threads interconnecting the pages, and each can be represented as one layer in a multi-layer diagram of the connectivity among the pages.

Contexts for Terms and Passages: Threads, Scenes, and Hub and Spokes

A thread that tracks the various appearances of a term links those passages together into context. More broadly, a context maps the range over which a particular idea or unit of knowledge applies. Just as a node on a high outline level is the base for a branching network of outline nodes on lower levels, a context is often an assembly of more specific nested contexts. The forms of context considered here are threads, scenes, and hubs with spokes.

Threads connect related usages, generally in sequence. Spokes linking usages to a defining hub are important because of the interconnections that they trace. Often the interconnections for various terms intersect in cogent passages that can be thought of as "scenes" because they contain a cohesive cluster of interrelated ideas. Threads, hub and spokes and scenes are examples of contexts, and weave together into larger contexts.

As described in more detail herein, hubs and spokes can comprise glossary displays and instance views. How these functions serve both readers and authors is also further disclosed herein.

Interweaver

The interweaver works with associations, and is designed to integrate all sorts of associations expressed formally in overlays, outlines or tabular data, and/or contextually in scenes, threads and hub and spokes. The interweaver works to calculate strength of association, and becomes more powerful when degrees of importance are assigned to different kinds of association, and degrees of relevance are assigned to individual instances of associations of each kind.

Top-down Overlay Outline links topics. Concordance Contexts thread upwards from below. The two naturally interweave for several reasons. First, Concordance Contexts extend all the way up to incorporate the terminology of the Outline topic names. Second, the individual threads connecting term usages link the textual material subordinated to topics, and the many individual threads for different terms reinforce one another when they travel on common routes to create thread bundles that parallel or cut across outline links. Third, the same passages that are included in the contexts of key terms are often the best definitions of the topics.

Top-down is the more formal, bottom-up the more creative. Top-down provides a systematic overview, while bottom-up preserves the uniqueness of key passages. Bottom-up serves to illuminate top-down, and may call into question aspects of the top-down outline. Top-down helps to model and appreciate bottom-up. Interweaving helps to improve the Overlay Outline and to sharpen contexts. A combined presentation that assimilates the Overlay Outline with scenes and threads linking key passages may be the most effective single summary of the material as a whole.

Display Field and Tabular Grid are Closely Coupled:

By default, primary display field 60 and primary tabular grid 61 are operating in lockstep; in other words they are fully coupled, so that each change made in either one is immediately reflected in the other. As a consequence, the display field 60 now displays icons for 140 features, arrayed in the order they were created. The author chooses to modify a display parameter so that feature titles are displayed in the display field 60, instead of being latently available through tooltips.

Viewing Existing Titles in the Tabular Grid:

Now the author focuses on the titles of the 140 feature icons. This is the first time that the author has seen icons for the four different kinds of media together in a single workspace. The author is aware that some necessary features are still missing, that some features will serve for more than one stream (or path), that most of the intuitive interactive graphics cover more than one topic, and so on, but the full picture has not yet become clear. The author is not yet sure how many topics there should be, and is looking forward to improving clarity.

Opening a Structural "Project Matrix" in a Display Field:

The author sees that it is time to provide structure for these features, decides to go forward with a structured display, and opens another instance of the display field 60 for this purpose, beginning with the same display as in the primary display field 60. This new structured display will be called the Project Matrix. The author defines two new structural attributes for the project: "stream", with values average, advanced, remedial and intuitive; and "topic" with values that will be defined later. The "stream" attribute is used to identify those features that will eventually go into the average, advanced and remedial paths 12, 14, 16, once they are placed in the proper order and connected. Since the author wants a traditional outline for the book, the attribute "topic" is associated with outline levels, which are specified as Title, Part, and Section. Each value of each structural attribute generates a structural node, so that there are now six structural nodes in the second display field 60:

(1) stream, with a parent relationship to its four children:
I. average,
II. advanced,
III. remedial, and
IV. intuitive; and
   (2) topic, a parent which is awaiting the creation of its children.

Laying Out the Columns:

The author positions stream in the upper-left hand corner of the display field 60, and places advanced, average, remedial and intuitive in a row to the right. The author now lasso-selects the row, and chooses the menu option "Attribute order", which assigns this sequence to the four values, and then chooses the menu option "Display as Columns" which sets a display parameter so that instances of each attribute will be grouped vertically in a column beneath its title. Five structural icons have now been positioned across the top of the second display field 60.

Laying Out the Rows:

The author next places Topic in the upper left-hand corner, selects it, and chooses the menu option: "Display as Rows." This causes the display field 60 to expect that values of Topic will be entered below, and it creates a blank space for this purpose. The author decides to create a rectilinear grid in this display field 60, and selects this option from the Top-Level menu for the display field 60. The display field 60 requests the widths of rows and heights of columns, and the author elects to select these by vertically and horizontally stretching or compressing grid heights and widths. Alternatively, height and width could be entered numerically.

Working Spontaneously:

Now the fun starts. The display field 60 is designed to facilitate spontaneous progress, and does not demand an orderly approach. Beginning from chaos-140 features in arbitrary order- and intending to reach about 170 features in perfect order, each exactly suited to its purpose, the author can start anywhere and tidy up whatever needs tidying, moving from point to point as interests and curiosity impel her or him. The author can be confident that the flexibility of the display field 60 will easily assimilate the fruits of this spontaneous approach without causing much extra work.

Assigning Feature A to Both Average and Advanced:

For instance, suppose that yesterday the author worked on a text feature A that is well suited to handle both average and advanced streams for a topic part way through the pat. The author first drags the icon A with that title to the top position in the "Advanced" column, then right clicks on A and selects option "also applies", and then drags the icon A to the "Average" column. Now the icon A extends graphically across both columns in the display field 60. The display field 60 now shows that feature node A has stream attribute "advanced+average". As yet feature A's topic attribute is void.

Creating Topic B which Applies to Feature A:

Considering feature A's title and perhaps reviewing its abstract and text, the author settles on a name B for the topic of feature A, right clicks on the grid rectangle in the topic column at the left of feature A's row, and when the entry widget comes up, types in the name for topic B. As a consequence, (i) the attribute topic now includes a value with that name B, which is a child of the attribute topic; (ii) a structural node B with title topic B is created and positioned in that grid cell; and (iii) the tabular grid 61 now shows the attribute topic B in the row for the feature node A. The author has now created one topic B, assigned topic B to feature A, and assigned feature A to both advanced and average streams.

What Next? Whatever Comes to Mind:

What should the author do next? Respecting the power of subliminal thought, the author should do next whatever comes into her or his mind. For example, the author might repeat this procedure with another text feature that was recently worked on. Alternatively, the author might next focus on the remedial column for Topic B, and scan the titles of the other 139 features, seeing if one of them is a suitable fit. Or the author might choose to find other features that qualify for the advanced stream. Or the author might recall the intuitive interactive graphic C he or she earlier created, that applies to this topic and decide to examine it to see what other topics it contains.

Relationship Display & Dwordle Field

The device pair Relationship Display selectively coupled with Dwordle Field is the creative nexus of the Creative Development Environment (CDE) and Creative Presentation Environment (CPE). These creative capabilities are also available in every display field of other device pairs.

Pairing Relationship Display and Dwordle Field

Relationship Display shows visually how elements are related, and conforms with logical reasoning and scientific analysis of causation. It is a formal graphic display for diagramming relationships, and can operate sequential presentations. Diagrams help us to develop clarity and cope with complexity, and are ideal for communicating ideas that involve interrelated elements. Relationship Display is the tool for perfecting an image of the author's understanding and sharing it with others in creative presentations.

Dwordle Field is the open platform for innovation where ideas develop and relationships among ideas are clarified. It is the creative field for imagining entities and delineating relationships in which a Relationship Display can be developed and enhanced. Paragraphs below having the header "THE DWORDLE" and "Subliminal (Seemingly Random) Selection and Placement" explain that dwordling can bring forth conscious insights that might otherwise arise later or might never take shape at all, and can help in determining relevant points and discerning the connections among them.

Relationship Display and the Dwordle Field are selectively coupled so that a diagram initially present in both closely-coupled fields can be decoupled from Relationship Display, creatively enhanced in the Dwordle Field, and then integrated with the prior version in Relationship Display by aligning or recoupling. Often the best way to further develop a diagram is to temporarily export a stripped down version of the present diagram to the Dwordle Field for creative enhancement.

An author or team developing a knowledge product of some kind can move back and forth between Dwordle Field and Relationship Display, evolving each new round of ideas in the Dwordle Field, transferring the innovations to the Relationship Display and subsequently thinking through their implications and reorganizing the Relationship Display as appropriate before again exporting it to the Dwordle Field for another round. During this alternation between the two devices, the Relationship Display is tidied up until it correctly reflects current understanding, and is then left behind for a session exploring new possibilities, discerning unexpected connections, and revising and extending knowledge in the Dwordle Field.

Coordinating Verbal Analysis with Acute Visual Focus and Wide-Angle Vision

Paragraph below having the header "Visual-Verbal Interchange" explains that visual and verbal analysis are complementary systems, in the sense that each of the two possesses strengths that offset limitations in the other. Consequently, when they are coordinated, the strengths of the two can be combined and the weaknesses can be circumvented.

As discussed in detail herein there are two distinct styles of vision in the human visual field: acute focus 1320 (FIG. 13b) and wide-angle vision 1310 (FIG. 13a). Acute focus 1320 benefits from the dense visual receptors in the fovea and the many nerve fibers that connect the fovea to the visual cortex. Humans naturally focus their eyes more sharply to rely on this central region of the retina when they want greater visual detail or when they want to analyze what they see. With this kind of focus, eye and brain are closely coupled for analytical and decision-making purposes. When we humans are intensely interested in something we naturally use acute focus 1320, and we tend to ignore anything that is outside of our narrow field.

By contrast, wide-angle vision 1310 is relaxed and restful, and makes use of the full extent of the retina to see panoramically and attend to everything in sight. Humans use wide-angle focus 1310 when peripheral vision is important, because peripheral vision requires the outer region of the retina. Wide-angle vision 1310 sees comprehensively and allows us to see things that do not fit into our preconceptions.

Like any good diagram, the Relationship Display coordinates verbal analysis with acute visual focus. We may consciously experience the analysis that results or it may proceed subliminally. Alternatively, we can calmly gaze with wide-angle vision 1310 at the relationship display in its entirety and take it in as a whole.

Paragraphs below having the header "Visual-Verbal Interchange" explain that information from the visual field is conveyed through visual analysis to verbal analysis with great rapidity and precision. Paragraphs below having the header "The Dwordle Completes a Feedback Loop between the Visual Field and Verbal Analysis" explain that to take advantage of the complementarity of these two systems and coordinate them by establishing a feedback loop between them, it is necessary to convey information back from verbal analysis to the visual field. This feedback loop can be provided through spoken words, and drawing and writing offer more direct pathways back to the visual field.

The Dwordle Field encourages wide-angle vision 1310, and the dwordle procedure sustains this feedback loop from subliminal verbal analysis through wide-angle vision 1310 and back to subliminal verbal analysis. As we alternate between working on the Relationship Display and working in the Dwordle Field, the process as a whole coordinates verbal analysis with both visual styles. This is a powerful combination, and its power is magnified as we become familiar with the alternation between Relationship Display and Dwordle field.

There is another effect as well: As we alternate, the shift in visual orientation from Acute Focus 1320 to Wide-Angle Focus 1310 brings with it a shift of emphasis from verbal analysis to deeper and more contemplative subliminal pondering. This second shift reinforces the shift in visual focus, so that the alternation takes us to two quite distinct and complementary modes of mental activity.

Thus Relationship Display and Dwordle Field elicit two different styles of vision that lead to two different mental states: a diagram in the Relationship Display evokes acute-focus vision, activates an intimate connection between visual and verbal analysis, and encourages analytical clarity; projection of a stripped-down display of the diagram into the setting of the Dwordle Field evokes wide-angle vision 1310 and facilitates dwordling, which encourages fruitful contemplation and wide-ranging context.

Relationship Display

Figure 13B:
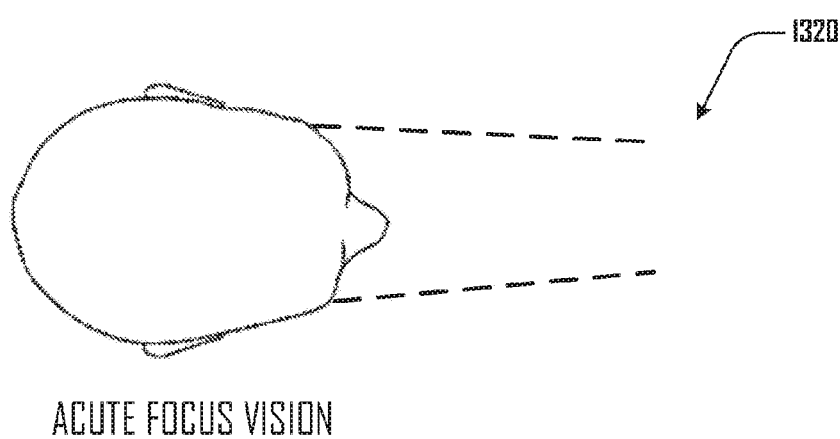
FIG. 13b illustrates an acute focus vision field of a user.

A diagram with labels, legend or caption exploits the alignment of visual and verbal analysis prompted by acute focus 1320 (FIG. 13*b*). The diagram depicts relationships while attached text explains the factors involved. Visual and verbal capabilities of the mind cooperate to bring forth understanding.

The Relationship Display is a sophisticated tool for displaying diagrams by showing both constructs and relationships between them, and giving relationships equal treatment with constructs. It can be used for any kind of relationships among elements. Often it will be used for logical or causal relationship, but it can also be used for relationships that interconnect countries, or people, or organizations. As another example, human thought accommodates associations of many kinds, and Relationship Display can depict thoughts and their associations. One use of Relationship Display is to show a Panorama of all relevant factors in a situation or problem, so that their different interconnections can be visualized.

Logic View is an important example of Relationship Display in which the relationships follow the rules of logical reasoning and causation. Some suitable approaches are presented in in more detail herein.

Sequential Presentation

Relationship Display supports sequential presentation of both relationships (connectors) and constructs (nodes). Sequential presentation is attractive for uses such as displaying logical reasoning and supporting a presentation. We humans well appreciate the unfolding of cause and effect as time passes, and perhaps for that reason, we are especially ready to consider and understand information that is presented sequentially in a logical order. Moreover, material is often remembered in the sequence in which it was presented, even when the order of presentation is not logical. The display can be configured to play through any sequence of nodes and connectors, highlighting each construct on the display while also displaying relevant textual material or other information as appropriate.

Dwordle Field

The Dwordle Field helps us to work creatively with ideas by "drawing with meanings." How can you discover what is already known but not yet consciously apparent? What will you find that is entirely unanticipated and yet ready to spring forth? How do you make a mental space into which subliminal knowledge can be projected? Just as an unfinished drawing invites lines into its white space, subliminally choose and subliminally place your meanings in the dwordle display field, contemplate with wide-angle vision 1310 (FIG. 13*a*), and let new meanings present themselves appropriately.

The Dwordle Field is an instance of a Display Field, and has all the properties of a Display Field. In addition, the Dwordle Field has three key features that are not readily available in an ordinary Display Field: display modes that induce wide-angle vision 1310 and encourage us to relax into deeper awareness and visual responsiveness; selective coupling to a Relationship Display; and tools for opening up space and reorganizing relationship clusters in an existing diagram.

Dwordling

The Dwordling procedure is explained at length below. It is a specialized aid for productive thought that establishes a feedback loop from conceptual thought through wide-angle panoramic vision and back to conceptual thought.

The functions of dwordling are explained in more detail below. In brief, dwordling involves a series of steps: the first aspect is placement of a term (a word or phrase) somewhere on the dwordle field. The term is chosen 'at random' and the position is selected 'randomly.' This process is akin to free association, and is determined subliminally: you are allowing your mind to make a meaningful choice. The choice of term and position is made without conscious control, and so feels 'random', but in fact it reflects subliminal knowledge and brings that knowledge into the field of conscious awareness. The second aspect of each step is to continue to look at the Dwordle Field with wide-angle vision 1310 (FIG. 13*a*): it is best to gaze calmly in this way while the term is being written and afterwards. The third, optional aspect of each step is to receive insights. Insights often arise fully formed, so that there is not much need to think about them. The process can continue, term by term, for as long as the steps are meaningful.

Often the Dwordle Field is populated initially with terms that reflect the present state of knowledge of the project, and dwordling is then applied to extend, enhance and reshape existing material. Once one is accustomed to the process, all the formality fades away and one is simply gazing with wide-angle vision 1310 as new ideas come up subliminally and are placed in the field. It is almost as if eyes and hands are doing the work, without any conscious mental effort other than to continue to gently concentrate on the dwordle. This may seem strange, but relaxation allows it to work reliably. The workings of this subliminal process are described in more detail herein.

Advantages of the Dwordle

When we are studying a page of text or a diagram, or when someone is explaining something verbally, we often jot down notes or draw diagrams or images. Sometimes we also find ourselves making unrelated drawings, seemingly at random. As discussed herein, there is a significance to random jottings, which are called "doodles." A doodle is defined as "an unfocused drawing made while a person's attention is otherwise occupied." Referring to an article in Applied Cognitive Psychology by Jackie Andrade, the Wikipedia article on Doodle states "that doodling can aid a person's memory by expending just enough energy to keep one from daydreaming, which demands a lot of the brain's processing power, as well as from not paying attention. Thus, it acts as a mediator between the spectrum of thinking too much and thinking too little, and helps focus on the current situation."

Doodling relaxes our eyes and may take us into wide-angle vision 1310 (FIG. 13a). It may also protect us from locking into acute focus 1320 (FIG. 13b), and allow us the distraction we need to interrupt the rigid continuity of verbal thought. Thus, a doodle may help us to think more effectively even though its content is irrelevant.

Much greater benefit results when we deliberately set the stage for productive contributions. Instead of random writing or drawing, we divert our energies from linear thought coordinated with acute focus 1320, and instead evoke a feedback loop between wide-angle vision 1310 and verbal analysis. The "dwordle" is our tool for this purpose. The dwordle gives us a second choice: we can work with diagrams that display relationships to maintain a feedback loop between verbal analysis and acute visual focus, or we can use the dwordle to maintain a feedback loop between verbal analysis and wide-angle vision 1310. Relationship display is more informative, and the dwordle is more open and creative, so best results come when the two are used alternately. This can be efficiently achieved by coupling a Relationship Display with a Dwordle Field.

Display Modes that Encourage Wide-Angle Vision

Display modes that encourage wide-angle vision 1310 (FIG. 13a) are a unique feature of the Dwordle Field. The eye has two modes of vision: acute focus 1320 (FIG. 13b), which relies exclusively on the fovea and wide-angle vision 1310, which uses the entire retina. Acute focus 1320 is closely tied in with conceptual analysis and is routinely used for reading and working with written language. Wide-angle vision 1310 is comprehensive and impartial, and is used for "speed reading." Wide-angle vision 1310 is essential for making best use of the Dwordle Field, but since acute focus 1320 is habitual when reading, many users may at first encounter difficulties when relaxing into wide-angle vision 1310 for Dwordling.

A number of display modes that promote wide-angle vision 1310 are offered, and the user chooses among them for best results. For example, the background can show small ripples or the letters can move slightly or change in size like shafts of grain shifting in the wind, or the border of the field can oscillate, or words and phrases can move or pivot slightly around their centers. The outer edges that border the diagram can move or oscillate in intensity. Icon orders and type symbols of icons can be replaced with more gentle indicators associated with the font characters, and fonts may morph to other fonts or oscillate in size. Also highlights can move across the screen diagonally or randomly and show up on the entire screen or just the background or just the letters. All of these are gentle effects, like the waves in a calm lake, just strong enough to awaken comprehensive attention.

All the display modes are graceful, because it is important to avoid anything jarring in order to promote a relaxed gaze. In addition to promoting wide-angle vision 1310, these modes also invite calmness and steady attention. For best results in dwordling, the user should experience calmness, alert interest and heartfelt warmth, as if at home in a friendly place. Relaxed calmness accompanied by lightly focused concentration is important because the subliminal process that brings forth the dwordle meanings relies on deeper awareness and more relaxed pondering than may ordinarily be available.

Wide-angle vision 1310 is able to register, spatially organize, and juxtapose many distinct objects, whether they be words or images. Once we settle into calmness, wide-angle vision 1310 is much better suited to handle complexity than conscious verbal thought, which proceeds linearly and emphasizes one relationship at a time. By combining both we can overcome limitations on our ability to work with complex problems.

Selective Decoupling and Coupling

"Selective Coupling" means that different displays are sometimes coupled and sometimes uncoupled:

(A) Sometimes the Relationship Display and Dwordle Field are closely coupled, so that a change in either one immediately shows up in the other;

(B) Sometimes the two are entirely uncoupled, so that changes made in either one are local to that one; and (C) Selective "decoupling," "aligning" and "recoupling" actions manage the transitions between these two states: (i) Decoupling initiates an uncoupled period; (ii) Aligning transmits specified changes in either display to the other without fully coupling them; (iii) Recoupling fully aligns the two and restores them to close coupling. Aligning and recoupling are sensitive operations, because the display being updated may not be fully compatible with the changes unless adjustments are made: the recoupling tool aids the user in carrying out the recoupling, and suggests ways to morph the target display to accommodate the changes.

Selective coupling is important during the creative process. Ordinarily, the Relationship Display is formally structured, while the secondary display is a Dwordle Field. Often the images in the Dwordle Field are stripped down and/or toned down relative to the Relationship Display during the uncoupling process, so that the softened message does not inhibit creative imagination or evoke acute focus 1320. The settings for these softening adjustments are controlled by the user, and ordinarily remain in place while the creative process proceeds.

In order to encourage creativity, existing structure can be optionally hidden, or merely hinted at through color coding or spatial proximity. Some ways to accomplish this are (i) to suppress node icons' borders, type symbols, and background shading, instead representing the characteristics of classes of nodes merely by font characteristics such as color, highlight color, choice of font, italic, bold, underlining, size, upper or lower case, etc. (ii) to similarly simplify connectors into nearly invisible lines; (iii) To make connectors invisible, so only nodes appear; (iv) to randomize positions of nodes. Note that all of these changes are temporary, and the original layout can be restored.

During early creative stages, the Relationship Display and Dwordle Field can be kept closely coupled so that any change in one is immediately reflected in the other. New ideas can flow freely and be inserted in whichever device is most appropriate. However, as the structure in the Relationship Display matures and begins to solidify, the success already achieved is both a help and a hindrance. The clear structure is very helpful, because the mind can now let go of the knowledge that has been set down, and focus on fresh enhancements. However, that same clarity can be a hindrance to further creativity because it powerfully conveys the existing message. While working with the Relationship Display, the user may not easily find space for innovations: this is literally true because it is a disruptive chore to move elements around in the Display in order to insert tentative changes, and more importantly, the mind itself may not be able to look beyond the vividly presented message to imagine new possibilities. For these reasons, the user may choose to selectively uncouple the two. The Dwordle Field is first populated with an initial image of the Relationship Display that is simplified toward a somewhat raw state by softening the message: the user can choose to remove as much or as little of the clarifying information as desired, including informative colors and shapes and/or connectors and/or positioning, so that the material in the Dwordle Field becomes a toned down and less structured version of the Relationship Display. The Selective Coupling Tool records the changes made during this transition, and is able to reverse them fully. The user goes ahead and makes discretionary changes of any kind, working freely and spontaneously in the Dwordle Field and following creative instincts. The Selective Coupling Tool tracks all these changes. When the work reaches a satisfactory point, the Tool assists the user to selectively (by alignment) or completely (through recoupling) effectuate changes made in the Dwordle Field in the Relationship Display.

Advantages of Selective Coupling

The advantages of Selective Coupling can be understood in terms of the human mind, in terms of the nature of knowledge; and in terms of the mechanics of diagrams:

In terms of the human mind, both remembered entities and remembered associations among them are somewhat fragile. They can be forgotten, lost track of, or warped by confusion. Often the entities and associations reinforce one another: entities interconnected by associations are more stable together than either would be in isolation. For example we remember things by associating them with other things, and we remember associations by recalling the entities they connect.

When we seek to reshape our understanding by remaking some associations and redefining some entities, and/or by adding some elements and deleting others, this is usually quite disorienting. Often there is a transition period during which new and old frameworks coexist and the thought process wavers between old and new and generates much confusion. To avoid confusion, mind tends to hold on to the existing framework in its entirety and finds it difficult to manipulate old constructs in entirely fresh ways. Of course, our minds can be trained to do better, but most of us experience difficulties when complexity carries us beyond our limits.

A diagram helps by presenting entities visually along with the associations among them. The diagram visually formalizes knowledge and gives our mind a second, entirely distinct way to stabilize present conceptual understanding. Once we have the diagram to rely on, we can relax our mental hold on the information portrayed in it. Much pressure is relieved once the existing framework is formalized as a diagram such as a Relationship Display. Since we can go back to the diagram at any time and quickly recover our understanding, we no longer need to hold onto the conceptual structure mentally. The image alone suffices, and it is preserved in the Relationship Display and may remain vividly in memory. As a result, we are free to play with the concepts and consider alternatives.

However, the existing diagram forcefully declares the existing framework, and we may find that it's hard to be creative while we're looking at it or visualizing it. Transitioning to the Dwordle Field and disconnecting the entities from the existing visual framework, overcomes this obstacle. The mind is freed for fresh contemplation, and new insights can emerge quickly.

Moreover, the mentality evoked by seeing the Relationship Display is analytical and associated with language, acute focus 1320 (FIG. 13*b*) and urgent intellectual concentration, whereas the ideal mentality for enhancing the Relationship Display is contemplative and impartial, and associated with a broader form of awareness, wide-angle focus 1310, and a deeper form of pondering. The shift between Relationship Display and Dwordle Field is purposely designed to help us make the transition from one mental orientation to the other, and to help our minds to master this form of productive thought.

In terms of the nature of knowledge, it's important to keep in mind that knowledge usually grows progressively. Each new idea reflected in the Relationship Display represents an accomplishment, but often it will soon lead to further ideas and further accomplishments. Alternating between the Relationship Display and the Dwordle Field is an excellent way to keep the progression going.

In terms of the mechanics of diagrams, a diagram conveys meaning through the position and proportions of its elements, and any change to the elements may require compensating changes to the design. Layout and overall size may need to be modified, and segments may need to be pushed apart or brought together. It's much easier to make significant changes in the Dwordle Field, and once the changes are satisfactory, automated tools can help us to transfer the modifications back to the Relationship Display by adjusting it to accommodate the changes while preserving the existing design to the extent possible.

Close Coupling and Complete Decoupling are Also Useful

The cycle of selective decoupling and recoupling is very helpful when enhancing a well-developed Relationship Display. During this cycle, most of the creative work is done while the Relationship Display and Dwordle Field are uncoupled. However, there are alternatives. While the two are closely-coupled, changes can always be made experimentally in the stripped-down image in the Dwordle Field without saving the workspace, and then when a satisfactory enhancement has emerged, the changes can be made permanent by saving the work. This may be the preferred form of development early on.

Also, it's always possible to make a change directly to the Relationship Display, which will become permanent upon saving, and this change will be passed on to the stripped-down image in the Dwordle Field, using the logic of recoupling in the reverse direction.

And sometimes it is appealing to work creatively in an independent Dwordle Field, using it as a workspace for sketches. Segments of the Relationship Display can be quickly exported to an independent Dwordle Field when necessary to create a backbone for a sketch, and when the idea has been developed, it can be edited into the Relationship Display directly or alternatively material from the sketch can be exported back to the Relationship Display. This approach is quick, spontaneous and flexible, and although it lacks the elegance of Selective Coupling, it may promote lightness of spirit.

Dwordling 4-Stage Intuitive Interactive Graphic C:

Let's suppose that the author next chooses to look at the intuitive interactive graphic C relevant to this topic and plays through the interactive sequence, focusing on what topics are covered. After pondering this, the author suspects that four topics are covered, of which the present topic is the third. To understand this more clearly, the author opens a new display field 60 window as a dwordle, and initiates an icon by typing in the name of node A in the entry widget at a spontaneously chosen place on the new display field 60. The overlay builder 56 recognizes that the title applies to feature A, and creates here a second instance of feature A. The author could also have dragged and dropped feature A from the primary display field 60, or dragged and dropped the row corresponding to feature A from the primary tabular grid 61. Now the author replays the intuitive interactive graphic C and each time an idea comes up, pauses the play, spontaneously selects a location in the dwordle field, clicks, and types in there a spontaneous guess at the title and perhaps also abstract for an idea, creating an idea-icon. After the interactive graphic has been played, the author reviews the idea-icons in the dwordle field, contemplating them in their entirety with wide-angle focus 1310. This calm viewing alone may be enough to bring to mind the titles for the three other topics covered. If not, the author can further contemplate the idea-icons in a relaxed way, remaining calm and alert, possibly moving the icons around into alternate positions and changing their titles to reflect partial understanding. If need be, the intuitive interactive graphic C can be played through again, continuing to enrich the contemplation.

Bringing in 4 More Topics:

Once the three new topic titles have become clear, the author concludes that these four topics do belong in sequential order in the linear outline for the text. The author can go back to the primary display field 60 and enter the three additional topics by placing the cursor above or below existing topic B and—with the proper keystroke—bring up an entry widget that will accept the keyboarded title and create the appropriate new structural nodes. Or the author can go to the primary tabular grid 61 and create three new rows and enter information for the new structural nodes. But suppose that while working on the dwordle, the author has already typed in the titles correctly and placed the four icons in the proper order (idea-icons in positions 1, 2 and 4, and the structural node A in position 3.)

Then the author has more refined and efficient procedures available. Working within the dwordle field, after first lasso-selecting the four, by placing the cursor on structural node A and using the proper keystroke and menu selection, the author can in two quick steps first transform the idea-icons into topics similar to topic B, and second assign their present positions as their ordering within attribute topic. Alternatively, the author can drag and drop the lasso-selected group onto node A in either the primary display field 60 or tabular grid 61, and accomplish the same thing in a single step.

Using a Tabular Grid for Topics:

However, the author may also use a different approach, because after the work done so far the author may be ready to focus constructively on the topics in the linear outline. The author first opens another tabular grid 61 for attribute topic, and then drags and drops the lasso-selected list onto node A which is already displayed for that topic, and with the appropriate keystroke and menu selection, creates the definition and ordering of the four with a single click. The author will refer to this topic tabular grid 61 often, because it shows the structural attribute topic in a clear form suitable for contemplating and editing the overall linear outline for the electronic textbook.

Saving a Temporary Dwordle to Use as a Logic Display:

Note that the work with the dwordle display field 60 has served its immediate purpose. Four topics now have instances there. The author may choose to delete that display field 60, but the author may also choose to save it for possible use in a logic display that documents Intuitive interactive graphic C. Next, the author returns to the primary display field 60 and drags and drops intuitive interactive graphic C onto the cell in column intuitive and row Topic A. Then the user control clicks the rest of the four topics to include them in the selection, and with the appropriate keystroke and menu selection "presents in sequence" records the fact that intuitive interactive graphic C presents the four topics in sequence.

Reformatting Tools

Reformatting procedures impact nodes and connectors. Most commands apply to nodes explicitly, with the connectors attached to those nodes following along with them. One or more nodes and/or connectors can be selected as a group for formatting commands. Formatting commands apply to insertions, deletions and repositioning, and other commands make space and align selected nodes vertically, horizontally, on an angle, in a circle or with a grid. Other commands control spacing between nodes within a group or around the borders of the group.

Working with Patterns of Thought

The dwordle can be effectively applied to one's own thought process. We can use the dwordle to observe and recast the patterns of our thoughts. Associations among thoughts make up an interwoven network of connections. We may clearly recognize such interconnection when we allow our thoughts to proceed idly and sense the discursive character of thoughts leading to thoughts. Existing interconnections are significant when we are thinking purposefully and aiming for a goal, because the existing network of interconnections can sometimes hamper our efforts. Often we are motivated to think something through precisely because the existing network is not adequate to our needs. As the thought process proceeds, we may find that we are following again and again some connections that lead to dead ends, while other avenues that seem promising trail off into inertia. These difficulties can often be transformed into opportunities simply by tracing the paths that our thoughts are repeatedly following. When we note down a list of thoughts, and begin to draw frequently encountered connections among them, dwordling offers beneficial effects almost immediately. Visually displaying the paths our thoughts take allows our mind to transform the existing network from a limiting rut into an active basis for discovery. As the visual display is progressively updated to reflect our new discoveries and we watch the updates being put into place, the patterned network of our thought process is recast into a muscular and reliable tool. For applications such as this, there is fundamental value in visual display of the interconnections among topics and paths among them.

Application 3—Enhancing a Relationship Display Using the Dwordle Field

This demonstration illustrates the use of selective decoupling in the Relationship Display and Dwordle Field device pair. In this illustrative case, nodes and connections had been shaped into a complete Relationship Display, but then a new insight called for significant modification, and so the Relationship Display was decoupled and exported to the Dwordle Field for enhancement.

This particular relationship display is designed to print at full size on legal-sized paper. The display densely occupies that space with more than sixty nodes and more than sixty connections. It depicts a functioning system: A panel across the top presents the underlying purposes of the system, and the first vertical segment at the left below the top panel presents a brief introduction to the system. Six more vertical columns diagram successive causal cascades that flow from top to bottom in each column and continue from the bottom of that column to the top of the next column.

The new insight called for the order of the first two columns to be reversed, and suggested possibilities for other changes. When a version of the diagram with connections suppressed was uncoupled from the Relationship Display and viewed in the Dwordle Field, a number of other new ideas resulted.

In brief, the following modifications occurred: the second vertical cascade switched positions with the first; one of its nodes was moved to the other cascade, now in second position; one of its sequences of nodes was moved to a different position in another cascade; and the third vertical cascade was extended at the top to explicitly reflect the impact of the first two. Along the way, a number of adjustments to the positions and alignments of other blocks of nodes and various connectors were needed in order to accommodate these moves. The Dwordle Field helped to stimulate these ideas, its reformatting tools facilitated the necessary adjustments to other aspects of the display, and it was then recoupled successfully with the previous version of the Relationship Display.

Concentrating on the Project:

Let's review what has been accomplished so far. It may seem like a very small beginning: just two features out of 140 placed in the structural display, and only six cells out of perhaps 240 in the structural display filled by those features. However a sound basis for steady progress has been established. The author's subliminal thought is focused on the project, and visual analysis is now grounded in the views offered by the primary display field 60 and primary tabular grid 61, the Project Matrix of topics and streams in the second display field 60, and the Linear Outline in the second tabular grid 61. Progress has been made and momentum is building.

Filtering Abstracts to Assign Attributes:

The author has already placed comments in the brief abstracts of some of the features identifying them as advanced or remedial. Moving to the primary display field 60, the author filters for "advanced" in the Abstract column and finds 30 features. Reviewing the abstracts, the author is encouraged with their consistency. 25 of the features are worthy candidates for the advanced stream. When the author selects those 25 and filters for that selection in the display field 60, the list of 25 also shows in the tabular grid 61. Moving to the tabular grid 61, the author enters the attribute advanced in their stream column and checks other attributes to see if anything needs tidying. The author tidies up the abstracts, removing the "advanced" notation and making a few editorial improvements. Then the author selects the 25 new advanced features and with the appropriate keystroke and menu selection causes them to be highlighted in the primary display field 60.

Creating the Advanced Path in the Primary Display Field:

Returning to the primary display field 60 and noting the 25 highlighted features now placed in the advanced stream, the author next gets the features into their natural order of progression. The quickest, easiest and most useful way of doing this is to create an advanced path, and begin to fill it in it with these 25 new features plus the one already treated. The author brings up the Path control panel and creates paths for each of the four streams. Then the author activates the advanced path in the primary display field 60, highlights nodes with stream attribute advanced, and contemplates the 26 existing highlighted titles. Building on prior work with their abstracts, the author can easily place them in order. He clicks on the first one to initialize the path and then clicks on subsequent ones in rapid succession with the appropriate key stroke to create connectors for the path sequence. About half way through and then again on completion, the author selects from the path control panel "display vertically" so the path nodes created thus far are shown in a vertical column in the primary display field 60.

Repeating the Process for the Remedial Path:

Next the author repeats this process, this time filtering in the tabular grid 61 for "remedial", reviewing the abstracts of the features found as displayed in the tabular grid 61, assigning the stream attribute remedial to the qualified features, and editing the abstracts to remove the word "remedial" and tidy them up. Coming back to the primary display field 60, the author activates the remedial path quickly and puts 30 remedial features into order on that path, again electing to display the path vertically. Now the advanced path appears on the left side of the primary display field 60 and the remedial path appears on the right side. Viewing the two paths in wide-angle vision 1310 (FIG. 13a), the author recognizes 9 cases where one advanced feature shares a common topic with one of the remedial features. Recognizing each pair helps the author to articulate the topic name, and when a name has been chosen, the author selects the pair, with appropriate click sequence and menu choice and types in the topic name only once to both create the topic and assign it to both features.

Now, returning to the second display field 60 "Project Matrix" with its structural display, the situation is much clearer. 13 topic rows now exist, and 20 individual features have been assigned to them, covering 24 cells: ten advanced, one average, nine remedial, and four intuitive. Also, 16 other features have been assigned to the advanced stream and 21 have been assigned to the remedial stream. 83 more features, however, have not yet been touched.

Putting Topics into Order:

As always the author has many choices for the next step, and will do well to let the decision emerge spontaneously. One frustration is that the order of the nine new topics has not yet been set. The features assigned to them have already received an ordering in the remedial path and the advanced path, and both of those orders are the same, but that order has not yet been applied to their topics. The author therefore uses the display field 60's control panel to "order by path sequence" based on the advanced path. This creates 26 rows corresponding to the 26 items included in the advanced path. Ten of these have assigned topics, and the author selects those topics and the other three that were previously ordered, and as before assigns the order of their present positions to attribute topic.

Filling in the Gaps:

The author is encouraged by continuing success organizing the material, and also satisfied to find that the features prepared previously seem to be working well. The author accordingly takes on the task of locating existing features (from among the 101 not-yet-classified text features) that fit into average stream cells for the nine topics that have advanced and remedial features but no average feature assigned. The author is able to locate five by title alone, and two more by inspecting brief abstracts, making seven in all. Each of the seven is dragged and dropped into the appropriate cell with an appropriate click sequence to assign both the stream attribute average and the appropriate topic attribute.

Assimilating Audio Introductions for Parts of the Textbook:

Now that almost half of the existing features have been partly or fully categorized, the author decides that it is time to focus on improving the list of topics shown in the linear topic outline. A good way to begin is with the eight audio recordings intended to introduce and summarize parts of the electronic textbook. The author listens to them instead of reading their transcripts so as to more clearly sense how a user might experience them. The author listens to them first while looking at the "Project Matrix" display field 60 with the structured stream/topic display, noting down succinct points on a piece of paper (because keyboarding while listening would disturb the author's concentration). Then the author listens to them again while gazing with wide-angle vision 1310 (FIG. 13*a*) on the Project Matrix: this is highly evocative. The author is able to place mentally six of the recordings as starting points for Parts of the text, and interpolates the names of these Parts into the existing list of topics. The author enters these Parts simply by clicking at the desired point in the topic column and using the proper keystroke sequence and menu selection to create a structural node with topic attribute Part and type its name into the text entry widget. The author then selects all instances of Part, and with the proper keystroke and menu sequence sets the default so that Parts apply on all streams and all paths. Consequently the cell for each stream in each Part row is now filled by that part's title. Next, the author drags and drops each of the six audio features to the Part that corresponds to them. The two audio features that were not yet used are given "under construction" tags that indicate what should be done with them, including such possibilities as "abandon" or "modify".

Bringing in Features Along with Topics:

With these Parts in place, the author is able to quickly conceive of additional topic names that correspond to a number of existing features. As soon as a topic name is created it can be entered into the topic column at the appropriate position, and then the corresponding feature is dragged and dropped into the cell for the appropriate stream in that topic row, thereby assigning both title and topic to that feature. Soon there are 20 more topics placed in the appropriate order and 30 more existing features with assigned topics and streams.

Summing Up a Day's Work:

All this work has been, in a sense, bottom-up: the author is seeing things and making connections without imposing a rigid mental structure. Perhaps some topic names have been surprising, but they have been inserted anyway because they seemed to fit at the time. The emphasis has been on fitting features in rather than dealing with features that don't seem to fit in. All of the work described above may have been completed in the first day of work, and in the process the author has shaped an appropriate environment for the project and also attuned her or his subliminal mental abilities to both the working environment and the material. The present state remains chaotic, but there is now a firm foundation for the next steps.

Further Steps:

The author might establish any of the following projects to begin the following day:

(i) Determine topics that relate to each intuitive interactive graphic, place these features in sequence, and create a path for the intuitive stream, intending to reconcile that path later on with the path provided by the textual material.

(ii) Focus on the linear outline, perhaps placing it into a display field 60 dwordle, and while looking at this with wide-angle vision 1310 (FIG. 13*a*) from a top-down perspective consider what additional topics are needed, and in what order. As topics are added to the dwordle, they can be interpolated into the list of topics in their appropriate order, and viewed with wide-angle vision 1310 in the Project Matrix alongside existing feature titles, discovering both matches and subtle discordances suggesting that either a title or a topic needs to be enhanced.

(iii) Begin working at the level of the text attached to titles while viewing the display field 60, to put together the average path in sequence, by activating path average and selecting individual pages one by one to extend the path, while reading the entire text of each feature carefully to see if something is missing that subtracts from continuity, so that issues can be noted down. For example, if a new node is needed, the author can create an average stream feature named "Needed: followed by the title", with the details in its brief abstract and place that feature node in the path; if an existing feature needs to be improved, the author can place an under construction tag on it that describes what is required.

(iv) Work through the display field 60 Project Matrix topic by topic, carefully reading text and images for each stream defined so far and playing the intuitive interactive graphic mapped to that topic, looking for other existing features that might fill in any empty cell and seeing the material for that topic as a whole, so that issues come to mind or improvements suggest themselves.

Panorama with Scenes & Context Gatherer

The device pair comprising Panorama with Scenes and Context Gatherer is designed to creatively develop, organize and effectively present a knowledge base comprised of two levels of information: a panorama layer with broader perspective; and a context layer comprised of localized or detailed contexts that are individually meaningful. Panorama with Scenes and Context Gatherer respectively generalize Relationship Display and Dwordle Field for this purpose. Some of the capabilities of this device pair are further extended in the Display Fields of subsequent device pairs.

Pairing Panorama with Scenes and the Context Gatherer

The Context Gatherer serves to gather and enhance scenes and other contexts that will contribute to the Panorama, and the Panorama with Scenes formally displays key features of the assembled contexts and the connective structure that arches over them.

For example, the panorama might be a reasoned argument or scientific paper with scenes that treat specific aspects in detail. The panorama might be a synthesis of various materials with those materials providing scenes and contributing to threads and hub and spokes. The panorama might be a report comprising various contexts including its appendices, attachments and detailed treatments in the form of supporting scenes. The panorama might be a compromise agreement, with the scenes describing in detail the special interests involved.

Panorama with Scenes provides a sequential presentation in which the panorama is maintained as a panoramic background like a Relationship Display, while the elements of the panorama being presented can be linked to the contexts of their origin in various ways. For example, the material may be presented as a succession of scenes, each of which is visually highlighted while being presented by means of multiple internal steps; or a presentation can refer to an individual context at the appropriate time by highlighting elements in the panorama arising from that context; or the presentation can alternate between presenting the panorama and presenting relevant contexts.

The Context Gatherer has a panorama layer and a context layer, and functions as a layered Dwordle Field. The context layer accommodates grouping elements into contexts such as scenes, threads and hub and spokes, assigning context attributes, and creating connections within and between contexts. The panorama layer of Concept Gatherer interacts with Panorama with Scenes much as Dwordle Field interacts with Relationship Display, and offers further capabilities for organizing contexts and crafting presentations involving contexts.

Scenes and Other Contexts

Theatrical performances are built from successive scenes. Stories recount scenes. Books are assembled from paragraphs, sections and chapters that are like scenes. Well-written paragraphs are often like scenes, with multiple interconnections among the different sentences that link the material together. Scenes are memorable for closely associated meanings.

The difference between a scene and a thread is that a scene is more enclosed and more important for the connections within it, and much more likely to have a unique set of connections, while a thread is more important for what it connects and may be one of several threads following the same path. Scenes remain distinct, while parallel threads reinforce one another.

In the CDE and CPE, contexts are groupings of nodes with connections among them, as described previously (in the section on "Visually Rendering Components"). As the creative process unfolds, certain contexts—scene, thread, or hub and spokes—come forward to play significant roles. A context connects to another context through shared nodes, shared connections, or a connection between a node in the first context and a different node in the second. Often the contexts do not individually conform well to one another, but when the connections among them are taken into account, their cumulative contributions yield a useful outcome.

Panorama with Scenes

Panorama with Scenes is based on the Relationship Display and adds capabilities for displaying scenes and other contexts in the Scene Show. Scenes are depicted through dynamic visual emphasis such as an aura for the scene as a whole and/or highlighting individual nodes and connectors in the scene; sequential or other dynamic presentations are used to present a thread; and icon coloring or other icon attributes signify hub and spokes. The next device pair, Overlay Outline and Concordance with Contexts, adds further capabilities for the visual display of threads and hub and spokes.

A panorama is a view that displays a comprehensive set of features as a background to be taken in as a whole, while selectively focusing on various related scenes (or other contexts), and highlighting the selected context in the foreground for emphasis and presentation in detail. Highlighting a scene while presenting it evokes acute-focus vision, while wide-angle vision 1310 (FIG. 13a) can be summoned by offering a time interval without highlighting so that the entire panorama comes into focus.

In some cases, the panorama can be arranged so that the elements of most scenes cluster together. When this occurs the panorama can be presented sequentially scene by scene. The panorama shows the entire range, while presenting the material in meaningful clusters, one scene at a time, focuses attention. This kind of presentation is a little like a slide show, and has the added advantage of keeping the panoramic perspective alive at all times.

In other cases the logical ordering of the panorama is unrelated to scene structure, so that the elements of scenes are dispersed across the panorama. In these cases a dual presentation makes more sense: the scenes are presented because they are individually significant, and the panorama is presented because it offers useful perspective and synthesis. There are many possibilities for a dual presentation. In regard to the order of presentation, the possibilities are: First the scenes as a whole in sequence and then the panorama in sequence, or first the panorama and then the scenes, or alternating between panorama and scenes. If there is an alternation between panorama and scenes, each scene can be made visible in a way that allows it to be effectively presented: it might take over the whole screen, or be presented in a side panel, or be enlarged and highlighted in the foreground while the panorama remains in the background.

Scene Show

The Scene Show presents a sequential display of scenes in the foreground, while the panorama persists in the background. Each scene is highlighted and enlarged in turn. The presentation of a scene can step forward in a series of internal steps within the scene. When appropriate, details of the scene that do not appear in the panorama can be brought in during the internal steps. The show can be played forward from start to finish, or the user can activate individual scenes or elements of the display at will.

Alternatively, the scene show can be presented in two simultaneous images, which are ordinarily projected on two different screens, but can also be viewed on a single screen using operator's view. The two-screen mode is very helpful for elucidating context. The basic application displays views of the panorama on one screen, and views of various scenes that relate to the panorama on the other screen. The operator's view consists of three windows, of which two correspond to the two screens and the third shows the various stages of the program in a tabular grid for navigation purposes. The operator's view serves as a third-screen control panel from which the two-screen show is operated, and can also be used by an author, reader or annotator to navigate through the show while viewing it on a single screen.

Context Gatherer

The Context Gatherer is a two-layer dwordle field, with one layer for contexts for the panorama and one layer for contexts of all kinds. It accommodates relationships both within and between contexts and allows contexts to be treated either as units or as clusters of separate elements depending on the circumstances.

As described previously (in the section on "Visually Rendering Components"), when visually rendering thought, a scene is a cluster of related constructs that are associated by interwoven meanings. Our thoughts and knowledge are naturally organized into scene-like clusters, and when we are collecting our thoughts and thinking something through, gathering ideas and knowledge into scenes can be very helpful. Not all of the contexts that we find will be scenes. For example, the order of presentation of the scenes that links them together is a sequence, which is a thread. If the scenes are categorized, each category is hub and spokes.

The Context Gatherer facilitates this process by helping us to record and organize our thoughts using the two-layer dwordle field as the creative platform: one layer for contexts and the other layer for the panorama. The Context Gatherer works with the full range of contexts.

For example, one may start with an overview of a complex situation, and seek to break it apart into manageable pieces that can be understood separately. Usually an understandable piece has the form of a scene, because of the relationships among its constructs. To develop the manageable pieces, one begins with a panoramic layout in the panorama layer of the Context Gatherer, and gradually decomposes that into pieces and expand the pieces into scenes on the context layer of the Context Gatherer.

Alternatively, one may begin with some significant and distinct ideas that seem to call for a systematic treatment or synthesis to integrate them. In this case, one would begin in the context layer of the Context Gatherer, building the distinct ideas into cohesive scenes, and inserting tentative connections between them. The connections between scenes will later mature into the panoramic structure, and key nodes in the scenes and connections among them will carry over to the panorama. It's good to begin to fill in the panorama tentatively as soon as connections among the scenes start to be useful.

In either case, each node or connection that appears in both the panorama layer and the concept layer is intrinsically pegged, so that the appearances in the two layers are treated as a single entity that establishes a correspondence between the layers.

The Context Gatherer can be applied to assemble scenes from outside resources like books or documentation: in such cases scenes are found in memorable paragraphs and passages, threads are found in outlines and references as well as in sequential appearances of topics or terms, and usages of terms linked to glossary definitions take the form of spokes around a hub.

The Context Gatherer is also very well suited to assembling material from scratch. It has all the capabilities of the Tabular Grid and Display Field for importing material. It can import CDE projects as starting points or raw material for a new project, and it can handle CDE contexts of any kind.
Memories, Notebooks, Lectures with References, and Thoughts When we explore a memory, we may find that as the memory takes shape it increasingly fills in a context, and grows more and more like a scene. When we take down notes and revisit them afterward, the process of recovering the subject of the notes is like filling in a scene. Crafting an academic lecture is similar to creating a panorama with scenes: the lecture effectively transmits material by presenting it in a series of scenes that will also serve as guides to the listener's later study of that same material. Each thought that we have carries links to other meanings in our minds, some of which may show up as subsequent thoughts, and if we take the time to contemplate a thought, we will probably sense a scene and other related scenes waiting to unfold.
Context Director The Context Director maintains an overall framework in which contexts of all kinds can be identified, categorized, searched and prepared for assembly. It maintains the library of contexts, from which contexts are drawn to populate the Panorama, and assists in the process of assembling and operating a Scene Show. The library of contexts can be expanded into a shared resource that serves for reusing contexts in subsequent Panorama with Scenes presentations.
Expert Knowledge Articulator We initially learn skills and knowledge for an activity conceptually as well as through practice, but as we learn more and more from the experience of using our skills and knowledge, we develop expertise that increasingly migrates away from a conceptual form to "analogue knowledge." Conceptual knowledge can be voiced and written down, but analogue knowledge is active knowledge that is honed for use and manifested in action. It is knowhow, the knowledge that does things. It is ready to be applied at a moment's notice to solve a problem or perform an action. The skills that allow us to walk and drive are analogue knowledge. We often learn the rudiments of complex procedures such as driving a car conceptually. Then, as we become experts in driving, our knowledge shifts into analogue form, and analogue knowledge grows far beyond the conceptual roots. In fact, the conceptual roots may gradually fade away unless we periodically study for driving exams.

Analogue knowledge is quick and can exhibit remarkable subtlety in handling a variety of special circumstances. When it is progressively developed through successful experience, it can be termed "expert knowledge." Typically the expert knows all the answers and solutions but may have difficulty explaining the shape of the knowledge that supports these skills. An expert's solution to a problem leaps into mind almost instantly. By contrast, a beginner finds a solution step by step, beginning from a conceptual analysis of the problem and proceeding to the solution in an orderly way, so that the shape of the knowledge is clearly apparent.

From the expert's perspective, analogue knowledge is wonderfully useful, but there are limitations. First, analogue knowledge can be readily demonstrated, but may not be easy to explain or to teach conceptually. Second, analogue knowledge can be wonderfully capable of addressing special cases, but it is not necessarily systematic and can become internally inconsistent in the sense that the supposed solution for one case continues to harbor a defect that was already corrected in another case. Because analogue knowledge is not subjected to conceptual oversight, it can even become obsolete or internally consistent without the expert's noticing.

Both of these limitations can be cured by articulating expert knowledge in conceptual form. Aids for Productive Thought can help an expert to evoke and systematize a conceptual framework for analogue knowledge, because the visual field serves to bridge the gap between analogue and conceptual. The Context Gatherer is a fine tool for articulating expert knowledge into conceptual knowledge, because analogue knowledge is expressed in terms of specific responses to specific circumstances, and the variety of special cases are well captured as scenes. The Articulator takes advantage of the high degree of repeated attributes in expert knowledge scenes, which occur because special cases typically share many common attributes while differing on just a few. Once the conceptual framework has been articulated, analogue knowledge can be perfected, and analogue and conceptual teaching methods can be combined with excellent effect.

Application 4—Insights into Productive Thought

This is an application of Panorama with Scenes and Context Gatherer. Each of the scenes is coherent and includes three classes of nodes: Experiences, Implications and Insights. Most of the Implications and Insights are significant enough to be included in the Panorama. Therefore, the finished product consists of the Panorama with Scenes on one layer, comprising these significant Implications and Insights identified by Scene, and a second layer showing the Gathering of individual scenes comprising Experiences, Implications and Insights. In this two-layer display, the user can place either layer on top and navigate sequentially through the material of either layer according to either the order of Scene Gathering or the order of the Panorama. The user can also select any node and follow a link to its position in the other layer. The two layers can optionally be reformatted as a single unified layer, comprising all of the nodes.

The subject is Insights into Productive Thought. Each scene is intriguing on its own, and the experiences that give rise to the insights stand apart, and yet the implications and insights come together in the panorama in a meaningful way. Here is an example of an experience with insights: Have you had the experience while driving a car of suddenly waking up to the realization that you can't recall driving there? Almost everyone whom I have asked has had this experience. Here are four insights that follow from this experience: First, we have two different kinds of experiences available—thoughts to get lost in, and the conscious experience of driving. Second, since we can experience either one or a mix of both, we must have a third mental quality of attending that can choose between the two. Third, since we allow ourselves to get lost in the world of thoughts, it must somehow be on a par with the living world in which we're driving, as if it is also real. Fourth, the subliminal mind must be highly capable to be able to drive without conscious assistance.

The material is used to illustrate a talk on this topic, which is related to the subject of this patent application. In the talk, the Context Gatherer and Panorama with Scenes are shown alternately: each of the scenes is first assembled step by step in the Context Gatherer in "dwordle style" as successive terms appear on a blank background in appropriate positions, and then the significant Implications and Insights from the scene are highlighted in their positions on the Panorama.

Figure 15:
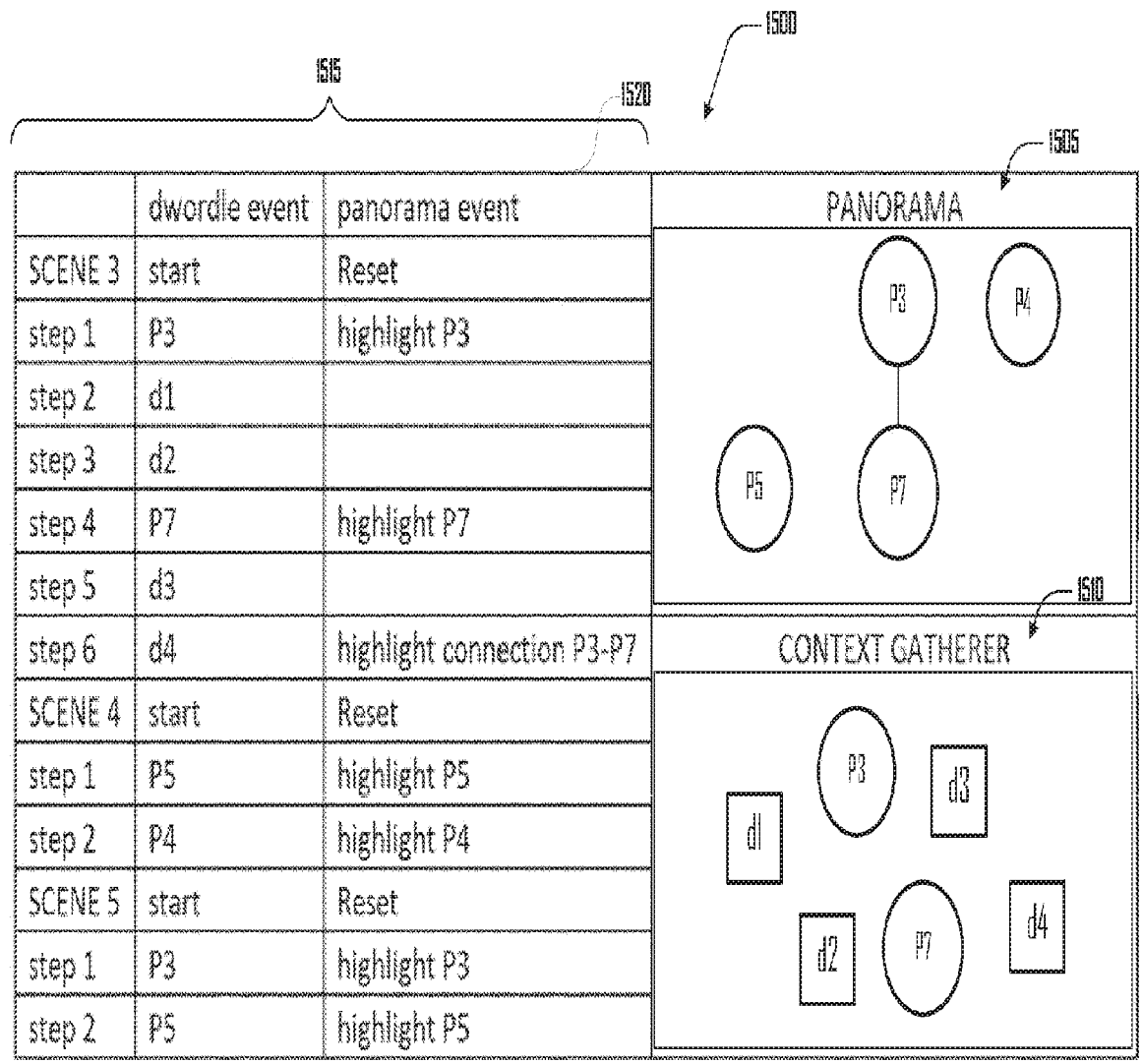
FIG. 15 illustrates a scene show comprising a panorama with scenes and context gatherer device pair in accordance with one embodiment.

For example, as illustrated in FIG. 15 a panorama 1505 can comprise thirty three features, of which P3, P7, P4 and P5 are shown. A Context Gatherer 1510 can comprise twenty seven dwordle scenes that develop and explain the panorama, of which only a subset can be displayed at a time. In the example shown in FIG. 15, show is currently reached the point where it is displaying a dwordle for SCENE 3, step 6. As this dwordle has been displayed step by step, nodes P3 and P7 have been introduced at steps 1 and 4, and further described by points d1, d2 and d3 at steps 1, 2, and 5. At the present moment, step 6, dwordle step d4 leads to the connection between P3 and P7 in the Panorama, which is now being highlighted in the panorama.

A control panel 1515 is also illustrated, which can be in the form of a tabular grid 1520. In this example, each row of the grid 1520 corresponds to a Scene or to the steps within a scene.

The second and third columns show the nature of the dwordle event and/or simultaneous panorama event that occur at each step. The tabular grid 1520 shown at the left serves for navigation. Selecting any row will take the show to that position.

Figure 16:
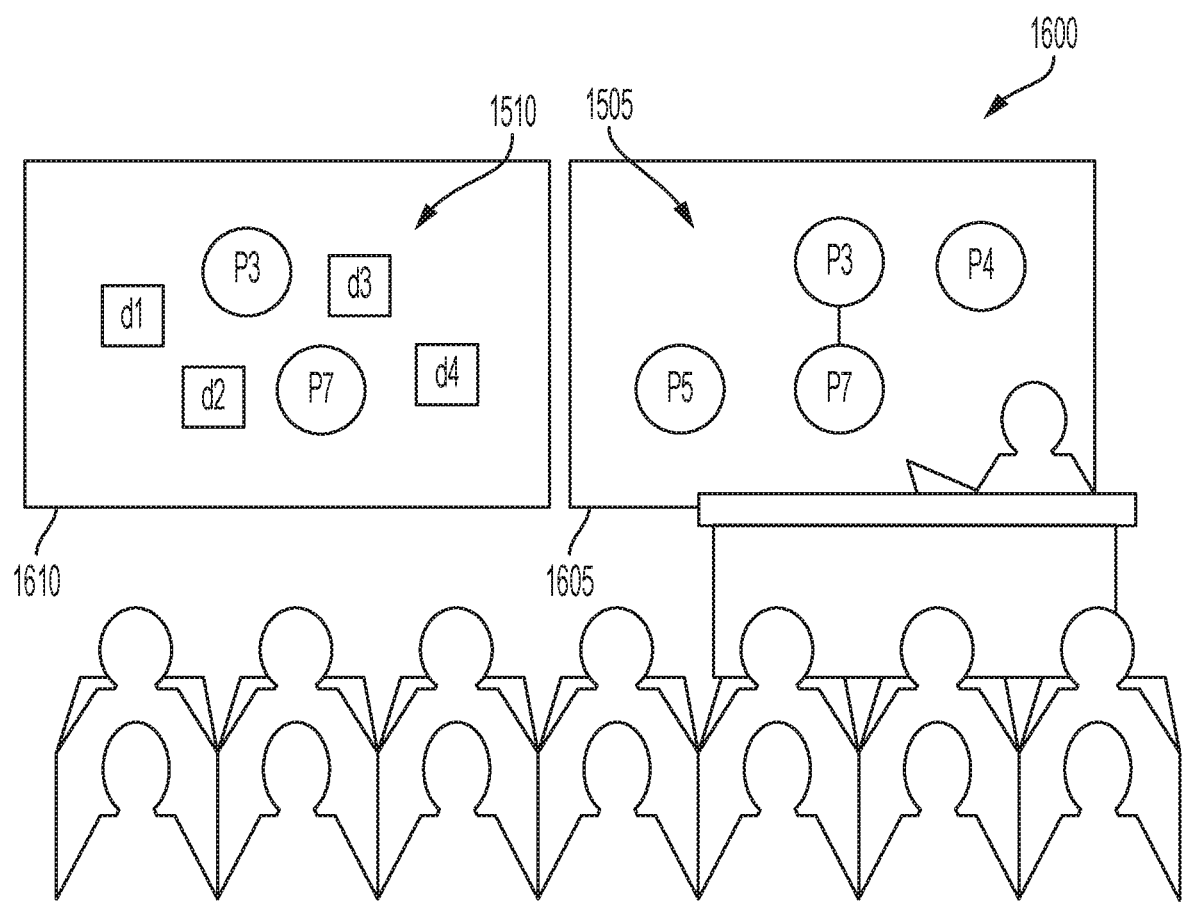
FIG. 16 illustrates a first and second large display presenting a panorama field and a context gatherer field in accordance with one embodiment.

FIG. 15 depicts an operator screen 1500 while in screen show mode, which can facilitate a presentation 1600 as illustrated in FIG. 16, that can comprise driving two large monitors 1605 and 1610, which show respectively the PANORAMA AND CONTEXT GATHERER 1505, 1510. Advancing the show using an arrow key on a keyboard, or the like can carry the show step by step from beginning to end, displaying it both on the large monitors 1605, 1610 and in the two windows on the operator screen 1500 shown in FIG. 15. As discussed herein, any of the device pairs, or the like, can be presented as illustrated in FIG. 16.

Later Stages of Developing Materials

Creative Development in Open Context:

There is generally more than enough structure in a project at this point of development. When we work exclusively with conceptual thought, we often hold onto structure almost desperately, but when the wide-angle visual field contributes to the mental picture, structure receives surprisingly strong subliminal support, and conscious emphasis on conceptual structure can be relaxed. Let what appears like structure be present lightly, like a wisp of mist about to be blown aside. Nothing is yet settled, everything is open. In this spacious acceptance enough structure remains to suggest further developments. What can be redeployed? What new can be added? What old can be shifted to make a proper home for the items moved? Viewing in the primary path field 60, view in depth the existing text and attributes of features in subliminally selected order. As you contemplate each one, visualize a layout for your features in the primary path field 60—a non-linear outline—and consider where this feature might belong in the final perspective on the project? Drag it to that location, so that the perspective will gradually take shape. Whenever you feel ready to insert a title or specify further attributes for a feature, move to the primary tabular grid 61 and enter them there.

Drawing with Meanings:

Much new material remains to be created: How can you discover what is already known but not yet consciously apparent? What will you find that is entirely unanticipated and yet ready to spring forth? How do you make a mental space into which subliminal knowledge can be projected? Just as an unfinished drawing invites lines into its white space, subliminally choose and subliminally place your meanings in the dwordle display field 60, contemplate with wide-angle vision 1310 (FIG. 13*a*), and let new meanings present themselves appropriately. Open a tabular grid 61 connector sheet. As a new meaning presents itself, create an idea icon for it, and then drag and drop it into a new relationship pair in the connector sheet. Then consider what it relates to. Find a partner in a display field or tabular grid, and drag and drop that into the other side of the pair. When the context of a meaning becomes clear, begin typing text in the text entry tabular grid 61. Let the words shape themselves successively, as you edit and extend with as little conscious intent as possible.

Visual Logic:

Here the term "logic" refers to reasoning and alternatively also to conventional association, or in other words, to any connection that can be explained in the context of your work. The term "visual" refers to making such connections visible. What are the logical connections among the items? How can they be understood? Which ones reinforce the linear order? Which ones violate it, either jumping ahead or reaching behind or just generally not fitting in at all? These are the connections that add sparkle to your understanding and help the user to see the bigger picture. It is easy to accommodate such anomalies in the non-linear outline. View the titles of the features in the project matrix display field 60, and when a connection occurs to you, select the feature at one end of the connection, drag the connector to the other end to make the connection, and then shift to the tabular grid 61 connector sheet to enter attributes and descriptive text for the connection. As you're describing the connection it's often wise to work out the material carefully, taking time to get the reasoning exactly right or filling in the details of the association before moving on, because your thoughtful concentration on this connection may bring to mind other connections.

Multiple Display Fields and Tabular Grids can be Used Simultaneously:

Incidentally, don't worry about the many open display fields 60 and tabular grids 61 becoming inconsistent. They are all windows into the same database, and you can enter almost anything anywhere with perfect effect. The entry algorithms will handle most ambiguities and warn you if something specific needs to be entered in the primary display field 60 or primary tabular grid 61 to clarify your work.

Developing the Overlay:

What has been covered above concerns developing original source material. That can be thought of as the first stage of preparation. Of course this first stage does not apply when placing an overlay on other people's material. The second stage in a broad sense consists in developing your overlay for your or other people's material. This is closely analogous to the work that someone else would do if they were making the overlay on your material, but it is a much richer in options and potential innovation when you do it yourself, because as the overlay develops you can improve your material through new insights or dovetail your material to fit better with the needs of navigation. There is another very positive aspect to developing your own overlay: you may now be able to redeploy as optional features some of the material you abandoned earlier.

The Non-Linear Outline Blends Language and Diagram:

Here are some ideas that may help you to appreciate the potential of this new way of working: The non-linear outline in the form of an overlay blends two ancient skills: languages and drawings/maps/diagrams. These two skills, in turn, depend on two distinct capabilities of mind: verbal and visual analysis. The rigidly linear form of a printed book is rooted in the memorization and subsequent recitation of spoken words. Both the shift to an electronic textbook with its non-linear outline in an overlay and the move away from linear page sequence to a collection of information lessen the predominance of verbal analysis and move us toward a closer balance with visual analysis. This shift can enhance our ability to handle complex matters, for two reasons: first, verbal and visual analysis can enhance one another; second, the visual field is the superior tool for assimilating and comprehending many factors that are simultaneously present. Visual analysis takes us almost effortlessly to the big picture. The implications for the use of our mind are quite profound. It is not surprising that new tools will help us to perform well in this new environment and that our mental habits may change for the better as a result, allowing us to think more productively.

Views and Perspectives:

Moving on to discussion of procedure, developing an overlay is discussed in detail above. Here we add further detail about various additional views (i.e. perspectives) that serve the needs of both users and authors, such as the structured view utilized in the "Project Matrix" presented above.

Creator's View:

The function of Creator's View is to preserve the creative process, allowing the author to preserve and revisit work in progress. This view is a selective snapshot of the displays (e.g. the content of the display field 60 and/or tabular grid 61) that you deem relevant at a point in time. Ordinarily these are archived for the author to return when necessary.

Structural Views:

A "structural" relationship is an orderly relationship that extends across many features. It is a type of logical relationship that can be accommodated by an orderly display such as parallel paths or a rectangular table with rows and columns.

To offer a few examples, if a series of textbooks in English cover similar grammar topics in similar order in successive grades, the rows would be topics and the columns would be grades. This view allows the user to see how the topics develop from grade to grade. If the chapters of a textbook regularly offer text, examples and exercises, the rows could be chapters and the three columns could be text, examples and exercises. If the textbook covers the same material at average, remedial and advanced levels, the rows could be topics and the columns could be remedial, average and advanced. If a history text offers chapters that consistently cover such themes as social, political, legal and economic events in successive periods, those periods would be rows and the themes would be columns.

The author identifies rows and columns either by attribute, or by path or by both attribute and path. The overlay builder 56 displays structural material in useful ways:

In the display field 60, rows can be identified by horizontal alignment of features, and columns can be identified by both vertical alignment of features and by highlighting, so that the columns appear as highlighted vertical lines and the rows show up as horizontal alignment of features in these lines. Labels for rows and columns can be provided in the margins of the display or within the body of the display.

The display field 60 positions all features that are not part of the structure in close proximity to the structural elements they connect with, and these non-structural features can optionally either be shown or become invisible. Features that are shared between multiple rows or across multiple columns are handled by placing the feature in a central position and highlighted aliases in the other positions.

In the tabular display 61, the rows and columns can appear as in a spreadsheet, with highlighted columns and labels in the margins. Non-structural features are handled analogously to the display field 60, by placing them proximately in interpolated rows and columns that can be optionally hidden. Shared structural features are handled similarly to the display field 60 by highlighted aliases.

Path Display: PathText Ordering:

When a path is displayed or printed as ordinary text, the title and text attributes of both nodes and connectors are presented in their appropriate sequence. This sequential ordering is another option for structural display, called "PathText". In PathText material can appear sequentially one row at a time or one column at a time, thus grouping the material either by row or column, and labels can be optionally interpolated into the text showing the row and column at the head of each section. Non-structural features are handled by placing a connector in the text wherever a connection occurs, and shared structural features are handled optionally either by interpolated aliases or by highlighted connectors in the aliased positions.

Using Structured Displays During Development:

It can very helpful during the development process to bring related materials into the wide-angle visual field simultaneously or successively: Mistakes are picked up easily, inconsistencies present themselves for resolution, possible improvements become readily apparent and new ideas are stimulated. When the materials are related though a logical structure, the benefit is even greater and significant insights may arise. If the author plans any structured displays for the final product, these can be assembled early in the development process and the author may review them periodically to move the project forward and monitor progress along the way. The author can also create temporary "tracking displays" to view material under development by assigning temporary attributes as needed and formatting a structural display based on those attributes.

Structured Displays in the Final Product

Complex presentations in many fields may benefit from regular structure within chapters or across parts of a book. The structure underlies the presentation and helps to organize and clarify the material for a user. Whenever such structure is present, the table of contents or non-linear outline can be rendered as a structured display. When topics are structured, a gallery node reflecting the topics available to visit can take the form of a structured display. When information is structured within a topic, a structured display can appear in the text displayed at a given node. Structure also results whenever the author systematically prepares alternate styles of presentation: For example, if a textbook covers the same material in both procedural and intuitively meaningful forms, as discussed earlier, these could be the two columns in a structured display that might be quite helpful to students.

Structure in an Arranged Display:

If a textbook offers two parallel paths, one for the student user and one a "teacher's guide" for the instructor or parent, these two paths can be arranged so as to appear side-by-side to the instructor or parent as highlighted columns in the display area 60. The parent or instructor can also arrange whether or not the student can see their teacher's guide column, and if so which material in that column will be shown to the student and which material (such as answers to test-your-skills questions) will be hidden (or alternatively displayed only after each test was completed and the student's performance recorded).

Glossary View and Instance View:

Using the glossary in the overlay builder 56 is much like an ordinary glossary. When you click on a term in the text that appears in the glossary the glossary entry appears. However it has two key enhancements:

(i) The glossary in the overlay builder 56 knows the specific text from which you came, because it records that as part of recording your traversal through the textbook or overlay. Its display takes that into account to customize the information that you see.

(ii) All instances of the term are linked into the glossary entry, and the glossary display shows the total count of instances. You can elect to view all those instances in alternate forms of Instance View: Displayed successively as text extracts that can be optionally expanded when you wish to see the entire surrounding text; shown by highlighting features and connectors in the display area 60; or shown as icons in a gallery. In all three cases, the original location from which you came is highlighted in the display area 60.

Viewing the Instances of a Glossary Term:

A glossary will probably help you during your work, and will almost certainly help your readers. Each term in the glossary is briefly defined and put into context. Uses of the term are automatically linked to the glossary, so that you and your users can optionally begin from any glossary item and bring up a gallery that presents all the instances of the term. This can help you to check the consistency of your usage.

Viewing Instances of a Term not in the Glossary:

When a user elects to search for any term or phrase, the list of instances will be created and Instance View can be entered at that time to activate any format of Instance View, even though the term is not in the glossary.

Benefits of Instance View During Development:

During development, glossary Instance View in text form can help you to check the consistency of your usage, and the visual display form can help you to tidy up your presentation and check the validity of connections you have made by verifying that the term appears where you intend it to. Searches for terms not in the glossary will count the instances and map appearances, so that you can decide whether the term should be added to the glossary and consider how best to describe it.

Activating Instance View:

The glossary can be accessed by clicking any glossary term. Instance View can be activated for that term from Glossary View, and can be activated for any other term or phrase by searching for the term. Whenever an arrangement of the material makes a feature or connector invisible, instances of terms in that section disappear from Instance View.

Accessing Underlying Content Associated with Nodes:

The overlay builder 56 also displays the underlying content associated with the various nodes and connections of the overlay 41 or electronic textbook 5. In one example, the overlay builder 56 interfaces with an application used to store the underlying content. For example, the overlay builder 56 interfaces with a word processor, browser or document display software such as a Portable Document Format (PDF) viewer, to display textual content natively. The overlay builder 56 interfaces with audio playback software installed on the user's computer to play audio content, and with video playback software to play video content. In an example, the audio and video playback software is integrated with the user's browser. Alternatively, the overlay builder 56 can display content using its own integrated capabilities. For example, if the user creates a comment, that comment can be stored by the overlay builder 56 in a proprietary file format associated with the overlay builder, and then displayed by the overlay builder 56 in a separate window 64, or a pop-up window of the overlay builder 56. The underlying content may similarly be displayed.

Aids to Productive Thought

Using Visual Display to Coordinate Visual and Verbal Thought:

The visual display 60 of the overlay builder 56 is also used, in an embodiment, by authors of overlays 41 or electronic textbooks 5, as a tool to aid the author in construction the overlay or electronic textbook. In order to better develop new ideas for inclusion into the nodes and connections of the overlays and electronic books of embodiments of the invention, an author can use the display area 60 of the overlay builder 56 to identify candidates for the nodes of the overlay, and then identify connections to be made between the nodes of the overlay.

The Dwordle:

In an embodiment, these candidates are identified by constructing "dwordles," using a selection from an inventory of terms in the content used by the overlay builder 56. As discussed in further detail below, a "dwordle" is a word or phrase, randomly selected and randomly placed in a visual field. For example, where the overlay builder 56 connects to a digital library 54 containing content 52, an inventory of terms in the content 52 is presented to the author by the overlay builder 56. This inventory of terms may be in the form of a list, or a collection of nodes labeled with the terms. The terms may preferably be single words or short phrases, but may alternatively be longer texts such as sentences or paragraphs. Where the overlay builder 56 (or add-on 40) connects to pages 34 available over a network 38, the inventory of terms may be constructed by scraping, or otherwise collecting a list of terms from the pages 34. Similarly, when the overlay builder 56 is used to construct the electronic textbook 5, the overlay builder 56 will draw on the content used to construct the electronic textbook 5, which is in an embodiment, content stored in the digital library 54, or accessible over network 38. Alternatively that content is available from the computer 32. Additional terms in the inventory of terms may be supplied by the author. The author may add terms spontaneously, by typing them into an entry widget in the display field 60. Spontaneously added terms are retained in a holding buffer for potential later inclusion in the inventory of terms.

Subliminal (Seemingly Random) Selection and Placement:

The author randomly selects a term from the inventory as a dwordle, and randomly places that dwordle in the display field 60. Or the author spontaneously thinks of a new term, randomly selects a location in the display field 60, clicks there to bring up an entry widget, and types in the new term for entry at that location. The author then randomly selects additional terms, and manipulates them as discussed in further detail below, to identify connections between them. In the earlier stages of composing the material, the author's work with dwordles helps to develop material, bringing forth conscious insights that might otherwise arise much later or might never take shape at all. Later in the editorial process, these dwordle connections aid the author in identifying relevant connections to use in crafting the overlay or electronic book. Once the author has completed the dwordling process, as discussed in further detail below, then the dwordled terms areused by the author to evaluate and consider connections to make between nodes containing content that includes the dwordle. For example, if the author perceives a connection between a first term found in a first content item 52, and a second term found in a second content item 52, then the author can consider whether it would be appropriate to include the first content item 52 and second content item 52 as nodes in the overlay 41, and the connection between the terms as a connection between the first content item 52 and the second content item 52 in the overlay 41. Because the overlay builder 56 includes the visual display 60 and has available a term inventory, the author is able to easily draw from the entire relevant inventory of terms to populate dwordles, and is also able to easily render connections between terms and translate those terms and connections into nodes and connections of the overlay 41.

The Dwordle in Context:

Dwordles are one example of an aid to productive thought, in accordance with embodiments of the invention. To further understand what dwordles are and how they aid in creating the overlays 41, it is helpful to consider the following discussion of aids to productive thought, including the interaction between the verbal and visual fields of focus, and visual and verbal analysis frameworks, and the use of dwordles.

Burgeoning Conceptual Complexity:

Our modern world is knowledge-based but conceptually educated. Our interactions are relatively harmonious when compared to past history, but as a result of telecommunication and the Internet, our interactions are conceptually mediated to an unprecedented degree. As a result we are becoming increasing distanced from one another and even estranged from our own nature. The complexity implicit in cultural mastery is burgeoning at the same time that the elements of our culture are increasingly perfused with concepts, and the universal education that helps us to keep up with all these concepts tends to cut us off from our heartfelt humanity.

The scientific endeavor, with its roots in disciplined and unbiased observation and verifiable prediction, its emphasis on rigorous analysis, and its active engagement in continuing enhancement, is a wonderful basis for humanity's continuing growth. However, it too is conceptually based and stretched to its limits by the complexity of natural and human systems.

Conceptual thought can be verbal or visual or emotional. (It's relevant that our culture's verbal emphasis may have increased during the first five decades of computer availability to a peak in the 1990's, and the proliferation of images on the web may now have begun a corrective trend back into balance with visual expression.)

Coordinating Conceptual Thought with the Visual Field:

Three factors make it beneficial to open up conceptual thought to coordination with the visual field: overemphasis of verbal thought; the comparative advantage of the visual field in handling complexity; and the risk that web-based learning may lead to mere information rather than knowledge.

The APT initiative is a practical one: tools for productive thought will succeed and meet their goals if they yield more satisfactory results for their users.

Knowledge is Information in Proper Context:

Mere information is data out of context. Without context, you do not know what to use data for and how to use it appropriately. Searching on the Internet you may find that you have gained information but still lack the knowledge you need to use the information effectively to satisfy your purposes. Information becomes knowledge when you know how it should play a role in your life and know how to make use of it.

To make wise choices or decisions, you need to know your own circumstances, the possibilities available, the principles or criteria for appropriate choice and how the various possibilities accord with these considerations. It is good to learn to bring all these factors consciously into your mind when making a choice, because conscious attention will help to balance various considerations and weigh their importance. There is no need to go about this abstractly by telling yourself how to think. A few well-designed questions will put you in the proper frame of mind. When you are making choices and the choices are well informed, you are creating a context that will frame the information you learn as knowledge rather than filing it as mere information.

Conscious Thought and Subliminal Thought:

In seeking a conclusion, for example to solve a problem or to learn about a particular subject matter, it is helpful sometimes to give purposeful thought to the problem. That is, to think something through, setting in motion a train of thoughts that continues until a successful conclusion is reached. Doesn't it feel good when you begin with no understanding or misunderstanding and eventually reach clarity? This is a form of productive thought. Once you recognize productive thought in your own experience, you have a basis for gradually reshaping your thinking so that more and more of your conscious thought is productive.

It's helpful to note, however, that most of your useful mental functions are performed subliminally without conscious awareness. When you catch a ball, you may think "I am catching this ball," but everything that your body does in order to catch it is being calculated and performed subliminally. Likewise, when you think "I have a new idea," most of the mental functionality that brought forth the idea was subliminal.

It's helpful to think of the mind as including both subliminal and conscious thought. When you reflect on this you'll find-perhaps to your surprise-that much of your conscious thought is actually getting in the way of productive thought and preventing useful productive ideas from reaching your conscious awareness.

This insight suggests that it might often be better to let your conscious thoughts fade into silence instead of letting them run along in their usual way. Pragmatically, we're looking for whatever form of conscious thought will best support broad minding (the mind as a whole) in productive thinking: when that means silence, there should be silence.

Minimizing Distortions Due to Emotions:

We're all familiar with emotional factors like writer's block, procrastination, infatuation, discouragement, and magical or wishful thinking in others and in ourselves. Emotions are closely linked to conscious conceptual thought and can obstruct, confuse and bias your thought process. In general, alert concentration and relaxation can soften these effects. Attending to the wide-angle visual field promotes alert concentration and engenders relaxation, which can be very helpful. Beyond that, the melding of graphic and verbal meanings in embodiments of the invention as discussed above often promotes alert concentration. As we become more interested in our work and begin to make real progress, the emotional effects usually subside.

Benefits of Introspection:

Introspection, literally examining inwardly, can be very helpful when engaged for a productive purpose. When you introspect with the intent of developing more effective and reliable ways of thinking, you can make important discoveries that take you to new ways of thought. These are truly discoveries, for two reasons: first because they concern your own mind, which is yours alone to explore, and second because you discern some things that go against views about mind that are prevalent in our culture.

Limitations of Conscious Thought:

It is helpful to productive thought to coordinate conscious thought and subliminal mental activity. The brain activates more than 100,000,000,000,000 calculations a second. Conscious verbal thought achieves about two words a second. Needless to say, there is a bandwidth mismatch. You will never be able to bring even a miniscule fraction of the brain's calculations into conscious thought, but it is beneficial to make space for subliminal mental activities to work alongside the conscious thought process and contribute knowledge and insights. Both conscious conceptual thought and subliminal mental activity contribute to the thought process, and it makes sense to coordinate them to attain our purposes.

It's helpful to develop habits of thought that make space for creative thoughts to surface. It's helpful to accept the value of subliminal mental activity in dealing with complexity. In the same way that we cooperate with a computer, it's helpful to cooperate or coordinate conscious conceptual thought with broader mental activity.

Conscious Verbal Thought and the Wide-Angle Visual Field:

Conscious verbal thought is linear. It traces one meaning, one connection at a time. It is useful for finding errors and getting things right. As it traces a single sequence of meanings, verbal thought is like listening or speaking. Thinking in images sometimes serves a similar function, exploring and tracing connections.

Unlike listening to speech, the human visual field takes in many things simultaneously. When we relax our gaze and rest in wide-angle vision 1310 (FIG. 13*a*), the visual field supports wide-reaching awareness. (By contrast, when we focus acutely and narrowly, the visual field supports intense analysis. Relaxed and soft, the restful gaze of wide-angle vision 1310 is an ideal complement to the linearity of conscious verbal thought. This restful gaze can be almost entirely free from emotional bias, and naturally attends to everything in sight, treating everything equally and allowing us to see things that do not fit into our preconceptions.

Benefits of the Dwordle:

Many elements of embodiments of the invention discussed above individually and jointly help to bring the benefits of both acute visual focus and wide-angle gaze to the thought process.

A unique element of embodiments of the invention, the "dwordle," helps you with both aspects of coordination: coordinating conscious thought with subliminal minding, and coordinating verbal analysis with the wide-angle visual field. The "dwordle" teaches you to activate wide-angle visual awareness and derive direct benefit from subliminal broader minding. The dwordle accomplishes this by completing a feedback loop between verbal conceptual thought and the visual field.

Visual Focus: Acute and Wide-Angle:

Human vision has two different styles of focus. These derive from physical features of the eye and the connections of the optic nerve to the brain. "Acute focus" 1320 (FIG. 13*b*) is sharp vision provided by the center of the retina (the "fovea"), and "wide-angle focus" 1310 (FIG. 13*a*) is less acute vision provided by the retina as a whole including that central region. These are rooted in physical properties of the eye and nervous system, and they also correlate with our mood and sense of identity.

We can use these contrasting forms of mental activity in several exercises, and it is helpful to appreciate them. Modern life may tilt us toward habitual acute focus 1320, making it difficult for us to deliberately relax into wide-angle focus 1310. If a person has lost discretionary access to wide-angle focus 1310, it is particularly important to regain this because wide-angle focus 1310 is an influential resource with profound impact on mental activity: Wide-angle focus 1310 opens the field of attention, whereas acute focus 1320 narrows it.

Acute focus 1320, which has also been called "hard focus" benefits from the dense visual receptors in the fovea and the many nerve fibers that connect the fovea to the visual cortex. Humans naturally focus their eyes more sharply to rely on this central region of the retina when they want greater visual detail or when they want to analyze what they see. With this kind of focus, eye and brain are closely coupled for analytical and decision-making purposes. When humans are intensely interested in something they naturally use acute focus 1320.

The other focus has been called a "soft focus." Here the eyes are relaxed and a much greater area of the retina is called upon. When humans use wide-angle focus 1310 the whole field of vision is warmly alive. The feeling is gentle, somewhat like meditation. Humans use wide-angle focus when peripheral vision is important, because peripheral vision requires the outer region of the retina. This is why we refer to it as "wide-angle."

The most light-sensitive receptors in the eyes are in the outer regions of the retina, and humans need to use wide-angle focus when walking in the darkness or looking at the night sky. If a person goes out and night and sees few stars, even after waiting for a minute or two for his or her eyes to adapt to the dark, and a little later sees many stars, the change has resulted from a shift from acute to wide-angle visual focus.

The "depth of field" in human vision is much greater in wide-angle focus. When a person wants to see clearly objects that are close and objects that are distant at the same time, the person uses wide-angle focus. With wide-angle focus, images are equally sharp at all distances. Designers of tranquil gardens such as the gardens in Japan invite visitors to increase the depth of field in order to calm the visitor, precisely because it invokes the visual state of wide-angle focus. When significant objects are present in the foreground, middle ground and background of a person's vision, the person naturally shifts to wide-angle focus in order to attain depth of field, and as a result the person's eyes and spirit relax.

Becoming Familiar with Wide-Angle Focus:

We have discussed four factors that induce wide-angle focus: peripheral vision, relaxation, darkness, and visual acuity at a range of distances. Peripheral vision is perhaps the easiest tool with which to explore wide-angle focus. Here is an exercise: Extend your arms in front of you with your hands at the level of your eyes. Focus on your hands, and keep them at eye level as you slowly swing your extended arms outward to the side.

As your hands swing backward and approach the edges of your visual field, they are picked up by peripheral vision and you are seeing in wide-angle focus. Continue to focus on your hands and move them as far backwards as you can without losing sight of them. Then keep your hands in view to sustain wide-angle focus as you attend to the entire visual field. See if you can relax and enjoy this feeling of softness.

Once wide-angle focus has stabilized, you can put your arms down if you want. Begin to play with the qualities of the softly-focused image. Very slowly move your eyes from side to side and up and down. You should find that your entire visual field is stable during this movement: there is no break in attention, just an extension. You see a single comprehensive image: as your eyes move to the left the image extends in that direction, and likewise up or down or to the right. As it extends your visual field retains the memory of the opposite sides of the field: the image is stable beyond the range of any one gaze, and when you later bring your eyes back where they were before, the lost part of the image comes back as if it has never changed and has been waiting for you. Though your eyes and gaze have moved, you have not diverted your attention at all.

Contrasting Wide-Angle and Acute Focus:

Another way to explore wide-angle focus is to focus on something complex and nearby like a messy desk or a loaded dinner table while moving your hand through the air between your eyes and the objects in your field of vision. If you are in wide-angle focus the background remains stable while your moving hand occludes various parts of it without disturbing the complex image. You can use this technique to recover wide-angle focus at any time during the day.

By contrast, with acute focus 1320 (FIG. 13*b*) attention is intensely focused at the center of the visual field. Attention moves with the eyes. The image reforms wherever your eyes move. When you move your eyes in acute focus 1320, it is as if your gaze is darting from one target to the next. There is a break in attention. Apparently the break occurs both in mind and eyes, for it distracts from engaging in complex physical activities like driving a car. At first vision is centered at one location, then it refocuses somewhere else and the area in between is blurred during the transition. The new target to which your gaze darts comes into focus almost instantly, but you may be able to sense that the image surrounding your new point of focus shapes itself more slowly than the target and remains blurry or vague for a short while.

Verbal and Visual Analysis:

Related to the ideas of acute and wide-angle focus, are the ideas of verbal and visual analysis. Humans can easily access two basic analytical frameworks: verbal analysis that supports hearing, speech and communication, and visual analysis that supports vision, spatial relationship, and engaging in physical activities like athletics or conversing or driving a car in physical time. When these two frameworks are allowed to interact, they cooperate well: the combination of the two is better than either one used separately. We can use a lightweight tool, the "dwordle", in conjunction with the principles of acute and wide-angle focus above, to enhance their cooperation.

Using the dwordle we are able to sense the respective strengths and limitations of the two frameworks and allow them to work together. This mind training takes form in conscious experience, enhancing the effectiveness of productive thought. As the human mind is trained to adopt this new technique, it learns to deploy it in its broader minding. Ultimately broad minding may take over these capabilities so fully that we receive the benefits almost instantly without needing to go through a conscious process to achieve the results.

Visual images and verbal concepts are both important in conceptual thought, as evidenced by the fact that each plays an important role in the flow of conscious meaning-laden thoughts. Vision receives many stimuli simultaneously: in any moment, some objects in the image are changing, some are moving, and some are fixed. Verbal information arrives in one sole sequence: newly arriving information is appended to a remembered sequence of sounds, and the sequence extends as time passes like a line being traced. The differences between the information sets require different forms of processing, and give rise to different styles of analysis.

The visual field specializes in receiving simultaneous stimuli and placing them into a spatial context, while verbal thought specializes in encoding and decoding meanings and linking them to related meanings. These different specializations naturally complement one another.

Verbal Analysis:

Language and formal thought, and the mental structures that support them, are important resources for pondering and creativity. Formal thought depends on reference and so relies on previously formed labels and references or associations. We can refer to these verbal labels as "words" and "meanings", with the understanding that these terms include such things as numbers and arithmetic. The analytical use of words and meanings can be termed "verbal analysis". The words and meanings of conventional language and principles of formal thought such as grammar and arithmetic are a toolkit for reasoned analysis.

This toolkit is very convenient when working within the range of words and meanings that come packaged within conventional language. Specialized vocabularies are invented to apply logical reasoning to fields ranging from architecture through mathematics to zoology. Formal thought is a natural basis for exploring conventional wisdom already embodied in formal thought. Inconsistencies and new connections can be discovered. Subtle implications can be inferred.

As new insights and implications emerge, new words and meanings can be developed to extend conventional wisdom. The process continues indefinitely.

Limitations of Verbal Analysis:

However, verbal analysis faces multiple handicaps when the purpose involves new perspectives and creativity. The strengths of verbal analysis bring corresponding limitations, as explained in the following paragraphs.

Verbal analysis depends on packaging into conceptual constructs for its broad reach-a great strength. However packaging often conceals the packaged contents, cutting off access to the experiential knowledge to which the packaged meanings refer. Analytical use of packaged constructs tends to intensify the difficulties of opening packages. When content is essential to creativity, as is usually the case because packaged constructs do not capture the potential of the knowledge they refer to, we can easily get stuck with no way forward.

The meaningful connections of verbal analysis are subtle and refined and offer unlimited abstraction-a great strength. However verbal analysis tends to take the correctness of these connections for granted, and rarely takes the time to unpack the connections to validate them through broader minding. Once in place and incorporated in analysis, even a gravely faulty connection is unlikely to be detected unless it raises contradictions. Verbal analysis is weak in detecting its internal errors and therefore vulnerable to error.

Language is central to communication-a great strength. At every point along the way, whether clearly established or veiled by confusion, we can describe where we are. However, the emphasis on communicability actively inhibits the initial stages of the deeper forms of creativity, because whatever is newly unfolding will not yet fit in. Formal thought demands milestones along the way and tends to inhibit creative exploration.

Because of its role in communication, language is central to the social model-a great strength. This applies especially to conscious conceptual thought, which is prominent in inward display of relationship models. Conscious conceptual thought can easily become entangled with emotionality and self-image. These are important ingredients of the social model, and so are highly relevant for creativity within the context of the social model. However, within the context of productive thought, these collateral effects are detrimental. Emotional entanglements and presentations of self-image are sure to cause distractions and likely to impede progress.

Because of the importance of communication, we have learned to concentrate intensely on formal thought. Our mind can simultaneously focus on conscious conceptual thought and activate relevant links to other concepts not presented consciously-a great strength. However, this intense concentration tends to cut off access to other aspects of subliminal minding. This is a major weakness, because we are often unable to take advantage of broader mental capabilities that we are in need of Because of the linear character of sound, which is expressed sequentially over time, expressed verbal meanings are linear. Broad minding skillfully expands the linear elements of verbal analysis into a network of interconnecting connections that mutually support one another, effectively traversing many links of a network at once-a great strength. However, only one connection can be played in consciousness at any one time, so conscious verbal conceptual thought is intrinsically linear. Even when conceptual thought is expressed in conscious images rather than words, the linearity tends to persist. Navigating a complex multilayered linear network one connection at a time is slow: much, much slower than broad minding. By the time we come to the end of a conscious thought, mind will already have moved on. As a result, there is inevitable discordance between conscious conceptual thought and broader mental capabilities. There is tension in this discord, and effort is required to maintain it. We lose access to beneficial aspects of subliminal minding that would be available in a more relaxed state.

Each successive thought narrows our focus onto its topic and supports this with relevant local connections-a great strength. However, as we localize in this way it is hard to maintain a consistent broad focus, and it is likely that we will sometimes lose track of the big picture. Moreover, once a connection is activated by projection into conscious thought, its priority is increased and mind tends to return to it, so conscious conceptual thought tends to be repetitive. Because of the combined effects of losing track of the big picture and tending toward repetition, we often find ourselves following a worthless track again and again, repeatedly presenting a broken train of thought and hardening our perspective until creativity becomes nearly impossible.

Because of these limitations of verbal analysis, it is important to supplement it with other styles of analysis that can work around these challenges. This way we can combine the strengths of multiple styles and minimize the costs of their limitations. Visual analysis naturally overcomes many of these limitations.

Visual Analysis:

The visual field presents a rich array of forms arranged in three dimensions. Tremendous mental calculations are required to present these in a timely way. The field distinguishes among changing elements, moving elements and fixed elements and handles them in different ways. Changing elements are noticed, processed, and recognized. Moving elements are carried forward with their prior assigned recognitions. Fixed elements continue in place as previously recognized.

All of the elements are presented for analysis simultaneously, as a single present array. Elements recognized some time ago are arranged alongside others newly arrived. Elements' status as fixed, moving, or changed is provided, and elements with common features are linked to one another. Patterns and textures, colors and shapes are identified. Spatial relationship in three dimensions is readily available, and provides context within the scene. The entire scene is easily scanned for any object. The context is powerful and supports memory, analysis and planning.

Visual analysis identifies the elements of the scene and studies relationships among them. Using a longer time history for perspective, motions are analyzed and rhythmic patterns such as the swinging of a pendulum are detected. Movement is modeled and changes are analyzed. All of this is done very quickly to keep up with physical time.

Limitations of Visual Analysis:

As with verbal analysis, the strengths of visual analysis bring limitations along with them. Visual analysis handles a vast amount of timely data very quickly-a great strength. However, when it comes to pondering meanings and searching for abstract relationships, the visual system seems to be a tool of the process rather than the manager of the process.

Visual analysis has wonderfully quick access to long-lasting memory that supports recognizing faces and places and objects and symbols-a great strength. It seems that these memories are closely linked to vision and accessible through visual analysis. However, it is not clear that the visual system has direct access to the general class of meaningful associations that are the specialty of verbal analysis. For example, when a newly appearing object is unexpected and difficult to recognize, visual analysis gives way to broader minding and we can sense the delay and dislocation of experience as attention shifts to other mental resources to resolve the mystery.

Visual analysis elegantly handles spatial relationships in three dimensions-a great strength. It can also detect relationships among elements in scattered locations that share a visual feature such as movement, change, or color. However, attributes of relationships must be represented symbolically, as for instance by an arrow in a diagram, to present them to the visual field. Visual analysis cannot itself overlay the nature of connections, and relies on formal thought applied to recognized images for this.

Visual analysis is central to the calculations that support engaging in physical activities in physical time-a great strength. However, it works best with continuously acting causes that exert incremental effects. It does not respond well to discontinuous, latent, or multi-factorial causes and relationships.

The visual field brings in every aspect of the visual array with equal status-a great strength. It can be easily prioritized to search in this extensive array for something that moves, emphasizing motion; or a green object, emphasizing color; or a pencil, emphasizing shape; or something that glints, emphasizing brightness; or something that sparkles, emphasizing change. After a skill like reading has been developed, visual analysis can be trained to search for a familiar symbolic form such as a letter in this extensive array. Thus visual recognition and search work well with visual cues and symbols. However, the visual system does not seem to handle abstract meaning in a native way. Instead, it passes on questions of meaning to broader minding quickly and efficiently.

Visual-Verbal Interchange:

Visual and verbal analysis are complementary systems. For example, verbal analysis focuses on a single sequence, while visual analysis sees a complete field. Verbal analysis works with labels, while visual analysis works with direct experience. Verbal analysis accesses formal thought and formal knowledge, while visual analysis recognizes images through matches between direct experience and recorded direct experience. Verbal analysis is locally focused with an abstractly connected proximate network, while visual analysis is broadly responsive, and when in wide-angle focus, grants equal value to everything in the visual field. Verbal analysis takes time, and conscious verbal analysis is ponderous, while visual analysis is quick.

When they are coordinated the strengths of the two can be combined. We rely on verbal analysis to support visual analysis. For example, visual analysis accomplishes recognition of a face or place on its own, and makes the recognized images available to verbal analysis to convey labeling and packaging to the networks of formal thought. For our mind to function as well as it does, the channel from the visual system to the verbal one must operate very quickly.

To cite one instance, training systems for "speed reading" have been available for many years. These rely on the wide-angle focus of the full visual field, rather than the acute focus 1320 employed for ordinary linear reading, to achieve reading speeds of thousands of words per minute. This pace is so much faster than speech or verbal thought that it offers a feeling of exhilaration.

To achieve this pace, recognition of ten thousand letters or more, labeling of thousands of words, and understanding of the meanings of words and sentences are all accomplished within a minute. This is perhaps ten times faster than the usual pace of verbal thought, and entails the added steps of recognition and labeling. Clearly recognition and labeling are accomplished rapidly.

The Dwordle Completes a Feedback Loop Between the Visual Field and Verbal Analysis:

Thus, there is a highly tuned channel from the visual field to verbal analysis. To complete the feedback loop that is necessary to achieve effective coordination between these two modes of analysis, a reverse pathway from verbal to visual analysis must be opened. Written language and accurate drawing have provided the basis for this.

The traditional pathway from verbal to visual is writing and drawing. Almost everyone has had the experience of taking notes while someone else is explaining something or while studying. Most of us are also familiar with adding diagrams to our notes to clarify relationships. Our hands create the letters and images that send our ideas to the visual field.

Many of us also made random drawings on the pages of the notebook. These random drawings are called "doodles."

A "doodle" is "an unfocused drawing made while a person's attention is otherwise occupied."

Doodling can aid a person's memory by expending just enough energy to keep one from daydreaming, which demands a lot of the brain's processing power, while also helping the person to continue paying attention. Thus, it acts as a mediator between the spectrum of thinking too much and thinking too little, and helps focus on the current situation.

The "Dwordle". Here we suggest the term "dwordle" (pronounced dwurr-dull) to describe a doodle that is primarily made up of words and is used for the specific purpose of feedback from verbal analysis through broad minding to the visual field. A dwordle is the most direct form of feedback from verbal to visual analysis. The dwordle shares two key features with a doodle. Like a doodle, the material is selected at random rather than by verbal analysis. Again like a doodle, there is an element of random drawing in the dwordle, because the positioning of the words is left open to be randomly determined.

The strength of the dwordle arises from broad minding. The selection of words and the positioning of words is "at random" in the sense that we do not do it intentionally, but it is not truly random. On the contrary, words and positions are selected subliminally in support of our purpose.

Dwordling:

We use the dwordle while seeking to advance a project of productive thought, and we invite broad minding to help us achieve our purposes. The words in a dwordle are brought up to consciousness without prior conscious attention, and without conscious design on our part the words are positioned among other words on the page.

Broad minding cooperates by selecting words and positioning those words to evoke fresh insights for verbal analysis. From our conscious perspective, this is like free association. But our clear purpose in carrying out the exercise allows broad minding to cooperate by presenting useful associations.

The purpose of the dwordle is to express the current state of conscious conceptual thought with key words that come up through free association, and allow them to place themselves on a page in a freely selected configuration. The outcome is like a keyword outline in the shape of a diagram. The wide-angle visual field knows how to see the dwordle as a whole, and also knows how to infer relationship. Receiving messages from visual analysis, verbal analysis immediately forms new connections and reorients old ones in ways that were not previously accessible.

The addition of each word is another step in the process. One feedback loop from verbal to visual thought and back to verbal thought is completed with each step. At each step, broad minding is choosing a key word and placing it on the diagram. Broad minding does not need to do this in a linear fashion; instead it draws upon the formal structure of verbal analysis in a way that is not subject to the constraints of conscious formal thought.

As the process unfolds, the visual field is taking in the words as they are written, juxtaposing them with one another and considering their relations through visual analysis. Seeing them emerge successively one by one, and at all times seeing simultaneously all words so far written, the visual field opens the design up to broader minding. In turn, broader minding brings up the words and shapes the layout to show evocative relationship.

Broad minding seeks to make fresh relationships available to supplement the present state of verbal analysis. It selects words (labels) that are relevant for connection, choosing them from among the existing connections in the formal framework of conceptual thought as well as from remote locations. Then it presents them to consciousness in a diagram that suggests relationships. As a result, fresh relationships can be received and recognized through the wide-angle visual field.

In simple terms, dwordling exports the field of verbal analysis from broad minding to the written word and presents it as a diagram for the visual field, where it is visually analyzed and presented freshly to the field of verbal analysis to be rearticulated.

Using Dwordling in a Project:

Dwordling is designed to support purposeful verbal analysis. As described above, dwordling can be used throughout a project to creatively explore connectivity in the material. In addition, four occasions in a project are particularly well suited to spontaneous dwordling: (1) at the outset of a project; (2) when obstacles arise and the way forward is unclear; (3) to validate what has been accomplished and check things out; and (4) when a milestone is reached and the author is pausing or finishing the project.

At the start the author softens his gaze and settles into wide-angle focus. The author selects a word at random from the inventory of terms provided by the overlay builder 56, and places the word at random in the visual display 60, or alternatively types in a new term at the selected point, as a node for consideration to include in the overlay 41. The author chooses the words by free association and positions them flexibly, leaving open the opportunity for the words to "choose their own place" on the visual display 60.

Preferably, the author does not think purposefully about what he is doing or what is happening. Instead, the author waits for insight to come. When an insight comes, the author enters a comment, for example by attaching the comment to the node containing the dwordle. The author then explores the comment to the minimum degree needed to clarify its nature before returning to the dwordle.

When dwordling seems to be losing energy and new words are not coming to mind, the author looks at the visual field 60 in its entirety, like a drawing. The author does not focus on any single word or phrase, but instead softens his gaze into wide-angle focus and sees all of the words, nodes and the visual field 60 as a whole like a drawing. While the author contemplates the page, he relaxes mentally and lets new words or phrases come into consciousness, for example by randomly scanning the inventory of terms. If new words come, the author carries the process further. When the author has the insights he needs, he can let the formal process come to an end. Further insights may arise after dwordling is complete. Once the dwordling is complete, the author has a set of nodes and connections to use as a start on building the overlays or electronic books of an embodiment.

Other Assistance for Productive Thought:

Turning to other beneficial aspects of embodiments of the invention, as an author works in the overlay builder 56, or other embodiments of a creative development environment, the available tools as discussed above naturally interface closely with the author's mental processes.

Relaxing into Alert Wide-Angle Focus:

In contrast to linear conscious thought, which sequentially presents thoughts or images or feelings, when creative work is being seen in the wide-angle visual field the thought process can be largely subliminal and can proceed simultaneously on many levels. In these circumstances, conscious thought is usually not called for, and the conscious thoughts that do occur are likely to distract rather than contribute. Concentrating on your efforts in a relaxed way, you may find that effortful feeling tends to fall away. Concentration arises naturally from your interest in the work and sustains you through long hours of alert attention without causing weariness.

Whether you are writing on a page or typing on a keyboard, the meanings that you experience seem to come forth through your fingers rather than your thoughts. You no longer consciously anticipate what will be presented, but instead let conscious meaning take shape in silence as the words appear under your restful gaze. You can always try out some words or images in your thoughts, and when you do these experiments may be fruitful, but much of the time the material just shapes itself. The knowledge reflected in your work seems to unfold naturally, almost magically, without any evident source or accompanying commentary.

The forceful flow of conscious thought may feel continuous, but in fact these thoughts are surfacing from vast potentiality like foam on an ocean wave composed of water from the ocean's depths. Successive thoughts often arise from diverse sources in mind, like entertainers selected for a variety show who come from different backgrounds, or customers exiting through a revolving door who were shopping in different parts of the store a few moments before.

Electronic Textbook Components Taking Shape:

A thought may have its own cohesion, or it may be unpolished. When a series of thoughts are cohesive they are more like a paragraph, which again may be cohesive or lacking completion. When a paragraph announces its own completion and settles into context, you may have found a feature or part of a feature. This feature is implemented as a node in the overlay 41 or electronic textbook 5, as discussed above.

Sometimes thoughts may be intensely interesting and even thrilling. Such thoughts may become connectors in your finished work, such as the connections 7 of the electronic textbook 5 or overlay 41 as discussed above. Often connections will be implicit, unexplored by conscious thought and not easy to find, and they may be all the more interesting for that reason.

If you are lucky enough to experience space between your thoughts, you may be able to find connections easily, present latently in that quietness. If not, you can sense connectivity in the sequential stream of meaning and alertly grasp it. Some connections are logical, but the most valuable or profound ones relate less to inference and more to observation: they are present because of knowledge that has not yet been consciously articulated, and when you observe them in context insights will come.

Many other connections are associations derived from your past experience or alive in your present circumstances, These are meaningful to you but not necessarily to others, and more likely to resound with emotional tones. It is often difficult to extract the meanings of streaming thoughts from the emotions that accompany them, and you may find that the gentle accommodation and neutrality of wide-angle vision 1310 (FIG. 13*a*) offer welcome relief, allowing meanings to shed their emotionality and clarify themselves effortlessly.

Each feature, when well established, readily defines its connections in your thoughts, and each connection, when well established, clarifies and helps to define the features to which it connects. Working in the display area 60 of the overlay builder 56, you find that meaning sometimes crystalizes at a rapid pace, too quickly for conscious comprehension. You may wish to pause and check out what has emerged by tracing its connections and features (e.g. connections 7 and nodes 10) with linear thought, but it is often much better to let the flow continue. Hold on to this perspective: the mental capabilities available to you are vast beyond conscious understanding, so when your work is going well let your mind manage your conscious experience rather than trying to consciously manage your mind.

As you adhere to this perspective and gain confidence, the space between the thoughts will open up to you.

When your work in the display area 60 is going well, it can be useful to let go of any thoughts about where you are going. Features and connections (e.g. connections 7 and nodes 10) can be shaped by rounding out their attached texts (e.g. comments as discussed above), and the network (e.g. the overlay 41 or electronic textbook 5) can be extended and filled in as appropriate, refining and enriching its connectivity. You are working at the detail level, articulating and mapping your knowledge.

Focusing on Your Audience:

When your thoughts do turn to the wider implications of your efforts it may be a good time to hone in on the usefulness of your work for others. Which features and which connections might be most interesting? Are their different audiences out there, different user communities with different styles and preferences? Visualize the people you know and wonder about which feature might be their favorite, which connection might be most useful for them?

Such questions open up the dimension of paths (such as the paths 12, 14, 16 through the electronic textbook 5 of an embodiment): What paths through the material would be most helpful to others?

Is there one main path with optional branches, or are there several paths that deserve to stand alone? Should there be only one gateway or several?

When people approach your material, will they be able to determine what suits them from brief descriptions or will it be better to plan a way for them to enter your material and explore it before making up their mind. Are their topics in the heart of your material that might deserve special access points leading to small focused paths?

Contemplating Your Material:

Your material may have a dominant order such as sequence in time, or it may have a dominant layer such as regions in a travel guidebook. Your material may naturally divide into units, like recipes; or themes, like elements of design; or chapters with a common structure such as an idea accompanied by examples, exercises and tests of skill. There may be multiple paths through the material, and these may be at different levels or with different topics.

As you plan your work and pursue it you'll notice attributes that apply to some features or connectors and not others. Whenever you find that you want to check the consistency or continuity of similar things, you will probably want to assign them a common attribute. These attributes will help you to work with the material, and since they explicitly capture an aspect of your material, they may be useful for users later on.

Features that are similar, widespread and distinct, such as examples or exercises, can become a layer. Features that are interrelated in an orderly way, such as parallel paths or regularly encountered stages can be ordered in a structure. Layers and structures can be presented in customized displays that make them easier for you to work with as a whole and easier for your users to understand.

Visual Logic:

Our modern world is increasingly complex, and our abilities to cope with complexity are also increasing. The tools offered in embodiments of the invention can help you to validate your thought process and master complexity. You may find that you can lay out the relevant factors that convince you that a relationship exists but you are not sure exactly how they interact. It makes sense to write the factors down on a sheet of paper and diagram the interactions with arrows and comments.

After you work out the diagram you can transcribe it to an overlay 41 in the visual display 60 of the overlay builder 56 (or similarly to an electronic textbook 5). Alternatively you can complete the whole process from start to finish in the display field 60 of the overlay builder 56, and when you have it right the features and connections (e.g. nodes 10 and connections 7) will be available for later use. You can create a special path that traces the logic in whatever way seems most transparent, and you naturally lay out the connections in comments attached to the connectors.

When an interaction is highly complex, it is helpful to prepare a logic view. After you make an inventory of the interactions, consider whether some of them arise from common underlying factors. If so, then it may be helpful to trace each of their separate influences during your exposition. Each of these underlying factors can determine a logical nexus: a node dedicated to displaying an aspect of the underlying logic.

Interactive Logic Views:

As an author, one of the best ways of helping your users and clarifying your understanding is to create interactive pages. The presentation of a logical argument in a logic view by tracing through underlying logical nexuses, connectors and features-just mentioned above-illustrates this. When teaching, many procedures and relationships can best be made clear through interactive question and answer sessions, examples and exercises. Often such cases are presented dynamically through interactivity on a single page, or by automated navigation through a cluster of related pages. Interactivity can be a great aid to understanding. Visualizing and planning the interaction is even better. We are able to learn through experience and develop an intuitive appreciation of what we are learning and how it is important.

Speedy Content Development:

Rapid success in developing content such as the overlay 41 or electronic textbook 5 comes from attending to details and the broad picture simultaneously, while keeping in mind major aspects intermediate between these two poles. This is not possible in conscious thought, but the broader capabilities of mind are up to the task when you have become familiar with the material, and the material is well articulated and clearly presented to the visual field. Visual display can facilitate remarkable progress.

The tools in the overlay builder 56 are designed for this purpose. The visual display 60 can display the global view in its entirety or contracted to higher levels, or it can be selectively displayed by layers or attributes or structures. The tabular grid 61 can give you access to any sorted order of any filtered subset of features or connectors or both. Anything selected in the visual display 60 can be displayed in the tabular grid 61 and vice versa. Any selection can be displayed at any level of detail, including associated text in its entirety or only at the level of embedded outline headings.

There is also a Comprehensive view that offers any path through the material in document or webpage form. If the material consists of text and images, it is displayed in printable form that corresponds to sequential printing of a path in the overlay builder.

Other Applications of the Overlay:

The overlay 41 of embodiments of the invention is very versatile. The overlay 41 allows a user to easily assemble diverse materials and enter the user's own comments and transitions. It can assimilate and images or texts. The user can interlink the images or texts, select any path through the overlay 41, and print that path linearly.

Personal Uses:

For example, the user can combine driving directions with personal photos, add explanatory comments and send these out as an invitation that can be played in a tablet equipped with the browser add-on 40, as the user's guests are driving to the event.

The user can create a travel diary during a trip, linking the user's own photos and videos with images from the web, entering comments and editing flexibly during the trip, and after the user returns. Other users such as family members can create different paths through the same travel diary material for different purposes, and print them out when needed. One path might become a class report in school, another sent to relatives and friends, another become a treasured personal record.

The user can assemble a library of audio-visual playlists together with comments, each a different path through a common library of audio and images.

The user can begin with a library of recipes assembled from diverse sources, and overlay it using an overlay 41 with comments and menu suggestions. Paths are created reflecting each meal, connecting multiple recipes in order. Then, without disturbing the basic recipe library in any way the user assembles a multi-day menu with all the necessary comments as a distinct path. This is an application of a multi-level hierarchical overlay as discussed above: courses included in menus sequenced over days and weeks. Over the years, the user can accumulate hundreds of these sequential paths through the library.

In all these applications, the various paths created in the overlay 41 can be read as a path on the computer or tablet, using the overlay builder 56 or an add-on 40, or printed out in the traditional way. The user can also share this work with others, allowing them to contribute to what the user has created.

Website builder. The website builder can also create general electronic books (but not electronic textbooks). It has all the capabilities of the Author's Workbench, along with additional general-purpose capabilities relating to connectors, informed choice and perspectives. It also deals with arrangements and security issues.

Website Applications:

In another embodiment, an electronic book or an overlay of existing source material is created, which integrates in a single compilation material from multiple sources, such as multiple conventional books. Each separate source is represented in the compilation as a path through the compilation. The compilation has many entry points, for example one entry point for each discrete source (e.g. book). Each entry point offers a different angle of approach to the compilation. Each entry point opens to a path through the compilation that presents its own topic (e.g. the topic presented by the underlying source). However, because the underlying sources are all collected together into a single compilation with multiple paths through the compilation, a user of the compilation has access to a wide range of choices when connecting the material together with other relevant topics. These connections may be created by an author of the compilation, for example by creating a connection between two related topics in two sources in the compilation. Thus, if the compilation compiled several religious texts, the author could logically connect the same story told in each text, such that a user navigating the compilation could explore multiple viewpoints about that story, as expressed in each underlying text.

In another embodiment, a central organization (such as the Audubon society) maintains a public web resource (such as an individual photo of each bird in America with accompanying text description), and offers to users (for example chapters and/or individual members) the ability to make a local exhibit as an overlay. Construction of the local overlay is semi-automatic: Beginning with the list of local entities provided by the user (such as birds), possibly supplemented by a sequential order (for example local counts), an overlay that visits the list of descriptions is initially created. Then the user is free to insert comments and further material (such as local photos) to supplement the basic resource and complete the presentation. The local overlay then joins a collection of other local overlays, which can be made publicly available through the central organization's website and/or local websites as preferred. Over and above the intrinsic value of these local presentations, the process elicits local information that is valuable to the central organization.

Application 5—California Driver Handbook and Sample Driver Tests

This application demonstrates basic capabilities of the Tabular Grid and Display Field, including importing data, using multiple layers, adding connectors, and including active content in the form of test questions. It also demonstrates some capabilities presented along with other device pairs, such as administering test questions and navigating with a supporting ribbon. The two layers are for test questions and handbook, and the reader can make either one the top layer. The Drivers Handbook of the California State Department of Motor Vehicles is imported into the Tabular Grid, and made accessible as one of two layers in a structured display in the display field. Sixty-eight multiple-choice test questions provided by the DMV, with 'answer' as an attribute, are imported as a second layer in the structured display.

A little research serves to peg the location or locations in the Driver Handbook that relate to each question. As a result, each question receives the attribute(s) 'handbook reference(s)'.

The reader can scroll through the handbook layer. Any passage referred to by any question is highlighted, and the reader can select the highlighted marker to view the relevant test question. The reader can also search in the concordance of terms for any string and navigate to any question or passage in which the term appears.

The reader can take a simulated test by entering an answer to each question in sequence, and receive deferred feedback on performance when the simulated test is complete, along with a guided tour of the sections of code related to incorrect answers.

The reader can navigate through the question layer sequentially, from 1 to 68, with support from a navigation ribbon, or the reader can manually navigate through the question layer in any sequence, viewing questions and following links to relevant points in the Handbook. At any question node the reader can: (i) enter an answer to the question, in which case feedback as to correctness is given; (ii) view the answer to the question; or (iii) navigate to the relevant section(s) of code, before returning. When an answer is entered, the answer is immediately graded, and if the answer is incorrect, the reader is given the correct answer and the relevant location(s) in the Handbook are automatically displayed.

Electronic Books:

Additional embodiments of the electronic book or overlay include the following examples:

Literature:

Many stories concern two or three diverse characters. Usually the narration lays out their interactions and their thoughts, sometimes quoting their words. An electronic book according to embodiments of the invention straightforwardly presents the story line from the perspective of each of the characters. Each character's personal narrative is a distinct path through the nodes of the book, with a series of key scenes narrated by the author as a central path. Some of the nodes would be shared by multiple paths, and some of the nodes would be unique to a given character's narrative. Additionally, some nodes could supply different content depending on the path by which the reader arrived. Thus a node regarding a key point to the plot could present the same content (e.g. a view of a key scene) but alter the view to reflect the perspective of the path for the character the reader was following. A presentation of this kind gives the author's characters the scope to fully express their personal qualities. The reader of such an electronic book can choose to follow the narrative of any of the characters, thus experiencing a different book on each traversal through the electronic book.

Laying Out Fields of Knowledge:

Many widely read articles and books offer overviews of fields and topics of knowledge, striving for timeliness and often laden down with references to varied publications. The same work could be done much more effectively as an electronic book of an embodiment, using the techniques mentioned with reference to the overlay 41 above. An overlay 41 is constantly updated, keeping it always current. Such an enterprise could be a cooperative venture.

Application 6—Overlay Supplement: Buddhism Centered on Wikipedia

This application illustrates the capabilities of Informed-Choice Paths and Knowledge Garden, and also makes extensive use of Overlay Outline and Concordance with Contexts. The project is concerned with Buddhism on Wikipedia. Wikipedia offers a Buddhism Portal, which opens to a number of other articles that provide overviews and classifications of Buddhist articles. There is also a Wikipedia book on this topic, described as "a collection of Wikipedia articles that can be easily saved, rendered electronically and ordered as a printed book." These top-down resources link to thousands of Wikipedia pages on Buddhism.

The individual hierarchical tree-structures offered under the Categories in the Buddhism Portal are linear outlines, which if juxtaposed would become a complex non-linear outline with multiple dimensions and cross-connections. Thus the existing Wikipedia structure can be represented as an overlay outline, and the comprehensive list of individual articles can be treated as an intermediate concordance, at the level of articles, which lies between the top-level overlay and the basic concordance of individual terms and other constructs that make up the articles. Contexts for the articles in the concordance are provided by various references, cross-linkages, and terms utilized. The Concordance with Contexts for key terms in these materials serves as the base level. The intermediate and base level Concordances are integrated to obtain an enhanced and extended list of key terms and other elements.

Many other pages within Wikipedia and beyond it elsewhere on the web can be identified by searching for Buddhist meanings and terms, relying on a list of key terms initially assembled from a Concordance identified within Wikipedia. As other web sites with worthy content are found, they can be assimilated in an Extended Concordance and used to expand the search list of key terms. In this way, the list of acceptable resources is extended incrementally. Of course, a similar approach could be applied to any other Wikipedia portal.

Beginning from the Overlay Outline representation of Wikipedia's existing structure, creative procedures associated with the Overlay Outline and Concordance with Contexts device pair can be employed, by using the Interweaver to compile an extended Overlay Outline for Buddhism in Wikipedia that better reflects the bottom-up contexts of the articles. This may become a valuable resource for Wikipedia users, and will both facilitate and be enhanced by the application proposed here.

The suggested application is a family of Overlay Supplements. Each Supplement is based on a notable source, such as an introduction to Buddhism or a survey of Buddhist topics, which has been published as a traditional book or published on the web. Different Supplements are drawn from different traditions or reflect different approaches. The first step for each source is to publish it on the web as a self-contained Knowledge Garden, equipped with its own independent Informed-Choice Paths that guide a user through the textual material in the source. If the source is a traditional book or is a web publication structured with a linear outline, the linear path becomes the primary path among other Informed-Choice Paths. This independent treatment of the source has value in its own right.

A source that has been prepared in this way can serve as the core of a Knowledge Garden composed from Buddhist material in Wikipedia and optionally extended beyond. In this expanded role, the Knowledge Garden crafted for the source alone is interwoven with and extended by other Informed-Choice Paths leading to a wider range of topics. This extension process is conducted by a knowledgeable user who is familiar with the relevant tradition or approach. Each completed Overlay Supplement will be a valuable web resource, and will facilitate later projects with other sources. Ultimately, the family of Overlay Supplements, reflecting different traditions and approaches, will take shape as a comprehensive Knowledge Garden composed from Wikipedia articles, Overlay Supplements, and the web beyond.

To briefly summarize the procedure for each Supplement, with the permission of author and publisher as appropriate, the text of the source is imported into the CDE, mapped with an Overlay Outline and equipped with a Concordance with Contexts for key terms. Out of respect for the author and tradition, this Overlay Outline will be preserved in its original state. Next, the Interweaver tool is deployed to develop the correspondences between the Supplement and Wikipedia. Interweaving takes advantage of the top-down structure of the Overlay Outlines for the source and for Wikipedia to establish similarities and differences, and also undertakes a parallel correspondence process for the bottom-up Concordances with Contexts for the source and Wikipedia by matching the chapters, sections, paragraphs, passages, lists, key terms and so on in the source text to the material in Wikipedia articles and beyond on the web. As the user operates the Interweaver, a mapping from nodes of the source to articles and web-pages beyond takes shape. The result is a coherent Overlay Supplement, in the shape of the initial source, which serves to organize and present linkages to Wikipedia and extended materials on the web. Once the source has been organized as an Overlay Supplement in this way, any special purpose path crafted for the source can be readily extended into a path through Wikipedia and beyond.

This approach has several appealing features. Overlay Supplements can be created for different traditions and approaches, meeting a range of special needs while also offering informative comparisons among different Buddhist viewpoints. The user is presented with an appealing structure for the Wikipedia material, which can be optionally extended to web sites beyond Wikipedia. Topics in each Overlay Supplement that are not well covered in Wikipedia may be useful topics for additional articles, and the editors who prepare the Overlay Supplements may find it natural to fill in the gaps.

The availability of multiple Overlay Supplements from different traditional perspectives or styles of presentations offer almost unlimited scope for enriching the existing content of Wikipedia and opening Wikipedia to more fluent and instructive modes of access. For example, a user can begin from any article within Buddhism in Wikipedia, and view its position within any subset of the Overlay Supplements; its position and locality are displayed in the form of a Knowledge Garden that compares and contrasts the selected Overlay Supplements that include or closely approach the article. The user can also search for meaningful passages within the Supplements and in other related Knowledge Garden resources that clarify differential treatment by various Supplements.

Knowledge Garden Perspectives can be applied to the Wikipedia material, to the Wikipedia material with extended web material, and to the whole enriched by overlay supplementation. Such displays may be helpful for Wikipedia's editorial process. For example, Wikipedia articles are sometimes marked for cleanup or tagged with editorial requests for further contributions. As a service to Wikipedia's common editorial perspective, the nodes representing these marked and tagged articles can be highlighted according to their editorial status, promoted to a highest or second-highest layer in a multi-layer display of the Wikipedia material as a whole, and presented in a way that permits efficient navigation through the marked and tagged articles and on to other related articles. Moreover, the Wikipedia intermediate Concordance with Contexts for each article maps the article to relevant material elsewhere, and this may be a useful resource for contributors. Making use of the intermediate Concordance with Context and treating the articles as scenes for automated comparison, pairs of articles that are candidates for useful cross-references or merger can be detected and subsequently displayed for efficient navigation in the setting of the Knowledge Garden. When extended web materials are brought into the mix, many possibilities for adding references, enhancing articles and preparing new articles will become apparent.

Each Overlay Supplement can take this to a higher level by placing the material into a systematic context in which gaps in existing Wikipedia material become readily apparent; opportunities to move toward completeness by referencing the Overlay Supplement text itself or extended web material become evident; and the context offered by the Overlay Supplement helps to prioritize enhancements.

Working Through Cognitive Difference or Contention:

Using an electronic book or overlay of an embodiment, as discussed above, to make a record of statements from opposing viewpoints and beliefs, or from contending parties can do justice to each of the different sides. Each party receives a distinct path that traces their positions and reasoning, while a path along the middle ground offers a balanced perspective on the distinct positions. An approach like this is a natural expression of good journalism and potentially an aid to reconciliation.

Tracking Changes in Human Culture:

Culture at any point in time is many-faceted. Over time these facets change as culture changes. Offering an overlay containing connections to multiple facets of human culture at each point of time, captured as nodes in the overlay-a cross-section of culture at that moment, and then layering successive cross-sections as additional overlays, or layers to the overlay as discussed above, to create a history will offer a compelling record. The overlay of an embodiment of the invention is ideally suited to turn a structured matrix of information into an intelligible and interesting presentation.

Technical Documentation: Clarifying Complex Systems:

The world is increasingly complex. Gadgets have more options, increasingly complex controls to manage those options, and more and more potential points of failure and confusion for the user. One of the side effects of this is that it's increasingly easy to find a solution on the web. Printed user-manuals and generic web-based comments are increasingly supplanting documentation from the gadget's manufacturer.

The electronic books and overlays of embodiments as discussed above are excellent vehicles for technical documentation in every form, with qualities ideally suited for the creator, the users and third-party documenters.

The complexity of many systems arises from many interacting elements. A system may be unstable or stable, fixed or changing depending on how the interacting forces balance out. Simulations of such systems can calculate their behavior, but this is not always sufficient to explain their workings. The overlay of an embodiment is ideally suited to represent the interactions conceptually, allowing the various influences to be traced.

For example, the overlay of an embodiment is used to create the technical documentation for a new product or a new software program. When a designer is creating something, the designer takes into account many interactions among different elements of the design. Sometimes elements are connected by direct impact, either one-directional or reaching a mutual balance. Sometimes their design reflects a trade-off that gives rise to a point of vulnerability and potential failure. Sometimes a mutual interaction is hard to understand, and sometimes it depends on subtle factors elsewhere in the system.

Usually the more subtle interactions between features in the design are not clearly apparent in conventional documentation, but the overlay of an embodiment allows their importance to be clearly acknowledged. Each feature or design element of the new product is reflected in a node of the overlay. Then, each such interaction is recorded by its own connection between the nodes reflecting the features involved.

Documenting Computer Code:

The overlay of an embodiment makes the logical structure clear, by representing this logical structure using the nodes and connections of the overlay. For example in well-designed object-oriented software the logical structure of the program's functions is reflected in the structure of the program, including for example the various objects which call each other, or the various routines that invoke each other, when the program is executed. The overlay containing the technical documentation can be attached to the code objects with links that parallel these functional interactions. In fact, a complete structure for the documentation overlay could be read out from the computer code.

The overlay of an embodiment can go beyond the simple reading out of structure from computer code in a very important way, because interactions in the code are generally so intricately intertwined that no single framework can reflect them. Code follows the logical structure of some interactions but becomes perpendicular to others, and cannot possibly represent them all. By contrast, as an overlay, the overlay of an embodiment easily overcomes these problems by adding connections for as many additional structures as necessary. Each structure becomes a distinct layer in the documentation, and layers can be cogently compared and contrasted in compelling visual perspectives.

Living Documentation:

Furthermore, the usual forms of documentation do not age well. They are inadequate to begin with and as a project is enhanced and extended the documentation falls further and further behind.

One important cause of this is that the linear, tree-structure of documentation gets in the way of revisions. When leaves on distant branches become closely interconnected, there is no way for conventional documentation to emphasize this transparently.

Often enhancements and extensions come into being because the original design was inadequate, so innovations naturally violate assumptions that pervaded the original version. But it is not worth the effort to reorganize the entire tree to reflect the changes, and so the documentation loses its integrity and fades into irrelevance.

The overlay of an embodiment facilitates technical documentation that is living, active and in depth. As soon as someone understands a way to improve the documentation, they can add in the links and nodes to implement the improvement.

As an illustration, suppose that a software developer opened up its comprehensive documentation to outside users, such as user-manual publishers, to create overlays on the internal documentation using embodiments of the invention. In a short time the software developer's own people might be navigating through their own documentation using the nodes and connections in an overlay of an embodiment, which was created by the outside users. Of course all the outside users would be doing the same thing. Soon the software developer's people would better understand what they were doing and communicate better with one another, and as a result programming performance would improve and become more user-friendly.

Once the documentation is enhanced with an overlay, it can be seamlessly updated. For example, if a user identifies a gap in the product documentation, or a design flaw in the product, or an implementation bug, the user can diagnose the problem, create an update to the documentation, or a work around for the flaw or bug, and the new content is assimilated seamlessly into the existing documentation, via the overlay. The newly prepared explanation is accessible through its own path, with its own entry gateway keyed to the problem, and presents the solution through comments added in the overlay and citations from the underlying documentation.

Medicine: Integrating Clinical Experience and Scientific Discovery into a Coherent Framework:

These overlays can also be used to help translate complex knowledge into practical forms. For example, users building overlays can integrate together clinical experience and scientific discovery into a mutually coherent framework. Conventional clinical medicine largely relies upon rule-based treatment consequent upon diagnosis, and is not well suited to complex illnesses or illnesses that are hard to diagnose. Alternative medicine is more likely to approach each patient as a unique and complex biological system to be investigated in depth and progressively understood more and more incisively until eventually a cure is reached. Science approaches the human body as a system but tends to focus on general rather than individual characteristics and circumstances. Each of the three approaches has great strengths in its own domain, but it seems that the alternative clinician is positioned at the nexus between science and conventional treatment, because this is the point where individual characteristics are investigated in depth. Further, all three will benefit from increased knowledge of the human system, and the key to success is to consider patients who are ill with complex, hard to diagnose illnesses-the same patients who would normally seek out alternative treatment-as the platform for advancing basic science and translating scientific knowledge into practice. In an embodiment, the three separate orientations are each distinctly articulated and then juxtaposed, using the overlays on top of a core set of information such as a given patient's medical history. This approach allows widely disparate approaches to cohere around a new orientation, and facilitates the ultimate treatment of the patient.

Application 7—Systematic Translation of Religious Literature

This application illustrates the use of the device pair Overlay Outline and Concordance with Contexts.

Systematic Translation of Religious Literature:

For example, the Tibetan Buddhist Canon includes more than 200,000 pages, not including more than a millennium of additional domestic material. Translation into English is well underway, but the initial translation from Sanskrit to Tibetan that began more than 1200 years ago maintained high standards of consistency that are not natural in the West, and there is no agreement as yet as to lexicon or style for the translation to English.

The overlays of an embodiment can facilitate cooperation among a team of translators, by overlaying diverse translations that are all pegged to the Tibetan originals to which they refer. The Tibetan originals supply the underlying information items as discussed above. The various translations created by each translator form overlays on top of the underlying information items. Each translation can create a different path through the underlying Tibetan original material, with the translated text and additional comments explaining the translations.

However the challenge goes well beyond aligning the translations with their originals, because the Tibetan Canon reflects great respect for precedent, so that memorable verse and prose from the Buddha and early masters spawns a tree of consistently translated quotations that extends down to the present day. The overlays of embodiments of the invention can map many hundreds of trees of this kind, perhaps as many as 1000. In many cases, there will be hundreds of branches on a tree. Think of each of the trees as analogous to a branching path, and visualize displaying the many trees extending over hundreds of thousands of pages. The purpose of this mapping effort is to allow translators to see all the usages of a passage throughout the canon as a whole and progress step by step toward definitive translations, agreeing on translation terminology first for these seminal phrases that are so widely quoted, and central to the language as a whole. Without this approach, consistency will be unattainable because various translators will naturally translate the same passage in diverse ways in the many contexts where it appears. In an embodiment, the overlay is used to create a translation platform that will be widely used by translators around the world, allowing them to share information and support one another's projects.

Thus, Buddhist literature recorded in Tibetan is a prime example of religious literature that might benefit from a systematic translation project. The material is vast and increasingly available, including the texts of the Buddhist canon from Sanskrit and other languages that were translated into Tibetan, and specifically, the Derge Edition of the Kanjur and Tanjur. One "top-down" Overlay Outline has a chronological structure, based on authors (and translators), in the form of cross-connected tree-structures, from inception forward in time. This is informed by known student to teacher lineage traditions in India and Tibet, as well as broader classifications into "schools" such as madhyamaka andyogacara.

Each definition of a category of teaching, philosophical or religious school, or translation tradition gives rise to a hypothetical characterization of content (top-down). Different versions of the same textual element associated with schools and/or translation traditions provide further information.

"Bottom-up" context, drawn from a concordance of terms, offers many promising components that can be valuable for translators. Two that are most easily explored are (i) widely used passages and other textual elements, that can be traced forward in time, including lists of topics, blocks of text, and widely recognized textual elements of all kinds, and (ii) quotations and citations with attribution to a source in the past that establish time dependence backward in time.

Content offers information that is distinct from attributed citation, and the two sources of information can be integrated. The many appearances of each phrase or passage, considered as repetitions of a scene, generate a context that links all usages. Usages in the form of quotations with citation are particularly informative. Highly preserved scenes that have historically been emphasized for memorization, such as ordered lists of topics, are particularly valuable.

Each element—text, author, lineage link, block of text with later citations and quotations, list of topics, and specific topic—gives rise to a threaded context. Bottom-up threads may reinforce or contradict one another. Reinforcing threads cluster into a stronger thread. Contradictions to the general tendencies of reinforced threads may offer interesting insights.

Beginning with Widely Used Passages

To work toward consensus on terminology, it makes sense to begin with the most widely used passages, such as ordered lists of topics that were emphasized in memorization; and key verses and phrases from root texts that established commentarial traditions. Each widely used passage is effectively a memorable scene that generates a thread of usages linking texts and authors. Each scene is supported by the assemblage of linked usages which serves as its context.

Widely used scenes are natural initial targets for consensus translation and also the best vehicles for bottom-up perspectives on an overlay outline. The assemblage of contexts, gathered across a set of scenes, is a good starting point for an initial consensus translation project. It can be calculated and made accessible as core material for a translation platform that juxtaposes Overlay Outline and Concordance with Contexts for the benefit of translators.

Citations and Quotations

Like all of the bottom-up work, the work with citations and quotations begins with concordance. For the Tibetan language, a concordance of syllables is first constructed, and a concordance of words and phrases follows.

It is also helpful to assemble a concordance of the terminology used in expressing citations and attributions. Local context can be important, because often the honorific used in the citation identifies which among several authors is meant.

Each attribution may include a text reference and/or an author reference. The citation for the text may also be very helpful in clarifying the attribution. Citation and quotation attributions can also be verified and filled in by establishing citation threads that extend through time.

Working with Texts and Authors

In parallel with the content of the texts, a more modest project related to the top-down overlay outline can be pursued with titles and authorship. It is based on a concordance of texts, with attributes. It can be ordered according to various linear outlines from different sources, and alternatively by author. Diverse outlines for the Tibetan Canon are associated with different editions, and in fact the partitioning of the written material into separate texts differs between editions. A single multi-layer rendering of these different outlines into a single integrated display would be a valuable application of the Overlay Outline.

A similar effort can be made with a concordance of authors and translators, ordered by approximate date and linked by lineage trees, where known or inferred from citations. This component of the Overlay Outline can be validated by citation threads among texts, extending backwards in time, and further developed by comparison against bottom-up threads for textual elements, which will be helpful for corroborating translation.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, unless otherwise stated, and the invention can be performed using different or additional process actions or a different combination or ordering of process actions. Similarly, the orderings of the user traversals through the nodes and connections of the overlays and electronic books of the embodiments are merely illustrative. As another example, each feature of one embodiment can be mixed and matched with other features shown in other embodiments. Features and processes known to those of ordinary skill may similarly be incorporated as desired. Additionally, features may be added or subtracted from the various embodiments or embodiments can be combined. Accordingly, the invention is not to be restricted except in light of the attached claims and their equivalents.

Interactive User Interfaces for Electronic Textbook Implementations

Provided herein are interactive user interfaces for electronic textbook implementations of the present disclosure. The electronic textbook implementations may have various benefits. They may provide a universal educational solution and can be adapted to web courses, home schooling, and classroom applications. Such adaptability may allow convenient adoption by state and local governments. Further, the electronic textbook implementations may be suitable for a wide range of students, including but not limited to students with visual or auditory limitations as well as students with access to devices that lack certain hardware features (e.g., voice or text input, display), etc. The electronic textbook implementations may also be suitable for students with developmental disabilities, such as students who have limitations in interpreting complex symbolism, for example students with dyslexia, dyscalculia, and ADHD. The implementations may also allow students to participate or use the electronic textbooks remotely, for example to accommodate students who are temporarily out of the area or who are confined to their homes for health reasons.

In a further benefit, the electronic textbook implementations may provide significant flexibility to accommodate different users (e.g., students). The implemented interface may be customized for each user. A range of content can be adapted and integrated into a single integrated book (or system) having easily updated and expandable integrated content, and can be presented to different users in intuitive, interactive graphical user interfaces that are tailored to the user's needs, with the result that as the user proceeds through the initially arranged content, chooses among alternatives and demonstrates personal capabilities for performance on questions and problems, the range of content is progressively narrowed to focus on material most suited to the student and the organization of the selected content offered to the student is adjusted to suit the student. The interface presents the organized content as a custom map of the content in the format of a book. Individual units of content can also be adapted in a user-specific fashion, for example so that a student who fails to answer a question or problem correctly can later be presented with an adjusted or flexibly rendered version of that same question or problem in order to determine whether the student now understands the material. The custom map may be customized for different levels of learning (e.g., basic level, general level, advanced level, etc.). The interface display may be customized for user-specific presentations, for example by altering sequence or format or level of detail and by adapting to user responses. The systems described herein may characterize each user by observing and identifying the user's qualities and preferences in order to create the user's custom map. The system may monitor a user's interactions with, and/or the user's progress through the custom map in order to update the custom map in accordance with one or more goals, aims, or metrics associated with the specific user. The user's interactions and/or progress may be monitored in real-time. The custom maps may be updated in real-time. Alternatively, the monitoring and/or updating may be performed at a predetermined schedule, such as periodically. Alternatively, or additionally, the monitoring and/or updating may be triggered manually.

Data collected about a user, such as quantitative and qualitative information about the student's learning style, strengths, weaknesses, performance, and the user's personal information, may be kept private and confidential. Such security measures may prevent privacy violations, protect the student from embarrassment and support the student's self-confidence.

In a further benefit, electronic textbook implementations may be configured to collect and store relevant information and prepare structured records concerning a user's participation and performance that can be flexibly formatted as required by different institutions (e.g., school systems).

In a further benefit, the interactive user interfaces of the electronic textbook implementations can facilitate user-to-user interactions (e.g., peer collaboration). One of the aims of the textbook is to promote inter-student activities, such as discussing the material and talking about learning methods, helping one another to understand mistakes, cooperating on homework assignments, undertaking collaborative projects and so on. In order to facilitate this without encouraging any form of cheating, the system is able to identify remote participants, for example by recognizing voices, keyboard typing style, touch gesture style, input equipment and so on, and classify their contributions in order to deter cheating and monitor cooperation.

Figure 18:
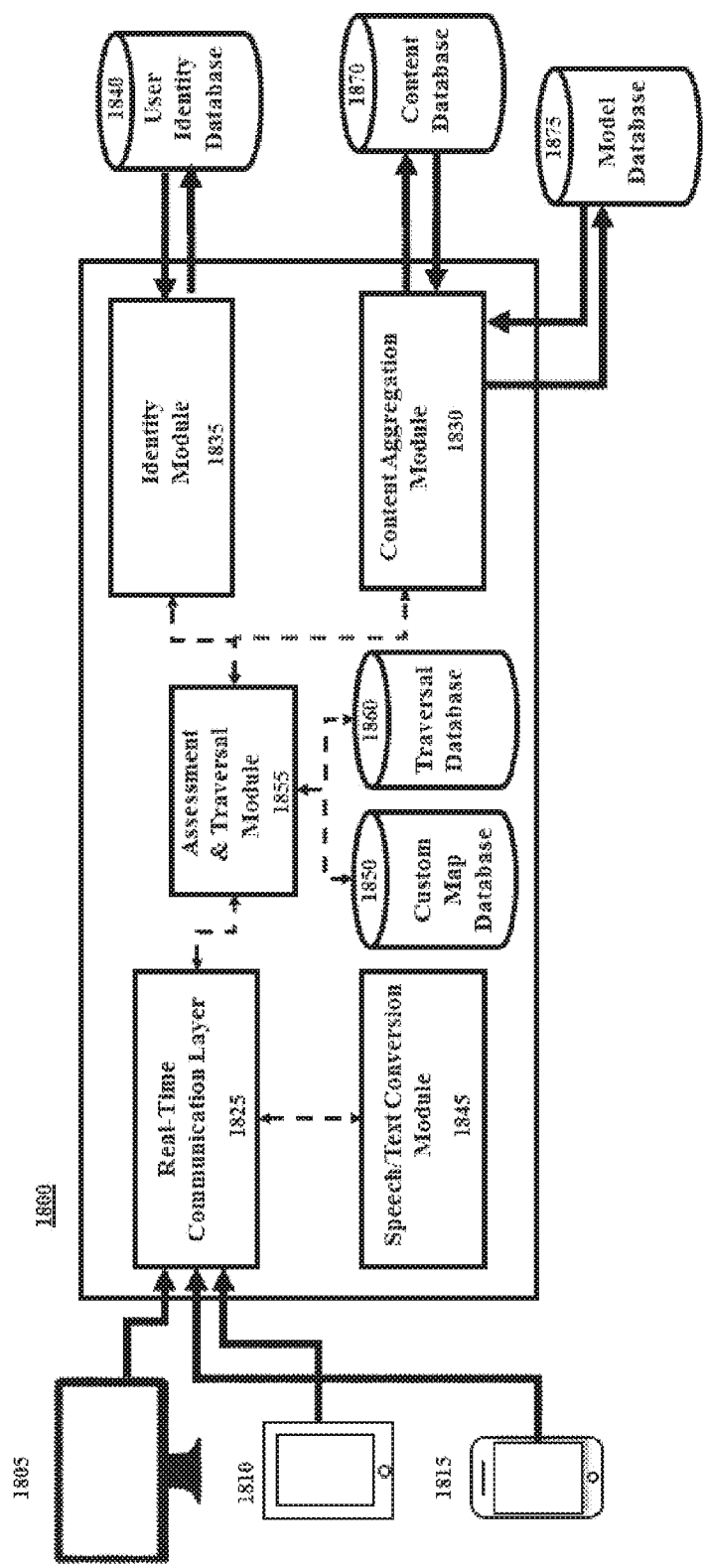
FIG. 18 illustrates a system architecture for implementing the interactive graphical user interfaces of the present disclosure.

FIG. 18 illustrates a system architecture for implementing the interactive graphical user interfaces of the present disclosure.

A system 1800 may communicate with a plurality of user devices 1805, 1810, 1815. The system may comprise a real-time communication layer 1825 configured to provide an interactive user interface. The system may further comprise a speech/text conversion module 1845, assessment and traversal module 1855, identity module 1835, and content aggregation module 1830 to facilitate the electronic textbook implementations described herein. In some instances, the assessment and traversal module 1855 may be in operative communication with a custom map database 1850 and traversal database 1860, the identity module 1835 may be in operative communication with a user identity database 1840, and the content aggregation module 1830 may be in operative communication with a content database 1870 and a model database 1875.

The real-time communication layer 1825 may receive instructions from an assessment and traversal module 1855 to provide an interactive user interface to a user device (e.g., 1805, 1810, 1815). The user interface may provide a custom map to a user of the user device. The custom map may comprise a map of selective custom content and custom sequence thereof. The custom sequence may be non-linear (e.g. showing loops or backtracking due to user choice or performance). Alternatively, the custom sequence may be linear (e.g., in an original sequence of the content in content database 1870). The custom map may be user-specific. Alternatively, the custom map may be a predetermined default content map. A user may access the custom content via interaction with the custom map on the interactive user interface.

In some instances, the interactive user interface may display the custom map, including structural components (e.g., nodes, connectors) of the map. In some instances, the interactive user interface may directly display the custom content (e.g., an electronic page of custom content) in the prescribed sequence. In some instances, the interactive user interface may display both the custom content as well as the custom map. For example, where both are displayed the custom map may include a progress or location indicator, indicating the location of the instant content (e.g., page) being accessed or viewed on the custom map and/or indicating the user's progress along the custom map by showing which content has been completed/accessed and which content remains to be traversed. Where both are displayed, for example, the interactive user interface may be divided into at least two regions, such that a first region shows the content and a second region shows the custom map. In another example, the custom map may be displayed as overlaying (or overlapping) the content. For example, the custom map and/or the content may be transparent or translucent to some degree to allow viewing of both the content and custom map when overlaid. Alternatively, either or both the custom map and the content may be opaque. In another example, the interactive user interface may display the content along with a visual indicator (e.g., icon) of the custom map, which may be called out on demand or upon user action. For example, such visual indicator may be linked to or anchored to the custom map such that when the user interacts (e.g., clicks, selects, taps, etc.) with the visual indicator, the custom map is called up (e.g., in a separate region as part of the content, overlaying the content, in a separate window, etc.), and optionally reverted to the visual indicator (e.g., collapsed) upon another user interaction. The visual indicator may remain in a fixed location on the interactive user interface. The location of the visual indicator may be altered flexibly by the user, such as by moving (e.g., click and drag, touch and drag, flick, etc.) the visual indicator in the direction of or to the desired location.

The assessment and traversal module 1855 may create and store the custom map in the custom map database 1850. In some instances, the custom map database may comprise the content of the custom map stored in the database. Alternatively, the custom map database may comprise only the custom map with anchors to selected content, wherein the selected content is called from the content database 1870 via the anchors. The assessment and traversal module 1855 may access the custom map or sequence of custom maps in the custom map database to otherwise modify, update, or delete custom maps, such as in real-time.

The assessment and traversal module 1855 may create and update the custom map, and its components based on each user. For example, the selected content and sequence may be customized based on a choice made by the user and/or an evaluation of the user (e.g. user performance on one or more assessments). The assessment module may communicate with an identity module 1835 which may identify the user based on the user device and profile the user. For example, the identity module may assign the user a learning model based on the user's evaluation. The evaluation may be based on the user's personal information (e.g., education history, age, etc.). The evaluation may be based on the user's previous interactions with the system 1800. For example, a user's progress in a current custom map may be collected by the identity module 1835 to update the user profile. In some instances, new and/or existing users who have been identified may be presented with a quiz, test, or exam to assess the users' learning characteristics and form a user-specific profile. For example, such assessment-oriented content may be stored in the user identity database 1840. In some instances, the assessment module may create a quiz map, test map, or exam map to present to the new and/or existing users during assessment. User evaluation data (e.g., learning models, user profiles, etc.) and participation data may be stored in the user identity database 1840, and fluidly updated. In some instances, each user may be assigned and identified by a unique user identifier (e.g., stored in the user identity database 1840).

Upon updating a user profile and/or learning model, the assessment and traversal module 1855 may also update the custom map for the user by updating the custom map in the custom map database 1850. In some instances, the assessment module may update the custom map in real-time. As used herein, the term "real-time" may generally refer to the instantaneous or substantially instantaneous response of a processor. For example, real-time can include a response time of less than 1 second, tenth of a second, hundredths of a second, a millisecond, or less. "Real-time" may also refer to the simultaneous or substantially simultaneous occurrence of a first event (e.g., updating of user profile) with respect to a second event (e.g., updating of a custom map). In other instances, the assessment module may update the custom map based on a predetermined periodic schedule (e.g., every second, every minute, every hour, every day, every week, every month, etc.). Alternatively or in addition, the assessment module may update the custom map upon manual instructions (e.g., such as by a user issuing a 'refresh' command). Alternatively or in addition, the assessment module may be triggered to update the custom map upon any change in the user profile. The interactive user interface may dynamically update the custom map for the user in real-time.

The content database 1870 may store integrated content for the electronic textbook implementations described herein. For example, the content database 1870 may comprise learning material data, including informational content (e.g., content shown in textbook pages) and content oriented for performance evaluation (e.g. content shown in problem pages). In some instances, the content may be assigned different difficulty levels (e.g., basic, advanced, etc.). In some instances, the content may be assigned to different learning goals (e.g., irrational numbers in mathematics, Newton's laws of motion in physics, Middle Ages in history, etc.). In some instances, for each learning goal, there may be different versions of content based on difficulty level (e.g., content for basic level, content for general level and content for advanced level, etc.). The model database 1875 may store learning model data. In some instances, the learning model data may include different learning models identified by unique model identifiers, and definitions for the different learning models. For example, the definitions can include associating different difficulty levels with different learning goals.

In an example, a user is profiled by the identity module 1835 which determines a first learning model for the user. The first learning model, stored in the model database 1875, defines a basic level for mathematics and advanced level for history. The content aggregation module 1830 may aggregate basic level content for mathematics and general level content for history from the content database 1870 to provide the select content to the assessment and traversal module 1855 to create the custom map for the user. The custom map is presented to the user device (e.g., 1805, 1810, 1815) on an interactive user interface via the real-time communication layer 1825. As the user interacts with the custom map and content thereof, the user interaction data is collected by the identity module 1835 and stored in the user identity database 1840. Based on such user interaction data, the identity module 1835 may re-evaluate the user to determine a second learning model for the user. The second learning model, stored in the model database 1875, defines a basic level for mathematics and a basic level for history. The content aggregation module 1830 may aggregate basic level content for mathematics and basic level content for history from the content database 1870 to provide the selected content to the assessment and traversal module 1855 which updates the custom map for the user, which is presented to the user device on the interactive user interface via the real-time communication layer. All of the processes described in this example may be in real-time. Alternatively or in addition, the processes described in this example may be periodically rendered or manually triggered (e.g., by the user).

In some instances, the real-time communication layer 1825 may communicate with the speech/text conversion module 1845 to output one or more components of the interactive user interface via audio or display (e.g., text). In some instances, the speech/text conversion module may convert text input/output to audio or audio input/output to text.

Custom Map.

The structure of the electronic textbook may be visually represented as a custom map. The custom map may graphically display the content in a directed graph. The directed graph may comprise nodes that represent elements of content ("pages"), and connectors that represent relationships among those pages and paths through those pages. The custom map may be displayed as a single layer or in multiple layers. In some instances, each layer may represent difficulty levels of content. For example, a course in the electronic textbook offers three levels of instruction—general (the average level), advanced, and basic (in some embodiments, the remedial level). In this example, there may be up to three versions of each page. Accordingly, the nodes for the versions of a page can be organized on the map on three different layers, one for each level, arrayed one above the other, and in other applications, the nodes for the three alternative versions of a page are juxtaposed on a single-layer display.

Figure 19:
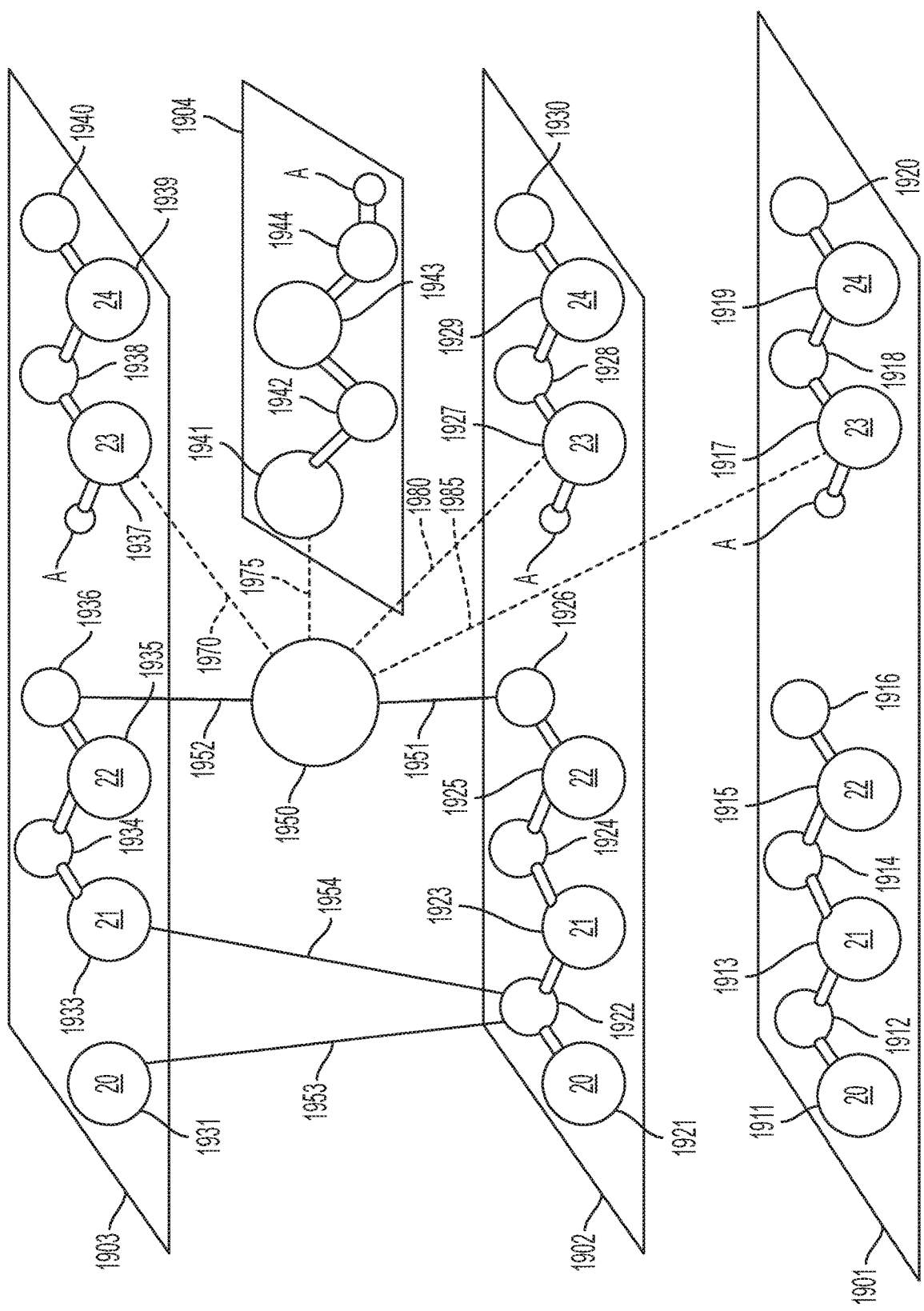
FIG. 19 illustrates an example of a three-layer custom map.

FIG. 19 illustrates an example of a three-layer custom map. In this example, an author of the electronic textbook has provided three levels, including the basic, general, and advanced instructional levels. Three levels of instruction are distinguished as layers 1901, 1902, 1903 on the custom map. The general layer 1902 comprises general nodes 1921 through 1930. The advanced layer 1903 comprises advanced nodes 1931 and 1933-1940. The basic layer 1901 comprises basic nodes 1911 through 1920. The parallel levels illustrate topic pages or nodes that cover a similar topic subject matter with differing levels of difficulty. The differing levels of difficulty are illustrated by the placement of the nodes into distinct parallel layers and the relative spatial relationship between the parallel layers. The nodes (e.g., topic pages, problem pages, etc.) are arranged so that shared content (e.g., topics, problem questions, etc.) between the layers are illustrated vertically, for example: the body of content referred to as 21 is covered in advanced, general and basic forms with advanced 21 content presented in topic page 1933, general topic page 1923, and basic topic page 1913—with three topic pages depicted vertically in the interface. The significance of the vertical display of topic content according to the level of difficulty may be indicated as shown in this example by reference numbers (e.g., the white number 21 labeling the vertically arranged topic pages), icons or other methods of conveying the significance of the vertically oriented content as shown by the white numbers 20, 21, 22, 23, and 24 disposed within the nodes (e.g., topic pages, problem pages, etc.). In some embodiments, the display may not include these numbers and the nature of the topic content (e.g., advanced, general, basic, etc.) is understood by the placement of spheres or other shapes (e.g., cones, cubes, cylinders, tetrahedrons, hexagonal pyramids, cuboids, hexagonal prisms, torus, octahedrons, pentagonal pyramids, triangular prisms, pentagonal prisms, hemispheres, icosahedrons, square pyramids, parallelepipeds, ellipsoids, dodecahedrons, etc.) used to depict topic pages, problem pages or any other pages or nodes displayed on the interfaces. The placement of these shapes can be used to convey other relational information about the content of the node. For example, sequential progression from left to right conveys movement through the content. The overall global view of the content map begins beyond the left of the segment shown here and extends beyond the right border. The route actually taken by a student is called a "traversal." A potentially available route which may be one of multiple routes available to a student is called a "path."

In some instances, a course may comprise a set of mandatory topic segments, each topic segment existing in a set of different versions corresponding to diverse instructional levels (represented in different layers 1901-1903). Each instructional level may contain one or more pages, some or all of which may also provide a problem page. In FIG. 19, the larger circular icons (e.g., 1931, 1921, 1911, etc.) can represent a topic segment of one or more topic pages, and the smaller circular icons (e.g., 1934, 1924, 1914, etc.) attached to the larger circular icons can represent a corresponding problem page. A typical or recommended traversal through each level may be shown as a series of connectors between recommended pages (e.g., nodes). Other connectors may link optional pages. For example, a user interacting with the advanced layer 1903 traverses from 1931 to 1933 by traversing connector 1953 to the general layer 1902 at general node 1922 (e.g., a problem page) and then traverses connector 1954 to revert to the advanced layer 1903. This detour is necessary because the general node 1922 serves as the problem page for both general and advanced layers.

The large node in the center 1950 may represent a junction called a "gallery," which permits multiple paths of progression (e.g., to different nodes) and offers information about these choices. In this example, the gallery may permit four paths of progression for the user. Three of the paths go forward on each of the three levels (dashed path 1970 to topic page 1937 located in advanced layer 1903, dashed path 1980 to topic page 1927 in the general layer 1902, and dashed path 1985 to topic page 1917 in the basic layer 1901). A fourth dashed path, 1975 leading to topic page 1941, illustrates a path along an optional excursion layer 1904 which comprises a short innovative excursion path, comprising nodes 1941-1944, before returning to continue on one of the three levels. The optional excursion layer 1904 is depicted in a plane with an orientation different from, and not parallel to layers 1901, 1902, and 1903, in order to indicate that these topic pages and problem pages do not directly correspond to the other layers in the way the nodes (e.g., topic pages and problem pages) do in 1901, 1902, and

1903. The small spherical connectors labeled A may indicate a user concluding a path (e.g., an innovative excursion) and returning to the prior traversal level. Small spherical connectors labeled A can be found at various layers of the content, for example at 1944 in the innovative excursion layer 1904, at 1937 in the advanced layer 1903, at 1927 in the general layer 1902, and at 1917 in the basic layer 1901). These small spherical connectors labeled A in the example shown in FIG. 19 can be made using shapes of different dimensions (e.g., circles, squares, rectangles, etc.). The exemplary small spherical connectors labeled A in FIG. 19 can have different shapes (e.g., cones, cubes, cylinders, tetrahedrons, hexagonal pyramids, cuboids, hexagonal prisms, torus, octahedrons, pentagonal pyramids, triangular prisms, pentagonal prisms, hemispheres, icosahedrons, square pyramids, parallelepipeds ellipsoids, dodecahedrons, etc.). The solid-line connectors (e.g., 1951, 1952, 1953, or 1954) between nodes may indicate recommended paths, these paths can traverse layers (e.g., 1953, 1954) and make connections between layers or directly to the gallery 1950 as shown with connectors 1951 and 1952. The broken or dashed connectors (e.g., 1970, 1975, 1980, or 1985) leaving the gallery may represent optional paths leading from the gallery.

In some instances, there may also be a lower directed graph layer beneath the illustrated multi-layer outline, which comprises the requirements (e.g., educational goals, technology familiarity, etc.) that are being satisfied by the interactive experience as well as the dependencies between the different requirements. Satisfying the set of requirements may determine successful completion of the course, and the set of dependencies may describe the interconnections among these requirements. Requirements may be educational goals. Requirements may include goals for increasing a user's technological familiarity with the electronic textbook. Dependencies may indicate the elements of knowledge, skill, and experience upon which mastering the requirements depend. The combination of dependencies and requirements may be represented by a distinct directed graph. The dependencies may determine the sequence in which the various pages should be completed. In some instances, all the pages on which a page depends should be completed before that page is attempted. In this case, the underlying dependencies and requirements graph may determine the structure of the custom map for the course. For example, topic 22 (represented by general topic page 1925, advanced topic page 1935, and basic topic page 1915 and the three corresponding problem pages 1926, 1936, and 1916, respectively) comes before a junction and fulfills a requirement. When showing the custom map and the dependencies/requirement map in the same diagram, one above the other, the two maps can be linked by vertical pegs (not shown in FIG. 19) that connect a node of course content to the dependency or requirement node to which it relates. Each map display can be a GUI that offers various capabilities to the user. For example, each node has attached content, such as a title, an abstract and one or more pages, and any element of attached content can be activated by first selecting the node and then selecting that element of content. Also, the user can select any node at which to shift into sequential content-level navigation from that point forward, and conversely the user can revert from content-level navigation to the custom map display as of the user's present location at any time.

As described above in the paragraph having the heading "Attributes in an Electronic Textbook," nodes can have attributes including title, brief abstract and type, that can influence the appearance of the node. As depicted in FIG. 19, the type of the node influences node size: topic page nodes are of medium size, problem page nodes are smaller, and the gallery node is large. Also, in this depiction, the topic number ranging from 20 to 24 is shown on topic page nodes. Depiction in this compact format helps to describe the implementation of the interface. This view may be helpful for an author or experienced teacher navigating through the electronic textbook. However, many students may benefit from visible node titles, because depicting titles results in a diagram of the local context. Seeing the diagram can arouse curiosity and may help the student to develop perspective on the material and remember it. A title may appear below its node, or the node may be represented by an image of its title. In all node depiction formats, selecting a node by mousing over it or touching it will bring up a window showing attributes of the node such as title, brief abstract and attached features.

Navigation of the Custom Map.

The content map or the user's custom map can be navigated in its entirety by users (e.g., advanced students, instructors, and mentors, etc.) who are able to see the comprehensive "global view." However, in some cases, only a local region of the content map is visible to a user (e.g., student) as a custom map in order to highlight what is immediately relevant and focus the user's attention on the current study situation. During the user's progression through the material, the "local view" of the custom map may emphasize a subset of the various levels of instruction and focus upon pages in the vicinity of the page currently being worked upon. In some instances, the display of the "custom map" may be customized as needed, such as to limit visibility of irrelevant pages (e.g., nodes) to show only currently relevant pages, and/or limit visibility of irrelevant versions (e.g., layers) to show only the versions of such pages that relate to the student's current emphasis and focus.

As explained with respect to FIG. 20 below in the section having the heading "View Ahead and Path Taken," the traversal history of a user to date may be shown in the Path-Taken view, and/or relevant future possibilities may be shown in the View Ahead view. The View Ahead may be extended as needed to provide perspectives on choices to be made currently or in the future.

Any user's path taken in traversing the textbook can be represented by a series of connectors between the successive pages visited during the traversal. The record of this path can be displayed in the form of an overlay on the custom map that is unique to the user. The overlay may (i) indicate pages visited and the traversal sequence, (ii) indicate completion status, and (iii) provide data specifying the particular version or versions of a page that the user has visited. Like the custom map itself, this path may be shown as a directed graph comprising nodes that represent pages and connectors that represent transitions between pages (see FIG. 20). This directed graph can be displayed as an additional layer overlain above the custom map. If two users are comparing the routes they have taken through the textbook or if an instructor is considering the routes taken by various students, the graphical user interface can show the various routes as graphical displays in contrasting colors and these can be superimposed in a single overlay layer or assigned different overlay layers. As described further in the paragraph having the heading, "Separable Overlays," each user may enter private comments on the textbook that are associated with a specific node or connector that the user has traversed. The comments may be shared selectively, in whole or in part, with other users of the system (e.g., teachers, mentors, peers). In some instances, the comments may be displayed as another overlay layer on the custom map, with each comment node linked to the associated textbook node or connection (e.g., via vertical pegs). In principle, a student's assembled comments may be developed into a study guide.

Navigation Styles.

The interactive user interface may provide two styles of presentation for representing different component levels of the electronic textbook implementation, such as at the course level, topic segment level, version level, and/or page level. In one style of presentation, the graphic display of the custom map may show a diagram comprising nodes corresponding to elements of that component level, with connectors connecting those nodes that correspond to transitions between the elements. The user can select any node or connector in order to expand it and view its content. This approach facilitates choosing among alternative elements and formulating a path to visit the chosen alternatives in a convenient or recommended sequence. The advantages of this style of navigation are described in the paragraph above having the heading "Presenting Complex Knowledge in Depth," which explains that the custom map may serve as a non-linear outline. In this style of presentation, the user accesses content via the overlay.

In the other style, the user progresses through a series of content pages, which may correspond to the content of nodes as well as content of connectors, along a sequentially determined path, transitioning from one page to the next by default when selecting a "next page" option, or selecting other options available from that page using "buttons" or other user interactive objects in some accessible form. In some cases, this transition may directly connect successive nodal content elements (e.g., topic pages, problem pages, etc.) and in other cases, a transitional connecting page may appear between successive nodal content elements to present the content of a connector. This form of navigation is described above in detail in the paragraph having the heading "Textbook Reader" and subsequent paragraphs. In this style, as described in the paragraph above having the heading "Navigation Tools Window," the user can optionally open the custom map to show the present location and the nodes and connectors in the vicinity and other nodes and connectors that may be visible. When moving forward from one topic to the next, a student may navigate the graphic overlay display that shows a local view ahead of the custom map, seeing at the inception of each new page optional nodes representing available versions of content. The student may expand any one of the nodes to view the content, and optionally decide to complete that content page and its problem page or alternatively the student may decide to return to the overlay and select another page to expand. This approach allows the student to develop comprehension of the various qualities of the materials at the different levels.

Navigation may be substantially improved using the interactive user interface. For example: navigating the "overlay layer" in the interactive user interface may be a substantial improvement over navigating through a table of contents at the opening of a printed or electronic book and navigating the "content layer" in the interactive user interface may be a substantial improvement over linearly reading through the content of the book. The innovation here is that both styles implement a directed graph custom map—as contrasted to the rigid progression of a linear outline—and accommodate the wide range of choices and navigation styles that become available.

Provided herein are systems and methods for enhancing the interactive user interface through entrainment, separable overlays, and comments.

Entrainment.

The interactive user interface may offer several modes of entrainment between different users' devices. As explained in the paragraph above having the heading "Facilitating Remote Participation through Entrainment," when the teacher is demonstrating the use of the Electronic Textbook or presenting material from the textbook, and optionally projecting an image of the teacher's screen onto a larger display screen in a classroom, a student who is unable to attend class in person can participate through entrainment of the display on the student's device to the display on the teacher's device. The mapping of the electronic textbook to a directed graph (in this case the content map) permits entrainment to function efficiently in this way, without any pressure on available network bandwidth. Each connector and each node may have a unique identifier (uuid) so that the present layout can be tersely communicated between systems, and every transition between successive identified elements may take place in a standardized way. Even if the teacher's electronic textbook has been updated to a more recent version than a student's, the student's display may track the teacher's display except when the teacher visits an element newly added to the textbook (in which case the necessary update information may be broadcast to the student), because each uuid persists through successive updates of the electronic textbook. The teacher can use this same capability to introduce students to the electronic textbook interface. The teacher brings up the electronic textbook interface, showing the students how to bring up their version of the system with their own personal accounts. Then the teacher entrains all of the students' systems to the device shown on the screen. Now the students' systems reproduce each step taken by the teacher; this is not a copied display but mirrored or remote navigation. The teacher takes the students through an initial topic page, and then takes the class to the subsequent problem page on that same topic, and within the entrainment system sets a scope for each individual student to provide their own answer on that page. The teacher may navigate sometimes at directed graph overlay level and sometimes at content level, while encouraging the students to follow along with their own devices, such that the students may benefit from having their devices entrained to the teacher's device. Then the teacher releases entrainment so that all the students are independently operating their own systems, beginning from that scope, and asks them each to enter their answer. This may allow remote students who participate via a network connection and/or listen to an audio broadcast to participate, such that the electronic textbooks on their own devices follow every step that the teacher takes. In some circumstances, the teacher may cycle between intervals of entrainment, during which students are led along an informative path and brought to an interesting point, and intervals of free exploration during which individual students navigate independently on their own devices and explore the locality to which the teacher has brought them.

Entrainment also allows systems on different devices belonging to different users to be coupled to the system on one particular device. In this case all users are seeing the same images on their screens, but in an embodiment, only one designated user at any given time has the scope to operate the system, while the other users are passive. For example, a student may invite one or more mentors to tune in in this so that the student can demonstrate a troublesome situation. Student and mentors can talk over the situation, and at any point a mentor can ask the student for permission to take over scope and make some clarifying changes. In contrast to uses of entrainment in class instruction, which may center on the content map in order to be relevant for the class as a whole, applications of entrainment that involve coupling may generally center on the student's custom map and content level activities.

Separable Overlays.

As described in the section having the heading "Custom map," a user's recorded traversal through the electronic textbook can be displayed as a layer overlain above the custom map. As described in the paragraph having the heading "Separable User Overlays," students and other users are able to make their own private overlays, which can be maintained privately and securely within the system, and can be separated from their copy of the electronic textbook, shared with others (e.g., students, mentors and friends), or offered to the author or publisher. Further, an author who decides to offer an electronic textbook in multiple single-level versions, such as separate advanced, general, and basic level versions, can accomplish this by preparing three separate overlays, one for each level, and using the separate overlays for the separate publications. In the case of the student's traversal, the overlay records a path through the textbook. An overlay can also be prepared to describe alternative navigation routes or suggest a specific ordering of related pages.

Comment System.

As described in the paragraph above having the heading "Comments on Items," the author can use comments that are attached to nodes and/or connectors in a way that may sometimes be analogous to traditional footnotes and additionally offers advice on paths to follow. As described in the paragraph above having the heading "User Interactions," the electronic textbook format provides a mechanism for the textbook's dialogues with the student to be recorded along with a pointer to the location on the custom map where the dialogue occurred and/or a pointer to some other location referred to in the dialogue, and allows the student to share these materials with other students along with further comments, questions and suggestions. Optionally, the student's own comments, the author's comments, and/or comments shared by others are displayed along with the custom map in their appropriate positions. As described in the paragraph above having the heading "Notes, Comments and Reminders," the user may attach notes, comments or reminders to any node or connector, including any nodes or connections that the user has added to the textbook. These added comments may or may not be shared, and mentors or other privileged users may set rules concerning the student's sharing. As described in the paragraph above having the heading "Multiple Paths through the Book," comments may often pertain to connectors. For example, a comment may explain why a particular connection (between content nodes) was traversed or preview what will be encountered at the other end of the connection.

In some instances, as described in the paragraph above having the heading "Comment Window and Index Window," a separate comment view window may display comments pertaining to the current node and connector and permit users to add or edit their comments.

As described in the paragraph above having the heading "Navigation Tools Window," along with other navigation tools, an external content window may be provided to allow the user to access external content and potentially add it to the textbook and annotate it with comments.

As described in the paragraph above having the heading "Index," a complete listing of available nodes and connections may be provided in a searchable and navigable index. The student may add comments to the index, and, in an embodiment, the index can include all of the student's comments and other comments in its lists.

As described in the paragraphs above having the headings "Sharing Comments to Inform Choice," "Sharing Comments for the Sake of Classroom Communication," and "Comment Walls," the comment system can structure information in ways that can help a group of students and their teacher, whether together in a classroom or interacting on the web, to communicate effectively with one another and improve communication. The same structure can also serve to share information with the author. As described in the paragraph above having the heading "Templates for Comments" and the paragraphs having the heading "Reviewing Comments and Personalized Access," in some cases comments are collected using standardized data entry templates, so as to provide useful systematic feedback about improving the system and/or obtaining standardized ratings and suggestions from students interested in opening up opportunities for innovation.

As described in the paragraph above having the heading "Privacy," the user's traversal and/or comment records may be recorded as a separable overlay, stored securely, and shared in whole or in part, selectively or inclusively, with other students, teachers and mentors.

Extensions in the Textbook.

As described in the paragraph above having the heading "Knowledge Garden," the textbook can be designed with primary paths that the user must traverse, which are enriched by an array of relevant topics that are offered optionally to the user at appropriate points along the way. For example, if there were 200 topic nodes along a primary path, there might be 500 supplementary optional nodes in the textbook. In some instances, options pursued by the user (e.g., reader, student, teacher, etc.) may lead to further options. These optional nodes may function like an "option tree," in the sense that they diverge from mandatory paths and are offered selectively at relevant points. Once visited by the user, an option may no longer be presented at subsequent stages of the traversal. The present description focuses on mandatory primary paths, but also briefly discusses the manner in which optional nodes are implemented.

As described in the paragraph above having the heading "Arranging Tie-Ins for Supplementary Material," tie-in points can be located anywhere in the custom map to provide for privileged or authorized users (e.g., a school district, a school, or an individual teacher, etc.) to insert additional material. As described in the paragraph above having the heading "Advantages of Tie-in Points," in an embodiment, senior privileged users such as a state board of education can extend the available tie-ins and give instructions concerning how local school districts can tailor content. Similarly, school districts and schools can insert tie-in material and/or provide further tie-in points, eventually delegating responsibility down to the level of individual teachers to tailor optional content. As described in the paragraph above having the heading "Paths, Comments and Additions," privileged users (e.g., state, county or local school board, school district, school, or instructor, etc.) may add comments via the content system and also add additional content that is directly included in the custom map.

The custom map may be extended at the level of nodes and connectors by tie-in material added to the textbook in the form of a nimbus of optional material of relevance to the student that is displayed optionally or by default in the customized custom map, and/or by material in the comment system which may be displayed along with the custom map as an overlay, and/or as additional nodes, and/or as a distinct layer of content attached to the nodes and connectors of the custom map and accessed via the corresponding individual node or connector.

Student Records and Devices.

Records of time periods in which users are active in the system may be collected and stored for all participants, including students, instructors, mentors, administrators and the like. For a student enrolled in a course, records may be kept both on the student's device and on an administrative server. When the student is in a class, participation may be recorded redundantly on both an instructor's and student's devices. Students may share a device, as for example when a student's device is not available or dysfunctional, and a student may make use of a mentor's device. Participation records on the various devices (e.g., student's device, instructor's device, administrative device, etc.) may be reconciled and kept up to date. Along with the student's traversal history, the system may provide a complete participation history within the scope of the system. This may cover numerous courses over multiple years of study. There may be multiple years of study of a single topic, such as Math or English. One aspect of participation is class attendance. This may be physical presence in a classroom, remote participation in a classroom offering, participation in a web course, or participation in a learning collaboration of some other sort that is tracked or otherwise monitored by the system.

Administrative Course and Student Records.

Administrative records for a course may be maintained by the school administration and/or instructor. Records for the course may include the course schedule, the instructor or instructors present, and any disruptions to the regular schedule. In an embodiment, some of the digital administrative records concerning the student may be reliably based upon information from the electronic textbook implementation system, such as digital records of student participation and performance.

Delivering a Curriculum

Provided herein are systems and methods for delivering a curriculum. One important feature of curriculum access is to extend accessibility to prior and subsequent courses. For example, as one year's course is drawing to a close, it may be helpful to preview the following year. And when a course is beginning, it can be very helpful to review prior years' material at the beginning of the school year. Extending the interface also provides an important resource for students to access remedial material from prior courses. The interface also offers an advanced or precocious student the opportunity to look ahead to subsequent years. In principle, an advanced student may complete two or more years of study in a single year.

Electronic Textbook Traversal History.

In courses where the electronic textbook system is offered, an electronic textbook traversal history that resides in the traversal database 1860 may be the core participation recording. Beyond recording participation, at minimum, the system may record topics covered, stages of successful completion, and detailed performance evaluations. The system may also record interpersonal interactions and joint projects. The history for any student is focused on individual courses, but it also serves the key roles of tracing the student's traversal over successive courses in the same topic and other related topics, and juxtaposing traversal history in courses occurring simultaneously. These functions support content delivery by recording the entirety of the student's educational traversals. The necessary textbook elements can be stored independently, and subsequently supported even if the original electronic textbook has been supplanted by a later edition.

Automated Reviews.

A review can be conducted for a classroom group or a web class as a whole to refresh memories in class after a break in an academic calendar. The review after a summer break may generally apply to the previous grade. The same approach can be used before a holiday break to briefly present upcoming material and then again after the break to review prior material. A presentation to conclude the school year may anticipate the next grade. An automated review may be scheduled by monitoring the class records at the administrative level. This approach can also be applied after a class disruption of any kind. For example, in an embodiment, if the school were closed because of a disruptive event, the review may occur on a subsequent day at school, or alternatively the class may potentially take place on the web at the time originally scheduled. The presentation of the review may be a replay of traversals of the electronic textbook materials in previous sessions that is displayed on student devices. The replay depends on detailed records of the instructor's traversals through the textbook during class sessions.

Closely related features of the system, described below in the section having the heading "Review and Remedial Presentations" may permit students to make up at home classes that have been missed. A review can happen for an individual student on the student's personal device at home, for example when the student has missed material due to absence and may need to both catch up with the class and recall material covered before the absence began. This automated review is scheduled based on the individual student's attendance and performance records, and relies on records maintained at the administrative level on the administrative server of traversals that took place during the relevant class sessions as well as various questions presented during class sessions or assigned as homework. Performance on test questions in the electronic textbook is ordinarily graded within a short time, so if information flows promptly from individual student devices to the administrative server, information about class performance in a homework assignment or a quick problem session in class may be available instantaneously or nearly instantaneously. If a widespread misunderstanding is present in a class, an automated remedial demonstration can be offered in class the same day or the next day.

Automated Remedial Presentations.

As explained in the section below having the heading "Automatic Review and Remedial System," the electronic textbook may be equipped with models of the dependencies of success in any particular question on various aspects of effective understanding and the relationships between defects in understanding and particular classes of errors. The electronic textbook may also be equipped with a remedial path system for taking a student back through material visited earlier and offering key questions that may clarify the student's understanding, before then returning the student to the current page.

An accommodative review can focus on points of confusion within the class that may have shown up as poor performance on a particular topic or theme of questioning. As described below, the electronic textbook may offer mandatory "problem pages" and recommended or optional "test your skills" pages, and other formal examinations that may be associated with the course. These tests may be completed during class or assigned as homework, and students may choose to visit a "test your skills" page to test and refine their understanding. Each student's visit to one of these pages as well as the student's performance there may be recorded in the student's traversal history in the traversal database 1860 as well as at the administrative level.

Mutually Dependent Content for Simultaneous Courses.

Material can be dynamically coordinated across individual courses on different subjects, for example, to allow material from the second course to be made available as a resource to students in the first course. This may be particularly beneficial where material from one course is relevant for learning the material from another course. For example, in the early grades of math and English instruction, it is helpful to reach out within one course for relevant content in the other class such as a clarifying illustration or a definition. In higher grades, there are numerous important connections between math and the sciences that can be treated in similar ways. In some cases, significant parallels between math and language can be illustrated, such as analogies between the rules of grammar and mathematics.

Remedial support may trace performance flaws back to likely causes across multiple distinct subjects. That is, although courses may cover distinct subjects, dependencies in each course may extend to another course. At a basic level in early grades, the learning of language and arithmetic and logic are spread throughout the curriculum. At more advanced levels, for example, a course on thermodynamics may require an understanding of partial derivatives from a math course and an appreciation of an advanced math course like differential equations may be supported by incorporating context from related physics classes. Similarly, a math problem may depend on a term or phrase (e.g., "coincident") explained in an English course, and a word problem in math may be incomprehensible to a person with limited reading skills. Conversely, understanding a passage in an English question may depend on a basic logical principle taught in math, such as ordered sequence, and an important property of arithmetic, such as commutativity or its absence, may help to understand sentence composition in English. To be fully effective, automated review and remediation may extend across material in separate courses in order to integrate material within them. Similarly, if material presented in one course depends on terms or concepts in a second course, usage in the first course can be anticipated by presenting the material in advance in the second course, or alternatively, usage in the first course may be supported by offering the necessary material from the second course as an available option triggered by student questions or mistakes in problem pages or test your skills pages. Under either approach, material from the second course may be made available as a resource to students in the first course.

In an embodiment, substantial shortfalls in reading abilities among students in a math course might be gradually remediated by embedding remedial modules in reading skills in the math curriculum.

Activities on Textbook Pages.

As explained in the paragraph above having the heading "Recording User Choices, Comments and Interactions," a student at a particular page (or node) may interact with the interface on a particular page to answer a test question. The student's answer is recorded and the student's performance is calculated. The student may also enter a comment about the page. In both cases, the student's interactions with that page are recorded as part of the user's path. The information that has been recorded is made available to privileged users, and the scope of access may be configured by the author, by other privileged users like the teacher or caretaker or mentor, or by the student.

Another important capability of the interfaces and supporting systems is discretionary navigation, which can happen at any page. Interactions between the student and the system are recorded on both sides (e.g., from the system to the user and from the user to the system), including recommendations from the system and decisions by the student. As explained in the paragraph having the heading "Index," at any point a complete list of available nodes and connections is provided, that can optionally be filtered by any applicable attributes. The student may be offered recommendations concerning paths, nodes or connections to visit, based on the student's experiences so far. The student is offered test your skills questions that yield recommendations about learning priorities and alternate paths. In general, these options can guide the student to relevant pages that may be off the usual path. As described in the paragraph having the heading "Navigation Information," the system also offers a search capability to locate any desired content in the electronic textbook. When the student finds the desired page, the student may either jump to that page or select a route to that page from among possible routes recommended by the system. The system offers an automatic facility for optional return to the jumping off point. Alternatively, this range of capabilities may be blocked by a privileged user as needed, to avoid the student getting confused or distracted. Blocking this capability allows the privileged user to crisply and unambiguously design the student's path, so as not to cause confusion or distract the student from the primary path.

As explained in the paragraph above having the heading "Navigation Styles for Choice and for Progression," the student may have arrived at the present page via overlay layer navigation or via content layer navigation, and the student may have the option at this page to switch from one layer to another. The student may also use the view ahead or the path taken view to show other pages that are available and to potentially navigate to them.

Generally, navigation through the content layer of the textbook offers a limited range of recommended opportunities and carries the student forward on a recommended path. Navigation through the overlay layer allows the student to access any node that is accessible by selecting that node to expand the corresponding page. Navigating via the Index or global view or via search offers wider scope to the student.

During excursions beyond the range of recommendations it may sometimes be helpful to carefully track and record the student's traversal while limiting the student's scope of action.

Remote Participation in Collaboration, Homework, and Examinations

Remote Participation in Classes and Tests.

Features of the system allow students to participate remotely in a class held in a classroom as one mode of attendance. Obstacles to remote participation include inferior resources and indirect contact for the remote student as well as potential communication difficulties between the student and the classroom. Additional potential obstacles arising from administering a test to an in-person class along with an unsupervised or remote student include the possibilities for the remote student to receive help from someone else or even be impersonated by a stand-in, exchange information and tips with other students, divert information taken from the examination questions for illicit uses, plagiarize other students' materials and the like. As described in the following sections, these systems and interfaces disclosed herein may be strong enough to overcome some or all of these challenges, and in some embodiments permit remote participation in remedial presentations, problem pages, test your skills pages, and even exams.

The instructor may give verbal guidance in the classroom during the examination, and may respond verbally to questions asked verbally before and during the exam. The remote student may hear the verbal guidance via speakers (or receive them as text) on the student's device. The student may also ask questions remotely during the exam. The student may ask these questions verbally or by entering them as text. In some instances or embodiments, to minimize disturbance to students in the classroom, the student's questions may be transcribed and transmitted to the instructor as text. Transcribed verbal communications may be transcribed for visual receipt, and text communications may be vocalized. The instructor may respond to these questions either in text mode or with verbal guidance that may also be heard by students in the classroom.

Features of the system may help to prevent cheating or other misbehavior by the student or anyone else helping the student while the student is taking the exam remotely. One such feature comprises the monitoring of user inputs combined with recognizing and validation of the user's identity through various biometric and other verification methods. In an embodiment, the system can be strengthened by a camera mounted on the student's device and facing the student, which can further monitor the student's activities. Another feature can comprise the flexible rendering of examination questions, so that the version of a question to which the student is responding may differ from those versions currently being seen by other students, and/or differ from questions seen in previous or subsequent years.

Flexible Page Rendering.

Flexible Page Rendering provides for problem pages, test your skills pages, and examination pages to be presented in flexible format, such that the particular question along with applicable performance standards is selected from a "family" of possibilities provided for that page. The characteristics of the various versions of the family can be parameterized so that a particular "page" can be used several times or even many times and bring up a different version of the problem or question with a different correct answer each time that a different set of parameters is used. The "page" can become a "metapage," which comprises the set of various members of a family, which are alike in evoking the same knowledge and testing the same abilities but differ in detail and consequently have differing answers. Each instance of the family is characterized by one or more parameters that uniquely determine that version of the page and the corresponding answer. This flexibility can be controlled and demonstrated in numerous ways, as illustrated by the following examples:

In some instances, the textbook may bring up an instance of the page at random, by randomly selecting from the family of available parameter values. In some instances, the textbook may search the knowledge base that describes a family for an instance of the page with attributes that reflect a student's personalized learning style and capabilities. Since questions may vary in difficulty dependent on the student's capabilities, performance standards and credits adjust in accordance with the selection. In some instances, a teacher who is simultaneously guiding multiple students through a problem page in a classroom setting or a webclass, can activate a control that causes the teacher's chosen value of the parameters to be used for the presentations on all students' devices, so that all displays match the teacher's and each student can follow along. In some instances, when the teacher is assigning a problem page as homework, the parameter setting may be randomized, so that each student sees a different version of the problem. This puts each student in a unique situation and inhibits cribbing or other forms of illicit information sharing. The applicable parameters are securely recorded in a hidden database within the system that is accessible as appropriate with permission when necessary, so that a teacher or mentor wanting to help the student can see the same version as the student remotely, and the student will see the same version when later revisiting the page. The student, teacher, and optional mentor each use their privileges with respect to the student's account to access the problem with the student's parameter values. In some instances, a student can request multiple instances of the same page, each time bringing up a new randomized version in order to practice addressing the problem in different situations. In some instances, students with collaboration privileges may arrange to bring up the same version of the problem on their separate devices when present together in a classroom, working remotely at home or cooperating remotely.

In all these aforementioned cases, the parameters of the instance received by each student may be saved invisibly so that when the page is revisited later on in the path-taken view the same parameters are applied so as to reproduce the instance seen before. This same coordination strategy can, in some embodiments, also serve to present supplementary materials for side-by-side use by students studying together, as for example showing two languages side-by-side in language studies. In this quite different application, the underlying common theme is coordinating parameterized displays.

Parallel Optional Voice and Text Communication.

In addition to the standard modes of conveying spoken communications and textual communications, the electronic textbook may offer communication channels that receive communications from a user either in the form of speech or inputted text, and deliver communications to another user according to the user's preference as either text or vocalized speech. Some of the benefits include serving handicapped students who may have either limited vision or hearing difficulties, serving young students who have not yet learned to read and students who are illiterate, and accommodating a student's device which may not have a microphone or may have a small keypad that is not well suited for typing. Depending on the circumstances and the limitations, students may send communications either verbally or in text, and receive communications displayed as text or broadcast as audio or both simultaneously. Simultaneous audio and visible display may be very helpful for some students, such as those who are improving their reading skills or taking foreign language classes. Independently of this choice, students can offer input either by voice or by inputting text, and both voice and text channels can be automatically responded to by the app on the student's device.

In an example, the student can make inputs by text or voice. Voice inputs are transliterated in an input field for the student to see and potentially edit. Voice inputs are recorded by default and may be optionally turned off. The student can therefore interact with the textbook by voice or keyboard input. The student may receive verbal instructions, content and comments from the textbook in the form of text or alternatively voice or alternatively receive the same information in both formats simultaneously—this is the student's option. In a classroom setting, students who elect to work with voice communications can use audio headsets. Transcription of dictations can also assist students in preparing written materials and submitting comments. The system components necessary to provide these capabilities are generally available and steadily improving. Transcription of voice entails substantial calculations, is imperfectly reliable and consequently benefits from the higher fidelity obtained from direct feed from a microphone, and improves with continuing exposure to the speaker's voice.

Provision for Simultaneous Speech.

Speech inputs may be locally recorded and transcribed on the student's own device. Local recording and transcription of speech inputs is important for several reasons. For example, the local recording may be more accurate than a recording at the other end of a network connection because of quality loss during transmission. Furthermore, recorded speech may generate large data files that can consume network resources. The quality of speech transcription for any given speaker improves as the transcription system accumulates a history of the user's speech, and there are multiple advantages in storing that historical record on the user's device. Another important benefit is the ability for the system to collect and discern different users speaking simultaneously, for example when two speakers communicating remotely with one another at opposite ends of the web commenction speak at the same time. The user's device can locally distinguish between the user's speech and the voice of another speaker coming in over the network. Therefore, when two users operating separate devices are speaking simultaneously, the information can be effectively captured and processed on their separate devices, whereas some of it would be garbled or lost if it were being captured by one centralized system operating on a server.

In one such example of simultaneous speech, communication is initiated and synchronized to allow for the capture and correct attribution of speech content. For example, the teacher of a class is contacting the student or a joint session is being initiated with a fellow student, or with a mentor. System calculation hubs at the multiple devices are jointly coupled over the network. Time clocks for the communication session are synchronized. Importantly, the system on each device can keep track of text input and voice streams, log their timing, and block any interference from communication streams elsewhere. This allows communications that may sometimes be overlapping in time to be organized sequentially afterwards. The student may sometimes speak when the other person is speaking and/or sometimes voice a thought while entering a text communication but the system and interfaces may be configured such that no garbling of content results, thus allowing the information to be successfully conveyed. Usually, the information is not sent over the network in both formats. Preferably, transcription is done at the source (because the speaker's local device should house the most effective dictation database), and voicing of text is done at the device where the user is listening (so as to use a voice preferred by the user). If the student interacts using both formats simultaneously, for example by both inputting text and speaking, then there are three possibilities: speech is ignored, text input is one stream and voice input is another stream, or speech and input text are interwoven into a single stream. The system and interfaces can be configured such that the default setting is configured with two separate streams—one for verbal input and one for text input.

Monitoring User Inputs & Recognizing the User.

One or more applications on the user's device may monitor and recognize keyboard cadence patterns or touch patterns, facial expression patterns, and the like. The user device can also monitor the object of visual focus. The system can also exercise vigilance in regard to inputs provided by the student, and recognize cut and paste inputs in contrast to keyboarded inputs to help in detecting items copied from other sources. The procedure also uses voice recognition techniques to monitor and recognize the speaker, and may also match activity profiles with expected modes of participation. During collaborative sessions in which multiple people are contributing, this system can help with the attribution of individual contributions to collaborative materials. This aspect of the system can monitor an individual's participation, minimize or detect cheating, and facilitate and help to give proper credit for cooperative contributions. The system may continuously affirm the identity of a participant who is inputting material or communicating by voice or text. As mentioned as part of the voice interpretation capacities described in the paragraphs having the header "Parallel Optional Voice and Text Communication," the system can determine whether someone is speaking and if so recognize the student's voice or alternatively the voice of some other person or the sounds of more than one person's voice. The system can also evaluate the tone of voice of the speaker, and in an embodiment assess the probability that the communicator may not be speaking sincerely.

In one example the system may be turned on and accessed through a student's device. The student may be at home, either remotely attending a class, or taking a web course or home schooling. The student's device is learning to recognize its owner. The system is monitoring the student's inputs via keyboard and/or touch screen and also (by default which can be turned off) voice. The system may optionally and dependent on the capabilities of the user's device be receiving images of the student through a camera to support the recognition process. The system recognizes the student. While a student is inputting text by using a keyboard or touch device, the system uses a recognition element comprised of hardware, firmware and/or supplementary software to monitor the information flow from the contact of the user's hands with the keyboard or touch facility in order to register and detect features of the physical contacts with the keyboard or touchpad such as patterns in cadence, pressure, and duration that may occur and that may vary across different areas of the keyboard or screen. Based on this information the system determines a typical range of physical input patterns that characterize the student. Thereafter the system confirms the identity of the student by matching current input patterns to the typical range of patterns. If a gross discrepancy occurs, the system may issue an alert signal, record an exception, or alternatively recognize another person's input patterns.

In another example, the system receives a contact request from a remote location, for example a classroom instructor or web course or mentor. While the system is on, the system recognizes the student, or alternatively recognizes another known person like a caregiver or mentor. If the person cannot be recognized, the system takes protective action such as freezing or ignoring inputs and controls or shutting down. While the system is running, the student's participation is measured by signs that the student is operating the system and inputting content or interacting with content (e.g., that the student is reading, as determined by eye focus, or thinking as inferred from pauses between noticeable actions). The active time period goes into the student's record of participation. If at any time the student steps away from the device and, for example, another family member or friend comes up and starts playing with it, the other person's inputs will be rejected and not allowed to control the system.

In some instances, the system may be configured to register copying and pasting of blocks of material as contrasted to inputting one character at a time, and can flag the input in the case of pasting as being suspect and warranting investigation. In some instances when a camera is present on the device, the system can also use images from a camera facing the user to recognize the user and confirm the user's identity. In some embodiments, in special circumstances the system can also check the content of answers for signs of plagiarism, copying or cribbing.

Beneficially, the system can help to detect impersonation, plagiarism or illicit cooperation, and it can also help to monitor participation and confirm attribution of contributions during collaborative undertakings. When operating on the student's device this feature of the system can also help to preserve the student's participation history if another person tries to operate the system, for example if the device is lost or stolen while the system is operating, or if a friend or another member of the family might pick up the device and begin to play with it, or if someone finds the student's password, or if a hacker somehow breaks into the system. If any such circumstances arise, the system can perform the steps of recognizing that the user is not the student, interrupting the impostor user's activities, demanding credentials, and eventually closing the app.

Collaboration & Cooperation System.

The electronic textbook system can conduct inter-student activities and accommodate remote collaboration and cooperation among students. The system can assimilate simultaneous contributions to the same project from multiple devices. While a collaborative session is underway, the system can properly attribute contributions from various participants in order to monitor cooperation and deter cheating using the methods described in the paragraphs having the heading "Monitoring User Inputs & Recognizing the User." The system can assimilate collaborative efforts on a shared project, which may be decomposed into segments to minimize confusion due to collisions. It can be applied within the classroom, among remote collaborators or with a mix of students working in-person and/or remotely. For remote students and in other unsupervised situations, the system relies on the monitoring and recognition methods described earlier. The collaboration system can also be used to operate a web class or to include remote students in a classroom. The system can also serve for tracking and cross-referencing local and remote inputs of any kinds from multiple sources. For example, it can be used for students to enter comments into the common version of the electronic textbook for sharing with other students.

Remote Mentor Support.

The Collaboration & Cooperation System can also facilitate a special form of remote support for the student. For example, this may be used when a parent or other mentor is away from the location of the student and calls to speak with the student. The remote mentor has registered for a mentor's access to the student account. The mentor's view of the student's course can be entrained to the student's so that the mentor sees exactly what the student is doing. Mentor and student can talk over any difficulties that the student is encountering. For the benefit of the student, the mentor can enter a comment on any page or connector with advice about an issue or answer. These same capabilities can allow the student and mentor to sit side-by-side and see the application presented on both their devices.

Personalized Customization.

In all the aspects described thus far, the system must maintain the integrity of the educational process, protect the privacy and identities of the students and others involved in the process, and keep the personal data of students secure and strictly confidential.

Choice and Innovation.

As described in the paragraphs above having the headings "Informed Choice" and "Learning about Knowledge," the term "informed choice" as used herein generally refers to techniques employed in the system to offer the student a wide variety of choices of ways to navigate through the material and to give the student the information necessary to make wise choices. The system also helps students to learn more about their own state of knowledge and clarify their thoughts. As described in the paragraphs having the heading "Information and Perspectives," the electronic textbook interface offers many types of information, such as: relative contextual information about content (e.g., orientation of content relative to the path traced up to this point, currently available choices, and insight into where those choices will lead), comprehensive overview and search of material, recommendations optionally supported by comments from other students, test your skills questions that yield recommendations on what may be important to learn, and alternate paths provided by author, mentors or friends. Beneficially, the student is encouraged to make choices among different branches on the textbook's learning path and to develop perspective on possibilities and opportunities. One of the goals of this style of instruction is to empower the student to play an increasingly active role in the learning process and encourage the student to experiment with innovations.

In addition, the student's comments mapped to the textbook may be securely and confidentially accumulated and saved along with the mapping to textbook nodes and connectors. in each case there is a Compact and Sufficient Secure Encoding (CSSE) method for parameterizing the information so that it can be utilized securely during the operation of the system without endangering privacy.

Innovative Leaps.

As described in the paragraph above having the heading "Adaptive Emphasis of Logical Connections," the author may identify meaningful connections between pages that are not otherwise directly connected. Alternatively, students may record such meaningful connections in their personal comments on the book and enter them on specialized connectors arranged for this purpose, and when a high enough percentage of students have affirmed a connection it may be added to the list of meaningful associations. For example, a meaningful connection may reflect an analogy, a causal link, a logical connection, a common source or consequence, a common structure, joint relevance in implying a significant conclusion, and so on. When an innovative leap has been requested by an interested student, connections of this kind that lead from the student's current location or a nearby location may offer attractive possibilities.

Perspectives.

As described in the paragraphs having the header "Perspectives," an embodiment of the electronic textbook offers perspectives that are representations of portions of the electronic textbook that allow the user to explore outside the restrictions imposed by the author's own structure.

Informed-Choice Paths and Knowledge Garden.

As described in the paragraphs having the heading "Informed-Choice Paths and Knowledge Garden," informed-choice paths can be crafted to provide students with meaningful choices and the necessary information to choose effectively, and the knowledge garden offers students perspectives on their chosen path while also helping them to appreciate aspects of knowledge presented on other paths and related features.

Adapting the Learning Configuration to Performance and Preference.

The student's history of participation in course textbooks offered by the system is recorded and saved. In order to support the customization of the student's experience and for other operational reasons some embodiments can be configured such that personal information about the student is securely and confidentially accumulated and summarized in the following areas:

Learning Capabilities

Learning capabilities are defined in terms of the pace at which new information can be assimilated, new understanding can be structured for application and new skills can be mastered, and the ease with which a misunderstanding can be corrected. Learning capabilities are indicated by the level at which the student's progression occurs, the student's ability to raise this level, and the student's ability to solidify and enrich the learning process by applying new knowledge and sharing it with others. Learning capabilities are also clearly seen during remedial instruction, for example as illustrated in the Question Cascade in FIG. 21 below.

Performance Capabilities

As described in the section below having the heading "Calculating Performance," the electronic textbook offers numerous ways to quantify performance in standardized ways. As described in the section below having the heading "Capability Appraisals Derived from Calculated Performance," the electronic textbook may summarize these performance measures in terms of capability factors or clusters;

Learning Styles and Preferences

Learning styles and preferences are defined in terms of the range of alternative learning tools and configurations offered by the electronic textbook, the student's manner of employing and responding to these learning tools and configurations, and any measurable impacts upon subsequent performance of the student's use of the learning tools and configurations. For example, as described in the paragraphs having the headings "User Interactions" and "Interactive Support Functions," the electronic textbook system may offer various interactive features, and as described in the section above having the heading "Choice and Innovation," the student may be offered various types of choices, and learning styles and preferences may be observed in the student's selection and use of various features and types of choices. For example, aspects of style may range from basic choices such as content-layer navigation versus overlay-layer navigation, to local styles such as completing each page before going on to the next versus going on to visit subsequent pages before returning to the current page to complete it. Also, as explained in the paragraph above having the initial words "The student's general learning preferences" and the three paragraphs that follow, the system can elicit the student's preferences regarding the structure, content and format of content presentation;

Goals and Wrappers

As explained in the paragraphs above having the heading "Setting Goals and Monitoring Progress" and the paragraph above having the heading "Wrappers", the electronic textbook can encourage and assist the student to set forth substantive goals and monitor subsequent progress;

Linguistic and Logical Skills and Knowledge

Linguistic skills and knowledge relate to such factors as vocabulary, reading ability, fluency of verbal and textual communication, understanding word problems, and mastery of one or more languages. Logical skills and knowledge relate to such factors as problem-solving ability, application of learning in diverse situations, readily structuring personal knowledge and extending the structure to admit new knowledge, and the ability to see one's own mistakes and discover how to correct them;

Speech and Composition:

As explained in the section below having the heading "Parallel Optional Voice and Text Communication," in an embodiment the electronic textbook provides communication routes to and from a student's device that convey voice and text in parallel, so that one student can either vocalize or input text and in either case a recipient can hear the communication, see it on the screen, or both simultaneously. This embodiment depends on accurate transcription of voice inputs, and so intrinsically provides digital information on the student's verbal and textual composition skills;

Device Engagement

As explained in the section having the heading "Monitoring User Inputs & Recognizing the User" an app running on the user's device can record the student's patterns of input (e.g., by voice, touch (e.g., touchscreen or keyboard), cut/paste, etc) and recognize the user by these patterns. Using these methods, the electronic textbook may monitor the user's engagement through their own device or others' devices.

Capability Appraisals Derived from Calculated Performance.

Evaluations of the student's work during the course and grades on examinations give information concerning the student's skills and knowledge. Skills include the student's learning capabilities as well as abilities to apply the knowledge presented in the course. The student's knowledge includes the student's understanding and intellectual grasp of the topics in the course and the materials presented in the course. Both can be demonstrated by the student's performance on problem pages and tests of skills and knowledge as well as other associated projects and examinations. The student has many opportunities to demonstrate learning capabilities while proceeding through the course.

Rules for calculating performance for problem pages and test your skills pages may be provided along with these course elements in the textbook, and performance can be calculated as soon as an element is completed. There is an ongoing cycle of evaluating present performance, updating capabilities and anticipating future performance.

As described in the paragraph above having the heading "Analyzing and Adapting to Performance and Preference," patterns identified by the electronic textbook including performance patterns and content format patterns may be used by the system to provide further recommendations to the student. Information collected anonymously from the student population can be analyzed to identify clusters of performance capabilities, potentially related to preferences for various content formats that suggest dimensions of capability relevant to a student's learning styles.

Capabilities may be modeled and as performance is subsequently calculated the model may be routinely confirmed and adjusted, and recalculated on the basis of the student's full history when appropriate (e.g. due to changing circumstances). There may be different models for linguistic skills, logical skills, and expertise in the course topics. The criterion for model performance is the ability to explain and predict the student's performance on subsequent problem pages and tests of skills and knowledge based upon the model implemented with currently estimated parameters.

Visibility, Accessibility and Permissions.

In order to customize support for the student's learning process, the display of the custom map is reset in a stepwise fashion, depending on a number of different factors, and the extent of the display is referred to as "visibility." The term "visibility" applies to the student's complete custom map as of the present time, which may be seen in its entirety in a global view; ordinarily, only a small local segment of the custom map is actually visible on the screen of the user's device. Generally, one primary factor that underlies visibility is "accessibility," the range of pages that are currently suitable for the student to visit. Another factor is "permissions," which are required to visit sensitive data and apply to all viewers including students.

The visibility of relevant pages and other optional pages depends on the student's preferences and learning styles, as expressed or demonstrated in the user's studies to date, as well as on accessibility and permissions, as determined by the student's present qualifications. Visibility is also influenced by the work that the student has successfully completed and pending work not yet accomplished. In instances where options are available, elements of the option tree that have been made available and that the student has not yet visited are visible when appropriate.

The system plays two important roles with respect to customized displays of the custom map. First, the system can evaluate the student's history and personal information, and in accordance with this offer guidance or make recommendations concerning the student's future progression through the textbook including revisiting material already covered. In regard to the student's future progression, the system may select from among various options including one or more trajectories that are expected to be beneficial for the student going forward. Information from the student's full history in the system, as well as other relevant information from different sources, can be incorporated in this analysis and evaluation. The system can help the user to make informed choices from among the trajectories selected, and also consider and potentially recommend alternative trajectories suggested by the student or other mentors. These future trajectories are displayed in the view ahead, taking advantage of one or more customized displays extracted from the custom map that may be displayed graphically in the view ahead or in other formats. Each customized display may render an underlying visibility filter that determines the nodes and connectors most suitable for display.

Also, material already covered by the student comes into play when the student is reviewing material already covered or receiving remedial support, and/or when the student chooses to explore the path taken. In this case, the pages and problem pages that were completed are always potentially visible, and all of these or a subset relevant to the present situation may be displayed. In some situations, pages related to the path taken that were recommended and/or visited but were not completed may also be visible and highlighted. Pages in the range of material already covered may also be displayed when they are options that have become relevant after the fact as a result of a factor that emerged later.

Second, the system can provide the student many ways in which to express preferences, demonstrate capabilities, innovate, establish goals, and make near-term and long-term choices. The open dimensions described in the paragraphs having the heading "Adapting the Learning Configuration to Performance and Preference" offer the student the chance to take a more active role. Visibility is again an important factor. Visibility forward depends on a trade-off between focus on the continuity of ongoing work and considering potential innovation. Depending on the student's present circumstances and the range of choices under consideration, visibility may range from focused display of short-term requirements to wide-ranging displays of opportunities for innovations, or alternatively, displays of available options.

For example, if a student is finding it difficult to complete the required work in the time allotted, options that are peripheral to the main thrust of the course may not be displayed, but if a student has been able to find time to visit options while also staying on schedule, then the entire option tree may be available and visible at the present stage of the course.

Further, when a student is proceeding through a sequence of linked pages, visibility may be limited to locally connected pages. When the user has completed a sequence of pages and has reached a potential junction point, the time is right for portraying a range of opportunities in in support of informed choice. When a student is settled on a path and is formulating goals then the entire path ahead may be visible, and when the student's progress on previously set goals is being reported then stages from both the path taken and the view ahead are displayed. When a student is open to trying out an innovation then various possibilities may be highlighted within the setting of the entire custom map visible in the background.

View Ahead and Path Taken.

As explained in the section having the heading "Knowledge is Information in Proper Context," making an informed choice depends on bringing to mind the context that is relevant to a decision. The View Ahead helps the student to bring to mind opportunities and related choices in the future, while the Path-Taken View reminds the student of past successes and possible omissions thus far and displays these in a logical arrangement that suggests context and easily expands to display further information.

Both path-taken view and view ahead can involve customized displays selected from the custom map. An example of a path-taken view 2000 and a view ahead 2002 is provided in FIG. 20.

As described in the paragraph having the heading "View Ahead," the View Ahead window 2002 can show the user subsequent nodes that are visible from the current node. The View Ahead can present the information in various formats. The principal format is a customized directed graph derived from the custom map. As explained in the paragraph having the heading "Visibility," the display can be customized to a student's present situation. As explained in the paragraphs having the heading "Limiting Visibility to Improve Focus," the flexibility to limit visibility can offer significant benefits.

As explained in the paragraph having the heading "Path-Taken View," the path-taken view 2000 can show the path the user has traversed thus far to arrive at the current node. The path-taken view can highlight the status of previously visited pages in various ways, so as to indicate the ones that were completed, the ones that were attempted but not completed successfully, and the ones that were merely visited (or optionally were offered but not chosen). By default, all pages (e.g., problem pages, topic pages, etc.) can be visible, although the user can elect to show one category but not the other. In some instances, test your skills pages and optional pages can also be displayed. In some instances, highlighted connectors can indicate a path the student actually traversed. Optionally, other paths such as a recommended path may also be shown.

Choices made by the student (e.g., if the student chose to visit basic material for clarification, or if the student chose to visit advanced material to go more deeply into a topic) may be diversions from a regular path and may be illustrated accordingly. As an illustrative example, suppose that the student has qualified to try out material at the advanced level and potentially continue at that level. The transition from a general level path to an advanced level path can be a significant event carefully managed by the system, and thus the system and interfaces may be configured such that in the process of making the transition the student may visit both general and advanced versions of several pages by navigating the overlay layer on a custom map that has been compiled, assembled, and rendered by the system specifically for this purpose. The interface also offers navigation along a customized path of this kind in the content layer, which is arranged by assigning appropriate destinations to next buttons and other controls and optionally offering vestibules between pages that explain the nature of the transition the student is making.

The path-taken view 2000 and view ahead 2002 can be shown separately. Alternatively, the two can be shown in a single diagram by partitioning the diagram at the boundary 2005 between past and future (see FIG. 20). This arrangement clarifies situations in which a student has deviated from a recommended path. Similarly, when a student has failed to follow the recommended route and instead followed an alternative route, this arrangement makes it possible to display the discrepancy and highlight recommended adjustments when necessary (as depicted in FIG. 20). This arrangement also helps when the student proceeds in an irregular way by, for example, sometimes jumping ahead to complete a block of pages and sometimes leaving behind a block of pages which must ultimately be completed. In this case, blocks with varying status can be identified by background highlighting, differences in the coloration of the drawing, surrounding boundaries, or other visual indicators (static or dynamic).

Generally, the view ahead 2002 is an important aid for the student's understanding of possibilities. To illustrate these aspects, suppose that the system determines that a student who is currently on the general level may qualify for the advanced level, and that the student may benefit from transitioning to that higher level. The student may then be invited to explore this possibility. If the student expresses the wish to try the advanced level out the student is guided through a set of problem pages and test your skills pages related to advanced level topics covered earlier in the course while the student was at the general level. If the student is not able to answer correctly at any point then the student is given a review process along with remedial support. After succeeding in this, the student is offered a view-ahead display 2002 that allows the student to choose an optional trajectory that will make a gradual transition to the advanced level In an example, FIG. 20 shows a custom map display for a young student who is studying the electronic textbook in a classroom course with a teacher. The custom map is for the same student and the same electronic textbook illustrated in FIG. 19 above and FIG. 21 through FIG. 23 to follow. This custom map is for a student that is at a proficiency level higher than the basic level and thus this content map displays only the uppermost parallel planes of FIG. 19 (e.g., 1903 and 1902) without the lower parallel plane, in this case the basic level (1901). As depicted, the custom map may include a "path taken" display 2000 and a "view ahead" display 2002 separated by a divider 2005 disposed at the current location of the student, at general problem page 1926. The view shown in FIG. 20 will appear in the student's content viewer when the student reaches general problem page 1926. The student has been proceeding steadily on the general level path, completing topic pages (shown in this example as medium size spheres) up to 1921 and corresponding problem pages (shown in this example as small spheres) up to 1922 successfully. Because of this consistent progress, after completing the general level topic page 1923 (general level topics/problem pages are shown on the bottom layer in this example), the student received an invitation from the system to try an advanced topic page 1933. The student chose to accept this invitation (advanced level topic/problem pages are shown on the top layer in this example and correspond to layer 1903 in FIG. 19), and the student completed topic page 1933 successfully. Then, following normal procedures for transitions between levels, the textbook took the student back to the general level (corresponding layer 1902 in FIG. 19) to complete the general level problem page 1924. The student succeeded, and the textbook then invited the student to try out the advanced level problem page, 1934. The student accepted; however this time the student was not able to complete problem page 1934 successfully. This was the student's first failure of this severity in the course, so the student did not have much experience of remediation, and the textbook system had little information about the student upon which a recommended method of remediation could be based. For these reasons, and because the failure occurred when moving up to the advanced level, the student was invited to participate in a "question cascade" (QC) to test the student's skills and knowledge relevant to problem page 1934 and clarify the student's understanding as necessary. The student accepted this invitation, and succeeded with the question cascade (QC), as described with respect to FIG. 21 further below.

Figure 20:
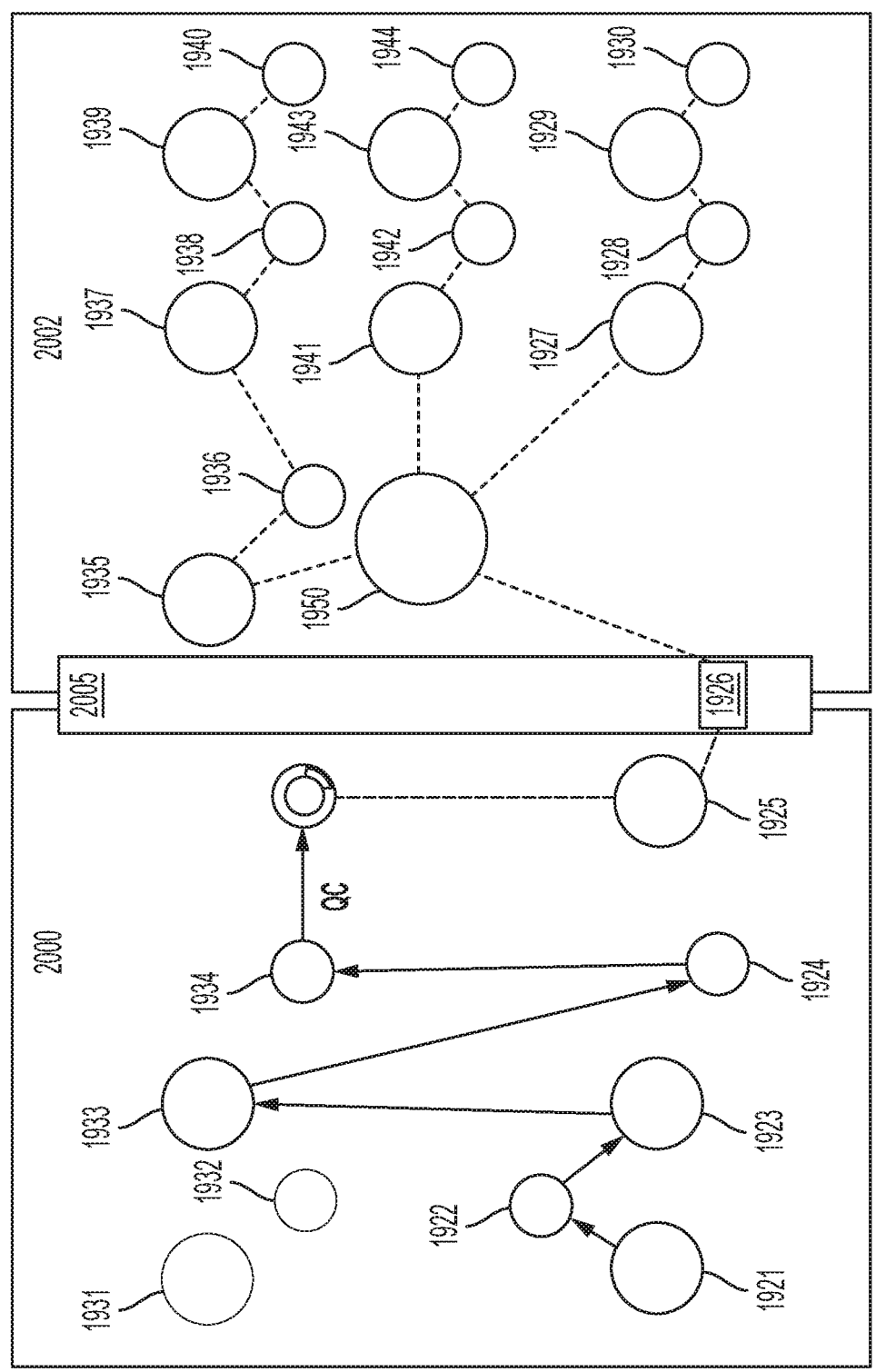
FIG. 20 illustrated an example of a path-taken view and a view ahead.

FIG. 20 provides overview insight into the traversal the student has made thus far and the paths that are presently available based on the student's current position in the textbook. This custom map view was displayed after the student has completed the question cascade and subsequent topic page 1925, and just after the student has begun problem page 1926, shown with a rectangular box in this example. After the student finishes this page, the next step will be gallery junction 1950. The textbook offers this gallery junction to all students, and among the options available there may be offered an excursion, an optional exploratory path comprising two optional topic pages (1941, 1943) with corresponding problem pages (1942, 1944). The excursion appears in the student's view ahead because the student has already earned the reward, but it may not be visible in the view ahead of a student who is lagging behind, because visibility of these optional paths is dependent on the student's learning style regarding optional rewards (e.g., how the student is motivated, when rewards are helpful to the student's learning pace, etc.). A student who has been moving steadily and keeping up with the pace of the class can choose this option as a reward. If a student has been proceeding less regularly and/or fallen behind, the excursion may be offered on condition that the student first establish a goal to proceed more rapidly, and otherwise the student will lose the option and instead use the time to catch up. The View Ahead also shows two other choices. One leads to the advanced level and topic page 1935, and the other leads to the general level and topic page 1927.

Calculating and Responding to Performance.

Coursework can comprise work in class, homework, formal work in response to course content, unstructured projects, individual projects, team projects, private personal efforts, interactive sessions, structured exercises, creative ventures, projects within the sphere of the electronic textbook, and standalone assignments associated with other educational materials. Performance can be demonstrated in any of these ways. In some cases, performance is evaluated by an instructor or mentor. In some cases, performance is evaluated exclusively by the electronic textbook, and in some cases evaluations may be made jointly within the scope of system by evaluating tangible performance while also taking into account opinions and suggestions from other people involved.

When performance is measured by an answer or set of answers, nominal performance standards are provided in conjunction with the problems, tests of skills and knowledge, or examination. Nominal performance standards are securely stored and confidential within the system. The system calculates nominal performance promptly as answers are submitted by the student. In some cases, the system may respond with one or more additional test of skills questions that may be administered dynamically, based on the student's calculated performance on earlier questions, and the next steps in the student's path may depend upon performance with these questions. This responsive approach requires prompt calculation of nominal performance each time an answer is submitted so as to determine the status of the student's entries and step forward to the next question.

On the other hand, when the material submitted by the student is evaluated on a qualitative scale that reflects human judgment, a systematic procedure for qualitative evaluation may involve input from the teacher and grading may be somewhat delayed. The system can accommodate this by deferring response until the evaluation is complete.

The electronic textbook for the course may comprise multiple levels of instruction, such as basic, general and advanced. In an embodiment, successful completion of the course may be determined by performance on examinations and successful completion of all pages at some established level or levels. Successful completion may also be characterized by the level at which the pages are satisfied. Successful completion and the grade awarded on completion may also be influenced by performance on other mandatory problem pages that are related to content pages, and/or optional or recommended test your skills pages that may also play a role in completion.

Tests of Skills and Knowledge.

The electronic textbook may offer mandatory "problem pages" and recommended or optional "Tests of Skills and Knowledge" pages. As defined here, "skills" may refer to learning skill and skill in applications, and "knowledge" may refer to intellectual comprehension of the material and its applications. The broad category will be referred to as "Test your Skills" pages. These pages may be completed during class or assigned as homework, and students may choose the test your skills pages to check or refine their understanding. Each visit as well as the student's performance on each visit to test your skills pages is recorded in the student's traversal history. There may be no performance debit for getting the wrong answer on a test your skills page, and there is ordinarily a performance credit for answering correctly.

Unlike problem pages, which are essential elements of the textbook that play predetermined roles in the learning process, test your skills pages are optional exercises that are offered to the student in specific instances, for example, when reviewing material, receiving remedial instruction after having performed poorly on a problem page, considering whether to go forward to the next section of material, choosing to explore an optional path, choosing to make a leap into a different area of the material, or making an innovative connection and wishing to investigate it.

In an embodiment, mandatory problem pages are included in the custom map and provided along with the textbook. Test your skills pages are also provided along with the textbook, but the test your skills pages do not fall into the mandatory structure and may be drawn upon or composed along with other aspects of the automatic review and remediation system as the textbook is being used. Test your skills pages may be optional and may be recommended by the textbook or accessed by the student in various circumstances, so they are not shown on the custom map. An optional page that has been recommended by the textbook and/or completed by the student becomes relevant in the "path taken" graphic display of the student's traversal.

The electronic textbook system also provides supporting calculations for problem pages, test your skills pages, and examination questions. The system specifies nominal performance standards including correct answers and other criteria for awarding partial credit. Moreover, the system may offer analysis of likely causes of various kinds of wrong answers and may provide information that associates these with potentially remedial information. Such diagnostic information may continue to be developed and progressively refined based upon information concerning students' traversals and performances using the textbook, and distributed in the form of updates to supporting information by the publisher or by other providers.

Question Cascades.

In some embodiments, providing an answer in a problem page or test your skills page may initiate a "question cascade" (QC). In some cases when the original answer is not correct, the textbook may respond with a prompt, for example: "There seems to be a problem here. Would you like to try again, or would you like to explore further?" A student who selects the option to try again repeats the page, possibly with a different flexibly rendered version of the problem. A student who selects the option to explore further may receive a QC, a sequence of questions that are determined step-by-step according to the correctness or type of error of each successive answer. A QC is not triggered by a factual mistake, but rather by an answer flaw that relates to a logical procedure of some kind. A QC that follows an error offers the option of quick "in-line" diagnostic remedial support that might otherwise be provided by the Automatic Review and Remedial System. The operation of the QC depends upon prompt evaluation of each answer soon after it has been submitted, in order to determine a response to the student and guide the student to the next question. The student may also receive informational pages along the way and may be given opportunities to ask questions to which the textbook may reply. A QC following an error can sometimes offer new information while also giving rapid remedial support.

Alternatively, when the answer is correct, the textbook may respond with a prompt, for example: "That's a good answer. Would you like to continue through the textbook, or would you like to try some other questions?" A student who selects the option to continue then continues their path. A student who elects the to try some other questions may get to see some interesting or thought-provoking questions related to the initial question they answered, and those questions may be suggestive of innovations presented elsewhere in the textbook. In this way, the student may be guided to explore related material at an advanced level or in a different mode of instruction.

Figure 21:
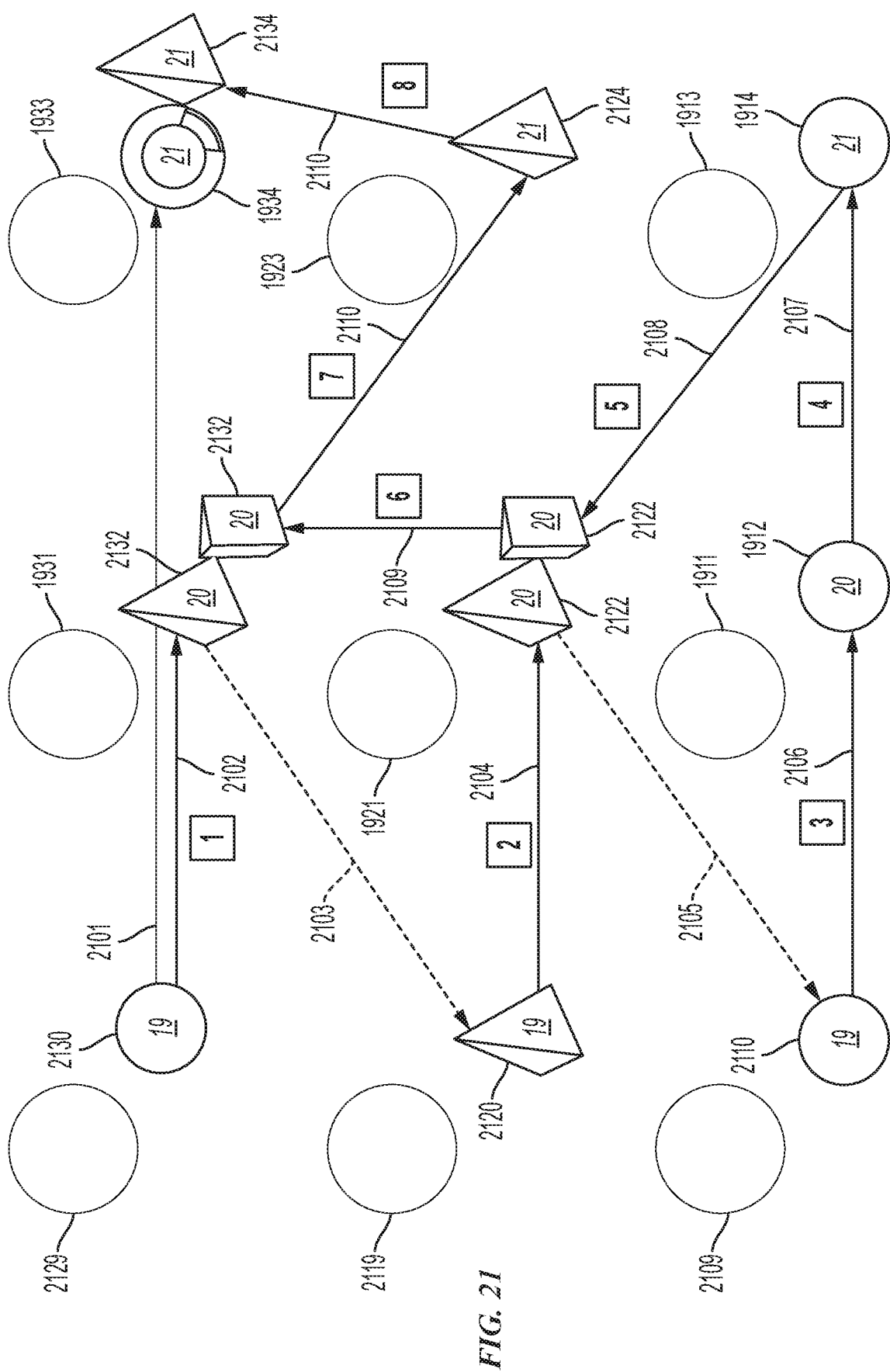
FIG. 21 shows the graphical user interface (GUI) view of an example of a Question Cascade.

FIG. 21 shows the graphical user interface (GUI) view of an example of a Question Cascade. In this example, the QC was recommended to the student when the student did not successfully complete problem page 1934. The GUI shows nine problem pages with accompanying topic pages. In the QC, question pages are shown similar to FIG. 19 and FIG. 20, as small icons relative to the larger topic page icons. Small spheres 2130, 2110, 1912, 1914 are problem pages in the original textbook. Small square pyramids 2132, 2120, 2122, 2124, 2134 are flexible renderings of problem pages in the original textbook. Small triangular prisms 2122 and 2132 are test of skills pages that are related to the corresponding topic page and may also address an error that the student has made on that page. Corresponding topic pages are shown as larger icons (e.g., 2109, 2119, 2129, etc.). The topic pages are shown as larger than the problem pages in FIG. 19, FIG. 20, and FIG. 21 for illustrative purposes; however, the relative size of the shape can be varied as appropriate (e.g., according to the user preferences, customized settings, system defaults, etc.) and can vary from page to page or between pages (e.g. smaller topic pages and larger problem pages on the QC display and larger topic pages and smaller problem pages on the view ahead pages, etc.) Although shown here as spheres, square pyramids and triangular prisms, the nodes (e.g. topic pages or problem pages) can be selected from a variety of different shapes (e.g., cones, cubes, cylinders, tetrahedrons, hexagonal pyramids, cuboids, hexagonal prisms, torus, octahedrons, pentagonal pyramids, triangular prisms, pentagonal prisms, hemispheres, icosahedrons, square pyramids, parallelepipeds, ellipsoids, dodecahedrons, etc.). The problem pages can be flexible rendered with each flexible rendering shown as a different shape in the QC display. In the example shown here FIG. 21, the initial rendering of a problem page is displayed as a sphere, a first flexible rendering of the initial problem page is shown as a square pyramid and a second rendering is shown as a triangular prism. Many more flexible renderings may be possible and alternative shapes may be used to depict any additional flexible renderings.

The problem page 1934 shown as a small sphere in FIG. 19 and FIG. 20 is shown as a small hollowed out sphere in the upper right of FIG. 21. As illustrated in FIG. 20, the student did not successfully answer the question on problem page 1934 thus triggering a QC, the question cascade shown here in FIG. 21. The question 1934 was of an advanced nature regarding topic 21, and is shown in the upper right of FIG. 21 as the hollowed-out circle labeled 1934 with the outer sphere representing the question, and the hollowing out center of the circle representing the initiation point of the QC. In the example illustrated in FIG. 21, the QC includes a 3×3 array of nine question pages. The three rows correspond to different levels: advanced at the top, general in the center, and basic at the bottom. The three columns are the third column with the current problem page 1934 at the right, the second column with the previous problem page 1932 now flexibly rendered twice (the first time because the user had already completed it in its original form, and the second time due to an error the student will make in the QC) each time labeled as 2132 in the center, and the first column with the problem page 2130 before that, which has not been previously visited by the student because when studying topic 19 the student was still at the general level, and consequently remains in its original form. As described in FIG. 20, the student moved up from the general level to an advanced level problem, and has previously completed the general level problem pages successfully, and so the proximate problem-page remediation sources in this example are the previous advanced level problem page 1931 and the basic level problem pages 1910, 1912, and 1914, all of which the student has never visited and are thus depicted as spheres (as shown in the electronic textbook overview illustrated in FIG. 19). The array of nine questions is remedial in the sense that goal is to succeed with the question in the upper-right corner, which was not completed successfully, and all of the other eight questions are either to the left and hence earlier topics, or beneath and hence less advanced levels, or both. The student begins the question cascade in the upper left-hand corner with topic 19 problem page 2130 at the advanced level, and successfully completes problem page 2130. The student earns a first success, revealing a click enabled box with "1". The click enabled box is an icon for a vestibule that is attached to the connector 2102. As explained in the paragraph above having the heading "Vestibule," a vestibule may not appear as a node in a custom map, but instead appear as content attached to a connector, which describes what the student will learn at the node ahead. In this case the click-enabled box guides the student to proceed on connector 2102 to problem page 2132. The student's goal is to reach and successfully complete question 2134 in the upper-right corner, as indicated by the direct connector 2101. All that is required is to complete the intermediate flexibly rendered problem page 2132. However, the student fails to complete this successfully, and as a consequence is instead directed on connector 2103 to node 2120, which is remedial in addressing an earlier topic at the general level. The student successfully completed this before, so the present problem page is flexibly rendered, and the student successfully completes this rendering also. This success earns a second success and click enabled box with "2", which leads forward on connector 2104 to question 2122. The student completed this successfully before, but now the student fails to complete the flexibly rendered version and is again directed remedially along the connector 2105 to question 2110. The student completes this basic problem page, earns a third success (click enabled box with "3") and goes forward on the basic level connector 2106 to problem page 1912, completes that successfully, earns a fourth success (click enabled box with "4") and goes forward on connector 2107 to basic level problem page 1914. This problem page relates to topic 21, the same topic where the student initially failed with 2134, but the student succeeds and earns the fifth success.

The click enabled box with "5" directs the student in a remedial direction to topic 20, while raising the student from the basic level to the general level with question 2122. The student initially succeeded here and then failed with the first flexible rendering, but now the student succeeds with a test your skills question 2122 associated with the topic and the error that the student made previously, and earns a sixth success. The click enabled box with "6" leads the student up to the advanced level of topic 20 on connector 2109. The student failed with the flexibly rendered 2132 earlier, but again succeeds with a test your skills question 2132 at the advanced level related to topic 20 and concerned with the error that the student made here previously. The student has earned a seventh success, and the click enabled box with '7' guides the student to the general level of topic 21, where the student succeeded before with 2124. The student again succeeds with flexibly rendered 2124 and earns the eighth success.

The remedial aspect of the QC has succeeded, and the click enabled box with 8 guides the student on connector 2110 to the upper right corner where the original failure with 1934 occurred. Now the student will attempt this again with a new flexible rendering 2134. The student again fails. After this second failure, the textbook recommends that the student continue with review and remediation, but instead, as shown in FIG. 20, the student takes a route that was not recommended and reverts to the general level and completes the next topic page 1925 and then goes on to its problem page 1926. Again, the textbook recommends that the student pursue review and remediation, but the student instead goes on to the Gallery junction 1950.

The question cascade has been inserted as a segment in the custom map that demonstrates the student's capabilities and provides some indications of the student's responses to remedial material. Alternative segments can pass through different forms of these problem pages, such that the content being tested may be similar but the format or method of testing the content may be different. In some instances, the format or method of testing the content can be customized to the needs (e.g., education requirements including learning challenges, visual/auditory preferences, etc.) of the user following the path being traversed wherein the path may comprise one or more segments between problem pages and/or topic pages. In some embodiments, the format or method of testing the content can be varied to reduce or limit plagiarism or copying among students. In further embodiments, the format or method of testing the content can reflect a combination of factors including the needs of the student being tested (e.g., the location of the student during the test, the personal education needs of the student, the learning style of the student, student's preference, etc.) and the needs of the class (e.g., variation in test questions to prevent plagiarism, or in order to stimulate future discussion, or in order to establish a baseline performance for the group on a particular subject matter, etc.)

Automatic Review and Remedial System.

A student who has forgotten something, fails to understand a question or topic, or has made a mistake on a problem page or test your skills page, or has missed an exam question may be guided to multiple resources.

The textbook's design may reflect the principle that material should be introduced to the student no later than when it is first used and should be developed sequentially after it has been introduced, providing adequate exposition along the way to make the content clear. Problem pages and test your skills pages may be provided liberally in order to help solidify learning as it develops. This approach to textbook preparation gives rise to a logical structure that can be represented in the form of content dependencies, which indicate whenever complete understanding of one topic depends on understanding another. Often such dependencies are sequential: "b" depends on "a", "c" depends on "b" and so on. Sometimes two or more units of knowledge are mutually supportive, and in this case the dependencies are reciprocal. The student's path forward through the textbook can be eased by taking such dependencies into account in the recommended paths through the material. Topics can be introduced before they are used, and once put into use, built upon by bringing in new topics that depend upon them.

When a student has difficulty with any topic, several avenues of support are available: First, the reverse of this forward procedure may be applied, taking the student progressively back along the dependency paths to review those pages on which the topic depends. In this case, the logical structure of dependencies that serves to determine forward sequencing also serves to trace back the causes of misunderstandings and mistakes. The system has recorded the path that the student has taken up to the present point and can present that graphically as the path taken, for example by highlighting it in the context of the broader range of available content from which it was selected. The system can help the student to retrace that path and/or revisit a specific page or pages on which the current page depends. The system may also use special transition pages (similar to vestibules) designed for this retracing process that are not otherwise apparent in the system.

If the student missed or did not complete a page that is a key resource for the current topic, that page immediately rises to the top of the list of review priorities. The selection of material for review is informed by the student's past performance on test your skills pages. The manner of presentation may be customized for the student, based on the student's preferences and personal learning styles.

When the student is reviewing the path taken or revisiting pages on the path, the system can rely on the mapping of requirements and dependencies to select pages for emphasis and highlight elements of the pages that are particularly relevant. A review may trace backwards from the present, or alternatively begin from an earlier position and proceed forward to the present or alternatively follow a content-related sequence.

Second, the student can be guided through remedial presentations that are less advanced or more basic and which may offer context for the present situation. For instance, a student who is progressing on the general path, can view the basic page for the present material, and if necessary also work backward on the basic level to find a point of understanding from which to once more proceed forward.

In addition, the textbook may offer a glossary of terms with relevant definitions as well as a dictionary. In more advanced grades, the glossary may offer the student references elsewhere in the coursework. The electronic textbook may also provide a searchable collection of comments that are mapped to locations in the textbook. The electronic textbook may also provide a collection of frequently asked questions with answers, which may be mapped to particular points in the custom map where students most frequently ask them, and may be brought up for the student's consideration during the review process, and may also be searched generally. The electronic textbook may also offer relevant links to a web-based knowledge resources such as Wikipedia or other appropriate web references.

Adjusting the Learning Configuration for Mentor Instructions.

In an embodiment, the electronic textbook system can receive instructions or suggestions that override the configured educational settings determined by the system. For example, a teacher and caregiver in mutual agreement may either give an instruction to the system or recommend to the system that the student is ready to move up from general to advanced level, or that a young student should move up from pure audio content presentation to simultaneous audio and visible text presentation, or that a student is ready to freely navigate the entire custom map of the course. Alternatively, the teacher and caregiver in mutual agreement may suggest that at present the student is easily distracted and either give an instruction to the system or recommend to the system that for the time being the student should focus entirely on content and not use View Ahead or Path Taken displays except when choices are being presented.

The electronic textbook system can implement these instructions as received or at a later date, such as after the impact of the instructions has been assessed. The system can also request clarifying information such as whether the instructions are in response to a faulty assessment of the student by the system, or alternatively result from a recent change in the student's situation, in order to improve assessment accuracy.

Figure 22:
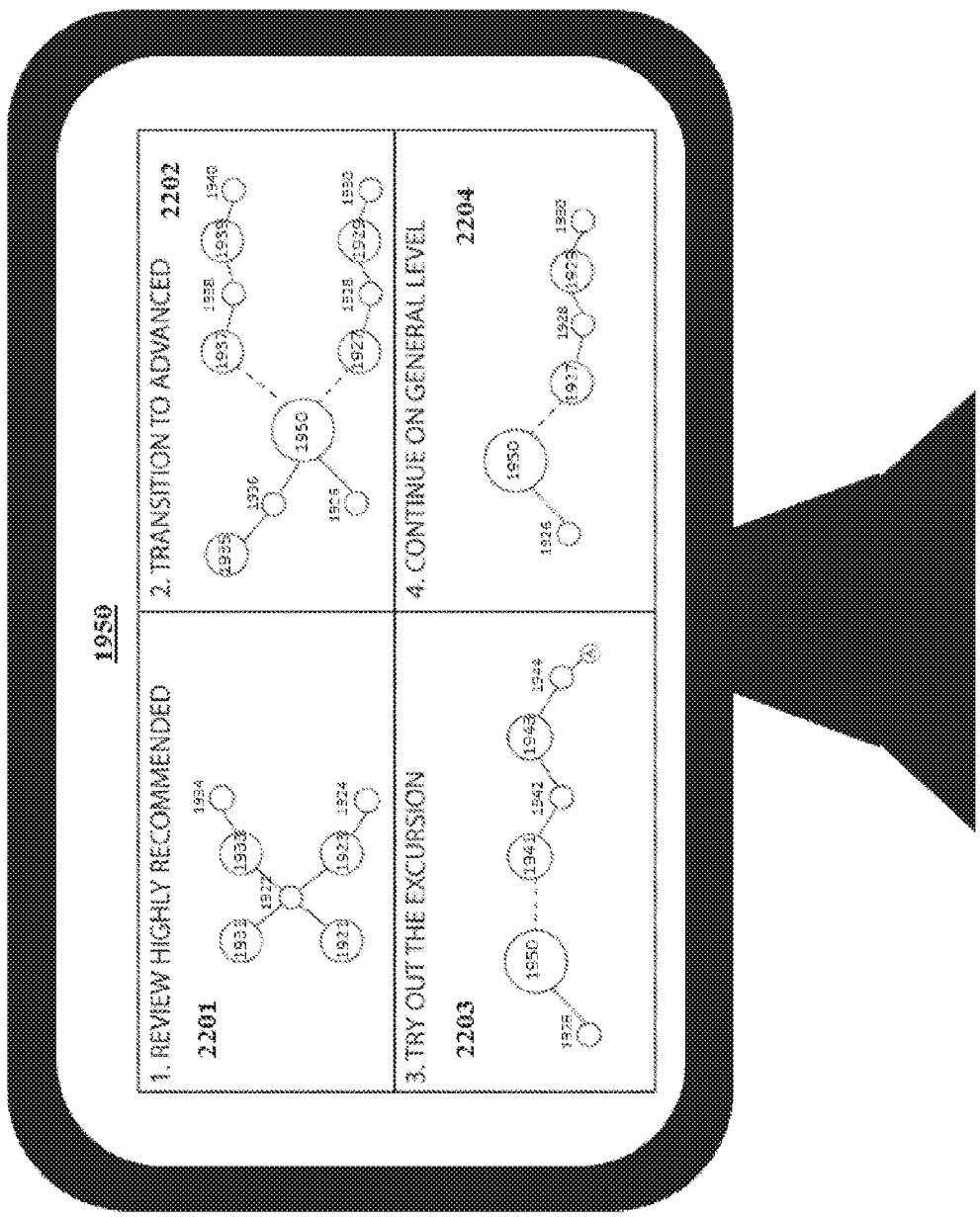
FIG. 22 illustrates an interactive user interface showing a gallery that is displayed to a user.

FIG. 22 illustrates how the interactive user interface may display the gallery 1950 when the user proceeds there after completing problem page 1926. In the gallery 1950 the student is invited to choose among four options displayed in the four quadrants (2201, 2202, 2203, 2204) of the GUI. At the top of each quadrant is a brief recommendation from the system. The textbook's first recommendation appears in the upper left corner, and other options are shown from left to right and top to bottom. The four optional paths are as follows: In quadrant 1, 2201, (1) "Review highly recommended": This is the first recommendation because the uncompleted problem page has not been resolved and the system's calculations have determined a remedial path that is likely to lead to success. When selected, this panel offers a brief summary of the review ("Return to further review and remedial instruction for the uncompleted problem page 1934"). If the user selects this, a vestibule appears that offers further guidance to the explain the path, and guides the student on a click enabled route among test your skills questions associated with the pages displayed in this panel that eventually takes the student back to problem page 1934. In quadrant 2 2202, (2) "Transition to advanced": Alternately, the textbook advises the student to continue on the advanced level despite the difficulty with 1934, starting from topic page 1935 and problem page 1936 which came before the gallery 1950, and then continuing from 1937. This option is offered because of the student's good performance on the Question Cascade and the solid basis for further study the student established there. If the student selects this, a vestibule appears that offers guidance and gives the student the option of first completing the general level pages 1937-1940 before reverting to the advanced level. In quadrant 3 2203, (3) "Try out the excursion": The student has qualified for the excursion through 1941-1944 as described above. This excursion is an instance of an innovation, which takes the student to another area in the custom map that is logically connected to topic 22. However, this is not highly recommended because the student has lost a little time working with remedial materials, and because it may distract from the transition to advanced level which the student has been preparing for. If the student does choose this option, when the excursion is complete the student will be offered a vestibule in the form of a custom junction in which to choose between returning to general level or transitioning to advanced level. In quadrant 4 2204, (4) "Continue on general level": This option is not recommended because the student can succeed at a higher level.

Quadrants 1 and 2 (e.g., 2201, 2202) may be examples of the system's ability to compose transition content according to the student's circumstances. Each panel offers a description of the option and explains why it may be a good choice and further offers a graphic display of the path. Quadrants 3 and 4 (e.g., 2203, 2204) may be examples of standard options built into the textbook, which offer gateways to vestibules in the custom map. As explained in the paragraph above having the heading "Vestibule," after making a choice at a junction, a student may be presented with a vestibule which may present such features as a preparatory test of skills and knowledge or a problem page or alternatively invite the student to pause and reflect. A vestibule may show a map of the path ahead and/or describe what the student will learn and how that knowledge will be useful. A vestibule may appear as a node or as an icon attached to a connector in the custom map. In the latter case, the vestibule may appear as content attached to the connector that leads from the point where the choice was made to the first page of the chosen option. When the student is navigating through the content layer, vestibule content shows up as a content page as the route is being traversed. When the student navigates the custom map, vestibule content is accessed by selecting the connector to which it is attached or alternatively jumping ahead to the subsequent node.

Figure 23:
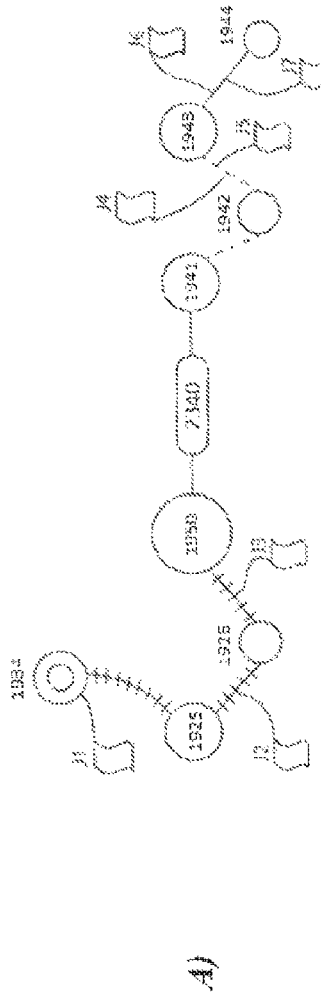
FIG. 23 shows alternate GUI modes for displaying an example dialogue.

In this example, the student chooses not to go back immediately to continue remedial instruction, and instead chooses option (3). In doing this, the student ignores recommendations from the electronic textbook. The teacher and caregiver had earlier entered user requests for system notification when the choice is made, hoping instead for a selection of option (1). As illustrated in FIG. 23, when the notification reaches them, they immediately begin to exchange comment messages. Each message in their dialogue receives the attributes of sender(s), recipient(s), owner(s), creation time, subject, and relevance to a location or locations in the custom map. In this case the subject is "personal support."

The messages may reside in the library of the student's device and/or may reside in one or more backup locations. The messages are secured wherever they reside. The teacher and caregiver each make use of their personal accounts associated with the student's electronic textbook system account to access the comment system, read and edit comments, and operate display tools and view messages on this subject. They may work simultaneously with one another and/or simultaneously with the student without causing any interference with one another's efforts or compromising security. They may have access to collaboration tools that permit both of their shared inputs to appear simultaneously on both of their device displays.

The interactive interface system may support at least two ways to display the comment dialogue in relationship to the custom map. The dialogue can be overlain on the custom map as comments linked to nodes and/or connectors, or the comments may be displayed in chronological order with a link to the corresponding custom map nodes and connectors attached to each one. FIG. 23 shows these alternate GUI modes for displaying an example dialogue.

Upper panel A shows comments linked to elements of a custom map, and lower panel B shows comments in a chronological order with links leading to these same custom map elements. In this example, the student was in the classroom when he failed to succeed with 1934 for the second time. Both privileged users were promptly notified. The teacher was unable to respond to the notification immediately, and the student did not ask for help. The student's mother received the news right away and was concerned. That evening she talked to the student and was able to gauge his feelings and state of mind. The student did not have a clear idea about what had happened and was reluctant to talk about it. The student appeared to be a little upset and worried. The mother messaged a comment J1 to the teacher about this, linking it to the 1934 node. After the failure, the electronic textbook system recommended review and remedial work. During class the next day, the student considered this recommendation and did not accept it; instead, the student chose to return to the general level to complete 1925 and 1926. Both privileged users were again notified, and this time the teacher was able to meet with the student soon after the student made the choice. The teacher asked if the student would like to talk about the recommendation, and the student said no. The teacher messaged a comment J2 to the effect that the student seemed defensive, linking it to a connector between nodes 1925 and 1926. The student's mother had a warm talk with the student later that day, but the student did not bring up the course, and later she sent a comment message J3 to the teacher reporting that the student was firmly committed to the choice, linking the message to a connecter between nodes 1926 and 1950.

The third notification came the next afternoon when the student was studying at home. The student rejected the recommended options in gallery 1950 and instead chose to try out the excursion on the innovation path beginning with vestibule 2340. The student's mother received the notification and went to the student right away. She sat down next to him and watched as the student worked. She spoke supportively as the student worked through 1941 and 1942, and the student visibly cheered up. That evening she messaged J4 the teacher suggesting that the solution for the difficulties the student was experiencing was for one of them to be present in the same room whenever the student was making a choice in order to talk about the choice with the student while the student was making up his mind. She offered to provide the support herself during the student's homework sessions. She linked the comment to a connector between nodes 1942 and 1943.

The teacher sent a comment reply J5 agreeing to the proposal and outlined a personal support program for the student, linking the comment to the same connector between nodes 1942 and 1943. The teacher also attached system documentation that explained that the electronic textbook system could hasten or slow the student's work progression as appropriate. This could be applied to arrange for the choices to come up when the student was likely to be studying at home or likely to be in the classroom. The system would also notify mother and teacher in advance of the probable time when the choice point would be reached. The system would also bring up the choice page for the two privileged users to view and talk over beforehand. Also, the interactive user interface allows teacher or caregiver to provide in advance comments upon the choices that are presented to the student along with the choices. Also, with the authorization of both teacher and caregiver, the electronic textbook system permits changes to the nature of the choices actually presented, for example by removing or adding an option, and/or editing the choice descriptions. The caregiver agrees in message J6, linking the comment to a connector between nodes 1943 and 1944. Further, both the teacher in message J5 and caregiver in message J6 agree that all messages on this subject are jointly owned by both of them, and that no message will be shared with the student or anyone else in the absence of mutual agreement to share. They agree that the personal support project will become a part of the student's course records. They also agree to select the option to display by default the personal support project comment marker flags when viewing the custom map.

The teacher, in message J7, reports that the controlling entries have been entered into the system such that the student will be taken to the remedial option (1) when the student completes the excursion, but that the student will be diverted in other projects so that this notification will be postponed until the caregiver is present with her child. The teacher links this comment to the same connector between nodes 1943 and 1944. The teacher also sends additional system documentation that explains that the personal data about the student assembled by the system is strictly confidential and securely protected. In an embodiment, the information may be owned by the caregiver or the student or both, and visible to the teacher only with the approval of the owner.

Several capabilities of the electronic textbook system may contribute to the personal support project: Notification: The system tracks the periods of activity of the student user and the student's progression over successive pages and connectors and within individual pages and connectors. The system can provide a real-time dashboard that shows progression to a privileged user and can notify a privileged user about significant events. For example, both privileged users were notified about four key events beginning with the student's second failure with advanced problem page 1934; Monitoring Status: In an embodiment, sensors in the system may monitor multiple quantified aspects of the student's personal status and learning status. The system may offer measures calculated based on the values of these aspects that represent well recognized mental states such as anxiety, distraction, inaction, haste and sleepiness. A privileged user may specify threshold values for a set of these measures and/or other measures specified by the user and receive notification whenever a specified value is exceeded. The ongoing values of these aspects and measures may be recorded as an element of the student's personal information, for subsequent analysis when warranted; Scheduling: The system can influence the student's schedule. Progress may be hastened by encouraging the student to complete a task or focus on mandatory work. Progress may be slowed by encouraging the student to have a break or undertake a test your skills page or choose among optional pages to view; Authenticated Validation: The system routinely tracks user inputs and recognizes users and this also has the beneficial effect of authenticating users. The system can additionally deploy multi-person validation to reach consensus among two or more users and affirm consensual decisions. The student, teacher, caregiver, other mentors, and other privileged users such as fellow students and friends with whom the student shares information can take advantage of this feature. Adjusting the Learning Configuration for Mentor's Instructions: The electronic textbook system models the student's learning styles, learning capabilities and preferences, and makes use of these models to adapt the learning configuration for the benefit of the student. The system can impose restrictions on this process in order to implement instructions received from privileged mentors such as teacher and caregiver. For example, restrictions may take the form of modifying parameters in the student's learning styles, capabilities or preferences that influence the system's calculation of the learning configuration. Alternatively, restrictions may take the form of specifications for the learning configuration itself that restrict the range of alternatives that the system can consider when calculating the configuration. Instructions received and restrictions imposed are recorded in the comment system. In the present case the first solution of modifying parameters turns out to be sufficient: a single adjustment to the student's learning styles and a single related adjustment to the student's learning capabilities suffice.

Facilitating System Improvements and External Learning Inputs

As explained in the paragraph above having the heading "Self-Correcting Paths: Fixed Thresholds," the author or publisher or other agency may collect population data across some or all students on students' traversal choices in order to determine whether recommended paths should be adjusted. As explained in the paragraph above having the heading "Self-Correcting Paths: Adaptive Thresholds," additionally population data on each student's performance subsequent to path recommendations may be collected and examined in the context of performance prior to the recommendation, to determine whether criteria applied at the time of path recommendations should be adjusted. To protect student privacy in these cases, each student's data may be transmitted to the population dataset anonymously, for example pseudonymized, preferably without any way to trace the information that has been released back to the student. This can be accomplished by assigning to each student a unique and permanent confidential identifier such as a uuid, which is used solely to identify that student in anonymous data, and is never used in any manner that might be traced back to the student. The uuid is hidden within the student's personal data in the system, and is accessible only for anonymous disclosure.

As described in the paragraphs above having the heading "Comment System," some form of comments, when collected across an extensive student population, may be useful information for system improvements. The electronic textbook system can collect user comments in templates that structure the information entered (as if filling out a form.) Such comments can offer feedback to the author and information for other students in the form of ratings on electronic textbook features and responses to questions asked by the author in an accompanying comment. Student comments can also contribute to a systematic effort to link locations in the textbook traversal with relevant information on the web that is appropriate for the student population. For example, as described in the paragraph above having the heading "Urgent Need," it would be extremely helpful to expand the student user's access beyond textbook contents to closely related and suitable material on the web relevant at any particular point in the textbook. Comment templates drawn up with the advice of one or more search providers, supplemented by a student option to perform optional web searches at that point, can help to determine priorities for suitable web links to offer to the student population and productively embed the electronic textbook in the worldwide web. To protect student privacy in this application, which is particularly vulnerable to disclosure because a student's web searches may be initiated from the student's own device or family device, it seems essential for the electronic textbook system to serve as an intermediary, aggregating the population of comments and sending them forward, compartmentalized according to individual students and linked to their positions in the textbook, but subject to the requirement that students remain anonymous and unidentifiable. (This is in stark contrast to students' sharing of comments with other students, where, in an embodiment, students who share comments may be required to identify themselves.)

In some embodiments, the system may centralize student data anonymously in order to build up population data for pre-arranged system adaptations, research or further improvement of the system. For example, researchers may wish to associate confidential personal data in the electronic textbook system with external measures of student performance, such as standardized examinations. Associating confidential electronic textbook information related to performance and learning styles with test results in a statewide or national examination might help to evaluate the electronic textbook system and potentially improve it. Since external measures are matched to individual student users of the electronic textbook system through student identities, exporting matched confidential information identified in this way would breach secure confidentiality. Instead, matching and subsequent study of the data should take place in an anonymous setting wherein identities have been entirely erased. This could be accomplished within the administrative capabilities of the electronic textbook system, or by a trusted third party, through a three-step procedure: first, match external identifications of students with system identifications; second, for those students with a confirmed match, compose a bundle comprising both system information and external data from which any identifying information on both sides has been removed; and third, export the anonymous bundle for research study at a population level in an anonymous or pseudonymized setting.

In some embodiments, the electronic textbook system may be configured to receive learning configurations and/or customized instructions and materials for individual students. The system may accommodate inputs from external guidance systems concerning transitions and innovations that are targeted for individual students based upon their personal data. Third parties may craft superior elements, such as improvements in communications between system and student, that are calculated externally based on personal student information within the system to which approved methods are applied, and then fed back into the system as a supplementary factor in student guidance. There may be different guidance systems for various ranges of student capabilities. Authors may experiment with revised guidance systems in preparation for a revised edition. Educational authorities may take an interest in guidance systems. Artificial Intelligence may be applied to individual data in search of optimal guidance strategies. In any of these circumstances, in addition to the risks to the security of the individual student's personal data already addressed above, the security and privacy of the electronic textbook system may be threatened and even the integrity of the system might become vulnerable. It may be essential for the system to provide an intermediate workspace housed in a distinct knowledge base, like an anteroom or sandbox, wherein an image of the student's individual and operating data is available but all information suggestive of the student's identity has been expunged and wherein specialized software exports necessary information to the external system and imports suggested material from the external system, reviews the suggestions within the context of the student's present situation, and whenever suitability is not in question, submits it to the electronic textbook as a substitute for—or an addition to—material in the area of visibility, accessibility and permissions or other areas as appropriate.

Ultimately all of this might mature into personalized support algorithms for individual students and a general adaptive feedback system for textbook implementation improvement.

Security and Coordination Based on the Custom Map

Compact and Sufficient Secure Encoding (CSSE).

The terms used in the designation "Compact and Sufficient Secure Encoding" (CSSE) define its function. It is "compact" so that it can be quickly communicated or shared and quickly decoded. It is "sufficient" in that it specifies a particular item that belongs to a particular class or type, and is sufficient to fully specify the unique qualities of that item of its particular type. It is a full specification, not an approximation. It is "secure" in the sense that it conveys information reliably without obviously disclosing it. It is an "encoding" in the sense that it is encrypted or otherwise encoded so that it cannot be interpreted without access to a key to the encryption or coding.

The CSSE may be self-sufficient in the sense that it is not a label or pointer to a complete description elsewhere, but rather an encoding of the complete description and its content, and is therefore actionable in itself. Alternatively, it may also hold a pointer or set of pointers to information stored in a knowledge base about the class or type, and encode the location or multiple locations of the specification. The CSSE system serves to compactly record a unique instance so that it can be subsequently recovered. A CSSE may correspond to an "information structure" for the class or type to which the item belongs, which characterizes the attributes of the item in an intelligible way. A CSSE is calculated and encoded on the basis of information in such an initial information structure of that particular type, and then when the CSSE is subsequently decoded in order to be applied, the decoded values fill in an information structure of the same type containing values identical to the initial encoded values.

In several areas such as personal information, system information, operations, and items with families of instances such as flexibly rendered versions of the same page, the system may rely on parameterization to uniquely identify a unique instance of the information structure and to encode that securely, sufficiently and compactly. The CSSE system can record information. Its primary function is to support communications, such as communication between devices, communications between different modules of a system operating on the same device, or a combination of these two. In general, the parameterization differs from one information structure to another and is dependent upon the class or type. The secure encoding system, by contrast, may be general and may apply to all forms of parameterization, regardless of the type or class.

For example, the meaning of a CSSE for a student's traversal thus far in the course, as it might apply to a student approaching the twenty-ninth content page at the general level, may be represented quite differently for different students. A student who had proceeded on the general level, completing every content page and problem page through the twenty eighth topic, may have a brief CSSE interpretable as "general level completed routinely from inception to this point." A student who had generally proceeded on the advanced level through topic 29 and completed all topic and problem pages, and who had also visited and completed general level topics and problem pages for five earlier topics and was in the process of beginning the same thing now with topic 29, might have a CSSE interpretable roughly as the description in this sentence. On the other hand, a student who had generally stayed on the general level, sometimes failing to complete problem pages, and who had consulted basic level material and various remedial resources often on the recommendation of the system, and who had previously failed to complete topic 29 at the general level and then continued successfully on the general level to topic 35 and was now returning to attempt topic 29 again, may have a CSSE that specified one by one in sequence all the pages visited by the student in traversal order, together with their state of completion, up to the present.

A CSSE can be used to record a particular instance of a family of items, for subsequent application when the family is again evoked and that same instance of the family is again required. This method is used, for example, when a flexible rendering of a page that offers a family of possible representations was presented during an initial traversal and is subsequently presented again when revisiting that page while reviewing material or retracing the path taken. In this case, the CSSE for that page specifies one of a class of renderings for that page, and the exact CSSE that was used is recorded as a hidden property of the system's presentation of the traversal. For example, in the case of a word problem in a math course at the elementary level that concerns the rate of filling of a cylindrical tub, the wording of the problem and the image depicting the situation might both be adjusted in the rendering according to a set of parameters such as the rate of flow, the depth of the tub, the surface area of the tub, the amount of water the tub holds, the level to which the tub should be filled and the correct answer to the question about the time required for filling. In this case there are six numerical parameter values including the correct answer, and the CSSE could simply identify the family and hold these six values.

Directed Graph Visibility/Accessibility and Security System.

Each student can proceed through the textbook by traversing a series of nodes and connectors. The traversal is a record of the student's activities. It is important that the traversal accurately represents the student's learning and accomplishments during the course. The student should be supported so as not to damage the traversal by becoming confused or getting lost and consequently making random excursions. Users of the student's account other than the student, such as other family members or friends, should not be able to confuse the student's traversal through their own activities with the textbook or by editing the record of the traversal. If the student's device is lost or stolen, and another person obtains possession of it and gains access to the account, it should be impossible for that person to harm the traversal or prevent the student from continuing the student's own traversal on another device. If a hacker somehow gains access to the device, the same protections should again protect the student's traversal and other private information from the hacker.

The student's confidential information can be protected from access by anyone who lacks privileges, and no such information may be exposed to any searches lacking proper permission. Similarly, if the student shows someone else the student's classwork in the system, the student's confidential data may not be casually exposed to the view of a person lacking privilege and instead should be hidden.

A non-student user registered in association with the student's account cannot participate directly in engagement with active content or receiving credit for performance, except to the extent approved by administration when needed to support the student's interactions with the textbook. Inputs of any kind at any time that are not received from a person recognized at that time by the monitoring and recognition system are unacceptable and prompt the system to seek credentials from the inputting user and take immediate precautions to restrict the input flow and potentially initiate an investigation. As introduced in the section above having the heading "Activities on Textbook Pages," in addition to (1) experiencing the material on the page, the student can (2) navigate between overlay view and content view of that page, (3) enter a comment, (4) use search and glossary, and (5) navigate to the next step of a recommended path or an optional path offered by the system. These five "general features" are generally available to the student at all pages visited. Two further activities, "authorized features," by contrast, are normally available when the student arrives at a page while pursuing a route recommended by the textbook, but otherwise may not be permitted: (6) Engage with interactive content and (7) Credit performance based on interactive content to course performance. And two other activities, "authorized transition features," are generally permitted at a junction page or during a transition or when considering a choice, but may not be encouraged when the student is not following a sequence of connected pages or not following a recommended route: (8) Use information tools relevant to navigation, such as Index or global view, that extend beyond the range of view ahead and path taken view and (9a) use the course navigation system to navigate to connected locations and (9b) continue to navigate beyond the first page reached in that way.

In order to implement these rules, and more broadly in order to secure the student's traversal record in the context of system recommendations and support the system's efforts to guide the student effectively, the student's traversal may be permanently recorded step by step in a robust storage mode such as a blockchain.

All connectors and nodes in the custom map have unique identifiers, and any extensions to the custom map, as described in the section having the heading "Extensions in the Textbook," can be likewise assigned unique identifiers as the custom map is extended.

The traversal record and custom map may together fully specify the student's participation. This information may be securely stored within the system's knowledge base, and the image of the traversal history in the student's personal information is updated step by step as the student proceeds.

The user's right to make a requested transition from one item to the next requested item can be determined by the user's permissions. In the case of a student user, the student's right to make a recommended move can be determined by current accessibility status which in turn depends on individual information of several kinds. As explained above, in various circumstances the student may make a general transition that is not specifically recommended, and this general permission is granted in order to provide open access to relevant topics. When a student is not following a recommended route, authorized features and authorized transition features may not be available at the current page. The student may eventually need to return to a recommended route and can return automatically to the starting point of the excursion at any time, but until then the student still has access to general features on the current page and can, for example, continue to pursue and examine search and glossary references within the textbook.

The control of user access to shielded categories can be implemented by knowledge base availability. For example, a student's comments can reside in a distinct knowledge base, which is visible only to the student and to others who have been granted permission. The student will see these comments linked to the nodes and connectors where they were created or to which they pertain, but, for example, a parent viewing an entrained version of the display would see blank spaces in the locations where the comments are displayed unless the student has shared the comments with the parent.

Calculation of a user's permission for a given transition as well as the user's status with regard to activities on a page can be determined by the user's permissions and the CSSE for the current status of the user's traversal. The calculation can become more complex if the student has made frequent excursions into non-recommended pages and/or has sometimes failed to complete pages or to perform well, because in these cases the full histories of traversal and recommended traversal options may need to be assessed in connection with other resources such as learning capabilities and performance records in order to assess the current situation.

The following personal information regarding or related to the student can be mapped to the student's traversal: (1) The traversal itself, recorded as a series of join lock events and connectivity operations; (2) Communications with the textbook system, including traversal recommendations received and comments exchanged; (3) Student status in respect to prior recommendations received as well as prior goals and wrappers formulated by the student; (4) Visibility, accessibility and permissions as of each point in the traversal; (5) Navigation choices offered to the student during content layer and overlay layer navigation and choices made; (6) Interactions with pages and connectors, including completion, and interactions with questions and problems on the page such as answers submitted and feedback received; (7) Visitation and completion status for all pages and connectors along with measured performance on each question or problem on each page and connector; (8) Comments made and comments received; and (9) Participation records logging intervals of activity and participation along with accompanying circumstances.

The system can also calculate descriptions of current conditions that are decision-relevant based on the information above. This summary information at the present time can also be mapped to the student's traversal. In an embodiment, as described in the section having the header "Adapting the Learning Configuration to Performance and Preference," this information falls into the following categories: Learning capabilities, Performance capabilities, Learning styles and preferences, Goals and wrappers, Linguistic and logical skills and knowledge, Speech and composition, and Device engagement. These summary measures are circulated for distributed calculations and recorded.

The system can implement visibility, accessibility and permissions during the student's progression through the material, as described in the paragraphs having the heading "Visibility, Accessibility and Permissions."

The system has the following characteristics: (1) The system is applicable to a collection of information nodes and connectors, which may be represented in a directed graph or in a similar graphic structure; (2) A node can be reached only by means of traversing a connector or by a "connectivity operator" such as a gateway, a junction page, a search or glossary reference; (3) With the exception of a gateway, each connector links two nodes except in circumstances related to security where multiple connectors are joined in sequence. A user, such as a person, an entity or a computer program, may have access to the nodes at both ends of a connector, or to the node at one end but not at the other end, or to neither of the nodes. In the first case, the user can traverse the connector to proceed from one end to the other; in the second case, the user cannot traverse the connector to the inaccessible node but the user may be able to view certain details of the inaccessible node and certain details of the connector; in the third case, the user has no access to either node and no access to the connector; (4) Access may depend upon current location: for example, a node may become accessible when the user closely approaches it. (This may apply, for example, to the content attached to a node, which becomes accessible only when the node is reached, or to a sequence of connected nodes which each become accessible only when the previous node is reached); (5) In some cases, dimensions of permission may include generic requirements as well as personal permission, and a user may need to satisfy one or more generic requirements as well as qualify for personal permission based on ownership and/or performance or capability or sharing. (6) Visibility and accessibility may coincide, or the conditions for the two may differ. A user with comprehensive visibility permissions may see a well-formed directed graph, while a user with limited visibility permissions will only see the visible subset of nodes and connectors; (7) A person may traverse the directed graph within a permitted range, while chaperoning another person or persons who have lesser permissions on an escorted tour. The tour members can see only what is included in their limited visibility permissions. During the tour, the chaperone may selectively activate one or more visibility exceptions on behalf of the tour members and open up specific elements for them to view, without there being any risk that the tour members will see other connectors or nodes in the directed graph for which they do not have permission; and (8) when the electronic textbook is implemented through this system, one of the features of the system is recognition of a person's presence, and the system is able to handle this in different situations in different ways. For example, when a teacher and a student are both present, the system may grant access to the union of their two permissions, or to the permission set of one of them, or to the intersection of their permissions, depending on the inputs received from the teacher or both people.

Calculation Hub.

In some instances, an instance of the calculation hub can operate on each device. The hub on a device can provide oversight for the system's operations on the local device and manage information flows and calculation interchanges among modular components on the local device. Each hub can also coordinate with hubs on other devices to manage inter-device communications and calculation interchanges. As the name "calculation hub" suggests, the hub can be at the center of various calculations performed by modules. The hub can receive and disseminate timely information. It can maintain timely information and share it among modular components, also indicating to any module when any type of information relevant to that module is temporarily in flux and subject to change in another module. The hub can also reconcile most discrepancies arising from simultaneous independent processing of related information.

The hub can facilitate high speed interaction among the different calculation modules and also conduct interchanges with system hubs on other student devices and mentor devices. Modularity can help to distribute calculations between local modules and cloud modules. Modularity can further help to break out dedicated special purpose hardware/firmware/software modules for specific purposes, such as audio transcription, language interpretation and language translation. Modularity can also help to make use of multiple processors efficiently, by distributing to different processors different subsets of calculations that can be performed independently and in parallel. Processors may reside on the local device or may operate on other devices, such as a classroom device, a collaborator's or mentor's device, or an administrative or cloud server. Local modules can process voluminous locally generated information, such as processing of speech and—distinct from that—processing various forms of information sensed by keyboard, screen or microphone or camera in respect to recognizing the individual and characterizing actions. Modularity can facilitate upgrades that apply to specific modules.

Calculation modules that each control one or a few knowledge bases housing related information, and that are arranged so that different modules focus on different knowledge bases, may be beneficial because disruption of any one knowledge base or its network connection can be isolated using the CSSE system so as not interfere with other modules' calculations.

The calculation hub can operate the calculation of the local Interactive User Interface GUI display, coordinate the entrainment of the local display to another display such as the classroom display, and manage the entrainment of another display such as a mentor's or a collaborator's display to the local display.

The role of the hub can be further illustrated in regard to the following five implementations, each of which has been described above. First, managing the student's remote participation in a course or remote collaboration with a mentor or other students. In this implementation, the hub coordinates the operation of multiple devices and also coordinates processes such as communications and interactive user interfaces that are functioning in parallel on multiple devices and must be synchronized.

Second, monitoring inputs and recognizing the user, and making use of this information to record the student's participation and detect any misuse of the system by some other person. This implementation requires that extensive databases of personal information utilized in the recognition process reside on the user's device, that other more compact personal information resides on the system server, and that the personal information must be synchronized at the two locations while extensive calculations are proceeding on the user's device. The CSSE method can be very helpful in these first two implementations because of its speed and security, and may be generally employed by the calculation hub in all inter-device or inter-module information transmissions.

Third, coordinating the calculation of personal information and the interactive user interface display when the student is receiving remedial assistance. As described in the question cascade example, this implementation involves calculations that refer to extensive information relating to the student's traversal history and learning models and styles, and involve the Assessment and Traversal Module, Custom Map Database, Content Aggregation Module, Content Database and Model Database, Traversal Database, as well as the User Identity Database. The hub must coordinate calculations that extend across these modules and databases in order to adapt the interactive user interface map configuration to reflect the user's performance during remedial instruction (e.g. a failure to complete a question successfully, as well as the type of mistake that has been made), and the calculations must be completed as quickly as possible to minimize unnecessary delays.

Fourth, receiving instructions from a teacher or mentor that modify the system's customized learning environment for the student, and arranging for a prompt response. This implementation is particularly challenging, because any adaptation to significant information from outside sources that bears upon the student's learning models and styles requires extensive calculations of the same complexity as the third implementation above, and aligning the textbook's modeling and recommendation processes with external instructions that override some aspects of the internal process adds further complexity.

Fifth, in an embodiment handling external inputs concerning a customized learning environment. As described above, the secure implementation of externally calculated inputs based upon confidential personal data involves a number of security challenges, entails additional modules, and adds additional complexity to the system's internal calculations which must evaluate and adapt to the external inputs, integrate the external inputs with internal calculations, and implement the integrated results.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. An interactive graphical user interface presented on a display for navigating an electronic textbook, comprising:
    a custom map including a visual representation of a plurality of layers, each layer comprising a plurality of graphical nodes and a plurality of graphical connectors therebetween, a graphical node corresponding to a page, and a graphical connector corresponding to a path between any two pages, wherein the visual representation of the plurality of layers includes at least one graphical connector traversing between two graphical nodes located in two different layers or offers the opportunity to navigate between layers;
    a graphical status indicator on the custom map, wherein the graphical status indicator indicates a current location of a user on the custom map, the current location being a current node; and
    content of a current page of the electronic textbook corresponding to the current node,
    wherein each of the plurality of graphical nodes is selectable by the user, wherein selection of a subsequent graphical node navigates the user from the current page to a subsequent page corresponding to the subsequent graphical node.

2. The interactive graphical user interface of claim 1, wherein the custom map is user-specific to the user.

3. The interactive graphical user interface of claim 1, wherein each of the plurality of layers corresponds to a different difficulty level of the electronic textbook.

4. The interactive graphical user interface of claim 1, wherein the interactive graphical user interface further displays a visual representation of a comment layer overlaying the custom map, the comment layer comprising one or more comments.

5. The interactive graphical user interface of claim 4, wherein each of the one or more comments is linked to a node or connector of the custom map.

6. The interactive graphical user interface of claim 4, wherein each of the one or more comments is associated with viewability permissions.

7. The interactive graphical user interface of claim 1, wherein the custom map further comprises a graphical representation of a path previously traversed by the user to arrive at the current node.

8. The interactive graphical user interface of claim 7, wherein the path is a graphical highlight of one or more nodes or one or more connectors in the path.

9. The interactive graphical user interface of claim 8, wherein the path is permanently stored in a database.

10. The interactive graphical user interface of claim 9, wherein the database is secured by a blockchain.

11. The interactive graphical user interface of claim 1, wherein the custom map further comprises a graphical representation of a recommended future path.

12. The interactive graphical user interface of claim 11, wherein the recommended path is a graphical highlight of one or more nodes or one or more connectors in the recommended path.

13. The interactive graphical user interface of claim 1, wherein the custom map is updated in real-time.

14. The interactive graphical user interface of claim 13, wherein the custom map is updated in response to user interaction with the interactive graphical user interface.

15. The interactive graphical user interface of claim 1, wherein each of the plurality of graphical nodes and plurality of graphical connectors are assigned a unique identifier.

16. The interactive graphical user interface of claim 1, wherein the custom map is collapsible such that the display primarily shows the content.

17. The interactive graphical user interface of claim 1, wherein a subset of the plurality of graphical nodes corresponds to problem pages containing user-interactive problems.

18. The interactive graphical user interface of claim 1, wherein the plurality of graphical nodes displayed in the custom map is within viewability permissions relative to the user or relative to the current node or relative to the layer of the current node.

* * * * *